United States Patent [19]

Wishneusky

[11] Patent Number: 5,566,352

[45] Date of Patent: Oct. 15, 1996

[54] REGISTER-READ ACKNOWLEDGMENT AND PRIORITIZATION FOR INTEGRATION WITH A HARDWARE-BASED INTERRUPT ACKNOWLEDGMENT MECHANISM

[75] Inventor: John Wishneusky, Bolton, Mass.

[73] Assignee: Cirrus Logic, Inc., Fremont, Calif.

[21] Appl. No.: 774

[22] Filed: Jan. 4, 1993

[51] Int. Cl.$^6$ .................... G06F 9/00; G06F 9/46
[52] U.S. Cl. ............ 395/868; 395/200.06; 395/200.16; 395/478; 395/733; 364/230.1; 364/230.2; 364/280.8; 364/263.2; 364/241.2
[58] Field of Search ................... 395/275, 725, 395/250, 200.06, 200.16, 309, 310, 478, 733, 868; 364/705

[56] References Cited

U.S. PATENT DOCUMENTS

| | | | |
|---|---|---|---|
| Re. 33,521 | 1/1991 | Mori et al. | 364/200 |
| 4,070,706 | 1/1978 | Scheuneman | 364/200 |
| 4,332,011 | 5/1982 | Epstein et al. | 364/200 |
| 4,456,970 | 6/1984 | Catiller et al. | 364/900 |
| 4,641,266 | 2/1987 | Walsh | 364/200 |
| 4,648,029 | 3/1987 | Cooper et al. | 364/200 |
| 4,752,930 | 6/1988 | Kitamura et al. | 371/62 |
| 4,914,625 | 4/1990 | Billian | 364/900 |
| 4,975,828 | 12/1990 | Wishneusky et al. | 364/200 |
| 5,129,065 | 7/1992 | Priem et al. | 395/375 |
| 5,148,544 | 9/1992 | Cutler et al. | 395/725 |
| 5,150,465 | 9/1992 | Bush et al. | 395/275 |
| 5,280,579 | 1/1994 | Nye | 395/166 |
| 5,384,834 | 1/1995 | Sato et al. | 379/88 |

OTHER PUBLICATIONS

*CL-CD1400 Data Book*, Cirrus Logic, Inc., Sep. 1993, pp. 1–131.

Primary Examiner—Thomas C. Lee
Assistant Examiner—Rehana Perveen Krick
Attorney, Agent, or Firm—Blakely, Sokoloff, Taylor & Zafman

[57] ABSTRACT

A register-based computer architecture is particularly suited for using a common resource, such as a host processor or CPU, to respond to multiple devices such as co-processors, slave processors, or peripherals via service requests initiated by these devices. The invention's register acknowledgment and service prioritizing features are preferably added to, and integrated with, a prior-art, hardware-based interrupt acknowledgment mechanism, thus providing enhanced flexibility and performance. This architecture includes features for enhancing the support of a service-request based or queue-driven interface between the host processor and the supported devices, including a Service Request Status Register, a Service Request Configuration Register, and Service Request Acknowledge Register(s). From the point of view of the host processor, these registers are accessed as normal input/output read/write operations. From the point of view of the supported devices, such register operations appear to be interrupt acknowledgment operations. This transformation is effected by special-purpose logic within the architecture. The invention is preferably embodied in a monolithic integrated circuit that supports control by the host processor of a potentially large number of data communications ports. These features can be incorporated in pin compatible new versions of existing devices so as to be backwards compatible with the existing devices, thus allowing end users to gracefully upgrade their systems with minimal effort.

25 Claims, 8 Drawing Sheets

| SRCR | SERVICE REQUEST CONFIGURATION REGISTER | | | | | [11 00 110] | |
|---|---|---|---|---|---|---|---|
| BIT 7 | BIT 6 | BIT 5 | BIT 4 | BIT 3 | BIT 2 | BIT 1 | BIT 0 |
| 100PQFP | REGACKEN | DAISYEN | GLOBPRI | UNFAIR | RESERVED | AUTOPRI | PRISEL |

FIG. 4

MRAR     MODEM REQUEST ACKNOWLEDGE REGISTER     [11 10 101]

TRAR     TRANSMIT REQUEST ACKNOWLEDGE REGISTER     [11 10 110]

RRAR     RECEIVE REQUEST ACKNOWLEDGE REGISTER     [11 10 111]

| BIT 7 | BIT 6 | BIT 5 | BIT 4 | BIT 3 | BIT 2 | BIT 1 | BIT 0 |
|---|---|---|---|---|---|---|---|
| MODIFIED SERVICE VECTOR PROVIDED ON READ ||||||||

FIG. 5

| SRSR | SERVICE REQUEST STATUS REGISTER | | | | | [11 00 101] | |
|---|---|---|---|---|---|---|---|
| BIT 7 | BIT 6 | BIT 5 | BIT 4 | BIT 3 | BIT 2 | BIT 1 | BIT 0 |
| ilv1[1] | ilv1[1] | RREQ | rreq | TREQ | treq | MREQ | mreq |

FIG. 6

| MSMR | MODEM SERVICE MATCH REGISTER | [11 00 001] |

| BIT 7 | BIT 6 | BIT 5 | BIT 4 | BIT 3 | BIT 2 | BIT 1 | BIT 0 |
|---|---|---|---|---|---|---|---|
| 1 | USER DEFINED MATCH VALUE | | | | | | |

FIG. 10

| TSMR | TRANSMIT SERVICE MATCH REGISTER | [11 00 010] |

| BIT 7 | BIT 6 | BIT 5 | BIT 4 | BIT 3 | BIT 2 | BIT 1 | BIT 0 |
|---|---|---|---|---|---|---|---|
| 1 | USER DEFINED MATCH VALUE | | | | | | |

FIG. 11

| RSMR | RECEIVE SERVICE MATCH REGISTER | [11 00 011] |

| BIT 7 | BIT 6 | BIT 5 | BIT 4 | BIT 3 | BIT 2 | BIT 1 | BIT 0 |
|---|---|---|---|---|---|---|---|
| 1 | USER DEFINED MATCH VALUE | | | | | | |

FIG. 12

REGISTER-READ ACKNOWLEDGMENT AND PRIORITIZATION FOR INTEGRATION WITH A HARDWARE-BASED INTERRUPT ACKNOWLEDGMENT MECHANISM

FIELD OF THE INVENTION

This invention relates generally to the architecture of computer systems. Particularly, it relates to the use of a host processor (or other common resource) for control/service of a potentially large number of devices such as peripherals, slave processors, or co-processors. For example, the invention can replace an architecture wherein numerous peripheral-device controllers make interrupt requests to a host processor with one wherein the host processor performs I/O reads and writes to a few service-request registers.

BACKGROUND OF THE INVENTION/PRIOR ART

Often events occur in peripheral devices that require the attention of a host processor or CPU. Typically the intervention is provided by a control or service program executing on the host processor. An example of an event is when new data is available for transfer from a peripheral device to a host processor. Another example of an event is when a device is ready to accept new data for transfer from a host processor to the device. These service needs of peripheral devices must be communicated in a timely manner from the peripheral devices to the host processor. A specialized controller is sometimes used to communicate the service needs and may be quite specialized for that particular peripheral device. In addition, the service needs require timely communication between the host processor and the devices.

In the prior art, two basic approaches are known for communicating such service needs or requests from a device to a host processor. The first method is interrupts, wherein the regular sequence of instruction execution of the host processor is interrupted and control is transferred to a device service routine. Interrupts or interrupt requests typically involve dedicated hardware and control signals. The second method is polling, wherein the host processor frequently interrogates each device controller to obtain its current status. The host processor tests this status and then transfers control to a device service routine if required. Polling generally requires software executing on the host to check if a peripheral device has a service need.

One substantial drawback to interrupts is the overhead required to switch contexts between the regular sequence of instruction execution and the execution of an interrupt-driven routine to service the device. Context refers to the present state of registers and memory values that the host is presently operating with. The current values in all, or many, of the host processor's registers and counters are typically saved in main memory before control is transferred to the device service routine, thereby saving the present context before servicing an interrupt. In addition, these saved values are restored to the registers after the device service routine finishes and before control returns to point in the regular sequence of instructions where it was interrupted, thereby restoring the original context. Alternatively, a second set of hardware registers dedicated solely to interrupt service may be implemented. Either alternative requires additional hardware costs and complexity. Processor execution time is degraded by having to save the host context and then return to that context to proceed with further operations.

Another disadvantage to interrupts is the overhead that is required to identify which one of various devices requires service of the current interrupt request. It is common for an interrupt-driven service routine to poll, as its first task, the various device controllers it supports to determine which one initiated the current interrupt. One approach to reducing this time and complexity is to encode a vector in the hardware-level interrupt request. This vector specifies which type of interrupt, out of a handful of possible interrupt types or vector values, occurred. In such vectored interrupt systems, the overhead time between the interrupt occurrence and the start of the "useful" portion of the device service routine is reduced. This reduction in processing time occurs at the expense of additional hardware cost and complexity, thus the system architecture typically supports only a handful of possible values of interrupt vectors. In many systems, interrupt vectors are scarce resources that must be wisely allocated to optimize overall system performance. Due the limited number of different vector values, conflicts among various peripheral devices over the use of an interrupt vector are common occurrences when configuring or reconfiguring 286-based or 386-based personal computer systems. The drawbacks of vectored interrupts becomes onerous in data communications applications, where one may need to support 50 to 100 user terminals from a single host processor. Whether or not vectored interrupts are used, host processors that service a large number of communications channels must spend a significant fraction of their processor resources (e.g. CPU time) entering and exiting interrupt-driven device service routines, if support of the communications channels is solely through interrupts.

In contrast to the interrupt approach, some host processors poll the devices they support, i.e. they interrogate each of the device controller(s) they support to obtain the current status of the device(s) that the particular controller supports. The polling approach eliminates the host processor time required to enter and exit interrupt service routines and the hardware required to support interrupts. Nevertheless, polling typically requires that a significant, and possibly a very substantial, portion of the host processor time be spent polling, i.e. performing these interrogations and the associated tests of the status information obtained to see if any device requires service. In order to respond promptly to service requests when they do occur, the host processor must frequently interrogate each device controller such that it is unlikely that any particular interrogation reveals a service request.

Servicing the needs of peripheral devices also requires that appropriate priorities be established. For example, if a host processor supports a disk and a keyboard, then a delay of 100 ms in servicing an interrupt from the keyboard is likely to be imperceptible. However, a delay of 10 ms in servicing an interrupt from a disk may have an adverse effect such that the disk's continued rotation during the service delay has left the disk and read/write head mis-positioned for the present action requesting the interrupt or the next action. Appropriate prioritization of device service requests increases the hardware cost and complexity and/or increases the host processor time requirements. This applies both to interrupt-based and to polled architectures.

In the prior art, a major challenge for a computer system designer was to somehow transform a steady but unpredictable stream of service requests from a multitude of devices into something that the host processor can manage and control economically. FIG. 1 shows a prior-art solution to the device-service problem. One or more interrupt request lines from peripheral device(s) were connected to a hardware device called an interrupt controller. The interrupt controller could possibly consist of discrete logic or a separate monolithic integrated circuit. Interrupt controllers typically have the capacity to receive a handful of individual interrupt request inputs from peripheral devices. The interrupt request inputs are prioritized among potentially simultaneous requests according to some algorithm that is fixed within the controller hardware. In response to the assertion of an interrupt request, the controller asserts a master interrupt request signal to its host processor. On receipt of an interrupt acknowledgment signal from the host processor, the controller asserts an interrupt acknowledge signal to the specific peripheral device which is being acknowledged. The peripheral device responds to the acknowledgment by placing an interrupt vector on the data bus. The interrupt vector generally contained information of which peripheral or group of peripherals made the request so that the host knew which device to talk to. Depending on the function and sophistication of the peripheral device, the peripheral device (it) may enter a specific interrupt "context" or state to facilitate the performance by the host processor of the task that required service. To improve the process of a stream of interrupt requests from the same device, queues were introduced. A queue is a method of stacking many requests on top of one another. Thus the host processor can process a queued stack of interrupts from the same device or ensemble of devices. Since these am usually similar types of interrupts the host processor stays in the same context. Thus the efficiency of the interrupt handling is improved.

FIG. 2 shows another prior-art solution to improve the performance of handling interrupt requests. Using some discrete or "glue" logic in addition to interrupt control hardware, the interrupt request lines from the peripheral controller are OR'ed together and the result presented to the interrupt controller. This is done to conserve the limited interrupt request inputs to the controller. The controller responds to the interrupt request by interrupting its host processor. However, rather than provide an interrupt acknowledgment signal to the peripheral controller that causes the peripheral controller to provide an interrupt vector, the interrupt controller provides a vector to the host processor that sends it to a generic interrupt service routine. The host processor relies on additional features implemented in "glue" logic to read the individual status of the interrupt request lines from the peripheral controller. This enables the interrupt routine to determine which interrupt request signals are active and choose which one to acknowledge. The acknowledgment is provided by glue logic that decodes the processors attempt to read from a certain address or addresses and activates a selected interrupt acknowledgment signal to the peripheral controller. The controller responds to the acknowledge signal by driving an interrupt vector onto the data bus. The host processor receives this vector as the data resulting from this glue logic-based read operation.

All these prior art solutions have involved signals that form a sort of "handshake" that must be supported by external dedicated hardware elements within the system, called controllers. Because of this hardware, interrupt-handling systems have been inherently inflexible and dedicated to one users system. It is desirable to have a flexible system that is software programmable such that many users can reconfigure one chip in order that the desired interrupt interface can be easily supported and reconfigured.

BRIEF SUMMARY OF THE INVENTION

A register-based computer architecture is particularly suited for using a common resource, such as a host processor or CPU, to respond to multiple devices such as co-processors, slave processors, or peripherals via service requests initiated by these devices. The invention's register acknowledgment and service prioritizing features are preferably added to, and integrated with, a prior-art, hardware-based interrupt acknowledgment mechanism, thus providing enhanced flexibility and performance. This architecture includes features for enhancing the support of a service-request based or queue-driven interface between the host processor and the supported devices, including a Service Request Status Register, a Service Request Configuration Register, and Service Request Acknowledge Register(s). From the point of view of the host processor, these registers are accessed as normal input/output read/write operations. From the point of view of the supported devices, such register operations appear to be interrupt acknowledgment operations. This transformation is effected by special-purpose logic within the architecture. The invention is preferably embodied in a monolithic integrated circuit that supports control by the host processor of a potentially large number of data communications ports. These features can be incorporated in pin compatible new versions of existing devices so as to be backwards compatible with the existing devices, thus allowing end users to gracefully upgrade their systems with minimal effort.

It is an object of the invention to provide a register-based acknowledgment mechanism and a traditional hardware-based mechanism in the same device. This combination supports a variety of hardware-based and software-based acknowledgment strategies to be employed by the host CPU in its interactions with the device.

A related object of the invention is to permit the enabling and disabling of the daisy-chain capability of the service acknowledgment mechanism under host software control, thus providing for backwards compatibility and a graceful introduction of the above-mentioned combination into existing designs or actual systems.

Another object of the invention is to provide features for prioritizing service requests by the device, either with regard to the types of requests which it may itself be asserting, or with regard to the shared requests made by an ensemble of devices. The sharing of requests of like type is typically performed by a wired-OR connection of like service requests. The device prioritizes those requests according to user selectable options, and assigns the highest priority available request to the next received service acknowledgment. Upon receiving a prioritizable acknowledgment, the device either accepts the acknowledgment indicating by the modified service vector the type of request for which the acknowledgment is accepted or passes the acknowledgment down the daisy-chain to a device having the highest priority available request.

A related object of the invention is to permit the wired-OR sharing of request types of unlike type with predictable and usable results by means of the above-mentioned auto-prioritization mechanism.

Another object of the invention is to provide a new service acknowledgment vector type to be used by the device when the daisy-chaining of service acknowledgments is disabled by the host. This new acknowledgment vector type is used by the device to indicate to the host device that an attempted service acknowledgment was not accepted by the device because the device had no service request pending which was a suitable match to the type of service acknowledgment it received at the time of receiving the service acknowledgment.

BRIEF DESCRIPTIONS OF THE DRAWINGS

Figure 3:
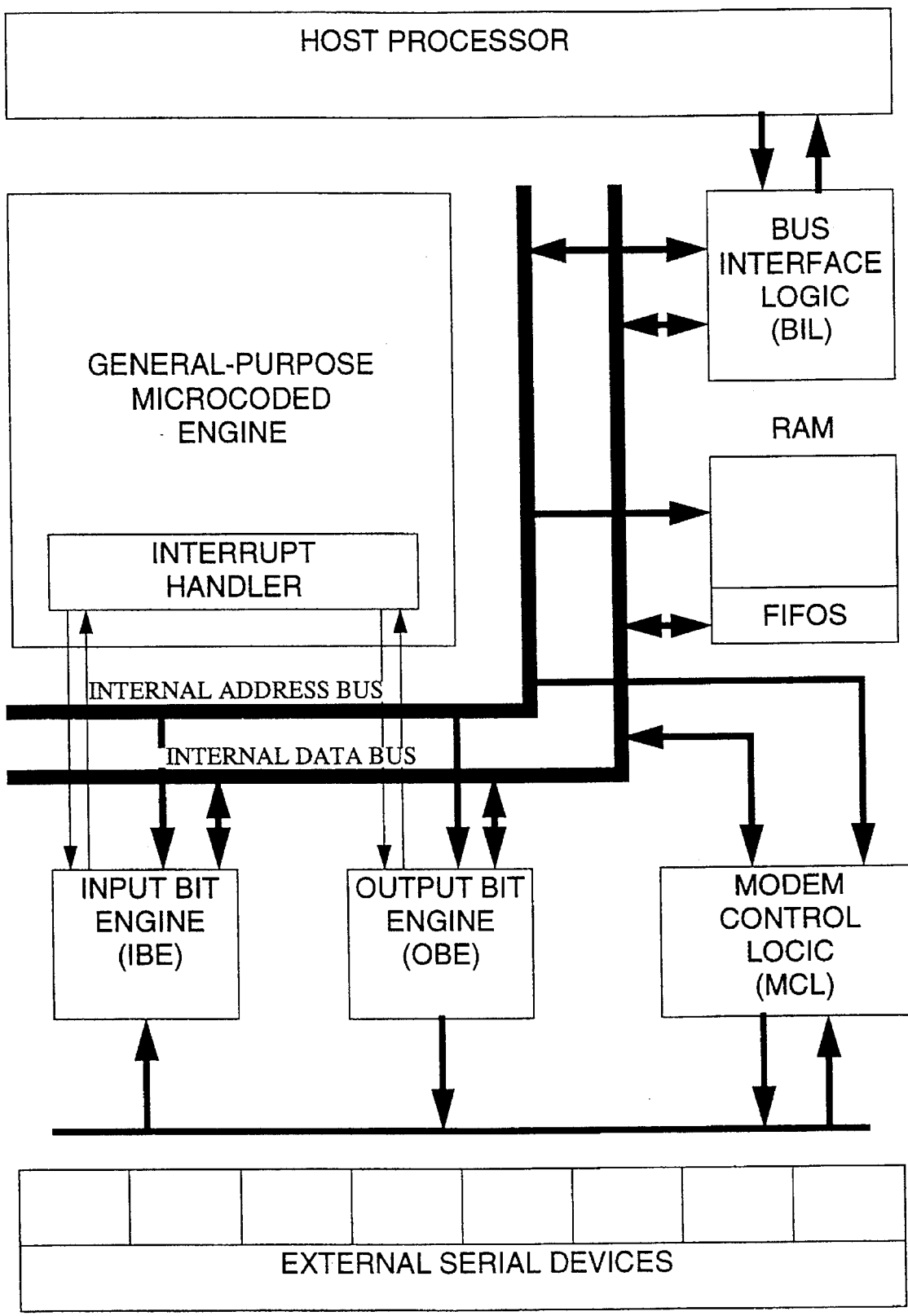

FIG. 3 illustrates the block diagram of the monolithic device described in Wishneusky U.S. Pat. No. 4,975,828 that is improved by this invention.

FIG. 4 illustrates the Service Request Control Register

FIG. 5 illustrates the Service Request Acknowledge Registers titled Modem Request Acknowledge Register, Transmit Request Acknowledge Register, and Receive Request Acknowledge Register.

FIG. 6 illustrates the Service Request Status Register.

Figure 7:
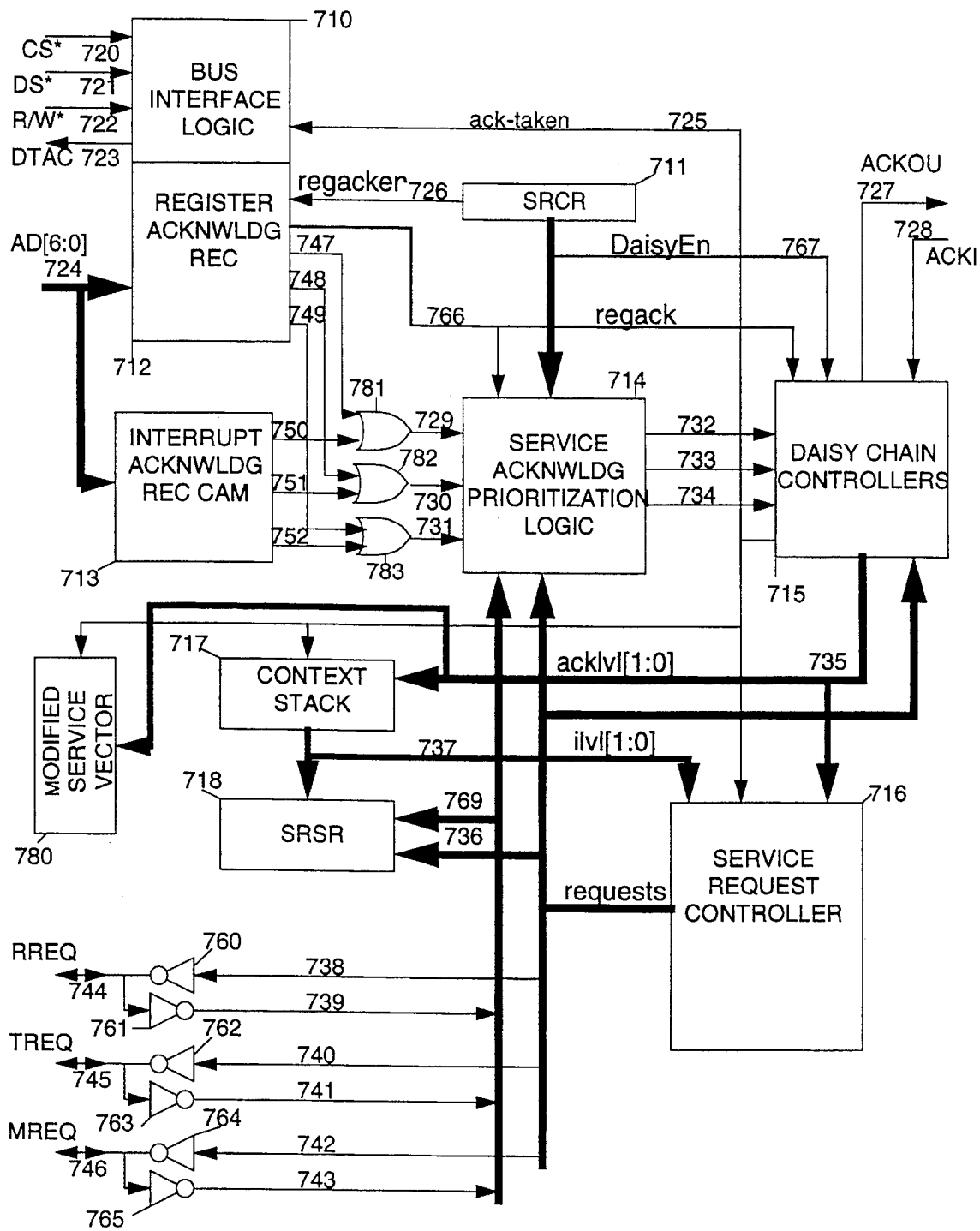

FIG. 7 illustrates the block diagram of the present invention.

Figure 8:
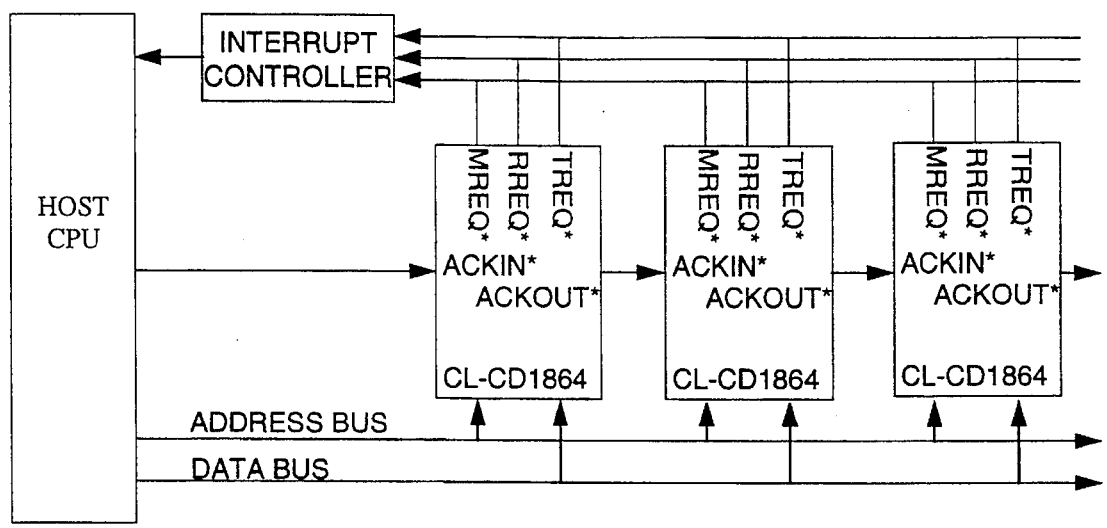

FIG. 8 illustrates how the invention allows the CL-CD1864 to be daisy chained together to support more than eight peripheral devices.

Figure 9:
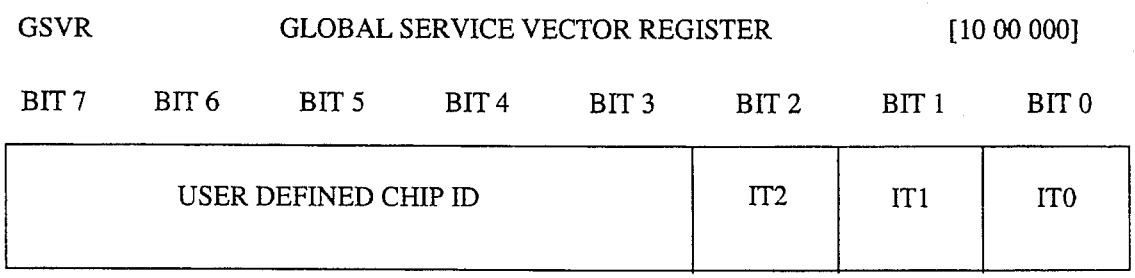

FIG. 9 illustrates the Global Service Vector Register with the five most significant bits user modified. The lower three bits [IT2, IT1, IT0] are supplied upon a read operation only. Combining the five most significant bits of the Global Service Vector Register with the IT2, IT1, and IT0 bits represents the Modified Service Vector provided onto the data bus during addressing as if reading one of the Service Request Acknowledge Registers.

FIG. 10 illustrates the Modem Service Match Register.

FIG. 11 illustrates the Transmit Service Match Register.

FIG. 12 illustrates the Receive Service Match Register.

Figure 13:
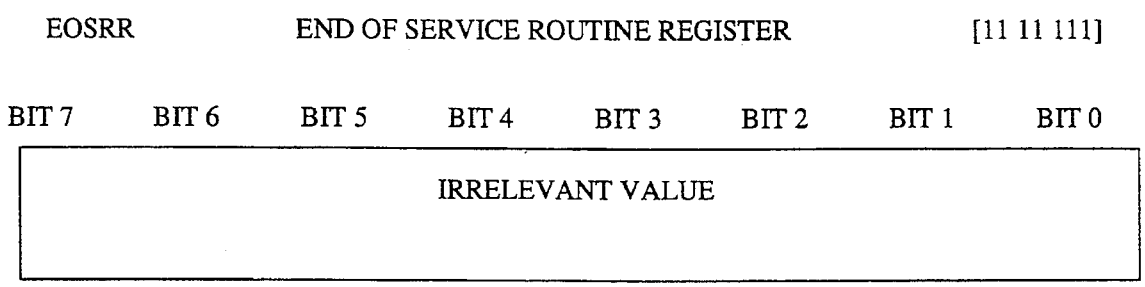

FIG. 13 illustrates the End of Service Routine Register.

DETAILED DESCRIPTION OF THE PREFERRED EMBODIMENT

The preferred embodiment of the present invention is realized in a monolithic integrated circuit (IC). The IC that first embodied the present invention is known as the CL-CD1864. It is an intelligent eight-channel communications controller manufactured by Cirrus Logic, Inc. assignee of the present invention. It is described in Appendix I, entitled "CL-CD1864 Preliminary Data Sheet", which is also incorporated herein by reference. Further details of the portions of the CL-CD1864 containing the present invention are given in Appendix II, entitled "Register Acknowledge and Auto Priority Design Notes", which is hereby incorporated by reference. In some cases, the exact terminology, representations and level of detail used in these appendices varies from that used in this disclosure.

The CL-CD1864 is controlled by an external host processor or CPU, which may support a potentially large number of data communications channels. A data communications channel is also referred to as a communication port. The present invention includes an improvement over prior art methods by providing a novel interface between the external host processor and the CL-CD1864 that supports service requests. The present invention includes an improvement in the Bus Interface Logic (BIL) in FIG. 2 of Wishneusky U.S. Pat. No. 4,975,828, reproduced herein as FIG. 3. The CL-CD1864 is designed to interface and process signals from eight modem-like devices. It will be obvious to one skilled in the art that the present invention can be readily adapted to interface with other quantities and with other types of peripheral devices, particularly serial I/O devices.

A "Service Request" to the host represents more than an Interrupt Request. An "Interrupt Request" (IREQ) is a general single interrupt signal that a dedicated hardware interrupt controller would receive from a peripheral Input/Output device. The Interrupt Request conveys no information regarding what the peripheral I/O device desires. A Service Request is a term that embodies applications and situations that not only use a dedicated hardware interrupt controller, but also include various methods of direct host processor involvement requiring the recognition of a particular type of service request and a response to it. This invention provides for three basic types of service requests. These are Receive Service Request (RREQ*), Transmit Service Request (TREQ*), and Modem Signal Change Service Request (MREQ*) which can be programed to generate service requests for various reasons. The Receive Service Request tells the host processor that either the CL-CD1864 has received a programmable level of valid data (Receive Good Data) or that an error or other special condition has occurred in receiving the data (Receive Exception). A Transmit Service Request tells the host processor that either the CL-CD1864 has completely transmitted all characters or that the internal 8 byte Transmitter FIFO is empty and can now be filled. A Modem Signal Change Service Request tells the host that one of the modem control signal inputs (DSR,CD,CTS) has changed its logic level. The term Service Request is used throughout and shall refer to RREQ*, TREQ*, MREQ*, as well as future service requests that are obvious to those skilled in the art.

[For Cirrus Logic Inc. data communication controllers, the act of service request or interrupt acknowledgment causes the controller to enter an internal "context" wherein the parameters of a specific service request are made specifically available for the duration of the service. These parameters include the channel requiring service (affects device addressing automatically selecting the appropriate channel's registers), pointer(s) to the appropriate FIFO(s), channel status, data transfer counts, etc.]

REGISTER BASED SERVICE REQUEST ACKNOWLEDGEMENT

Different external host processors accept interrupt signals in varying ways. Devices manufactured by Cirrus Logic such as the CL-CD180 and CL-CD2401 support multiple distinct request types, each having a different system level priority. However, Intel bus based systems have a limited number of interrupt request types available. This forces a compromise to be made in that several different request types are funneled into a common request signal in order to conserve scarce interrupt request resources. Typically interrupt requests were acknowledged by a single signal.

This preferred embodiment of the invention provides for any of the three types Service Requests RREQ*, TREQ*, MREQ* to be acknowledged by reading a respective Service Request Acknowledge Register or by the traditional acknowledgment input signal, ACKIN*. The following describes how the host interfaces with the invention.

When a CL-CD1864 is not daisy chained to further devices (such as CL-CD1864 chips), the host processor may assert a chip select of a particular CL-CD1864 and read one of the Service Request Acknowledge Registers of the particular CL-CD1864 by asserting the unique address of the particular register onto the address bus to find local status of the device. The Service Request Acknowledge Registers represent pseudo-registers that can only be read to provide a Modified Service Vector onto the data bus. FIG. 9 illustrates the Global Service Vector Register. The Modified Service Vector is an eight bit value with the upper 5 bits from the upper five bits of the Global Service Vector Register and the lower three bits respectively being the bits IT2, IT1, and IT0. The ITn bits (IT2, IT1, and IT0) may vary depending on which Service Request Acknowledge Register is addressed as described below in the hardware description. The host reading one of the Service Request Acknowledge Registers (MRAR, TRAR, RRAR) is analogous to a traditional interrupt acknowledgment by the host processor. Even though daisy chaining is not being used, a Modified Service Vector is read out onto the data bus just as if a conventional interrupt acknowledge cycle were performed.

In the case that daisy chaining is being used the preferred embodiment of the invention supports global service request acknowledgment by addressing as if reading the Service Request Acknowledge Registers from one particular device.

CASCADING/DAISY CHAINING

While the prior art interrupt controller devices have allowed daisy chaining (also known as cascading) via hardware, the present invention offers the flexibility of using daisy chaining for register based acknowledgments of the CL-CD1864 by programing a Service Request Configuration Register as well as using the traditional hardware acknowledgment via ACKIN*. For register based acknowledgments the preferred embodiment of the invention further allows the daisy chaining to be turned on and off by a control bit within the Service Request Configuration Register, disabling the generation of ACKOUT* in response to the host addressing as if reading a Service Acknowledge Register and no local Service Request pending such that the device wants to pass. Configuring the connections of a number of CL-CD1864 devices for daisy chaining is illustrated by FIG. 8. Using software, a single bit (DaisyEn) can be toggled within the Service Request Configuration Register in order to turn daisy chaining on or off. Via this register the host processor can easily vary its configuration for handling Service Requests. In the daisy chain configuration each CL-CD1864 within a chain has a unique vector 5 bit chip ID that was programed into its Global Service Vector Register by the host upon initialization. These five bits of chip ID and three other bits (IT2, IT1, and IT0), representing the Modified Service Vector, are supplied to the host on the data bus by one CL-CD1864 in the chain in response to a service request acknowledgment that is performed by the host.

A second daisy chaining bit can be used to further control the daisy chain by turning on and off the ACKIN* signal from generating ACKOUT*. This would allow the host to further balance the work load received from various devices. Also the host can reconfigure the service request system if an upgrade is required for the addition of different peripheral and CL-CD1864 devices.

GLOBAL EXTERNAL AND LOCAL INTERNAL AUTOPRIORITIZATION

In the prior art prioritization was either fixed in the hardware via the configuration of peripheral devices with the interrupt controller or was controlled by the software interrupt routines used by the host. The present invention offers the flexibility of assignment of priorities for the automatic prioritization of either global external service requests across an ensemble of daisy chained devices or the automatic prioritization of local service requests for that particular device only.

In the case of global external service requests, multiple CL-CD1864 devices are daisy chained together, each generating service requests. If autoprioritization is selected within each CL-CD1864 that is daisy chained, then the host need only acknowledge one of the CL-CD1864's in the chain (typically the first in the chain) and the CL-CD1864 in the chain with the highest-priority service request will answer the service request acknowledgment given by the host. The answer from the CL-CD1864 is an eight bit value representing the Modified Service Vector. The five upper bits of the Modified Service Vector are from the upper five bits of the Global Service Vector Register and represent the chip ID of the CL-CD1864 that is answering the host's acknowledgment. The lower three bits (IT2, IT1, IT0) of the Modified Service Vector ignore the lower three bits of the Global Service Vector Register and indicate the type of service request with the highest priority that is presently pending in the answering CL-CD 1864. To acknowledge a service request, the host processor usually addresses the first CL-CD1864 device in a chain via its chip select (CS*) signal and performs a read operation as if reading one of its three Service Request Acknowledge Registers. The answering device may be different from that which the host has addressed with the chip select signal. The answer in response to the acknowledgment, the Modified Service Vector, is driven onto the external data bus by the answering CL-CD1864. The host processor then interprets this answer to address the appropriate device and service the request.

In a daisy chain configuration, each CL-CD1864 must determine the current highest priority service request. To do this, each device monitors the Service Request outputs (MREQ*, RREQ*, TREQ*) to determine what type of requests are pending. Each device also knows its pending local Service Requests. By default a Modem Signal Change Service Request is defined to have the lowest priority. The priority of Transmit Service Request over Receive Service Request or visa-versa is set by the PdSel bit of the Service Request Configuration Register within each CL-CD1864. Upon receiving an acknowledgment, each CL-CD1864 if it does not have this request pending passes on answering the service acknowledgment using the daisy chain signals ACKIN* and ACKOUT* until the device (or the first of the devices) with the highest priority answers. Typically the host would select to read the chip at the beginning of the chain by asserting CS* of that device as if reading the Service Request Acknowledge Register of that chip. If the first chip is not currently asserting the highest priority service request it asserts its ACKOUT* signal that drives the next device's ACKIN*. Thus whichever device is asserting the highest priority service request will receive the acknowledgment and answer by driving the data bus lines with the Modified Service Vector.

In the case that daisy chaining is disabled, autoprioritization can be utilized to prioritize the local service requests. This is useful in systems where a host processor may only have one priority level interrupt input pin and has wired-OR together the separate Service Request pins. An example of a CPU that has a limited interrupt resource is an Intel 8086. Thus the host will receive the priority level from the lower three bits of the Modified Service Vector in answer to its acknowledgment. The user or host can set the PriSel bit of the Service Request Configuration Register to determine the highest level priority between Transmit Service Requests and Receive Service Requests locally to each individual CL-CD1864. Those of skill in the art can recognize that a more general system can be implemented to provide a wider variety of priority level selections.

FISHING/REGISTER BASED POLLING

When the host acknowledges a Service Request by addressing in a read operation one of the Service Request Acknowledge Registers and daisy chaining is enabled, a CL-CD1864 with the appropriate level of priority of pending service request will answer. In a system that does not use daisy chaining, a host can poll each device to determine if a Service Request is pending by simply addressing in a read operation one of the Service Request Acknowledge Registers (Modem Request Acknowledge Register, Transmit Request Acknowledge Register, Receive Request Acknowledge Register). In the case that daisy chaining is turned off (DaisyEn=0), the host reads the Service Request Acknowledge Register and if no corresponding Service Request is pending, the polled device answers with its Modified Service Vector such that the lower three bits are all zero. That is [IT2, IT1, IT0]="000". This is the only case where in the preferred embodiment the polled device answers with the lower three bits of its Modified Service Vector equal to zero. This method of polling to determine if a Service Request is pending typically saves the host at least one read cycle. In the prior art the host would normally poll the status register of an interrupt controller to determine if an interrupt were pending. The host would then have to go and poll each device. In this preferred embodiment the invention allows the host to directly poll a register to determine if a service request is pending. The host can then "fish" for a service request by polling one of the three Service Request Acknowledge Registers of each CL-CD1864 device that it selects. For example if the host wants to fish for Modem Change Service Requests ignoring Transmit Service Requests and Receive Service Requests (assuming autoprioritization is off), the host can address each device and its Modem Request Acknowledge Register as if reading the register to determine if the lower three bits on the data bus are all zero or if the value is 001 representing a Modem Change Service Request pending within that specifically addressed device.

HARDWARE DESCRIPTION

The invention hardware embedded within a CL-CD1864 consists of a set of global registers and other logic that is shown in FIG. 7. (Details of the control logic blocks of FIG. 7 are provided within appendix II as well as being described below.) The information that is presented by these registers may vary by whether the host is performing a read or write operation. These registers are named the Service Request Control Register (SRCR), Service Request Status Register (SRSR), Modem Request Acknowledge Register (MRAR), Transmit Request Acknowledge Register (TRAR), Receive Request Acknowledge Register (RRAR), and the Global Service Vector Register (GSVR). Other registers are also and are defined below. The following is a detailed description of each register and the values or function that each performs.

FIG. 4 illustrates the Service Request Control Register that configures the CL-CD 1864 to handle service requests. The user sets these bits depending on the type of method chosen to handle service requests.

While the CL-CD1864 provides for the "traditional" interrupt-based service request acknowledgments, the Service Request Control Register allows the user to provide for software based service requests in addition to the traditional hardware based service requests. The register further provides for picking two different methods of priority. This register also controls the operation of Fair Share for Service Requests. This register is downwardly compatible with software written for the prior art integrated circuit known as the CL-CD180. Thus both the traditional interrupt-based service request acknowledgments and service request acknowledgment via registers are simultaneously supported.

The two different types of priority methods are selected in the following manner. Setting the AutoPd bit enables the priority scheme. The user then selects PriSel and GlobPri to define the specific type of priority desired to be used.

The following is a detailed functional description of the control and option bits within the Service Request Configuration Register (SRCR):

This register configures the CL-CD1864 depending on the method chosen for handling service requests. In addition to the 'traditional' interrupt-based host interface, writing the appropriate bits in this register provides for software-based rather than hardware-based service request acknowledgments and fixes service request priorities in either of two ways. This register preserves compatibility with existing CL-CD180 software. For this reason, this register defaults to all zeroes and each new feature must be enabled as desired.

RegAckEn and DaisyEn Bits are related to each other, and perform service-request acknowledgments by accessing registers within the CL-CD1864 instead of asserting hardware signals.

Service requests are prioritized by three other bits. AutoPri enables the priority scheme; PriSel and GlobPri determine the specific priority to be used.

| Bit | Description |
| --- | --- |
| PkgTyp | This read-only bit indicates the CL-CD1864 package type. This bit is a '1' for the 100-pin QFP. This bit is named 100PQFP in Appendix II. |
| RegAckEn | Enables register-based service-request acknowledgments. If this bit is a '0', register-based acknowledgments are not accepted. In this case, the results of a read of any of the service-acknowledgment registers are undefined. This is the default state of RegAckEn, and ensures compatibility with earlier versions of the CL-CD180. When RegAckEn is enabled, register-based acknowledges allow the user's software to acknowledge a service request by reading from a register, rather than by driving the external ACKIN* Signal. This is convenient in applications where Service Requests are not supported, or where polling is preferred. Setting this bit does not disable the function of the ACKIN* Signal. Throughout this description of the preferred embodiment RegAckEn is assumed to be set to a one to enable the host to use both the traditional interrupt acknowledgment and the register based acknowledgment of Service Requests. Otherwise this invention operates in the prior art manner of allowing the host to acknowledge Service Requests in the traditional interrupt acknowledgment method. |
| DaisyEn | Enables daisy-chaining of register-based service acknowledgments. When DaisyEn is a '1', a CL-CD1864 being addressed with a register-based service acknowledgment (a read takes place from a register-acknowledgment address) for which it has a pending request, will place the Modified Service Vector onto the data bus. When DaisyEn is a '1', a CL-CD1864 being addressed with a register-based |

| Bit | Description |
|---|---|
| | service acknowledgment for which it does not have a pending service request, asserts ACKOUT* to pass the acknowledgment down the daisy chain. The next CL-CD1864 in the chain will see the acknowledgment as an ACKIN* acknowledgment. The Service Request Acknowledge Register addresses must be placed in the corresponding Service Match Registers (RSMR, TSMR, and MSMR) as part of the user setup for daisy-chaining of register-based service acknowledgments. If daisy-chaining of register-based service acknowledgments is not used, the Service Match Registers may be programmed with any address codes that the user finds convenient for use with the 'normal' ACKIN* service-acknowledge mechanism. If DaisyEn is a '0' and a CL-CD1864 is addressed with a register-based service acknowledgment for which it does not have a pending service request, it will respond by providing a Modified Service Vector with a modification code of '000'. RegAckEn must be a '1' to enable register-based service acknowledgments. DaisyEn has no effect on daisy-chain operation of the regular ACKIN* - ACKOUT* chain. |
| GlobPri | When AutoPri is used, GlobPri set to a '1' means that the CL-CD1864 will prioritize across multiple CL-CD1864s sharing external Service Request lines (MREQ*, TREQ*, RREQ*). GlobPri is a '0' means to accept the acknowledge for the highest priority on-chip Service Request. In both cases, automatic prioritizing is only done on type 1 (normally the modem signal change type) Service Request acknowledgments through the ACKIN mechanism, or the register-based acknowledge mechanism. It is possible to use the CL-CD1864 with the three external Service Request (MREQ*, TREQ*, RREQ*) lines wire-OR'ed together. In this configuration, with any Service Request asserted, the global values of all requests will appear to be asserted. GlobPri should be a '0' to force prioritization among the Service Request sources on-chip. When no on-chip Service Requests are pending, the acknowledgment will be subject to daisy-chaining. See DaisyEn description. |
| UnFair | Fairness Override Bit. If UnFair is a '0', normal Fair Share Service Request control is performed. If UnFair is a '1', the fair bits are all forced to a '1', disabling the Fair Share mechanism. This is useful when the Auto Priority Option is used, and the different external Service Request lines (MREQ*, TREQ*, RREQ*) are wire-OR'ed together. |
| Reserved | Must be a '0'. |
| AutoPri | When set, indicates that the CL-CD1864 should prioritize service requests in the manner selected by the PriSel Bit. In conjunction with the GlobPri Bit, either local (within the chip) or global (across daisy-chained chips) prioritization is done. With AutoPri set, auto-prioritization is performed only when a type 1 (modem) Service Request acknowledgment is recognized. Acknowledgments of type 2 (transmit) and 3 (receive) Service Requests continue to be unique and specific even with AutoPri set. This offers a form of local override to Auto-prioritization for Transmit or Receive Service Request when continuing a second-priority service routine. If not set, the user must indicate the service request being acknowledged by the choice of service request acknowledge register. AutoPri × GlobPri => look at external service request to prioritize globally. AutoPri × GlobPri* => look at internal service requests to prioritize locally. |
| PriSel | Prioritized Service Request order option. If AutoPri is set, PriSel selects the highest-priority service request. If PriSel is a '0', receive requests have the highest priority. If PriSel is a '1', transmit requests have the highest priority. Modem signal change request priority is fixed at the lowest priority. |

FIG. 5 illustrates the three Service Request Acknowledge Registers referred to as Modem Request Acknowledge Register (MRAR), Transmit Request Acknowledge Register (TRAR), and the Receive Request Acknowledge Register (RRAR). These are read-only registers that return an appropriate Modified Service Vector when read by the host. The act of reading one of these registers (usually) produces a Service Request acknowledge cycle in the affected CD1864 (not necessarily the one addressed, it might be one further down a daisy chain). For these registers to operate properly RegAckEn of the Service Request Control Register must be set.

FIG. 6 illustrates the Service Request Status Register (SRSR). The i-level bits, ilvl[1], ilvl[0], are the current internal context code from the Context Stack 717 of FIG. 7. The i-level bits, ilv[1:0], are encoded as follows:

| ilvl[1:0] | Context |
|---|---|
| 00 | CL-CD1864 is not in a Service Request context |
| 11 | CL-CD1864 is in a receive Service Request context |
| 10 | CL-CD1864 is in a transmit Service Request context |
| 01 | CL-CD1864 is in a modem Service Request context |

An accepted Service Request acknowledge cycle pushes a new context onto the stack.

Note, the external and internal Service Request status bits are positive true. The external Service Request lines (MREQ*, TREQ*, RREQ*) are, of course, negative true. The internal Service Request Status bits mreq, rreq, and treq are signals within the device that are being read representing a local Service Request (also referred to as internal Service Request) is pending. The external Service Request status bits RREQ, TREQ, MREQ are values representing the respective condition on the external pins RREQ*, TREQ*, and MREQ* as a result of a wire-OR'ed function. In Appendix II the internal signals and the bits in the Service Request Status Register referred to as rreq, treq, and mreq respectively correspond to the bits and signals referred to as IREQ3int, IREQ2int, IREQ1int as defined in Appendix I.

FIG. 9 illustrates the Global Service Vector Register (GSVR) with the bits defined as follows:

| Bit | Description |
|---|---|
| Bits 7:3 | These bits are user-defined. However, in a multiple-chip design, these five bits must have a unique value in each CL-CD1864, to identify which CL-CD1864 is returning a vector during service acknowledgments. When writing to this register, all eight bits are saved in the Global Service Vector Register. However the lower three bits are not used. Upon a register acknowledge read operation, the CL-CD1864 will modify the low-three bits automatically. Note that if this register is read in a normal manner, the original eight bits will be read and the modified bits from the last acknowledgment cycle will not be preserved. |
| Bits 2:0 | These three bits indicate the group/type of service request occurring. These bit are supplied by the CL-CD1864 during an acknowledgment cycle. |

| IT2 | IT1 | IT0 | Value | Group/Type |
|---|---|---|---|---|
| 0 | 0 | 0 | 0 | No Request Pending *** |
| 0 | 0 | 1 | 1 | Modem Signal Change Service Request |
| 0 | 1 | 0 | 2 | Transmit Data Service Request |
| 0 | 1 | 1 | 3 | Receive Good Data Service Request |
| 1 | 0 | 0 | 4 | Reserved |
| 1 | 0 | 1 | 5 | Reserved |

| Bit | | | | Description |
|---|---|---|---|---|
| 1 | 1 | 0 | 6 | Reserved |
| 1 | 1 | 1 | 7 | Receive Exception Service Request |

\*\*\* This code is returned by the CL-CD1864 only when RegAckEn is set, and DaisyEn is not set. In this condition, the CL-CD1864 must provide a vector when acknowledged. If the CL-CD1864 receives an acknowledgment for which it does not have a request pending, it will return '000'.

FIG. 10 illustrates the Modem Service Match Register (MSMR). This register must contain the value for Modem Signal Change Service Requests that will be presented on the Address Bus A0–A6 by the host to indicate the type of service request being acknowledged when ACKIN* is asserted. This register along with the other two Match Registers, is compared to the value on the Address Bus during acknowledgment cycles so that the CL-CD1864 can determine the service request being acknowledged by the host.

Bit 7 must be programmed to a '1'. The CL-CD1864 compares all eight bits internally, but there are only seven address lines. Bits 6:0 of the register are compared to A6:A0 of the Address Bus. Bit 7 of the register is compared with a logic '1'.

Within any one CL-CD1864, the three Match Registers must have unique values. In multiple-CL-CD1864 designs where service acknowledgments are cascaded, all Match Registers of the same type (e.g., Modem) must have the same value.

In designs using register-based service acknowledgments (RRAR, TRAR, and MRAR), the addresses of these registers must be placed in the equivalent Match Register, so that MSMR contains $F5 (hexadecimal).

FIG. 11 illustrates the Transmit Service Match Register (TSMR). This register must contain the value for Transmit Data Service Requests that will be presented on the Address Bus A0–A6 by the host to indicate the type of service request being acknowledged when ACKIN* is asserted. This register, along with the other two Match Registers, is compared to the value on the Address Bus during acknowledgment cycles so that the CL-CD1864 can determine the service request being acknowledged by the host.

Bit 7 must be programmed to a '1'. The CL-CD1864 compares all eight bits internally, but there are only seven address lines. Bits 6:0 of the register are compared to A6:A0 of the Address Bus. Bit 7 of the register is compared with a logic '1'.

Within any one CL-CD1864, the three Match Registers must have unique values. In multiple-CL-CD1864 designs where service acknowledgments are cascaded, all Match Registers of the same type (e.g., Transmit) must have the same value.

In designs using register-based service acknowledgments (RRAR, TRAR, and MRAR), the addresses of these registers must be placed in the equivalent Match Register, so that TSMR contains $F6 (hexadecimal).

FIG. 12 illustrates the Receive Service Match Register (RSMR). This register must contain the value for Receive Data Service Requests that will be presented on the Address Bus A0–A6 by the host to indicate the type of service request being acknowledged when ACKIN* is asserted. This register, along with the other two Match Registers, is compared to the value on the Address Bus during acknowledgment cycles so that the CL-CD1864 can determine the service request being acknowledged by the host.

Bit 7 must be programmed to a '1'. The CL-CD1864 compares all eight bits internally, but there are only seven address lines. Bits 6:0 of the register are compared to A6:A0 of the Address Bus. Bit 7 of the register is compared with a logic '1'.

Within any one CL-CD1864, the three Match Registers must have unique values. In multiple-CL-CD1864 designs where service acknowledgments are cascaded, all Match Registers of the same type (e.g., Receive) must have the same value.

In designs using register-based service acknowledgments (RRAR, TRAR, and MRAR), the addresses of these registers must be placed in the equivalent Match Register, so that RSMR contains $F7 (hexadecimal).

FIG. 13 illustrates the End of Service Routine Register (EOSRR). This is a dummy register, and must be written to by the host's service request routine to signal to the CL-CD1864 that the current service-request service is concluded. This must be the last access to the CL-CD1864 during a service-request routine. Writing to this register will generate an internal End-of-Service Signal, which 'pops' the CL-CD1864's context stack, allowing the CL-CD1864 to resume normal processing and also service other channels. Service-request contexts may be nested, as explained in Appendix I Section 2.4, i.e., one can respond to and service a higher-priority event while in the middle of a lower-priority service request routine (as when nesting subroutine calls within other subroutines). Any attempt to read from this register will cause unpredictable results.

FIG. 7 represents the improvements added to the devices of the Wishneusky U.S. Pat. No. 4,975,828, the disclosure of which is incorporated herein by reference. FIG. 7 is a block diagram that represents the upper level functionality of the circuitry in each CL-CD1864 to support the preferred embodiment. Not all signals are shown in FIG. 7. Only those of importance to the description of the preferred embodiment are represented. For example each block of FIG. 7 has access to an internal data and address bus but it is not shown for purposes of clarity. Further the blocks of FIG. 7 do not necessarily operate independent of the RISC processor but many portions of the preferred embodiment of the invention do operate independently. Also the CL-CD1864 externally interfaces to the host data bus which is not shown in FIG. 7. The preferred embodiment of the invention communicates to the host by use of the external address and data bus as well as other control signals. References in this description to the address and data bus refer to the external address and data bus and generally not to the internal address and data bus of a CL-CD1864.

Referring to FIG. 7 the Interrupt Acknowledge Recognition CAM 713 contains the Match Registers (Modem Service Match Register, Transmit Service Match Register, Receive Service Match Register). The Match Registers allow the host to support the traditional hardware interrupts as depicted in Appendix I Sections 2.5, 2.5.1, 2.5.2, 2.5.3. In this case mixed-mode service request acknowledgments are described. Mixed-mode refers to using both a traditional hardware interrupt (ACKIN* in conjunction with the Service Request Match Registers) acknowledgment mechanism and a register based (Modem Request Acknowledge Register, Transmit Request Acknowledge Register, Receives Request Acknowledge Register) acknowledgment mechanism to process Service Requests.

In the case of traditional hardware interrupt acknowledgments, the host is first notified of a Service Request (Receive Service Request, Transmit Service Request, Modem Change Service Request). The host then acknowledges the Service Request by asserting ACKIN* 728 and DS* 721 while placing onto the external address bus 724 a match value or the type of Service Request being acknowledged by the host. Upon initialization the Service Request Match Registers were loaded with the respective address values of the Service Request Acknowledge Registers as described above. For example the host acknowledges a Transmit Service Request and writes $76 (hexadecimal) onto the address bus. The Interrupt Acknowledge Recognition CAM 713 compares the contents of the external address bus 724 with the contents of the Match Registers within the CL-CD1864 to detect what service request the host is acknowledging. If a Receive Service Request is acknowledged signal 752 (match3) is asserted. If a Transmit Service Request is acknowledged, signal 751 (match 2) is asserted. If a Modem Change Service Request is acknowledged, signal 750 (match 1) is asserted. This first service request is handled by the host in the traditional way of servicing interrupts. When the host completes handling the first Service Request it notifies the CL-CD1864 by writing to the End of Service Routine Register at address $7F (hex). Since other Service Requests may be pending within the same device it is wise to keep the host in its present context servicing this device. Thus after finishing the service of the first Service Request the host should read the Service Request Status Register 718 in order to determine if other service requests are pending. If the bits rreq, treq, or mreq are set it indicates that another service request is pending internally within this CL-CD1864. Thus if another service request is pending the host can now use a software, register based acknowledgment method supported by the invention. The host can acknowledge the internal pending Service Request (also referred to as local pending Service Request) by addressing the appropriate Service Request Acknowledge Register. For example, assume a Transmit Service Request is pending internally within the same CL-CD1864. The host acknowledges the service request by placing onto the address bus 724 the value $76 (hex) as if reading the Transmit Request Acknowledge Register. This addresses the Transmit Request Acknowledge Register, which is not a real register in the sense that it is made of memory elements. Addressing as if reading activates combinatorial logic to assert internal control signals such that the Modified Service Vector is written onto the external data bus (not shown) by the respective CL-DC1864. Other internal control signals such as regack 766 (register acknowledge) and signal 748 (txregack) are asserted in response to the read of the Transmit Request Acknowledge Register by the host processor. If the host were to read the Modem Request Acknowledge Register similar internal control signals would be generated except that instead of txregack 748 being asserted signal 747 (mdmregack) would be asserted. If the host were to read the Receive Request Acknowledge Register then instead of txregack 748 being asserted, signal 749 (rxregack) would be asserted. The combinatorial logic for generating these control signals is within the Register Acknowledge Recognition block 712 as depicted in FIG. 7. The host can continue to poll the Service Request Status Register 718 to determine if any further Service Requests are pending within the same device and acknowledge those requests by reading the Service Request Acknowledge Registers (MRAR, TRAR, RRAR).Thus the support of a mixed-mode acknowledgment (traditional interrupt and registered based acknowledgment) allows the host to remain in its same context in order to handle service requests from the same device or other devices in the daisy chain.

In order to support the multiple Service Requests within the same device, the service requests must be queued up internally and the internal context must be saved. The Service Request Queue Controller 716 has three queue controllers within this block. Each queue controller is dedicated to one type of Service Request (Modem Change Service Request, Transmit Service Request, Receive Service Request) that needs support. Each dedicated queue controller may store context information for multiple pending requests. Appendix II provides a detailed truth table of the logic for the queue controller. The internal context for each type of Service Request that is queued up is stored within the Service Request Queue Controller 716. A context saved in a queue controller becomes active when its pending Service Request is acknowledged by the host. The Context Stack 717 records current and nested active context and allows for host initiated nesting of separate queue controller contexts. The signals acklvl[1:0] 735 from the daisy chain controller are pushed onto the Context Stack when the device accepts a service acknowledgment. The Context Stack is popped when the host signals the end of a service context by writing to the End of Service Routine Register.

In the case that multiple devices are daisy chained together (illustrated by FIG. 8) and an external Service Request signal is asserted such as RREQ* 744, TREQ* 745, or MREQ* 746 the host may acknowledge this signal by reading a Service Request Acknowledge Register within the first device in the chain. This generates the signal ACKOUT* 727 such that it propagates from the first device to the ACKIN* 728 of the second device provided the first device did not have a Service Request pending and did not accept the acknowledgment. Similarly ACKOUT* of the second device is connected to the ACKIN* of the third device in the daisy chain. The daisy chain is presently limited to 32 devices because there are only 5 bits available within the Global Service Vector Register to uniquely define a Chip ID for each device in the daisy chain. However more channels can be supported by the same host by connecting multiple strings of daisy chains to perhaps an interrupt controller. Another limit to the length of a daisy chain is the speed at which the ACKOUT* signal can propagate through the devices in the chain and how long the host processor will wait for the propagation delay.

In essence this invention allows the host to selectively turn on and off the daisy chain for register acknowledgments of global Service Requests by setting a bit within the service control register. With daisy chaining disabled, an ACKIN* signal is still able to be passed to the ACKOUT* signal in the case of a traditional interrupt acknowledgment if the device has no pending local Service Requests. The host writes to the Service Request Configuration Register by asserting R/W* 722, CS* 720, and then places the address $66 (hex) onto the address bus AD[6:0] 724. The host places on the external data bus the same values previously stored in the Service Request Configuration Register with the exception of the DaisyEn bit, bit 6 of FIG. 4. DaisyEn bit is changed to a zero to disable the generation of ACKOUT in response to a register based acknowledgment. DaisyEn register value is changed to a one in order to enable daisy chaining. Daisy chaining of global register based acknowledgments is typically disabled for systems that were wired for the traditional interrupt acknowledgment configuration. These systems can take advantage of the local register acknowledgment mechanism but can not support the global register acknowledgment because the Service Match Registers can not be appropriately set. In other systems the host may choose to turn off daisy chaining in order to selectively reconfigure the system in how it handles service requests.

Within the Daisy Chain Control Logic 715 is combinatorial logic that determines whether to keep the acknowledgment or to pass the acknowledgment down the chain to other devices. This decision depends on a number of factors which are further discussed below. When daisy chaining is disabled the DaisyEn bit is a zero. The combinatorial logic that generates the signal ACKOUT* 727 is as follows (Internal to the device the signal name is ACKOUT that is an active true signal and has the reverse polarity of the output signal ACKOUT* which is active low.):

ACKOUT=passx(DaisyEn+regack*)

Thus if daisy chaining is disabled the ACKOUT* signal is only generated when the pass signal results from ACKIN* 728 being asserted. The pass signal in this case results from the device having no pending request of the type being acknowledged. With daisy chaining disabled ACKOUT is never active if the host is attempting to acknowledge a Service Request by addressing the Service Request Acknowledge Register. In other words, disabling the daisy chain mechanism only disables the register based acknowledgment for global service request acknowledgements. The register based acknowledgment still functions for local service request acknowledgments. Daisy chaining disabled still allows for the traditional methods of interrupt acknowledgments via the Service Request Match Registers and the acknowledgment input signal ACKIN*. This provides compatibility with the prior art devices.

This invention supports both Global and Local prioritization of Service Requests while daisy chaining is enabled. The discussion above described how to turn on and off daisy chaining. We now turn to issues of how Service Requests of different levels and the acknowledgment of those service requests can be automatically prioritized by the invention.

Assume for this discussion that the desired configuration for handling Service Requests is by a daisy chain configuration. Upon initialization of a system, the user has the host initialize the set of CL-CD1864 devices within the daisy chain. The host writes to the Service Request Configuration Register(SRCR) 711 and sets the bits accordingly within this register. For the purposes of discussing global autoprioritization assume that the SRCR 711 is written with 01110010. Thus daisy chaining, register based service acknowledgments, global priority, and autoprioritization am all enabled. We choose for the moment that Receive Service Requests have the highest priority level via the PriSel bit. Therefor Transmit Service Requests have the next highest priority level. Modem Change Service Requests by default have the lowest prioritization.

In this configuration the RREQ* 744 signals of all devices in a daisy chain are wire-ORed together, the TREQ* 745 signals of all devices are wire-ORed together and the MREQ* signals of all devices are wire-ORed together. For this purpose the outputs of inverters 760, 762, and 764 are open drain devices that facilitate the wire-OR configuration. Of course a pull up resistor must be placed on each wire-ORed output.

Thus when a CL-CD1864 within the daisy chain of devices asserts one of the Service Request Outputs (744, 745, or 746) the host initially does not know which device is requesting service. The host would then proceed to acknowledge the request when it is ready to handle the request. Usually the host would acknowledge the first device in the chain by either addressing any one of the three Service Request Acknowledge Registers in a read operation or by performing the traditional method of interrupt acknowledgment by addressing the appropriate value stored in a Service Match Register and asserting the ACKIN* input of the first device. As discussed previously the Register Acknowledge Recognition 712 generates the following signals: regack 766 and one of mdmregack 747, txregack 748, or rxregack 749 in response to a Service Request Acknowledge Register of the device being read by the host. The Interrupt Acknowledgment Recognition CAM 713 generates match1 750, match2 751, or match3 752 in response to the host asserting ACKIN* together with an address code matching the contents of one of the service match registers. Signal match1 is ORed with mdmregack 747 by OR gate 781 generating newmatch1 729. Signal match2 751 is ORed with txregack 748 by OR gate 782 generating newmatch2 730. Signal match3 752 is ORed with rxregack 749 by OR gate 783 generating newmatch3 731. Thus either a register based acknowledgment or an interrupt based acknowledgment can start the autoprioritization logic. Note that the first device that the host acknowledges does not necessarily have a Service Request pending. For example devices that are fifth and seventeenth in the chain may be the devices asserting Service Requests.

Generally the Register Acknowledge (Regack) Prioritization Logic 714 within each CL-CD1864 in conjunction with its associated Daisy Chain Controller 715 prioritizes the Service Requests that are pending either globally amongst devices in a daisy chain or locally within a device. The Service Acknowledge Prioritization Logic 714 particularly determines if the local Service Requests that may be queued and currently pending are of an appropriate level in order that the device containing the Service Acknowledge Prioritization Logic should answer the host's acknowledgment. External Service Request signals RREQ* and TREQ* are sensed in order to determine globally if a different chip is asserting a more appropriate level of Service Request than what is pending locally.

Appendix II, page 14 illustrates the detailed logic of the Service Acknowledge Prioritization Logic 714. The signals action@3 and action@2 are generated if an internal service request local to the device is pending or if global prioritization is enabled and an external Service Request at another device is pending. The signal action@3 responds to Receive Service Requests and action@2 responds to Transmit Service Requests. Initially PriSel bit of the Service Request Configuration Register steers the priority by the use of transfer gates into the signals action@hi and action@med. In our example PriSel is set to a zero. Thus action@3 is steered into action@hi and action@2 is steered into action@med. Thus the Receive Service Requests are steered into the action@hi. Next the equations for accept@hi, accept@med, and accept@lo are evaluated and enabled by the AutoPri bit from the Service Request Configuration Register. If AutoPri is set to a zero all the remaining logic evaluates to a zero and does not effect the daisy chain. For AutoPri set to a one the accept@ equations are evaluated. If action@hi is true then accept@hi is true and accept@med and accept@lo are both false. Thus in our example the Receive Service Request either locally or externally asserted would exclude the other lower Service Request. However if action@hi is false and action@med is true then accept@med is true to the exclusion of accept@hi and accept@lo. Thus in this example no Receive Service Request is pending but a Transmit Service Request is pending. For accept@lo to be true neither a Receive Service Request nor a Transmit Service Request is pending. The signals accept@hi and accept@med must be correctly steered back into the Transmit Service Request Logic or the Receive Service Request Logic by the second level of transfer gates controlled by the PriSel bit. Now that the priority is set, the Daisy Chain Controller Logic determines if the host's service acknowledgment shall affect the daisy chain by generating the ACKOUT signal telling other devices that the present device will pass the acknowledgment or if the device will accept the acknowledgment as "mine" and answer the host.

The signals newmatch1, newmatch2, and newmatch3 were generated as described above and represent a register based service acknowledgment or a traditional interrupt acknowledgment to this device. If a low priority Service Request is pending then accept@lo is true. The host can choose to ignore this lower priority Service Request by acknowledging a higher level Service Request. Thus the host can acknowledge a Receive Service Request while a global or local Modem Change Service Request is pending and those devices will not answer. The devices with the Modem Change Service Requests will pass.

In the case that the host acknowledges with a lowest priority Service Acknowledgment (Modem Service Request) and a higher level of Service Request is pending in a device in the daisy chain, the first of the devices with the highest level of pending Service Request will answer. The device that answers may be the first or any other device in the chain that has a level higher than a Modem Service Request pending. However if there are equivalent levels of priority pending in the daisy chain, the first device with that level in the chain will answer first. In the logic diagram in Appendix II, Page 14, one of the pmatch (pmatch2 or pmatch3) signals is generated and passed to the Daisy-Chain controller 715 under these conditions. For example, assume that a Transmit Service Request is pending externally and causes the signal accept@med to be generated in the current device. Assume the host acknowledges the request by addressing as if reading the Modem Request Acknowledge Register in the current device. This generates the newmatch1 signal from the equation newmatch1=match1+mdmregack. The signal newmatch1 is ANDed with the value from the second level multiplexer. In this example the second level multiplexer is set so that accept@med is passed to the pmatch2 logic chain. Thus newmatch1 is ANDed with accept@med signal generating the signal pmatch2. The pmatch2 signal is passed to the Daisy-Chain Controller 715 to determine if the present device should answer the host and "accept" the Service Request or "pass" the acknowledgment down the daisy chain to the next device.

In the preferred embodiment, when the host acknowledges the second level priority, that level of Service Request is answered even though a higher level of priority Service Request is pending. Only in the case of the host acknowledging the lowest level of Service Request does a device answer that has a higher priority pending. For example if the signal newmatch2, representing a Transmit Request Acknowledgment, is asserted then the autoprioritization logic is bypassed and the signal pmatch2 is generated. If the signal newmatch3, representing a Receive Request Acknowledgment, is asserted then similarly the autoprioritization logic is bypassed and the signal pmatch3 is generated.

Once the Service Request Acknowledgment has been autoprioritized a device in the daisy chain must determine if it should accept and answer ("accept") the acknowledgment, provided directly by the host or through other devices in the chain, or if it should pass the acknowledgment to the next device. For each level of service request there is a daisy chain controller in each CL-CD1864. Thus the Daisy-Chain Controller block 715 contains three individual daisy-chain controllers. In Appendix II Page 11 there is a Karnaugh map describing the input signals and states that each daisy-chain controller goes through.

The PASSn state and the MINEn state are of interest. In the PASSn state the daisy chain controller recognizes the type of acknowledge to be that which it could accept but that there is no internal Service Request (also referred to as local Service Request) pending. Thus it should pass the acknowledge to the next device in the daisy chain. In the MINEn state the acknowledgment is a type that the controller should accept and answer the host processor because it has a matching request pending. Thus it will not pass the acknowledge to the next device and should not generate an ACKOUT signal.

Assume that global prioritization, daisy chaining, and autoprioritization is enabled and the PdSel bit is set to zero as in the example above. In the Karnaugh map for the daisy chain controller, illustrated in Appendix II Page 11, the initial states are IDLE1 and IDLE0. Upon initialization the devices of the invention start in the IDLE0 state. Assume no local Service Requests for any level are initially pending within the first device of a set of devices in a daisy chain. Also assume that an external Service Request from another device down the chain is sensed by the first device and the service acknowledge prioritization logic generates a corresponding action@ signal within the first device. Simultaneously all other devices in the daisy-chain have recognized the Service Request signal and generated a corresponding action@ signal within their own service acknowledge prioritization logic. The host can then acknowledge the service request in two ways. The first method is by asserting ACKIN* to the first device in the chain and placing a value on the address bus which will match the stored value in the corresponding service match register. The second method of host acknowledgment is by reading one of the Service Request Acknowledge Registers of the first device in the daisy chain. In the first method, all devices in the chain will have sensed the external address value corresponding to a match signal. In the second method, the register acknowledge recognition logic in the first device has recognized the read operation to the Service Request Acknowledge Register and produces a corresponding match signal. Since daisy chaining is enabled, the other devices in the chain must be programmed with Service Match Register values which correspond to Service Request Acknowledge Register addresses, so the Interrupt Acknowledge Recognition CAM logic in those devices will produce a match signal as well.

The match signals produced in each device are presented to the daisy-chain controllers. The active match signal will send the corresponding controller from the IDLE state to the intermediate state.

In the first device there was no local Service Request pending so its daisy chain controller is moved by the match signal to the intermediate state between IDLE0 and PASSn. In the devices which have the service request pending, the match signal moves their daisy-chain controllers to the intermediate state between IDLE1 and MINEn.

In the first device, the signal regack is generated by the Register Acknowledge Recognition logic. This signal causes the daisy-chain controller, activated by the match signal, to transition from the intermediate state to the PASSn state. Since daisy-chaining is enabled, the effect of the register acknowledge is to cause the controller to assert the ACKOUT* signal. The next device in the chain sees the ACKIN* signal (also known as ackin signal internally within the device). Assuming this device does not have the corresponding service request pending, the controller will proceed to the PASSn state. Thus the device will also pass down the chain the acknowledgment input signal received from the first device. This cycle is repeated down the chain until the ACKIN* signal reaches a device having an internal Service Request (also referred to as local Service Request) pending of an appropriate level such that it can accept the acknowledgment from the host. The controller in that device will be sent to the MINEn state by the receipt of ACKIN*. It will not pass the acknowledgment but will assert the internal signal ack-taken 725. This causes the new service context code to be pushed on the Context Stack 717, the Vector Modification logic 780 to generate a Modified Service vector, and the Bus Interface Logic 710 to perform a bus read operation that places the Modified Service Vector on the external data bus and generates the data transfer acknowledge signal (DTACK*) to indicate to the host that valid data has been placed on the data bus.

All other devices further down the chain received no acknowledgment signal. Their daisy-chain controllers which were activated by the match signal, will transition directly back to the IDLE0 or IDLE1 state when the match signal is removed by the end of the host bus read or bus acknowledge signals.

In each device, all daisy-chain controller PASS signals are ORed together to generate the overall PASS signal. Similarly each controller's MINE signals are ORed together to generate the overall MINE signal. These equations are illustrated on Page 12 of Appendix II. To answer the host and prepare the Service Request Queue Controllers 716, the signal ack-taken 725 is generated. The signals acklvl1 and acklvl0 (signal bus 735) carry a binary encoded value which corresponds to the asserted match signal, this indicates the type of acknowledgment being accepted. It may correspond exactly to the type of acknowledgment issued by the host, or if autoprioritization was performed, the acklvl type may be different. The acklvl signals are used by the Vector Modification Logic 780 together with optional sub-type information from the corresponding Service Request Queue Controller 716 to produce the Modified Service Vector. The signal ack-taken 725 tells the bus interface logic 710 to write the modified Service Vector onto the external data bus in answer to the host acknowledgment. This indicates which device the host should service and what type of service is required. The PASS signal further generates the ACKOUT* signal to offer the next device in the chain the opportunity to answer the acknowledgment.

In the design of the priority logic, the requirements for loading the Match Registers insures that only one match signal can be generated at a time. Thus the PASS signal and MINE signal can not both be asserted at the same time. All daisy-chain controllers which have received an acknowledge signal (either regack or ackin) and moved to the PASSn or MINEn states will make the transition back to the IDLE0 or IDLE1 state when the acknowledge signal is removed. The first device in the chain will recognize the removal of the acknowledge signal, of either type, first. It will remove its ACKOUT* signal. Subsequent devices in the chain will recognize the removal of the ACKIN* signal and remove their ACKOUT* signal, until ACKIN* is removed from the device in the chain that accepted the acknowledgment.

We next describe a method for the host to "fish" by issuing a Register Acknowledgment to a CL-CD1864 without knowledge of its currently pending service requests. This method may be used when daisy chaining is disabled and register acknowledgment is enable (DaisyEn=0, RegAckEn=1). If a suitable request is pending, the device will reply with a modified Service Vector indicating the type of service to be performed. The successful acknowledgment will cause the CL-CD1864 to enter a new service context just as it would if the host had prior knowledge that a suitable service request was pending. If a suitable service request is not pending, the CL-CD1864 will reply with a modified Service Vector containing the reserved modification code "000" indicating that no suitable request was pending. In this instance, the CL-CD1864 does not enter a new service context. If the autoprioritization feature is used, any pending request(s) will cause the CL-CD1864 to reply with a modified Service Vector indicating a new service context for the highest priority pending request has been entered.

This was accomplished by the host addressing one of the Service Request Acknowledge Registers and monitoring the lower three bits of the modified Service Vector that were provided on the data bus from the CL-CD1864. Normal processing of the match signal occurs in the CL-CD1864, selecting one of the daisy-chain controllers to await the acknowledgment. In response to the regack acknowledgment signal from the Register Acknowledge Recognition logic (and passed through the Service Acknowledge Prioritization Logic), the activated daisy-chain controller will make the usual transition to either the MINEn or the PASSn state. If the state entered is the MINEn state, a service acknowledgment has been performed and the modified Service Vector indicates the type to the host. However, if the state entered is the PASSn state, the signal ACKOUT* will not be asserted. Recall that the equation for ACKOUT is:

$$ACKOUT = pass \times (DaisyEn + regack^*).$$

The signal pass is true, but the signals DaisyEn and regack* are false. The equation for the ack-taken signal from Appendix II is:

$$ack\text{-}taken = mine + (pass \times DaisyEn^* \times regack).$$

In this case mine is false but pass, DaisyEn* and regack are all true, so the ack-taken signal is asserted. The equations for the acklvl signals from Appendix II are:

$$acklvl1 = MINE3 + MINE2$$

$$acklvl0 = MINE3 + MINE1.$$

Since only a pass signal and no mine signals are active, both acklvl signals are false. The combination of an ack-taken signal with both acklvl signals false inhibits the entering of a new service context by inhibiting the pushing of the Context Stack 717, and causes the Vector Modification Logic 780 to place the reserved "000" code in the Modified Service Vector.

FIG. 9 illustrates the Global Service Vector Register. The lower three bits in the data sheet description are named IT2, IT1, and IT0. The modified Service Vector response to a service acknowledgment is composed by two pieces of hardware. The five user defined bits are stored as a register value within a RAM which is not shown in FIG. 7. These bits are read from the RAM and presented to the Vector Modification Logic 780 during the service acknowledgment cycle. The bits IT1 and IT0 are produced by the acklvl[1:0] bits from the Daisy-chain Controllers. The bit IT2 is generated from the Service Request Queue Controller 716. The bit IT2 768 is separately generated denoting the specific sub type of Receive Service Request pending. The Vector Modification Logic 780 joins these bits with the five user defined bits from the Global Service Vector Register to generate the Modified Service Vector.

The autoprioritization as previously described may vary the values of IT2, IT1, and IT0 presented on the data bus from the implicit type of the service acknowledgment performed by the host. In the case where the Service Acknowledgment Prioritization Logic has converted the match type of the service acknowledgment from the host to a different match type presented to the daisy-chain controllers, the acklvl signals from the daisy-chain controllers will reflect the converted match type and cause the IT2, IT1, and IT0 values supplied within the modified Service Vector to correspond to the type of request autoprioritization caused to be acknowledged.

DYNAMIC DAISY CHAINING

The embodiment of the invention in the CL-CD1864 does not permit the use of the "fishing" type acknowledgment with daisy-chaining because the present implementation of the DaisyEn control bit disables only the passing of register acknowledgments. Devices further down the daisy-chain see only the traditional acknowledgments signalled by ACKIN*. ACKIN* acknowledgments will produce an ACKOUT* signal if a suitable service request is not pending. It will be obvious to one skilled in the art that a further control bit providing for the disabling of ACKIN* acknowledgments or the broadening of the DaisyEn control function to include ACKIN* acknowledgments could be readily implemented. With such an extension to the control of daisy-chaining, fishing would be supported over an entire daisy-chain. In this case, the last device in the daisy chain must have its ability to pass an acknowledgment disabled. In the event that a "fishing" type acknowledgment found no device in the chain with a suitable service request pending, the acknowledgment would be passed to the last device in the chain. That device, having no suitable service request pending and with daisy-chaining inhibited, would be obliged to respond with a modified Service Vector containing the reserved type code "000".

The extension of the Daisy-chain disabling mechanism as just described, together with the register acknowledgment invention would permit several novel and useful host software manipulations of a hardware daisy chain. The daisy chain can be dynamically partitioned at arbitrary points by disabling daisy chaining at any device or devices at which the host wished to partition the chain. By use of the direct addressing that is possible with the register acknowledgment invention, service acknowledgments can be issued to the devices at the head of the chains so partitioned. A circular daisy-chained ring of devices can be implemented in hardware and arbitrarily defined to end and begin with any 2 successive devices in the ring. The circular daisy-chained ring can be partitioned at multiple points to produce several smaller daisy-chains.

IMPROVEMENTS OVER PRIOR ART

This invention differs from the register support for service requests in the prior art device know as the CL-CD1400 in several ways. First, the user can view the service request state of the chip AND of the ensemble of chips sharing a set of service request lines. This latter facility means that by reading one register on one chip, the host or user knows if there are ANY service requests pending on any chips.

The second major difference is in the mapping of the Service Request acknowledge mechanism into reads of special registers. Here, the user may issue an acknowledge to the chip at the head of the chain. With DAISYEN set, that chip will treat the register-based acknowledge as a daisy chainable, validated Service Request acknowledge. That is, if it has the corresponding service request pending, it treats the register-based acknowledge as an acknowledgment of its pending service request. However, if it does not have the corresponding request pending, it passes the register-based acknowledge on down the chain by asserting ACKOUT*. CL-CD1864's down the chain see the ACKIN* as valid acknowledgment of the proper type, because they have their Service Match Registers (Modem Service Match Register, Transmit Service Match Register, Receive Service Match Register) programmed (by the user) to the addresses used for the Service Request Acknowledge Registers.

Note the user doesn't have to employ the register based acknowledge mechanism in a daisy chained mode. The user can reserve daisy chaining for use with an external interrupt controller using whatever acknowledge codes (Service Match Register values) are chosen. The user can use the new register based support on a chip by chip basis that does not conflict with the existing IACK mechanism.

It is legal to "fish" for acknowledgments with the RegAckEn=1, and DaisyEn=0. A vector with a modification code of zero indicates no Service Request was pending to "take" the acknowledge. This differs from "normal" interrupt acknowledge behavior in that the chip addressed will respond to the host whether it has an appropriate service request pending or not. In the "normal" case of the prior art, a chip receiving a service acknowledgment (its ACKIN* pin is asserted) will respond on the bus with a (possibly modified) vector only if it has an appropriate service request pending. If it does not have a request pending, it will assert ACKOUT*. The host is not guaranteed a response (vector) from the chip.

The third difference is in the option to have the CL-CD1864 assign the priority to a generic interrupt acknowledge given either through the ACKIN* mechanism or the register-based acknowledge mechanism. The AutoPri and the PriSel bits control this. The AutoPri bit enables the CL-CD1864 prioritizing mode and the PriSel bit chooses whether the Receive or the Transmit requests is to be of the highest priority. The user also selects whether the prioritization is to be done globally (over all chips in a daisy chain sharing IREQ lines) or locally to the specific chip receiving the acknowledgment.

While the preferred embodiment of the invention supports control by a host processor of a potentially very large number of data communications ports, it is obvious to those skilled in the art that the invention is applicable to other architectures. In particular, the invention is applicable to computer architectures in which a common resource (such as a host processor) controls, services, or communicates with multiple resources or devices (such as co-processors, slave processors, or peripheral devices).

FEATURES

- Eight full-duplex asynchronous channels supporting data rates up to 64 kbps[1]
- Register-based interrupt acknowledges eliminate need for separate interrupt acknowledge signals
- Automatic prioritization scheme allows device to respond to an interrupt acknowledge with the highest internal interrupt pending (host-programmable)
- Sophisticated interrupt schemes
  — Vectored Interrupts
  — *Fair Share* ™ Interrupts
  — *Good Data* ™ Interrupts for improved throughput
  — Simultaneous interrupt requests for three classes of interrupts: Rx, Tx, and modem state changes
- Independent baud-rate generators for each channel/direction
- Improved host/controller software interface
- Generation and detection of special characters
- On-chip flow control
  — In-band (Xon, Xoff generation and detection)
  — Out-of-band (DTR/DSR or RTS/CTS)
- On-chip FIFO — 8 bytes each for Rx, Tx, and Status
- Line break detection and generation
- Multiple-chip daisy chain cascading feature
- Odd, even, forced, or no parity
- Five modem/general-purpose I/O signals per channel
- System clock up to 30 MHz (x2), 15 MHz (x1)
- CMOS technology in 100-pin QFP

Intelligent Eight-Channel Communications Controller

OVERVIEW

The CL-CD1864 is an I/O controller capable of controlling eight full-duplex channels transferring data at rates up to 64 kbps. The advantage of the CL-CD1864 lies in its ability to move data efficiently from the serial channels to the host. This results in an order of magnitude improvement in system-level throughput and a reduction in overhead on the host CPU.

To increase the overall data throughput of the system, the chip relies on a combination of features. Most important are the buffers for transmit and receive data. Each serial channel has three 8-byte FIFOs — one each for transmit, receive, and receive exception status. The Receive FIFOs have programmable thresholds to minimize interrupt latency requirements.

*(cont. next page)*

Functional Block Diagram

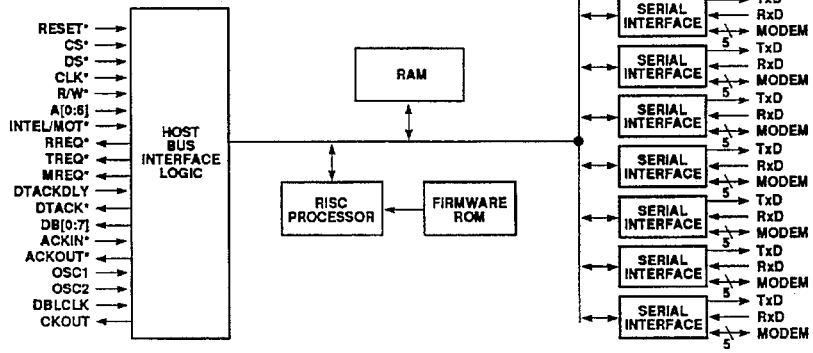

[1] 100% system throughput at 57.6 kbps, and 80% system throughput at 64 kbps.

Before beginning any new design with this device, please contact Cirrus Logic, Inc. for the latest errata information. See the back cover of this document for sales office locations and phone numbers.

OVERVIEW (cont.)

The CL-CD1864 is based on a high-performance proprietary RISC processor architecture developed by Cirrus Logic specifically for data communication applications. This processor executes all instructions in one clock cycle, and uses a register window architecture to ensure zero-overhead context switch for each type of internal interrupt.

The CL-CD1864 is fabricated in an advanced CMOS process. The chip's high throughput, low power consumption, and high level of integration permit system designs with minimum parts count, maximum performance, and maximum reliability.

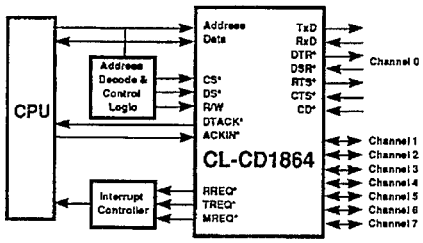

Typical CL-CD1864 Host CPU Interface

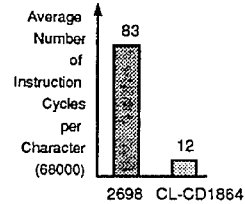

CL-CD1864 Performance

CL-CD1864 Features/Benefits

| Unique Features | Benefits |
|---|---|
| ■ Three 8-byte FIFOs per channel | Greatly reduces real-time interrupt response time requirement of the host CPU. Simplifies system tasks in a real-time multi-tasking environment. |
| ■ User-programmable receive FIFO interrupt threshold | Enables tailoring of interrupt conditions to different system requirements. Speeds software development. |
| ■ Data interrupt for transferring multiple bytes of data | Reduces host time required to transfer data and significantly improves system performance. 'Frees-up' bandwidth for host to perform higher-level system tasks. |
| ■ Interrupt vectoring by device ID and type of service required | Permits direct jump into proper interrupt service routine, improving overall system performance. |
| ■ Automatic flow control | Real-time control of data flow reduces risk of losing valuable data. |

Table of Contents

| Section | Page |
|---|---|
| 1. PIN INFORMATION | 5 |
| 1.1 Pin Diagram | 5 |
| 1.2 Pin Assignments | 6 |
| 1.3 Pin Descriptions | 7 |
| 2. FUNCTIONAL DESCRIPTION | 10 |
| 2.1 Introduction | 10 |
| 2.2 Internal Operation | 12 |
| 2.3 Service Request And Interrupt Operation | 17 |
| 2.3.1 Theory of Operation | 17 |
| 2.3.2 Internal Implementation of the Service Request Logic | 19 |
| 2.3.3 Priorities and Fair Share™ | 22 |
| 2.4 Types of Service Requests | 23 |
| 2.4.1 Receive Service Requests | 23 |
| 2.4.1.1 Receive Good Data | 23 |
| 2.4.1.2 Receive Exception | 24 |
| 2.4.2 Transmit Service Requests | 26 |
| 2.4.3 Modem Signal Change Service Requests | 26 |
| 2.4.3.1 Using Modem Pins as Input/Output | 26 |
| 2.5 Implementing Service Requests | 26 |
| 2.5.1 Method 1a — Full Interrupt – Type A, Three Level with Three-Level Acknowledge | 28 |
| 2.5.2 Method 1b — Full Interrupt – Type B, Three-Interrupt Level with Single Acknowledge | 29 |
| 2.5.3 Method 2b — Interrupt Interface, Single-Interrupt Level with Single Acknowledge | 30 |
| 2.5.4 Method 3b — Polled Interface | 31 |
| 2.5.5 Comparison of Interrupt and Polled Code Sequences | 33 |
| 2.5.6 Cascading Service Requests with Multiple CL-CD1864s | 34 |
| 2.5.7 Multiple CL-CD1864s without Cascading | 35 |
| 2.5.8 Acknowledging Service Requests | 35 |
| 3. SYSTEM BUS INTERFACE AND SYSTEM CLOCK | 36 |
| 3.1 System Interface Considerations | 37 |
| 3.2 System Clock and Bit Rate Options | 37 |
| 3.2.1 System Clock | 37 |
| 3.2.2 Bit Rate Options | 38 |
| 3.2.3 Maximum Throughput Limits | 40 |
| 3.3 CL-CD1864 Basic Bus Interface and Addressing | 40 |
| 3.3.1 Intel, Versus Motorola, Interface Signals and Addressing | 40 |
| 3.3.2 Un-Clocked Versus Clocked Bus Interface | 41 |
| 3.4 Interface Examples | 43 |
| 3.4.1 Interfacing to 80X86-Family Processors | 43 |
| 3.4.2 Interfacing to 680X0-Family Processors | 43 |
| 3.4.3 Interfacing to the VME Bus | 44 |
| 4. SERIAL INTERFACES | 46 |
| 4.1 Receiver Operation | 46 |
| 4.1.1 Basic Operation | 46 |
| 4.1.2 Receive FIFO Operation | 46 |
| 4.1.3 FIFO Timer Operations | 48 |
| 4.1.4 Receive Service Requests | 48 |
| 4.1.5 Receive Good Data™ Service Request | 49 |
| 4.1.6 Receive Exception Service Request | 49 |
| 4.1.7 Types of Errors | 49 |
| 4.1.8 Types of Exceptions | 50 |
| 4.1.8.1 Special Character Recognition | 50 |
| 4.1.8.2 Flow-Control Characters | 51 |
| 4.1.8.3 No New Data Received Time-out | 53 |
| 4.1.9 Programming Notes | 55 |
| 4.2 Transmitter Operation | 55 |
| 4.2.1 Basic Operation | 55 |
| 4.2.2 FIFO Operation | 56 |
| 4.2.3 Transmit Service Requests | 56 |
| 4.2.4 Special Transmitter Commands | 57 |
| 4.2.5 Special Character Transmission Via Send Special Character Command | 57 |
| 4.2.6 Embedded Transmit Commands | 57 |
| 4.2.7 Sending Breaks | 58 |
| 4.2.8 Sending Inter-Character Delays | 58 |
| 4.2.9 Summary of Special Transmitter Commands | 59 |
| 4.3 Flow Control | 59 |
| 4.3.1 Receiver Flow Control | 61 |
| 4.3.2 Receiver Hardware (Out-of-Band) Flow Control | 61 |
| 4.3.3 Receiver Software (In-Band) Flow Control | 61 |
| 4.3.4 Transmitter Flow Control | 63 |
| 4.3.5 Transmitter Hardware (Out-of-Band) Flow Control | 63 |
| 4.3.6 Transmitter Software (In-Band) Flow Control | 63 |
| 4.4 Modem Signals and General-Purpose I/O | 66 |
| 4.4.1 Generating Service Requests with Modem Pins | 67 |
| 4.4.2 Using Modem Pins as General-Purpose I/O | 67 |
| 4.5 Testing the CL-CD1864 — Loopback Tests | 68 |

Table of Contents (cont.)

| Section | | Page |
|---|---|---|
| 5. | PROGRAMMING | 70 |
| 5.1 | Types of Registers | 70 |
| 5.2 | Access Duty Cycle | 70 |
| 5.3 | Accessing FIFOs Versus Other Registers | 71 |
| 5.4 | Initialization | 71 |
| 5.5 | Global Initialization | 73 |
| 5.6 | Service Request Initialization | 73 |
| 5.7 | Prescaler | 73 |
| 5.8 | Channel Initialization and Changes | 73 |
| 5.9 | Transmitting Data | 74 |
| 5.10 | Receiving Data | 74 |
| 6. | DETAILED REGISTER DESCRIPTIONS | 75 |
| 6.1 | Register Map Quick Reference | 75 |
| 6.2 | Global Registers | 77 |
| 6.2.1 | Miscellaneous Registers | 77 |
| 6.2.2 | Configuration Registers | 77 |
| 6.2.3 | Service Request/Interrupt Control Registers | 82 |
| 6.3 | Indexed Indirect Registers | 85 |
| 6.3.1 | Receive Data Count Register (RDCR) ($07) — Read Only | 85 |
| 6.3.2 | Receive Data Register (RDR) ($78) — Read Only | 86 |
| 6.3.3 | Receive Character Status Register (RCSR) ($7A) — Read Only | 86 |
| 6.3.4 | Transmit Data Register (TDR) ($7B) — Write Only | 87 |
| 6.3.5 | End of Service Routine Register (EOSRR) ($7F) — Write Only | 87 |
| 6.4 | Channel Registers | 88 |
| 6.4.1 | Service Request Enable Register (SRER) ($02) — Read/Write | 88 |
| 6.4.2 | Channel Command Register (CCR) ($01) — Read/Write | 89 |
| 6.4.3 | Channel Control Status Register (CCSR) ($06) — Read Only | 95 |
| 6.4.4 | Receiver Bit Register (RBR) ($33) — Read Only | 96 |

| Section | | Page |
|---|---|---|
| 6.4.5 | Receive Time-out Period Register (RTPR) ($18) — Read/Write | 96 |
| 6.4.6 | Receive Bit Rate Period Register – High Byte (RBPRH) ($31), and Low Byte (RBPRL) ($32) — Read/Write | 96 |
| 6.4.7 | Transmit Bit Rate Period Register – High Byte (TBPRH) ($39), and Low Byte (TBPRL) ($3A) — Read/Write | 97 |
| 6.4.8 | Special Character Register 1 (SCHR1) ($09) — Read/Write | 97 |
| 6.4.9 | Special Character Register 2 (SCHR2) ($0A) — Read/Write | 97 |
| 6.4.10 | Special Character Register 3 (SCHR3) ($0B) — Read/Write | 98 |
| 6.4.11 | Special Character Register 4 (SCHR4) ($0C) — Read/Write | 98 |
| 6.4.12 | Modem Change Register (MCR) ($12) — Read/Write | 99 |
| 6.4.13 | Modem Signal Value Register (MSVR) ($28) — Read/Write | 101 |
| 6.4.14 | Modem Signal Value Request-To-Send (MSVRTS) ($29) — Write Only | 102 |
| 6.4.15 | Modem Signal Value Data-Terminal-Ready (MSVDTR) ($2A) — Write Only | 102 |
| 7. | ELECTRICAL SPECIFICATIONS | 103 |
| 7.1 | Absolute Maximum Ratings | 103 |
| 7.2 | Recommended Operating Conditions | 103 |
| 7.3 | DC Electrical Characteristics | 103 |
| 7.4 | Index of Timing Information | 104 |
| 7.5 | AC Electrical Characteristics | 105 |
| 7.5.1 | Clocked Bus Interface | 105 |
| 7.5.2 | Un-Clocked Bus Interface | 105 |
| 8. | PACKAGE DIMENSIONS | 120 |
| 9. | ORDERING INFORMATION | 121 |

1. PIN INFORMATION
The CL-CD1864 is available in a 100-pin quad flat pack device configuration, shown below.
1.1 Pin Diagram
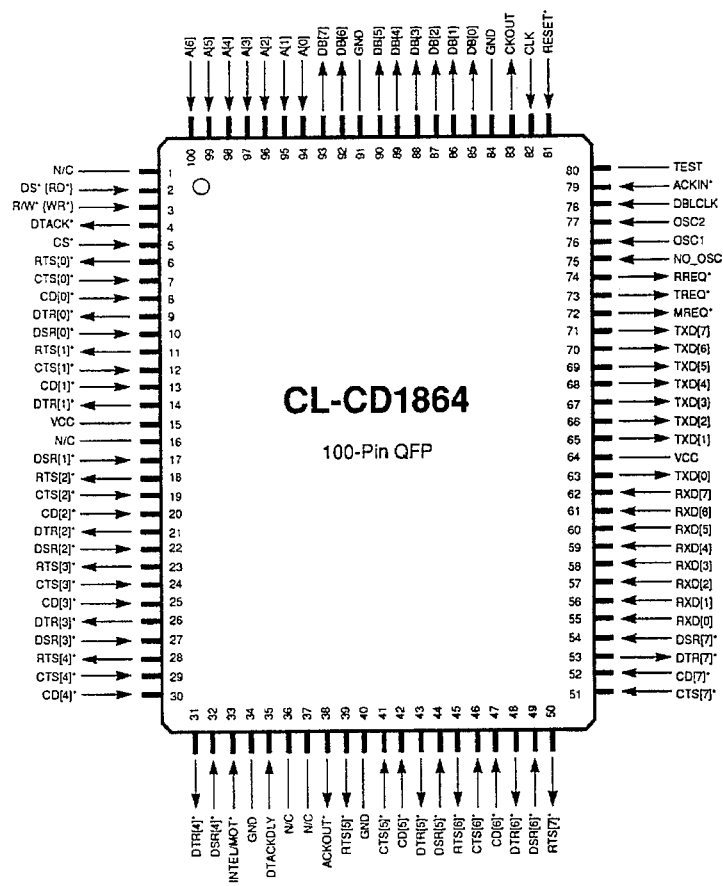
(*) Denotes negative true signal

1.2 Pin Assignments

The following conventions are used in the following table: (*) denotes an active-low signal; I = Input, I/O = Input/Output, O = Output, and OD = Open Drain.

| Symbol | Pin # | # of Pins | Type |
|---|---|---|---|
| GENERAL | | | |
| CLK | 82 | 1 | I |
| DBLCLK | 78 | 1 | I |
| NO_OSC | 75 | 1 | I |
| OSC1 | 76 | 1 | I |
| OSC2 | 77 | 1 | I |
| CKOUT | 83 | 1 | O |
| RESET* | 81 | 1 | I |

NOTE: Both the CLK and RESET* Pins have a $V_{IH}$ specification of 2.7 volts. A 1K-ohm pullup, or use of a driver of logic families (such as advanced CMOS, advanced Schottky, or others) that are specified by their manufacturers as providing a $V_{OH}$ of at least 3.0 volts when driving a micro-amp load is recommended.

| Symbol | Pin # | # of Pins | Type |
|---|---|---|---|
| MICROPROCESSOR INTERFACE | | | |
| A[0:6] | 94:100 | 7 | I |
| DB[0:7] | 85:90, 92, 93 | 8 | I/O |
| CS* | 5 | 1 | I |
| DS* (RD*) | 2 | 1 | I |
| R/W* (WR*) | 3 | 1 | I |
| DTACK* | 4 | 1 | OD |
| DTACKDLY | 35 | 1 | I |
| INTEL/MOT* | 33 | 1 | I |

| Symbol | Pin # | # of Pins | Type |
|---|---|---|---|
| SERVICE REQUEST INTERFACE | | | |
| ACKIN* | 79 | 1 | I |
| ACKOUT* | 38 | 1 | O |
| RREQ* | 74 | 1 | OD |
| TREQ* | 73 | 1 | OD |
| MREQ* | 72 | 1 | OD |
| COMMUNICATIONS INTERFACE | | | |
| RxD[0:7] | 55:62 | 8 | I |
| TxD[0:7] | 63, 65:71 | 8 | O |
| CD[0:7]* | 8, 13, 20, 25, 30, 42, 47, 52 | 8 | I |
| DSR[0:7]* | 10, 17, 22, 27, 32, 44, 49, 54 | 8 | I |
| DTR[0:7]* | 9, 14, 21, 26, 31, 43, 48, 53 | 8 | O |
| CTS[0:7]* | 7, 12, 19, 24, 29, 41, 46, 51 | 8 | I |
| RTS[0:7]* | 6, 11, 18, 23, 28, 39, 45, 50 | 8 | O |
| MISCELLANEOUS | | | |
| N/C | 1, 16, 36, 37 | 4 | — |
| $V_{CC}$ | 15, 64 | 2 | — |
| GND | 34, 40, 84, 91 | 4 | — |
| Test | 80 | 1 | — |

1.3 Pin Descriptions

| Symbol | Pin Number | Type | Description |
|---|---|---|---|
| General | | | |
| CLK | 82 | I | SYSTEM CLOCK: Input for 1x clock signal. If 2x clock or crystal is used, ground this input. |
| DBLCLK | 78 | I | DOUBLE CLOCK: Input for 2x clock signal. If 1x clock is used, tie this signal high to $V_{CC}$. If oscillator is used, ground this signal. |
| NO_OSC | 75 | I | DISABLES ON-CHIP OSCILLATOR: If an oscillator (crystal) is not being used, tie high. If a crystal is being used, ground this input. |
| OSC1, OSC2 | 76, 77 | I | OSCILLATORS: Connection for external crystal. The crystal should be an AT-cut, parallel-mode, fundamental-frequency crystal, and must be twice the desired frequency, e.g., a 30-MHz crystal will provide 15-MHz operation. If a crystal is not being used, OSC1 should be tied high, and OSC2 should not be connected. |
| CKOUT | 83 | O | CLOCK OUTPUT: This output is the actual clock used to drive the CL-CD1864 internally, regardless of the source of the clock. |
| RESET* | 81 | I | RESET: Resets CL-CD1864. All internal registers are cleared or initialized. |
| Microprocessor Interface | | | |
| A[0:6] | 94:100 | I | ADDRESS: Address inputs, used to select the various internal registers of the CL-CD1864. |
| DB[0:7] | 85:90, 92, 93 | I/O | DATA BUS I/O. |
| CS* | 5 | I | CHIP SELECT: Must be low for all reads and writes to the CL-CD1864, but not for service acknowledgment cycles. Must never be low when ACKIN* is low. |
| DS* (RD*) | 2 | I | DATA STROBE: When the INTEL/MOT* Pin is low, this signal is used to control access to the CL-CD1864, and data hold time on the bus. When the INTEL/MOT* Pin is high, this pin performs the same function for read cycles and service acknowledgment cycles. |
| R/W* (WR*) | 3 | I | READ/WRITE: When the INTEL/MOT* Pin is low, this signal controls whether the current bus cycle is a read or a write. When the INTEL/MOT* Pin is high, this signal strobes data into the CL-CD1864 on write cycles only. |

1.3 Pin Descriptions (cont.)

| Symbol | Pin Number | Type | Description |
|---|---|---|---|
| DTACK* | 4 | OD | DATA TRANSFER ACKNOWLEDGE: Open-drain output. This signal indicates the completion of an internal bus cycle within the CL-CD1864. It can be used to insert wait states by the host. Note that the bus cycles are of fixed length, and if the bus interface is correctly designed, DTACK* is not required to insert wait states. |
| DTACKDLY | 35 | I | DTACK DELAY: Controls the time of assertion of DTACK to allow 'fine tuning' of the number of wait states inserted. When low, DTACK asserts earlier than when high. |
| INTEL/MOT* | 33 | I | **INTEL/MOT*:** Selects either of two bus-handshake styles. When low, DS* acts as Data Strobe, and the R/W* Pin acts as Read/Write. When INTEL/MOT* is high, the two pins act as RD* Strobe and WR* Strobe. INTEL/MOT* does not affect the timing of the bus interface, only the logical meaning of these two pins. INTEL/MOT* may be tied either high or low, but should not be changed during regular operation. |
| Service Request Interface | | | |
| ACKIN* | 79 | I | ACKNOWLEDGMENT (SERVICE) INPUT: Must be low only during service acknowledge bus cycles. Must never be low when CS* is low. |
| ACKOUT* | 38 | O | ACKNOWLEDGMENT (SERVICE) OUTPUT: Goes low whenever the CL-CD1864 recognizes a valid acknowledgment is occurring (either hardware- or register-based) that is not for the CL-CD1864. In daisy-chain applications, the ACKOUT* should be connected to the ACKIN* of the next CL-CD1864. |
| RREQ* | 74 | OD | RECEIVE REQUEST OUTPUT: Asserts whenever the CL-CD1864 has a receive condition requiring service. Negates whenever a service acknowledgment of the receive type occurs. |
| TREQ* | 73 | OD | TRANSMIT REQUEST OUTPUT: Asserts whenever the CL-CD1864 has a transmit condition requiring service. Negates whenever a service acknowledgment of the transmit type occurs. |
| MREQ* | 72 | OD | MODEM REQUEST OUTPUT: Asserts whenever the CL-CD1864 has a modem signal change condition requiring service. Negates whenever a service acknowledgment of the modem signal change type occurs. |

1.3 Pin Descriptions (cont.)

| Symbol | Pin Number | Type | Description |
|---|---|---|---|
| Communications Interface | | | |
| RxD[0:7] | 55:62 | I | RECEIVED DATA INPUTS. |
| TxD[0] | 63 | O | TRANSMITTED DATA OUTPUTS. |
| TxD[1:7] | 65:71 | O | TRANSMITTED DATA OUTPUTS. |

NOTE: The following 'modem control' signals are named arbitrarily. The CD* Signal is a general-purpose input. The DSR* and DTR* Signals can be used by the CL-CD1864 receiver for handshake or flow control, or may be used as general-purpose inputs and outputs. The RTS* and CTS* Signals can be used by the CL-CD1864 transmitter as handshake or flow control, or may be used as general-purpose inputs and outputs. In all cases, the CL-CD1864 can be programmed to generate interrupts whenever the input pins change state in a specified direction.

| Symbol | Pin Number | Type | Description |
|---|---|---|---|
| CD*[0:7] | 8, 13, 20, 25 30, 42, 47, 52 | I | CARRIER DETECT INPUTS: May be used as general-purpose inputs. Can also be used for Ring Detect Inputs. |
| DSR*[0:7] | 10, 17, 22, 27, 32, 44, 49, 54 | I | DATA SET READY INPUTS: May be used to control the Receive Shift Register for flow-control purposes, or may be used as general-purpose inputs. |
| DTR*[0:7] | 9, 14, 21, 26 31, 43, 48, 53 | O | DATA TERMINAL READY OUTPUTS: Used by the receiver to indicate that the Receive FIFO has exceeded a user-defined threshold; in other words, as a signal to flow-control the remote sender. May also be used as a general-purpose output. |
| CTS*[0:7] | 7, 12, 19, 24, 29, 41, 46, 51 | I | CLEAR-TO-SEND INPUTS: Used by the transmitter as a permission-to-send controls, or may be used as general-purpose inputs. |
| RTS*[0:7] | 6, 11, 18, 23, 28, 39, 45, 50 | O | REQUEST-TO-SEND OUTPUTS: Used by the transmitter to indicate that there is data to be sent. May be used as general-purpose outputs. |
| Miscellaneous | | | |
| N/C | 1, 16, 36, 37 | – | NO CONNECT: Do not connect. |
| $V_{CC}$ | 15, 64 | – | +5V. |
| GND | 34, 40, 84, 91 | – | GROUND. |
| TEST | 80 | – | TEST: This is a test pin and should be connected to ground. |

2. FUNCTIONAL DESCRIPTION

2.1 Introduction

The CL-CD1864 I/O coprocessor controls eight full-duplex channels that transfer data at rates up to 64 kbps. The CL-CD1864 moves data efficiently between the serial channels and the host, resulting in a great improvement in system-level throughput, and a reduction in overhead on the host CPU. This improvement is obtained by reducing the number of service requests (interrupts) the host must respond to, and the complexity and time required to handle each service request.

The CL-CD1864 relies on a combination of features to achieve reduction in the number and complexity of service requests. Most important are the buffers for transmit and receive data. Each serial channel has three 8-byte FIFOs — one each for transmit, receive, and receive exception status. The Receive FIFOs have programmable thresholds to minimize interrupt latency requirements. The vectored service requests and the Good Data Interrupt allow the host system to immediately transfer data upon beginning processing of a service request, without tedious checking of flags and error conditions.

The CL-CD1864 is based on a high-performance, proprietary RISC processor architecture developed by Cirrus Logic specifically for data communications applications. The CL-CD1864 processor executes all instructions in one clock cycle, and uses a register window architecture to ensure zero-overhead context switch for each type of internal interrupt. The instruction set of this processor is optimized for bit-oriented tasks that, combined with instantaneous response to sending or receiving one bit, allow highly efficient processing of characters. All firmware for the CL-CD1864 processor is contained in an on-chip ROM, and requires no user programming.

The CL-CD1864 processor is assisted in its task by specialized peripheral logic. Serial data transmission and reception is handled by 'bit engines'. Each channel has a bit engine for transmitting and another for receiving. While each engine handles all bit-level timing, bit-to-character assembly is done in firmware. Bits are passed to the CL-CD1864 processor by internal interrupts, over a special bus dedicated to this purpose. Special internal-interrupt context hardware reduces overhead on internal interrupts to zero by pointing to the correct register window for every possible context, and a unique Global Index Register eliminates address calculations by always pointing to the current channel. External service requests to the host system are also hardware-assisted. There is a queue for each of the three classes of external service requests, and the request/acknowledgment mechanism is entirely in hardware to minimize response time.

The CL-CD1864 processor assembles bits into characters, checks parity and formatting parameters, and stores the data in the FIFOs as required. FIFOs are maintained as RAM-based structures, and both the local CL-CD1864 processor and the host access them via Pointer Registers by an Indexed Addressing Mode.

The CL-CD1864 communicates with the host via service requests and service acknowledgments. Service requests can be handled either as interrupts or by polling. Regardless of the method used, the CL-CD1864 has features to minimize both the number of requests to be serviced and the time required to service them. The number of service requests is reduced by the FIFOs, since a service request is required only every eight characters. To reduce the time required per request, the CL-CD1864 supplies separate vectors for four different types of service requests. This reduces the time required by the host CPU to determine what action to take. For instance, there is a unique vector for Good Data, so that the host wastes no time checking status bits or error conditions. If there is an error condition, the CL-CD1864 supplies a unique vector pointing to the error-handling routine. Other vectors report transmit status and modem signal change.

Service requests to the host system are implemented on the CL-CD1864 by three hardware service request state machines. Each machine has the ability to 'queue-up' multiple requests. The state machines are designed to offer the fastest response possible. Whenever the CL-CD1864 processor determines that a condition needs a service request, it queues the request with the appropriate state machine. The state machine posts the external request, monitors acknowledgment cycles from the host, and informs the CL-CD1864 processor when a valid service acknowledgment has been completely serviced. This allows the CL-CD1864 to correctly maintain the internal context for processing the channel being serviced.

Because the CL-CD1864 processor processes every character sent or received, features such as Automatic Flow Control and Special Character Recognition are easily implemented. This reduces the processing burden on the host system. Both In-Band (Xon, Xoff) and Out-of-Band (RTS/CTS, DTR/DSR) Flow Control Modes are supported. For In-Band Flow Control, the CL-CD1864 automatically starts and stops its transmitter when the remote unit sends flow-control characters. The CL-CD1864 makes it easy for the local host to flow-control the remote via the 'Send Special Character' commands. For Out-of-Band Flow Control, the transmitter will optionally assert RTS and monitor CTS for permission to send, and assert/negate DTR when the Receive FIFO reaches a user-definable threshold. DSR may be used to gate the receiver on and off. Together, the In-Band and Out-of-Band features allow the data flow to be controlled in real time with minimum or no host intervention, and also prevent loss of data.

Systems with multiple CL-CD1864s are easily implemented, with no external glue, via a daisy-chain scheme. A Fair Share feature ensures equal access for all service requests, both within one CL-CD1864 and across multiple devices. Alternately, multiple CL-CD1864s may be operated as independent devices in parallel.

Serial channels on the CL-CD1864 are entirely independent of one another. Any channel may be programmed to a combination of features regardless of the state of other channels. Bit-rate generators are programmed by loading a divisor value, so the transmitters and receivers can each operate at any standard or non-standard data rate.

The CL-CD1864 can detect the received line-break condition, send break characters of any length, and transmit delays. This is done via transmit commands embedded in the Transmit Data Stream. The CL-CD1864 can also be programmed to detect user-defined special characters and generate a special service request to the host. Parity checking is performed automatically, but can be overridden by the host to force parity errors for test purposes. Character length and Stop Bit length are also programmable per-channel.

Modem pins on the CL-CD1864 are general-purpose, i.e., they are not hard-wired into the UART functions. If modem pins are not needed to interface to actual modems, they can be used as general-purpose I/O pins. In either case they are readable and writable directly by the host system. In addition, the CL-CD1864 can be programmed to monitor levels on modem input pins and generate service requests to the host upon detecting a specified change.

The CL-CD1864 is fabricated in an advanced CMOS process. Its high throughput, low-power consumption, and high level of integration permits system designs with minimum parts count, maximum performance, and reliability.

There is a significant difference between the CL-CD1864 and conventional dumb UARTs; the CL-CD1864 is more efficient and truly intelligent even when operating in a polled environment. Systems built with the CL-CD1864 interface between the host and the I/O device at a higher level than systems built with conventional UARTs. For example, with a dumb UART, the host must test each channel for presence of data, a process that is time-consuming. With the CL-CD1864, the host queries the entire serial I/O subsystem to the presence of data. If data is present, the CL-CD1864 determines which channel it is on, and whether it is good or erroneous. Thus, using the the CL-CD1864, host-peripheral interface is easier to implement, faster, and efficient.

2.2 Internal Operation

Figure 1:
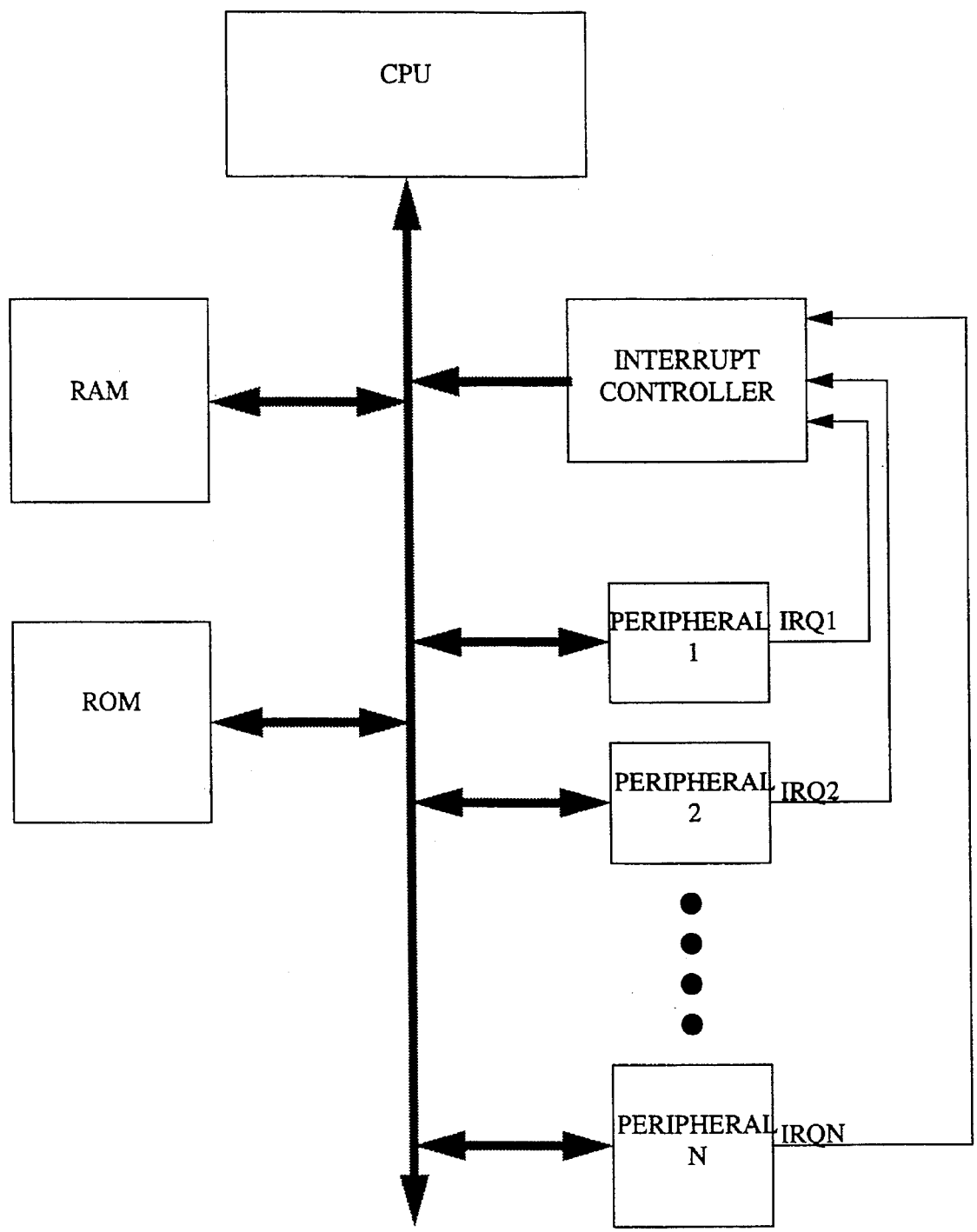
FIG. 1 illustrates the prior art method of an interrupt controller handling multiple interrupt request signals from N peripheral devices.
Figure 2:
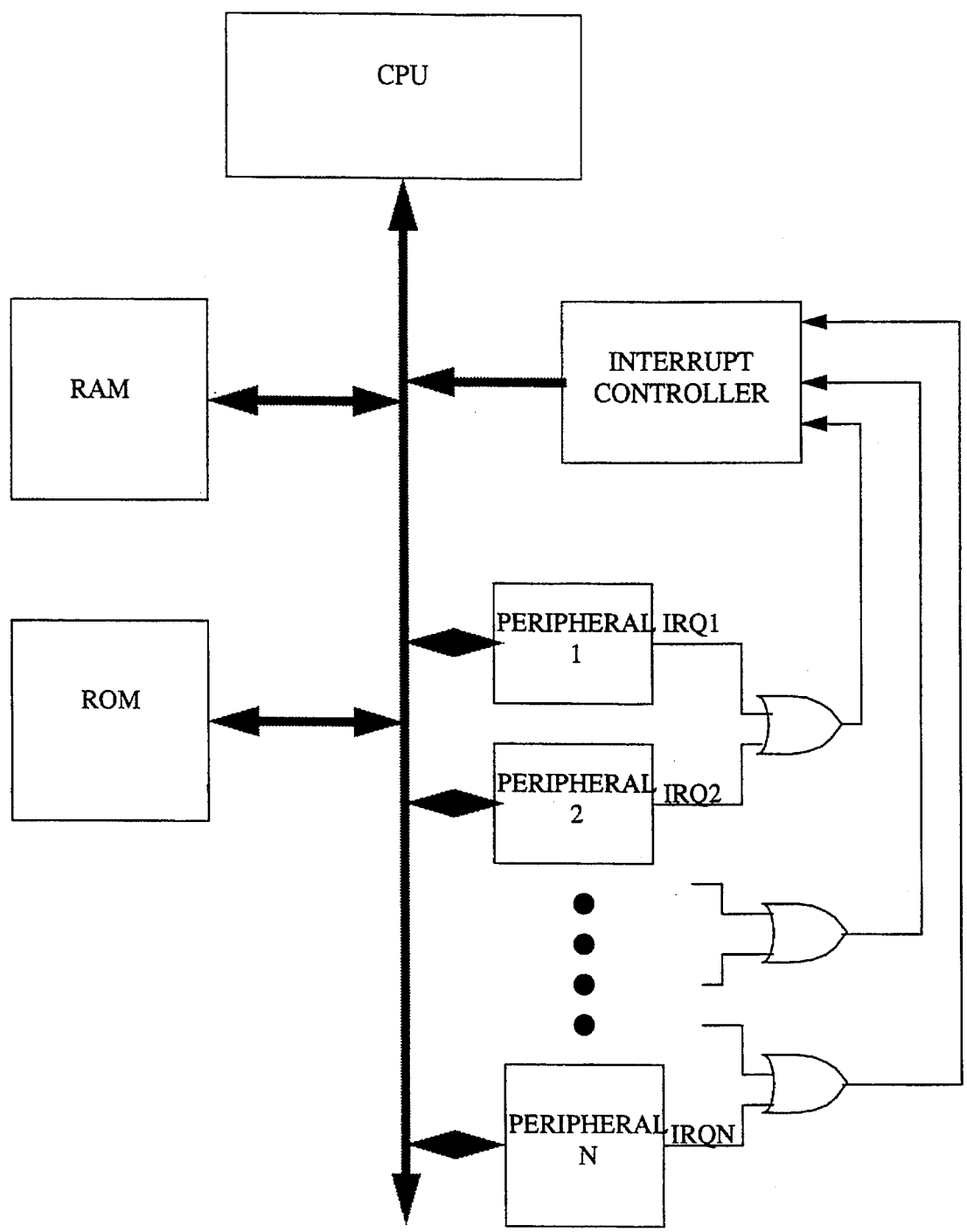
FIG. 2 illustrates the prior art method of ORing interrupt request signals so that a greater number of peripheral devices can share the limited capacity of the interrupt controller.

The internal architecture of the CL-CD1864 is shown in Figure 2–1. At the heart of the design is a custom-designed CPU that Cirrus Logic has developed especially for this application. This CPU is optimized for bit-oriented tasks associated with UART functions, and has a set of registers for each channel, arranged in a register window architecture. These registers and the ALU are eight bits wide. The CL-CD1864 processor has a 16-bit instruction word, that it retrieves from an on-chip ROM. Every instruction is one word long, and is executed in one-clock cycle.

Whenever an internal interrupt occurs (from a bit engine), the CL-CD1864 processor automatically switches context to that channel's block of registers. No time is lost in saving any machine state. The CL-CD1864 processor processes the instructions necessary to handle that bit (typically three to six instructions), and then returns to the context it was in prior to the internal interrupt. All internal interrupts are at the same priority level; the interrupt handler block ensures Fair Share access across channels.

Each channel's serial interface logic consists of a Receive-bit Engine, a Transmit-bit Engine, a Receive-baud-rate Generator, a Transmit-baud-rate Generator, and a Timer. The Receive-bit Engine samples the state of the RxD Pin at the time indicated by the Receive-baud-rate Generator, and reports this value to the CL-CD1864 processor as an interrupt. The Transmit-bit Engine works in a similar manner, but with a slight difference. At the baud rate tick, it outputs the next bit, and generates an interrupt to the CL-CD1864 processor requesting the following bit.

The baud-rate generators are 16-bit dividers, operating from a master clock, which is the system clock divided by 16. All baud-rate generators are independent, so a channel can send and receive at any speed. In addition to the baud-rate generators, there are two channel timers for each channel. One is an 8-bit divider, operating the master prescaler timer tick. This timer is used to time-out partially full FIFOs to avoid 'stale' data. The other is used to time embedded delays in the Transmit Data Stream.

All eight channels are continuously scanned by internal logic that generates interrupts to the CL-CD1864 processor in a 'fair' manner. This Fair Share Interrupt feature is the same as the mechanism used to share service requests across multiple devices. Whenever two or more channels are contending for interrupt service, the channel that is serviced first will not assert again until all other currently pending channels have been serviced. This prevents a fast, 64-kbps channel from 'hogging' service from a slow 1200-bps channel, yet allows the faster channel the additional service it needs to support its higher speed. This allows more overall throughput than a 'round-robin' or an 'equal-access' method would provide.

Service requests for the host are handled by fast, dedicated logic on each of the three levels provided. Whenever the CL-CD1864 processor detects a condition requiring external-host service, it queues the request with the service-request machine for that level. This machine asserts the External Request Pin, and watches for a service acknowledgment of the same level. When a service acknowledgment senses it, the machine automatically provides the vector to the host, and sets up the internal context of the CL-CD1864 for service. Upon completion of the service, the machine restores the normal context. The queue for service requests is two deep, so in a busy system there can be another request immediately pending when the first one is completed. This method avoids any delay between requests, and improves overall efficiency.

Modem I/O signals are implemented as 'conventional' input-output circuits, readable, and writable by either the on-chip or the host CPU. This allows maximum flexibility in using these signals either in the conventional way, or for any other I/O function desired. When the CL-CD1864 processor is using these pins to implement flow-control functions, it reads them under software control and implements the function that way. There is no direct hardware association between the modem pins and the serial I/O hardware.

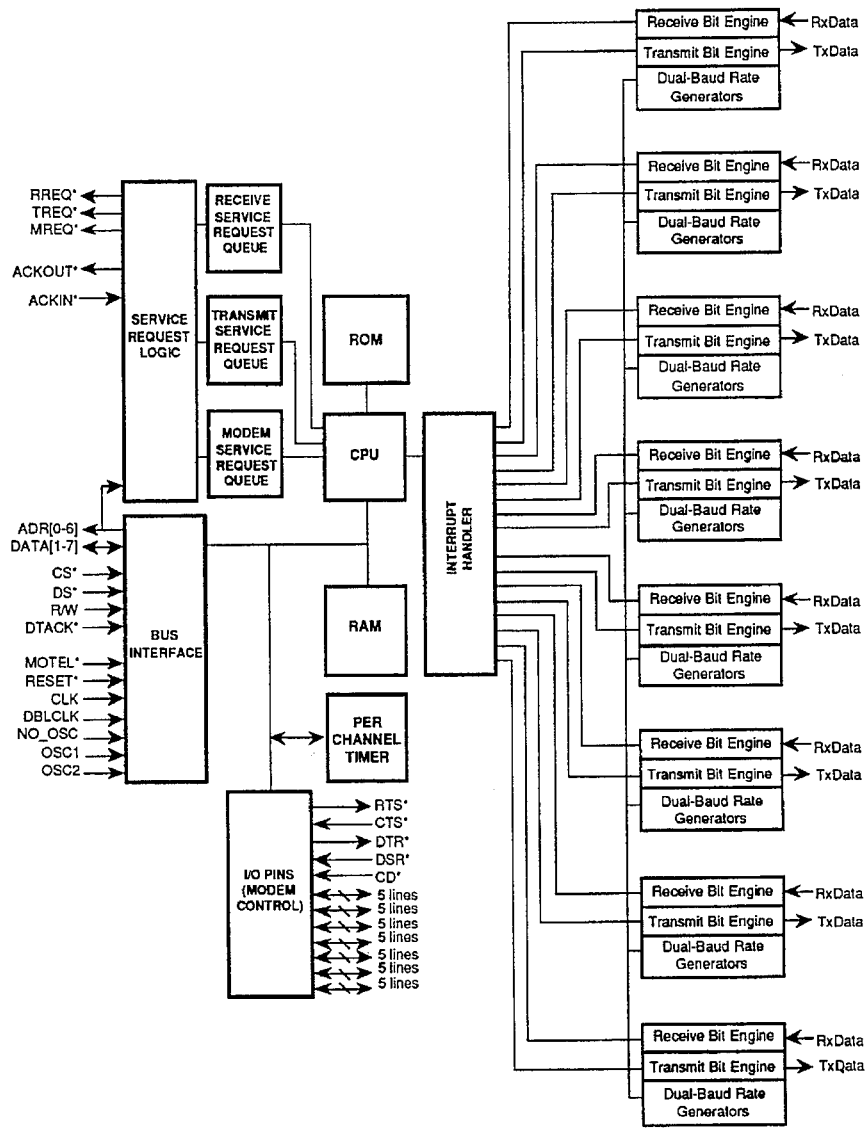
Figure 2-1. Internal Block Diagram

The CL-CD1864 workload can be divided into two categories:

- Bit-to-character conversion (and vice versa) — the 'traditional' UART function.
- Character-level processing such as flow control, FIFO management, and host interface functions.

The CL-CD1864 internal processor handles all these tasks in firmware. A foreground/background scheme is used; foreground for internal bit-engine interrupts, and background for everything else. This internal structure represented in Figure 2-3, shows how the foreground communicates with the background. Foreground code handles bit-to-character assembly for receive, and character-to-bit disassembly for transmit. In either case a Holding Register, together with a Full/Empty Bit, acts as the 'gateway' between the interrupt-driven foreground and the polling-loop background code.

The background code executes the polling loop as shown in Figure 2-2. After power-on reset, the software runs continuously in an inner and an outer loop. Lower-priority tasks are handled in the outer loop, and higher-priority tasks are handled in the inner loop. The highest-priority tasks are bit events, which are handled by foreground (i.e., interrupt-driven) code.

The inner loop executes eight times as often as the outer loop. It checks each channel's full/empty bits to sense if another character needs to be moved. It first checks receive, and if there is a character to be moved, it is moved and execution moves on to the next channel. If receive data needs no processing, then transmit is checked. This mechanism gives a slightly higher priority to receive than to transmit, and is desirable, as missing a receive character is a fatal error, and being late in transmitting one is not an error. (The effect of this may be observed by programming the CL-CD1864 for higher-than-rated serial baud rates, and providing a source of receive traffic with virtually 100-percent loading. As the CL-CD1864 is heavily loaded, it will leave short gaps between transmit characters because the firmware is following the 'receive' path through the code. Refer to Section 3.2.3 for details on maximum performance and maximum line speed).

After eight passes through the inner loop (i.e., checking all eight channels for data), one pass is made through the outer loop. This pass checks one channel for host commands (such as 'Send Special Character'), timer functions, and a condition that requires posting an external service request (for instance, Receive FIFO full, Transmit FIFO empty, modem signal change, etc.). If required, the firmware posts the service request within the queue of the appropriate service request logic. It then continues normal operation, until the host responds to the service request. After a single pass through the outer loop, eight passes through the inner loop are again made.

In most cases the CL-CD1864 checks the appropriate bit in RAM to determine which options are enabled, and modifies its processing accordingly. Some control bits must be interpreted and moved by CL-CD1864 firmware from their location in option bit registers to other locations in the chip. Therefore, the host must notify the CL-CD1864 when these bits are modified. The CL-CD1864 will then alter the channel as commanded. Refer to Section 4.2 for details on channel command functions.

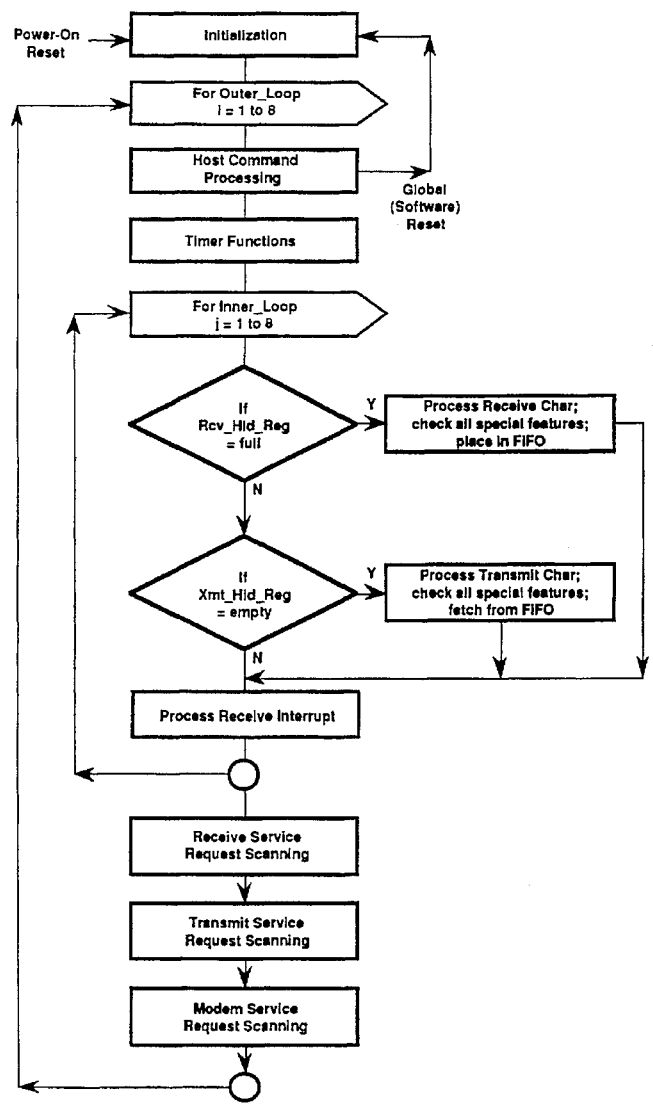
Figure 2-2. Internal Operation Flow Chart

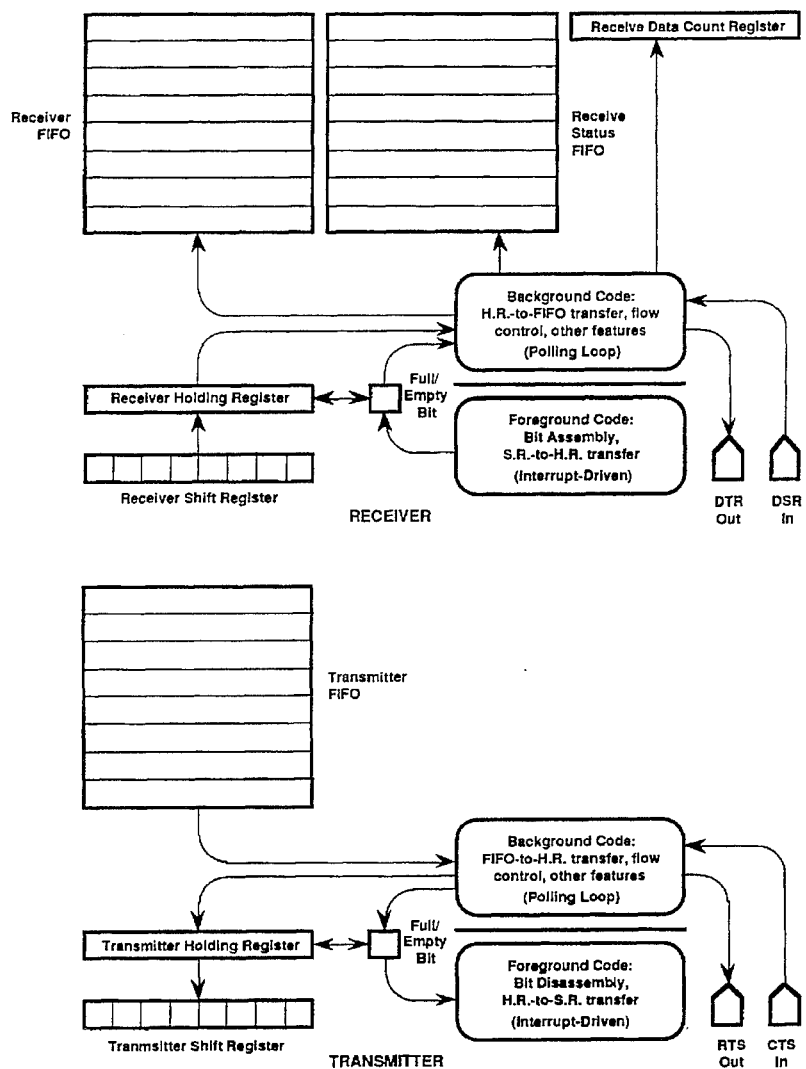
Figure 2-3. Foreground/Background Internal Structure

2.3 Service Request And Interrupt Operation

The CL-CD1864 enhances design efficiency because it is an intelligent device that more closely resembles an add-in controller board than a mere collection of TTL. Conventional UARTs are basically passive, 'dumb' logic. For example, when polling a device for channels requiring service, each channel is not individually tested. Because of this, certain restrictions are placed on when and how FIFOs are accessed. The CL-CD1864 processor must determine what the host is doing, and when to manage the queue of events correctly and efficiently.

Interrupt-Driven Versus Polled

The choice of software interface, interrupt-driven versus polled, has the most influence on overall system performance. This choice also has a significant impact on how software is written. In hardware implementation, a programmer has a choice of Mixed Mode, i.e., when to poll versus when to be interrupt-driven. Mixed-mode Operation allows a programmer to optimize the efficiency of the system according to changing needs. The advantages of each method are discussed in Section 2.5.

2.3.1 Theory of Operation

The CL-CD1864 has three independent service request levels, one for each of the three categories — Receive, Transmit, and Modem Signal Change. The priority of these lines is not fixed, but may be determined in one of the following three ways:

- It may be set within the CL-CD1864 by the AutoPriority Option Bits.
- A system designer may assign priorities by the manner in which the three service request lines are connected to the host interrupt controller.
- Under software control, the host system may define and redefine the order of service requests.

The Service Request Interface to the host is implemented with five signals — MREQ*, TREQ*, RREQ*, ACKLN*, and ACKOUT*. MREQ*, TREQ*, and RREQ* are asserted when a service request is pending. ACKIN* is asserted during service-acknowledgment cycles, and ACKOUT* is used in multiple-CL-CD1864 designs to share service requests and daisy-chain acknowledgments.

Whenever the CL-CD1864 processor determines that one or more channels need service from the host, it loads the appropriate service request state machine with the information about the type of request. The service request state machine for that level will then assert its request signal. Note that all three request signals can be active at the same time. At this point, the CL-CD1864 has not determined which request should be handled first — it simply asserts any and all lines, as required by the status of various channels. (This is true even if the AutoPri Option is enabled; AutoPri takes effect when a service request is acknowledged, and at that time the CL-CD1864 determines which is the most important request).

The host, after noticing that one or more of the three service request pins are active — either because the host was interrupted or polled — decides which of the requests (if more than one is active) it will service first. The host begins the service operation by issuing a Service Acknowledge Cycle. The purpose of this cycle is to cause the CL-CD1864 to set up its internal state for that type of request. (Note that if AutoPri is set, the host need not determine which level of service request to acknowledge; it simply acknowledges the CL-CD1864 request and the CL-CD1864 will return the vector for the highest-priority active request).

If AutoPri is not being used, the CL-CD1864 needs to be informed which one of the three possible pending requests the host wants to acknowledge. There are two different ways CL-CD1864 can be informed of this — hardware and software.

The hardware method is based on the value in the address bus; the CL-CD1864 determines the type of request being acknowledged by the value placed in the address bus during the acknowledge cycle. This is the method used by Motorola-family processors. The host places the level of interrupt being serviced on the low-order address bits during an interrupt acknowledgment cycle. When the host performs a Service Acknowledge Cycle, the CL-CD1864 compares the value on the address bus with the three unique values stored in three internal registers — the Modem Service Match Register, the Transmit Service Match Register, and the Receive Service Match Register. These values are set by the user at system initialization. A match will occur on only one of these registers, and this informs the CL-CD1864 of the type of request being acknowledged.

Under most circumstances the address bus should not have a value that does not match one of the three Service Match Register values during an acknowledgment cycle. This will cause the CL-CD1864 to not recognize that any bus cycle is occurring, and it will not assert DTACK*, or terminate the cycle, or take any other action. Doing this will not affect the CL-CD1864, but the system must have some other provision to terminate the bus cycle. If, for example, the CL-CD1864 shares an interrupt level with another device, different values on the address bus should be used to control responses to an acknowledgment, but the bus cycle should terminate in a useable way.

Service acknowledgments can also be performed by software. The host simply reads one of three Request Acknowledge Registers, and the CL-CD1864 performs as if a hardware service acknowledge cycle had been executed.

Regardless of the method of acknowledgment used, within the CL-CD1864, each service request state machine makes a determination: if it has an internal service request pending, and there is a service acknowledge of the same type, it asserts its internal-acknowledge-accepted signal back to the Service Request Controller logic, negates the Service Request Output Pin, and holds its acknowledge-out daisy chain in a negated state. It also drives the value in the Global Service Request Vector Register onto the data bus, for the host to read as part of the Service Acknowledge Cycle. The Global Service Vector Register (GSVR) value placed on the bus during the Service Acknowledge Cycle serves two purposes. The least-significant three bits of GSVR indicate which of the four types of service requests are occurring. The upper-five bits are user-defined, and serve to identify which of the multiple CL-CD1864s is active.

If the service request state machine does not have a service request pending, and there is a software acknowledgment or address bus match, it passes the service acknowledgment down the chain by asserting ACKOUT*. If there is no match, the state machine remains idle.

If a service request is pending, and the Receive Service Request is to be handled, the CL-CD1864 is notified because the three Service Match Registers have different values in them; therefore, only one match (receive service, in this case) occurred. The internal grant from the service request state machine causes the receive service type code and active channel number (previously stored at the time the request was posted by the CL-CD1864 processor) to be pushed onto the service request stack. This automatically causes the FIFO pointers to be set up for the active channel, with no host intervention.

The host, at this point, has all the information to handle the service request. It determines the exact type of service being requested (Transmit, Receive Good Data, Receive Exception, or Modem Signal Change), and which of the multiple CL-CD1864s is requesting service. It gets the channel number by reading the Global Service Channel Register (GSCR), and then proceeds to service the request. At the completion of the service, the host performs a dummy write to the CL-CD1864 End-Of-Service Request Register (EOSRR), that causes the CL-CD1864 to exit its internal service request state by popping the service request stack. At this time the CL-CD1864 is ready to be serviced on another of its outstanding requests. If another request of the same level is pending, two clock periods after the write to EOSRR are required for the CL-CD1864 to re-assert the request line.

Because the CL-CD1864 has a service request stack, it can support nested-service requests. For example, the host can be in middle of a Transmit Service Request, detect that Receive Service Request has asserted, process the Receive Service Request, and after exiting the receive service routine, resume the Transmit Service Request. The CL-CD1864 stack is three deep, so all three types can be nested if desired. The current service request context (i.e., the stack) is readable in the Service Request Status Register.

The Global Service Channel Registers (GSCR) are actually three registers that provide the number of the channel requesting service. Reading any of these registers will cause the CL-CD1864 to mask in three bits, specifying the channel number of the currently active channel. Normally these registers are read by the host when it is handling a service request. In this case, the three bits will be the number of the channel requesting service. If any of the three GSCR Registers are read when the CL-CD1864 is not in a service-request context, the three bits will be the current value in the CAR. The current channel number is masked into the contents of Bits 4:2 of this register by the CL-CD1864 when it is read by the host. The actual contents of the register are not modified.

These three registers are provided as a convenience to the user. In most applications, the user will only use one of these locations, and set the register to some arbitrary value. However, it may be useful to sometimes record information about the state of the CL-CD1864 (or the software driving it) that is associated with each of the three service-request types. In this case, the user may store whatever information is desired in the unused bits. Then, when entering a service routine, the software can check these bits to find what state they were left in, and this can be done in a 'sub-vector'.

2.3.2 Internal Implementation of the Service Request Logic

As discussed above, the heart of each service request level is an asynchronous state machine. This state machine has three inputs:

- MATCH from the Service Match Register comparator,
- **ACKIN* from the host system, and**
- INTERNAL_REQUEST from the CL-CD1864.

NOTE: Software acknowledgments (reads from the Request Acknowledge Registers), in effect, force the MATCH value true for their respective level.

It also has three outputs:

- Svc_Req to the host system,
- INTERNAL_GRANT to the CL-CD1864, and
- **ACKOUT*, which is combined with the other two ACKOUT* Signals to provide ACKOUT* to the next CL-CD1864 in the daisy chain.**

Figure 2–4 shows logic implemented by the state machine, and is described in Table 2–1.

Table 2–1. State Machine Logic

| State Name | Output Condition | Comments |
|---|---|---|
| IDLE<br>IF (INTERNAL_REQUEST = 1)<br>else IF (ACKIN = 1 & MATCH =1)<br>ELSE | all outputs inactive<br>GoTo REQ_ACTIVE<br>GoTo PASS_ACK<br>Stay at IDLE | ;normal 'resting' state<br>; pass this acknowledge<br>; wait here |
| REQ_ACTIVE<br>IF (ACKIN = 1 & MATCH =1)<br>IF (ACKIN = 1 & MATCH =0)<br>ELSE | <br>GoTo KEEP_ACK<br>Stay at REQ_ACTIVE<br>Stay at REQ_ACTIVE | request asserted<br>; keep this acknowledge<br>; wait here, ACK is for some other level (†)<br>; wait here |
| PASS_ACK<br>IF (ACKIN* = 0)<br>ELSE | <br>GoTo IDLE<br>Stay at PASS_ACK | ACKOUT* asserted<br>; return when IACK is gone<br>; wait here while IACK active |
| KEEP_ACK<br>IF (ACKIN* = 0)<br>ELSE | <br>GoTo IDLE<br>Stay at KEEP_ACK | INTERNAL_GRANT asserted<br>; return when IACK is gone<br>; wait here while IACK active |

NOTE: The (†) denotes the point where, if there is no match, the CL-CD1864 determines NOT to pass the ACK down the daisy chain. It does this for two reasons: first, it is unacceptable to have the ACKOUT* 'glitch' low; and second, the state machine should be as fast as possible. When the state machine senses an ACK-IN* and match is not valid, it cannot conclude that it should assert ACKOUT*; the ACKIN* may be for one of the other two service requests levels. It could wait for the results of the other two MATCH comparators; however, this would complicate, and therefore, slow down the response of the state machine. The reason this complication would cause delay is (to implement the logical function 'assert ACKOUT* if no match') it must determine how long to wait before declaring a no-match condition. To implement this delay function, a synchronous state machine would be required, which at a 15-MHz clock, would mean a delay of several hundred nanoseconds from ACKIN* to ACKOUT*, instead of the 65 ns currently specified.

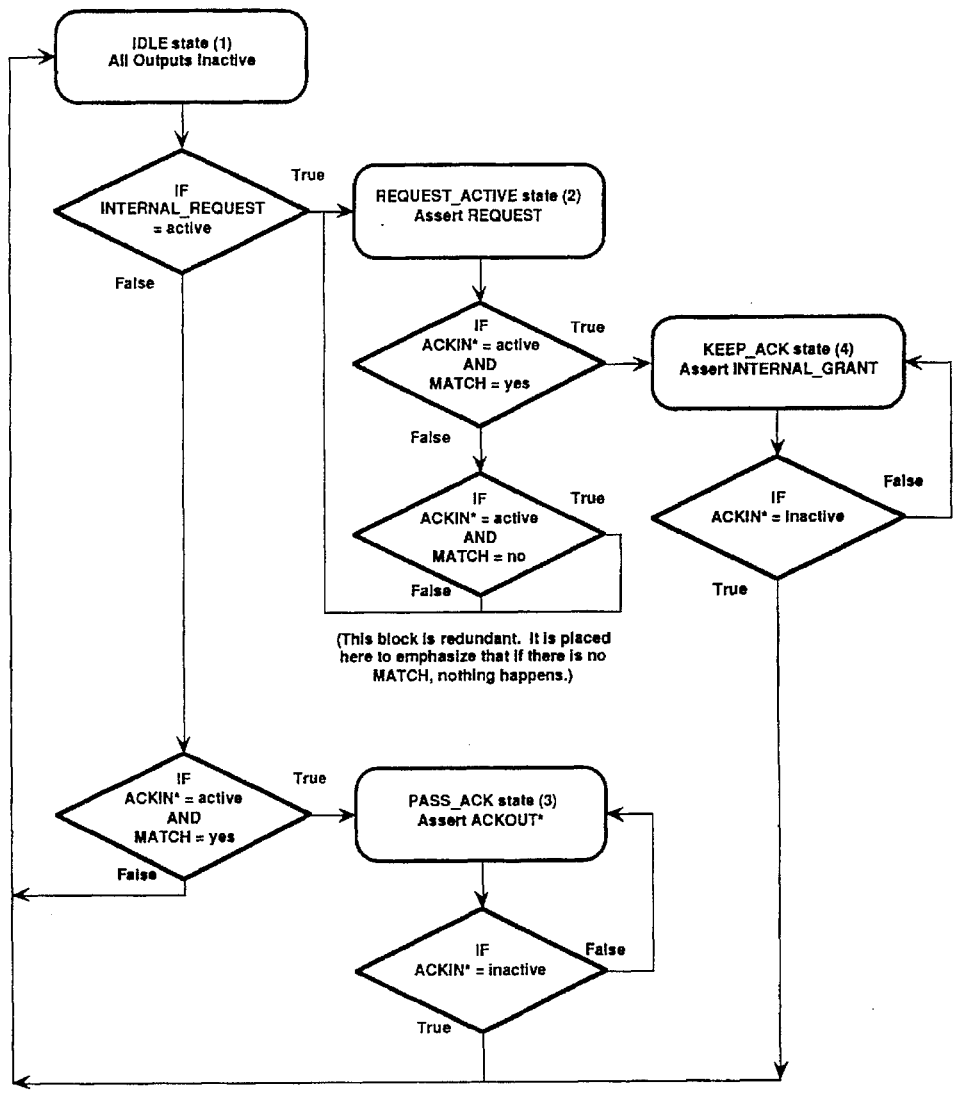
Figure 2-4. Internal Service Acknowledge Decision Tree

2.3.3 Priorities and Fair Share™

The CL-CD1864 implements a Fair Share mechanism to ensure that all channels receive equal service, without any 'data starvation'. Fair Share works automatically among the channels in one chip and across multiple chips.

Figure 2–5 shows a Fair Share Operation block diagram. On each of the three service request lines, the CL-CD1864 monitors both the internal and external value of the line. (The external value can differ because, in multiple-CL-CD1864 applications, it can be driven by other CL-CD1864s). At the end of a service acknowledgment bus cycle, the CL-CD1864 checks the state of both request values. If they are different, the CL-CD1864 determines that there is another part also driving the request line, and it will not re-assert its own request line until the external request has gone inactive. This inactive level means every other CL-CD1864 with a pending request has been serviced; therefore, it is now, okay to re-assert requests without 'hogging' the host's attention.

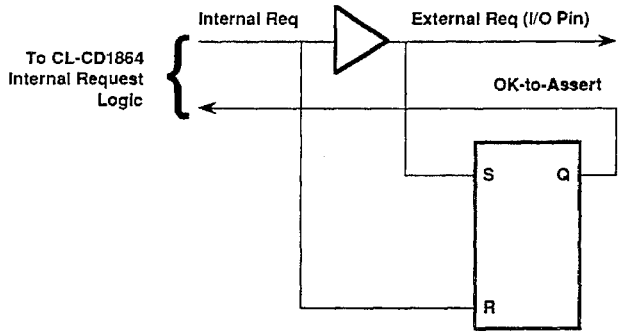

Figure 2–5. Internal Fair Share™ Operation

2.4 Types of Service Requests

The categories of service requests that a CL-CD1864 can generate are explained below. Each channel's transmitter, receiver, and modem pins require service from the host occasionally; however, each category of service request conditions can tolerate different latencies in being serviced. Conditions for service requests fall into three basic categories:

- Data is received from the remote device and needs to be transferred to the host.
- Data from the host can be given to the Transmitter FIFO, which is now empty.
- A modem signal changes state.

Three separate service request levels are provided to support the following three categories:

| Source | Pin Name | Request Match Register Name |
|---|---|---|
| Receive Data | RREQ* | RSMR |
| Transmit Data | TREQ* | TSMR |
| Modem Signal Change | MREQ* | MSMR |

2.4.1 Receive Service Requests

The Receive Service Request is unique as it has two sub-types; i.e., it is capable of returning one of the two different vectors during a service request acknowledge cycle. The two sub-types are — 'Receive Good Data' and 'Receive Exception'. The reason there are two types within one category of service request is that, while Good Data and Exceptions require different handling, they are both of equal priority, and need to be serviced in the order they are received. For example, suppose two good characters are received, then an exception character, and then another good character. There must be a service request for the first two bytes of Good Data, then for the Exception, and then for more Good Data. If Exception Service Request is at a different level, the exception character will be processed either before or after the Good Data, and not in sequence as it should be. This method also allows the Receive Good Data-handling routine in the host to be very fast and efficient, since it has to only move 'N' bytes to a buffer. All special-case conditions can be put in a separate handler, where they will not slow down normal data transfers.

Exception characters are characters with errors, or that match the defined special characters, line breaks, and certain time-out conditions.

Data must not be read from the Receive FIFO, or the Receive Status FIFO except when the CL-CD1864 is within the context of a Receive Data Service Request.

2.4.1.1 Receive Good Data

A Receive Good Data Service Request is asserted for any of the following conditions:

1. RxFIFO threshold reached, and the FIFO contains Good Data.
2. RxFIFO threshold not reached, but the FIFO contains Good Data, and the Receive Data Timer times-out.
3. RxFIFO threshold not reached, but the FIFO contains Good Data, and the newly arrived data contains an exception condition.

When any of these conditions occur, the modified service request vector indicates to the host that the service request is for Good Data. The CL-CD1864 continues to add bytes to the FIFO, and increments the Count Register for each good byte added, and this allows for optimally efficient use of the FIFO.

It is not necessary to accept any or all of the Good Data that is available when a Good Data Interrupt is received. If a host buffer is too full to accept eight bytes, a smaller number (even 0) can be read, service request context left, and the host buffer handled first. The CL-CD1864 will again generate another Good Data Service Request when any of the three conditions listed above are met.

If the condition which caused the request in the first place remains true, the CL-CD1864 quickly generates another service request. If no data is read, this is always the case. If some, but not all, of the available data is read, conditions 1 and 2 will not be true, but condition 3 may be if an exception condition was the cause of the Good Data Interrupt. If this becomes a problem, one solution is to temporarily disable receiving interrupts on that channel. To avoid FIFO overflow, do not disable the channel for too long.

2.4.1.2 Receive Exception

Unusual or exception conditions are reported to the host one character at a time through the Receive Exception Service Request. As with normal receive processing, the host determines the requesting channel by reading the GSCR. It can then determine the specific exception(s) by reading the Receive Character Status Register.

Exception conditions are generated for parity errors, framing errors, FIFO overrun, special character recognition, break detect, and for a special feature called the 'No New Data Timer' (NNDT).

NNDT is a receive timer option to generate a service request for the first receive data time-out following the transfer of all data from the FIFO to the host. It is often useful, when managing relatively large I/O buffers, for an I/O processor to determine that 'no data has arrived lately'. This event is used to transfer the contents of the local buffer that has been storing data from the CL-CD1864 FIFO for host-system processing.

This service request is a receive exception subtype, and can be used to signal that it is time to transfer the buffer. This feature can be enabled or disabled by controlling the NNDT Bit in the Service Request Enable Register. As shown in Figure 2–6, every time a received character is loaded into the FIFO, the timer is restarted. If the timer times-out, the CL-CD1864 checks if there is any data in the FIFO. If there is, a Good Data Service Request is posted, to avoid 'stale data'. If there is no data in the FIFO, the CL-CD1864 checks that NNDT is enabled, and 'armed'. Arming occurs when the last character is transferred out of the FIFO to the host. If NNDT is on and armed, a Receive Exception Service Request is posted to inform the host of this event.

Every Receive Exception is a unique, one-character event. The Receive Data Count Register has no meaning, unlike the Receive Good Data case, the Status Byte in the receive exception handling routine must be read. The Receive Data Count Register and the associated data character will be discarded by the CL-CD1864 at the end of the service routine. The Status Byte must be read before reading the Data Byte. Once the Data Register is read, the Status Byte is no longer available.

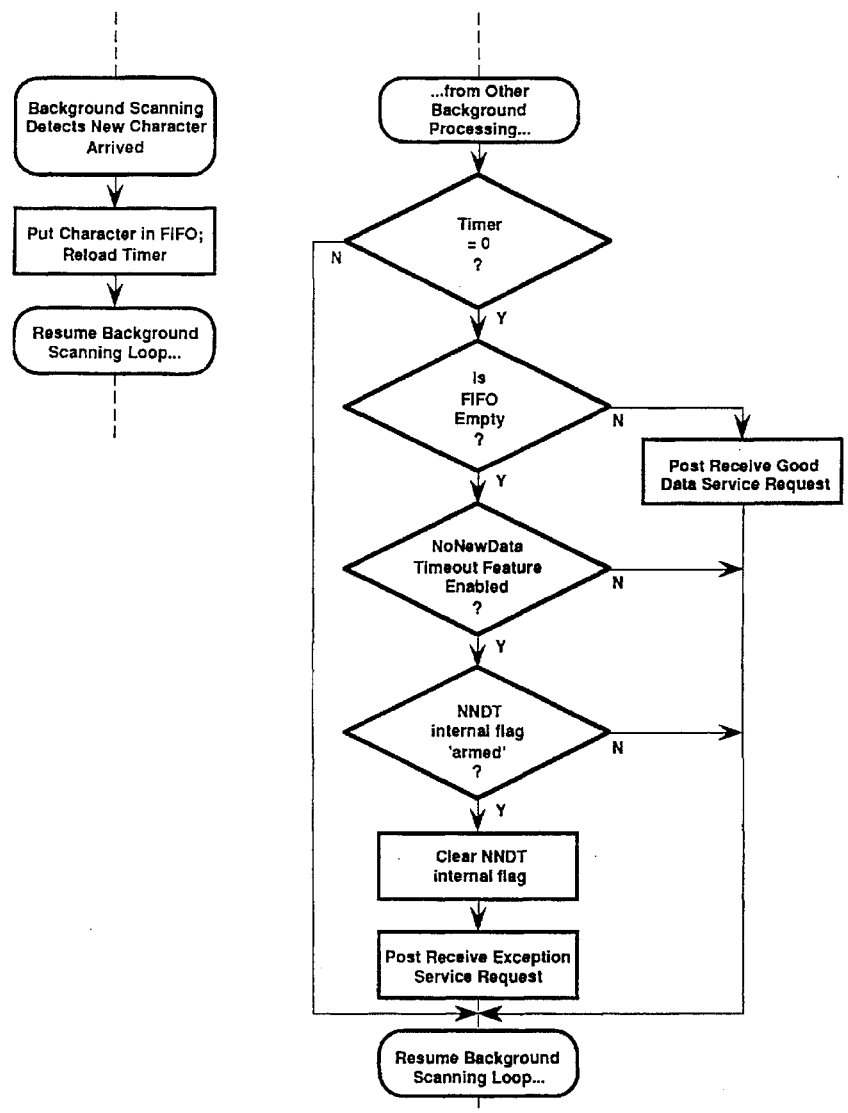
Figure 2-6. Receive Timer Operation

2.4.2 Transmit Service Requests

Each transmitter contains eight bytes of Transmit FIFO in addition to the Transmit Holding Register and the Transmit Shift Register. As data is being transmitted, the FIFO status is being monitored by the CL-CD1864. A service request is invoked for one of the following conditions:

- Transmit FIFO Empty – When the Transmit FIFO is empty, there is still one character in the Transmit Holding Register and one character in the Transmit Shift Register. The host has two character times to respond to this request without causing a gap in the Transmit Data Stream.
- Transmitter Empty – The Transmit FIFO, Transmit Holding Register, and the Transmit Shift Registers are now all empty. This signifies that all characters written to the FIFO have been completely transmitted.

The host can select which one of these causes a Transmit Service Request, and will be used by programming the options in the Service Request Enable Register (SRER).

Data may not be put into the Transmit FIFO at any time other than when the CL-CD1864 is in a Transmit Service Request context for that channel.

2.4.3 Modem Signal Change Service Requests

The CL-CD1864 may be programmed to assert a service request when a channel's modem input signals have changed states. The change-detect options are programmed in the Modem Change Option Registers. Individual modem pin service requests are enabled by setting the corresponding bits in the Service Request Enable Register.

The host must read the Modem Change Register to determine which modem signal changes were detected. This is indicated by a '1' in the appropriate bit location. The Modem Change Register must be reset to a '0' by the host before exiting the service request, because the CL-CD1864 does not do this. Refer to Section 4.4 for more details.

2.4.3.1 Using Modem Pins as Input/Output

The pins labelled as modem pins are general-purpose I/O pins, that can be controlled by either the CL-CD1864 processor or the host system. There is no direct, hardwired connection from any modem pin directly to a transmitter or a receiver. This means that these pins can be used for general-purpose I/O if they are not needed for modem-control purposes. See Section 4.4 for more details.

2.5 Implementing Service Requests

The CL-CD1864 is designed so that it can easily interface to any processor, yet be efficient and flexible enough to provide maximum throughput. The CL-CD1864 generates service requests, and awaits acknowledgments of these from the host. However, service requests may be implemented in either hardware or software; likewise, acknowledgments can be effected either way to offer maximum advantages to the system designer and programmer. This interfacing can be broken into various steps.

Service requests must be 'noticed' by the host system before they can be acted on, and this can be done the following three ways:

1. Provide three levels of interrupt support, with three separate levels and three separate vectors. This is well-suited to Motorola® 680X0 processors.
2. Provide a single level of interrupt support; this is an effective method when using 8-bit processors such as the Z-80 and many Intel® microprocessors.
3. Poll the device directly in software.

Once the host has 'noticed' the service request, it has the following two choices for acknowledging the request and begin servicing it:

a. Acknowledge the request via a hardware-based service acknowledgment, as is typically done in interrupt-driven systems.

b. Acknowledge the request in software, by reading from a register in the CL-CD1864.

Table 2-2. Service Request Methods

| | | How the host detects the Service Request | | |
|---|---|---|---|---|
| | | Three-level Hardware Interrupt | Single-level Hardware Interrupt | Software Polling |
| How the host acknowledges the Interrupt | Hardware-based service acknowledge | 1a Full Interrupt – Type A | Not recommended (Inefficient) | Not recommended (Inefficient) |
| | Software-based service acknowledge | 1b Full Interrupt – Type B | 2b Single Interrupt | 3b Software Polled |

Thus, there are six theoretically possible options for interfacing the CL-CD1864 to the host system. Two of the methods (2a and 3a) are not practical to implement without external hardware, and offer no performance advantage. Each of the other four methods has advantages and drawbacks depending on the type of host CPU being used, and whether or not that host CPU supports more than one CL-CD1864. The four methods used are listed in Table 2-2.

1a. This method is called 'Full Interrupt – Type A'. The system is fully interrupt driven with acknowledgments in hardware. It requires a host with at least three interrupt priority levels available, and the ability to acknowledge on multiple levels. This is the technique used by Motorola 680X0 processors. It is the most efficient method when the host CPU has a relatively fast interrupt context switch time, and when the host CPU has duties other than driving the CL-CD1864s.

1b. This method is called 'Full Interrupt – Type B'. It still has three levels of interrupt, but provides a single acknowledgment level. It is commonly used in Intel-type processor systems where there is an 8259A interrupt controller. The 8259A receives the three levels of interrupt, but provides its own vector to the host rather than that of the CL-CD1864s. The host then acknowledges the CL-CD1864s Service Request by reading the Vector Register in the CL-CD1864.

2b. This method is called 'Single Interrupt', and is best-suited to systems having only a single interrupt input, such as most 8-bit microprocessors. After the host has received its interrupt and is entering its interrupt service routine, it reads the CL-CD1864 to see which of the three types of service requests is responsible for the interrupt. It then acknowledges the interrupt by reading the appropriate Request Acknowledge Register.

3b. This method is called 'Software Polled'. Polling is often used in situations where the host system is primarily dedicated to servicing the serial channels, and has few other tasks to perform. It is often better when the host CPU has a long interrupt context switch time. In this method, the host periodically checks the CL-CD1864s to determine if any service requests are pending. If they are, the host acknowledges them in software and proceeds with the service.

One of the advantages of the CL-CD1864 is that it allows the use of any of the above techniques, or a combination thereof. Such a combination is referred to as 'Mixed-mode Operation'. In a typical mixed-mode design, normal interrupts are used to signal to the host that service is required. After the host enters its interrupt service routine, it services the CL-CD1864 that generated the service request. The host then polls the CL-CD1864s to determine if more channels require service. Frequently this will be the case. When the host finds a channel requiring service, it handles it in the usual manner, and then proceeds to poll again for more service requests. This process continues until all CL-CD1864s have been handled. Because the host is not exiting and re-entering its own interrupt context each time, much host CPU time is saved, resulting in even faster overall performance.

A mixed-mode design has the advantage that the software has complete control of whether to be fully interrupt driven, or to poll in certain circumstances. A mixed-mode design is recommended to tune a system for optimum performance.

A CL-CD1864 evaluation board can be employed to analyze CL-CD1864 performance and evaluate different software implementations. Cirrus Logic testing (in an AT-compatible '386 machine) found that a mixed-mode system provided the highest overall throughput with minimum host CPU loading. This was generally found to be the case with host processors that have relatively long interrupt response times, such as the Intel '386.

2.5.1 Method 1a — Full Interrupt – Type A, Three Level with Three-Level Acknowledge This method is best-suited for 680X0-family processors. The three CL-CD1864 service request lines are connected to the Interrupt Priority Encoder. When the host performs an interrupt acknowledgment cycle, the CL-CD1864 responds with its vector. The host uses this vector to jump directly to the appropriate service routine. The other methods can also be used with a 680X0-based system.

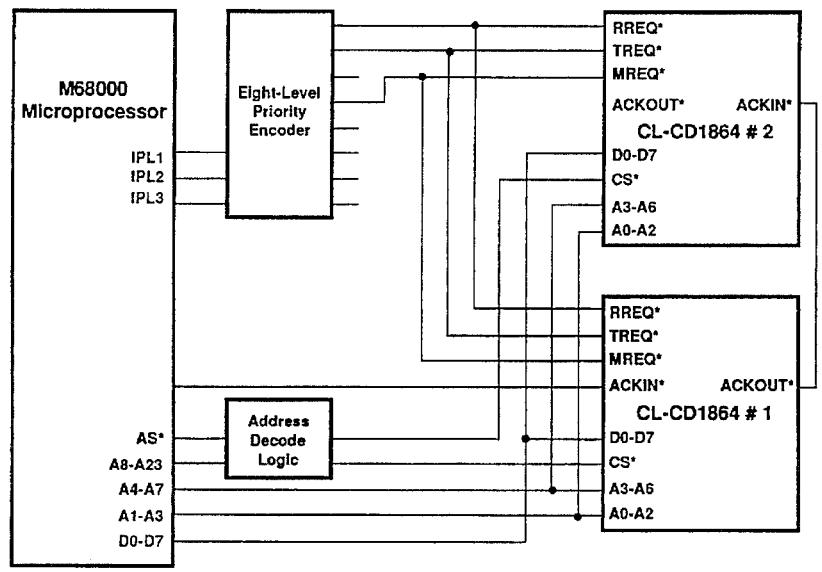

Figure 2–7. Three-Level Interrupt Example

2.5.2 Method 1b — Full Interrupt – Type B, Three-Interrupt Level with Single Acknowledge This method is useful with 80X86 systems that use the 8259A Interrupt Controller. Since the 8259A supplies its own vector to the host when an INTA cycle occurs, the host can simply read the CL-CD1864's vector by the method described in the polled interface example.

After the 8259A has supplied a vector to the 80X86 host CPU, the host performs a software acknowledgment to the CL-CD1864, which transfers the CL-CD1864 vector to the host, and allows the service request to be processed.

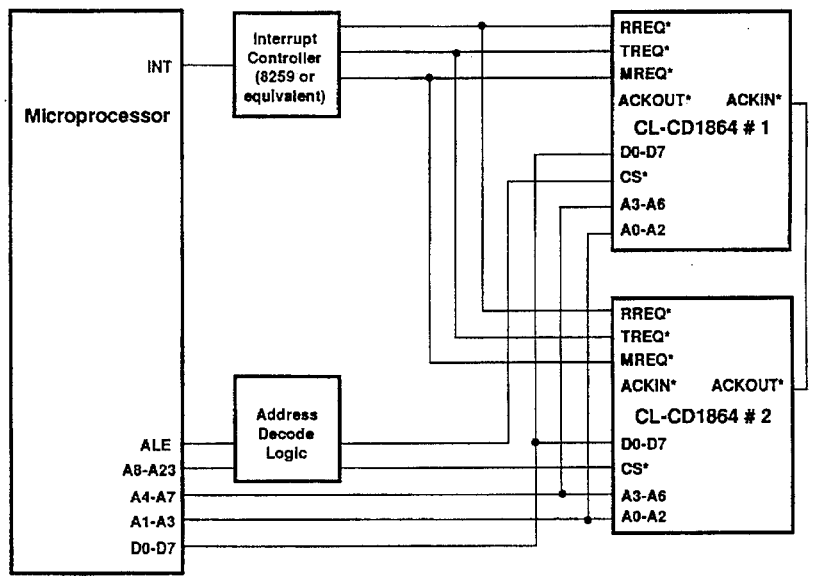

Figure 2–8. Three-Level Interrupt with Single Acknowledge

2.5.3 Method 2b — Interrupt Interface, Single-Interrupt Level with Single Acknowledge This method is best-suited to host systems having a single interrupt input. The three service request lines from the CL-CD1864 are run through an 'OR' gate to the host's interrupt input. When an interrupt occurs, the host system polls the CL-CD1864s to determine which of the three levels it was, and acknowledges it accordingly.

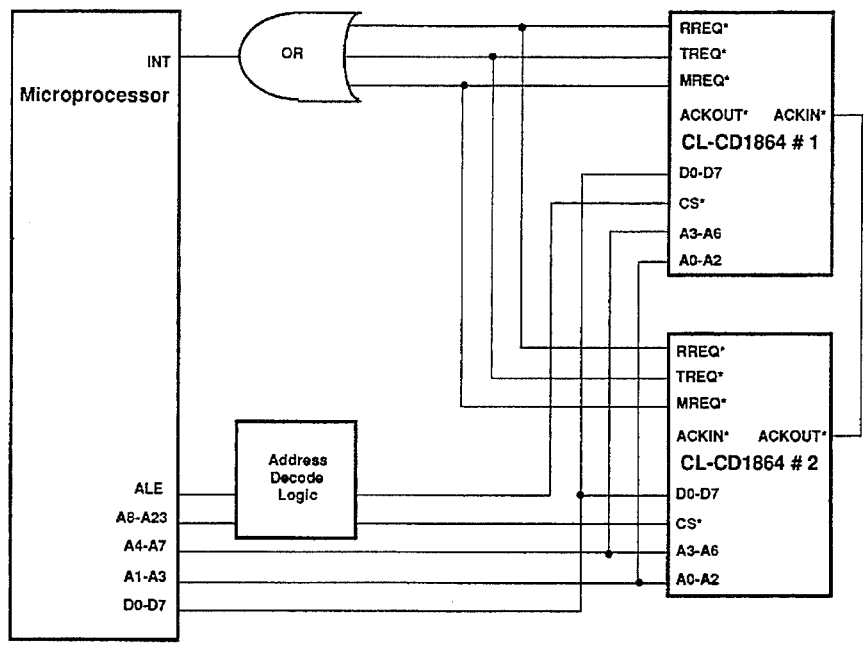

Figure 2–9. Single Interrupt with Single Acknowledge

2.5.4 Method 3b — Polled Interface

Polled operation can be used with any type of host CPU, or can be used in combination with interrupts to provide a mixed-mode system optimized for a particular application. In a polled system, the host reads the Service Request Status Register (SRSR) within the CL-CD1864 to determine whether there are any channels that need service. (Note that unlike traditional UARTs, only one register needs to be read to find out if there are any channels in any device that need attention, and this saves time).

If the host finds channels needing service, it acknowledges the desired type by reading one of the three Request Acknowledge Registers. These provide a vector that can be used to jump directly to the correct service routine. Processing from this point proceeds as in the case of interrupt-driven operation. Note that the difference between this method and method 2b lies in how the host system becomes aware of the need to service the CL-CD1864. In method 2b a single interrupt starts the process. In method 3b the host polls periodically. The two methods can be combined — an interrupt triggers the first service, but the host continues to poll until any other pending requests have been serviced.

There is a difference between the CL-CD1864 and conventional dumb UARTs, that makes the CL-CD1864 more efficient even when operating in a polled environment. With a dumb UART, the host polls each channel in turn whether it has any data. With the CL-CD1864, the host polls the CL-CD1864s as a group whether it has data. If it does, the CL-CD1864s will indicate the channel, rather than the host-testing each channel in turn. In fact, it is not possible for the host to dictate which channel is to be serviced; the CL-CD1864 determines this order. This minimizes both the number of polling steps required and the amount of time each needs, and it also ensures fair, balanced service of all channels.

There are several ways a host system can poll the CL-CD1864, and each method has certain advantages. The most direct method is to read the Service Request Status Register (SRSR). This register contains three bits that indicate whether there is a request pending for receive, transmit, or modem signal change, on the CL-CD1864 being read. There are three more bits that provide the same information for all CL-CD1864s in the system — these three bits reflect the state of the wire-OR'ed external request lines. Thus a single read operation can determine if there is any activity.

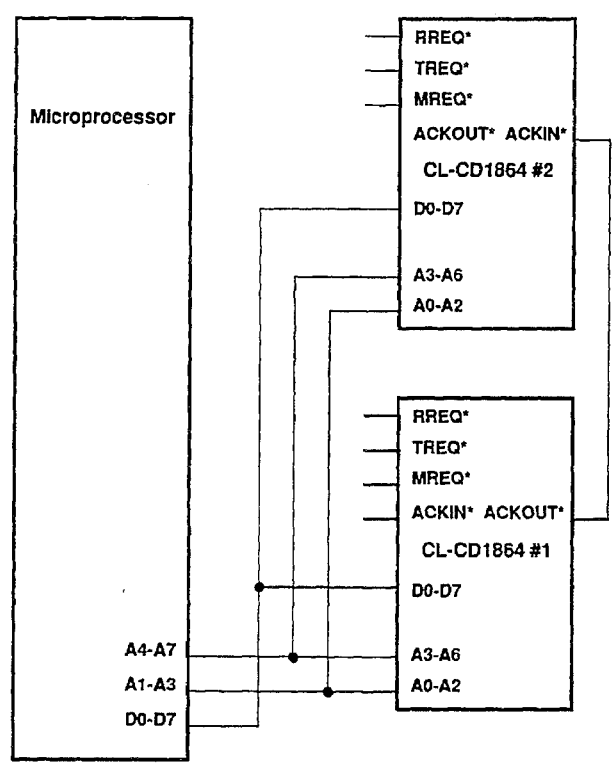
Figure 2–10. Simple Software Polled Interface

2.5.5 Comparison of Interrupt and Polled Code Sequences
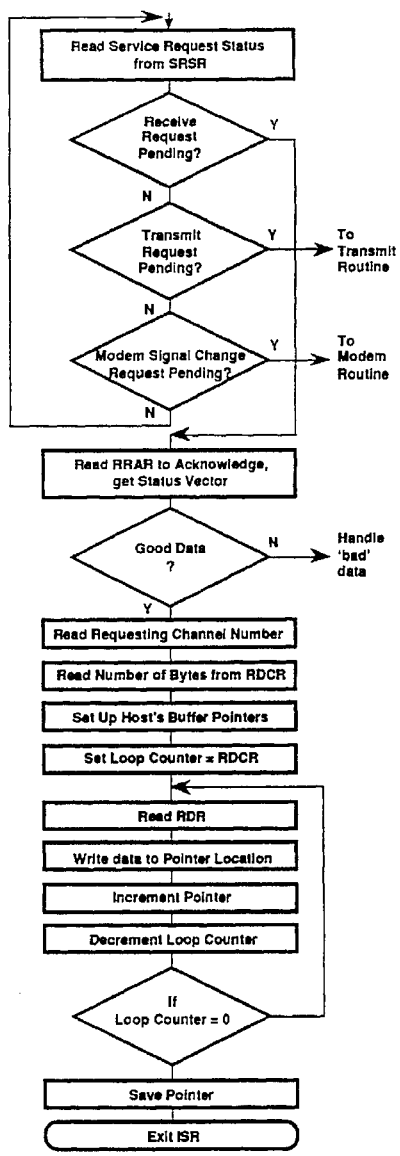
Figure 2-11. Polled Code Sequence

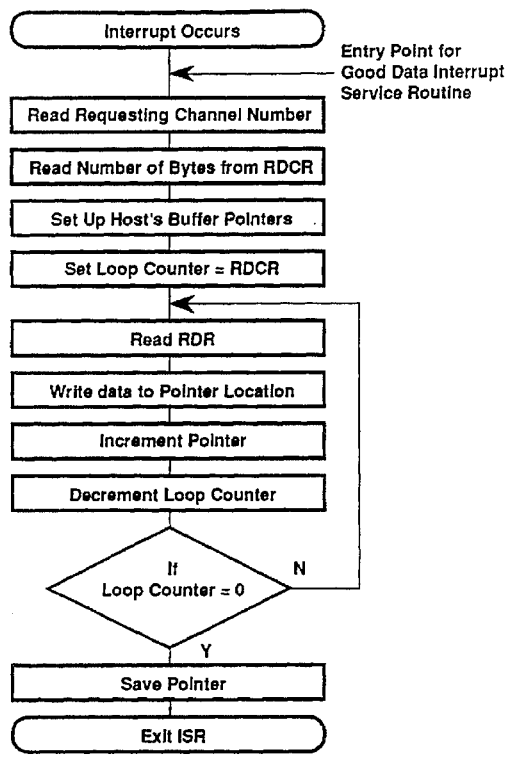

Figure 2-12. Interrupt Code Sequence

2.5.6 Cascading Service Requests with Multiple CL-CD1864s

Regardless of the method used to support service requests, multiple CL-CD1864s may be cascaded by tying together all MREQ*, TREQ*, and RREQ* lines. These lines are open collector so they may be wire OR'ed. The CL-CD1864s are then daisy-chained by simply connecting the ACKOUT* of one device to the ACKIN* of the next.

The host knows which CL-CD1864 is requesting service by the value returned by the CL-CD1864 from its Global Service Request Vector Register. Up to thirty-two CL-CD1864s may be cascaded in any one daisy chain in this manner. The maximum number of CL-CD1864s can be very large, since multiple daisy chains are possible. The 32-per-daisy-chain limit is set by the fact that there are five bits in the GSVR that can be used to identify which CL-CD1864 responded to the service request acknowledge cycle. The user must program different values into the upper-five bits of each CL-CD1864 GSVR.

Note that thirty-two CL-CD1864s is the logical limit per daisy chain. Since it takes over 1000 ns for an acknowledgment to ripple down 32 devices, it may not be efficient to have one long chain in heavy-traffic applications.

NOTE: In some systems that daisy-chain many CL-CD1864 devices, a potential timing hazard exists if the host processor does not allow sufficient time for the removal of the ACKIN/ACKOUT daisy-chain signal to propagate through all devices. In the event that the host processor begins I/O operations with another section of logic and applies DS* (RD* or WR* in an Intel environment) while an active ACKIN is being applied to a CL-CD1864 due to propagtion delay time, unpredictable results can occur. This constitutes an illegal acknowledge cycle. The failure mode is most often a cessation of service requests from the device, especially of the type that was being serviced when the illegal access occurred. Care must be taken to assure that the 35-ns propagation delay per device is included in any wait-state generation.

2.5.7 Multiple CL-CD1864s without Cascading

It is possible to interface several CL-CD1864s without using the cascade feature. There is an advantage to this because as there is less delay incurred while waiting for the service acknowledgment to ripple down a chain of devices. There are two possible disadvantages: If each of the CL-CD1864's three service request lines has a separate input to the interrupt controller, the interrupt controller is more complex, and the Fair Share feature does not work. If the service request lines are wire-OR'ed, Fair Share works, but the host has to test each CL-CD1864 in turn to see which one generated the service request. To implement this method, simply connect the CL-CD1864 address and data lines in the usual manner.

2.5.8 Acknowledging Service Requests

As mentioned in Section 2.5, two different methods can be used to acknowledge a service request. One method is hardware-based, and the other, software-based. The hardware-based mechanism is a specific type of bus cycle that uses the ACKIN* and ACKOUT* Signals, and the Service Match Registers in the CL-CD1864. An acknowledge cycle is defined where ACKIN* and DS* are active, and CS* is inactive. This method is used by processors that perform interrupt acknowledge cycles, such as the 680X0.

The software-based mechanism uses three registers — Receive Request Acknowledge Register, Transmit Request Acknowledge Register, and Modem Request Acknowledge Register. Reading any of these registers has the effect of acknowledging a service request, and the data read will be the appropriate vector, i.e., the contents of the Global Service Request Vector Register. The low-three bits of this register will be modified to indicate the specific type of interrupt being acknowledged.

If the host reads these registers when no service request is pending, either of two things will happen. If daisy chaining of acknowledgments is enabled, the ACKOUT Pin of the CL-CD1864 will assert. If daisy chaining is not enabled, the part will supply a vector with the low-three bits set to a '0'. Thus, it is possible to 'fish' for service requests, i.e., to acknowledge each CL-CD1864 in turn until a non-zero vector is received.

'Fishing' is not usually an efficient software technique, but may be useful in some circumstances. For example, in systems that are normally interrupt-driven, but where interrupts are not available for diagnostics or other reasons, the host can determine if a service request is pending by reading the appropriate Request Acknowledge Register. The CL-CD1864 must be configured not to daisy-chain; in this case it will return a vector if a request is pending, or '00' if no request is pending. The host may try all three levels of request in turn. This method will work for either single CL-CD1864s or multiple devices. In multiple-device systems, either disable daisy-chaining on all devices and fish each individually, or disable daisy-chaining on the last device only, and fish the device at the beginning of the chain.

Both methods of acknowledging service requests may be used interchangeably. It is usually advantageous to use Mixed Mode, for example, after receiving an interrupt and servicing it in the normal manner, the host should read the Service Request Status Register (SRSR) to see if other requests are pending. If so, the host can acknowledge by reading the appropriate Request Acknowledge Register (RRAR, TRAR, and MRAR), and proceed to service the request. This avoids the time required for the host to exit its interrupt routine, only to re-enter it immediately for the next request.

3. SYSTEM BUS INTERFACE AND SYSTEM CLOCK
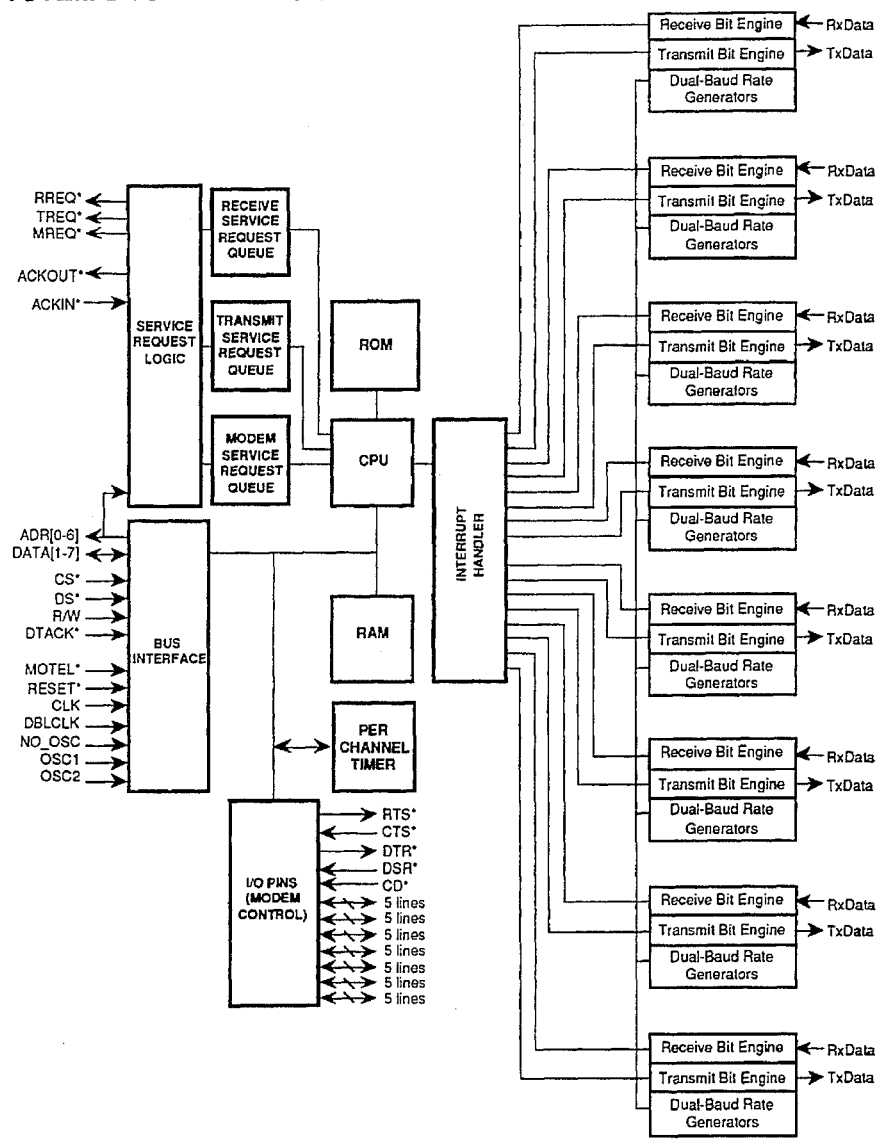
Figure 3-1. Internal Block Diagram

3.1 System Interface Considerations

The two areas where system architects, designers, and programmers should consider certain options when using the CL-CD1864 are system clock speed, and Un-clocked versus Clocked-host Bus Interface.

3.2 System Clock and Bit Rate Options

3.2.1 System Clock

System clock is a high-frequency clock (supplied by the user), used by the CL-CD1864 to derive all the necessary timing. The CL-CD1864 is capable of handling system clock levels of TTL-compatible voltage swings; however, the $V_{IL}$ and $V_{IH}$ specifications are not identical to all families of TTL logic. Specifically, the clock signal (and the reset signal) have lower $V_{IL}$ and higher $V_{IH}$ than the worst-case specifications of some TTL families. In general, any TTL family is adequate if not heavily loaded. Refer to the DC Specifications in Section 7.3 for details.

The CL-CD1864 can operate from either an external clock source or a crystal. The external clock can be either 1x or 2x the rated frequency, and the crystal must be 2x. Using the 2x clock or crystal with the CL-CD1864 is recommended whenever possible. The 1x clock input is strictly specified in terms of rise and fall time, duty cycle, and $V_{IL}$ and $V_{IH}$. The 2x-clock input is not as strictly specified. The 2x input is provided because many crystal-oscillator modules currently available do not meet the 1x-clock specifications. Commercially-available oscillator modules typically have poor duty-cycle ratios (60/40) and poor $V_{OH}$. By using the 2x input, the users avoid any problem with clock waveform quality.

The CL-CD1864 can be operated from the main system clock or its own clock. Operation from the main system clock reduces the number of clocks required, and allows the bus interface between the system and the CL-CD1864 to be clocked, but in general, typical system clock speeds are not exact baud-rate multiples. As bit rates are derived from the clock, it is important to take this into consideration when selecting a clock value. If exact baud rates are needed, or the system clock is not a convenient value, the CL-CD1864 must be supplied with its own clock or crystal.

The CL-CD1864 uses several pins to support the various clock options. OSC1 and OSC2 are the connection for a crystal of 2x-clock frequency. NO_OSC is a strapping option that disables the internal oscillator if a crystal is not being used. Pulling NO_OSC high turns the oscillator off, and reduces power consumption and internal noise. NO_OSC must be high if the oscillator is not being used. DBLCLK is the input pin for a 2x-external clock; if not being used, it must be grounded. CLK is the input for a 1x-external clock, if not being used, it must be grounded. If a crystal is being used, both DBLCLK and CLK must be grounded.

Figure 3-2 shows a conceptual model of the clock and oscillator circuitry.

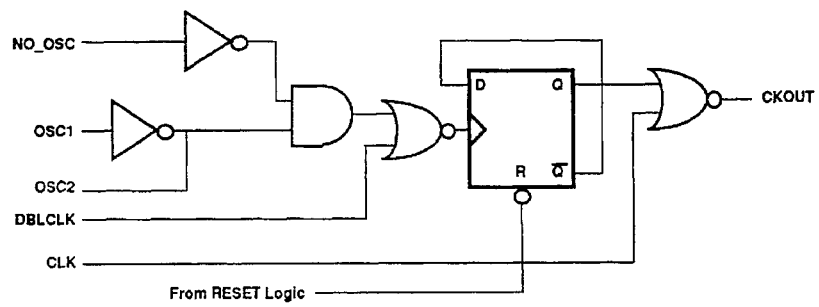

Figure 3-2. Clock and Oscillator Circuitry

3.2.2 Bit Rate Options

The CL-CD1864 supports independent transmitter and receiver bit rates on each of its eight channels. The bit rate is determined by a 16-bit period value (divisor) stored in the Transmitter Bit Rate Period Registers (TBPRH and TBPRL), or in the Receiver Bit Rate Period Registers (RBPRH and RBPRL). These registers establish the period of the corresponding Transmitter and Receiver Bit Rate Counters. The value to be loaded to set a given bit rate is determined by the following equation:

$$\text{Bit Rate Divisor} = (\text{CLK frequency (in Hertz)}) / (16 \times \text{desired Bit Rate (in bits per second)})$$

The above equation may yield a non-integer result. The nearest integer value is the optimum choice for that bit rate and system clock combination. The value loaded in the Bit Rate Period Registers must be that integer expressed as a 16-bit binary value. If rounding is necessary, the percentage bit rate error may be calculated by:

$$(\text{Bit Rate Divisor} - \text{Integer}) \times 100 / \text{Bit Rate Divisor}$$

For zero error on the bit rates, a system-clock frequency of 14.7456 MHz should be used. The popular bit rates and their corresponding divisors are shown in Table 3-3 for system clocks of 10 MHz and 9.8304 MHz.

If operation at 57.6 and 64 kbps is required, a clock of 14.5408 MHz can be used, with an error of 1.38% at 57.6 kbps and 1.43% at 64 kbps.

Table 3-3. Possible Clock Speeds For Exact Baud Rates (Note 1)

| Baud Rate (Max) | Baud Rate Divisor Value | | | | | | | | | | | | | | |
|---|---|---|---|---|---|---|---|---|---|---|---|---|---|---|---|
| | 8 | 9 | 10 | 11 | 12 | 13 | 14 | 15 | 16 | 17 | 18 | 19 | 20 | 21 | 22 |
| | Note 3 | | | Note 2 | | | | | | | | | | | |
| 115.2 | 14.7456 | | | | | | | | | | | | | | |
| 76.8 | 9.8304 | 11.0592 | 12.2880 | 13.5168 | 14.7456 | | | | | | | | | | |
| 64 | 8.1920 | 9.2160 | 10.2400 | 11.2640 | 12.2880 | 13.3120 | 14.3360 | 15.3600 | 16.3840 | | | | | | |
| 57.6 | 7.3728 | 8.2944 | 9.2160 | 10.1376 | 11.0592 | 11.9808 | 12.9024 | 13.8240 | 14.7456 | | | | | | |
| 56 | 7.1680 | 8.0640 | 8.9600 | 9.8560 | 10.7520 | 11.6480 | 12.5440 | 13.4400 | 14.3360 | 15.2320 | 16.1280 | | | | |
| 38.4 | 4.9152 | 5.5296 | 6.1440 | 6.7584 | 7.3728 | 7.9872 | 8.6016 | 9.2160 | 9.8304 | 10.4448 | 11.0592 | 11.6736 | 12.2880 | 12.9024 | 13.5168 |

NOTES:
1) All clock speeds are shown as net clock speeds in MHz. Crystals, if used, are 2x these values.
2) Divisors less than 16 may not produce 100% throughput in all cases.
3) Divisors less than 10 may result in errors if all eight channels are active.

Table 3–4 shows possible clock values for various baud rates and divisors. Not every combination is legal in all cases. Refer to Section 3.2.3 for information on throughput limits.

Table 3–4. Divisors For Standard Baud Rates For Various Clock Speeds

| Baud Rate | Clock Speeds | | | | |
|---|---|---|---|---|---|
| | 14.7456 | 12.9024 | 11.0592 | 9.8304 | 9.216 |
| 115.2 kbps | 8 | N/A | N/A | N/A | N/A |
| 76.8 kbps | 12 | N/A | 9 | 8 | N/A |
| 57.6 kbps | 16 | 14 | 12 | N/A | 10 |
| 38.4 kbps | 24 | 21 | 18 | 16 | 15 |
| 19.2 kbps | 48 | 42 | 36 | 32 | 30 |
| 14.4 kbps | 64 | 56 | 48 | 42.667 | 40 |
| 9600 bps | 96 | 84 | 72 | 64 | 60 |
| 7200 bps | 128 | 112 | 96 | 85.333 | 80 |
| 4800 bps | 192 | 168 | 144 | 128 | 120 |
| 2400 bps | 384 | 336 | 288 | 256 | 240 |
| 1200 bps | 768 | 672 | 576 | 512 | 480 |
| 600 bps | 1536 | 1344 | 1152 | 1024 | 960 |
| 300 bps | 3072 | 2688 | 2304 | 2048 | 1920 |
| 150 bps | 6144 | 5376 | 4608 | 4096 | 3840 |
| 110 bps | 8378.2 | 7330.9 | 6283.6 | 5585.5 | 5236.4 |
| 75 bps | 12288 | 10752 | 9216 | 8192 | 7680 |

3.2.3 Maximum Throughput Limits

The CL-CD1864 is internally a fully static, synchronous design. Consequently, the maximum data rate handled by CL-CD1864 is determined by the clock speed at which it is operating. There are a fixed number of CL-CD1864 processor cycles required to process each bit and character; a slower CL-CD1864 processor rate equates to a slower bit rate. The minimum clock frequency required can be determined by the data rate needed to be supported.

The CL-CD1864 can maintain 100-percent throughput on all channels with a Bit Rate Divisor greater than or equal to 16. The CL-CD1864 will operate with Bit Rate Divisors as low as 10, but will not be able to sustain 100-percent throughput on transmit, if all eight channels are receiving data continuously at this rate. Instead, there will be brief pauses between characters in the Transmit Data Stream. If the maximum desired data rate is less than 57.6 kbps, there will not be any pauses. Note that this is a harmless condition; gaps between asynchronous characters are acceptable.

Operation with baud-rate divisors less than 10 is possible if not all channels are enabled. For example, four channels may be operated at 145.2 kbps with a 14.7456-MHz clock.

The minimum clock rate shown in Section 7.2 is the rate at which 100-percent-throughput operation at 57.6 kbps is guaranteed. If desired, the CL-CD1864 can be operated at lower clock speeds than specified; however, it may not be able to sustain 100-percent throughput at 57.6 kbps. If the CL-CD1864 cannot keep pace, no data will be lost.

Cirrus Logic tests the CL-CD1864 at 15 MHz. The lowest speed recommended for operating the device is 8 MHz.

Individual channels can be operated at speeds greater than 64 kbps, if other channels are turned off (not merely run slowly).

3.3 CL-CD1864 Basic Bus Interface and Addressing

The CL-CD1864 is addressed through an active-low Chip Select (CS*) in conjunction with seven Address Inputs A[0:6] that are mapped CL-CD1864 internal addresses in two addressing modes — global and channel. In Channel Addressing Mode, the bits defining the channel to be accessed are provided from the Channel Access Register (CAR) within the CL-CD1864.

The most-significant Address Input (A6) performs the selection between global- and channel-specific addresses. If this bit is a '1', the address is global, and is not associated with any specific channel. If this bit is a '0', the address is channel-related.

With the exception of the FIFOs, all channel-specific registers are accessed by first setting the desired channel number in the low-three bits of the Channel Access Register. FIFOs may only be accessed within the context of a service routine. Attempting to force access to a particular FIFO by setting the CAR will cause unpredictable and incorrect results. Within the context of a service request, the effective channel access value is automatically controlled by the CL-CD1864, so the CAR should not be modified by the host system during service-request processing.

The advantage of this method is that the host never performs any address computation to access the CL-CD1864 during service requests. Because only the registers specific for the active channel (i.e., the one being serviced) are accessible to the host within a service request routine. An automatic indexing feature handles this, thus avoiding any burden on the host. Refer to Section 6.3 on Indexed Indirect Registers for details.

3.3.1 Intel® Versus Motorola® Interface Signals and Addressing

The CL-CD1864 supports two bus handshake methods. One is patterned after the Motorola 680X0-family processors, and the other after Intel 80X86-bus interfaces. Bus interface selection is achieved via the INTEL/MOT* Signal. When this signal is 'high', the Intel Bus Interface is selected, and when this signal is 'low', the Motorola Bus Interface is selected. This selection affects the logical meaning of two pins, but has no effect on bus timing.

The two signals having dual meaning are RD* versus DS*, and WR* versus R/W*. When the Intel Bus Interface is selected, these two pins function as RD* and WR*. These pins can be connected to either the IOR* and IOW*, or to MEMRD* and MEMWR* depending where the CL-CD1864 is mapped into memory. These pins then serve to select the CL-CD1864, and when either is active (along with CS* or ACKIN*) the CL-CD1864 considers itself selected; both of these signals should not be active at the same time.

When the Motorola Bus Interface is selected, these two signals function as DS* and R/W*. DS* must be asserted (along with CS* or ACKIN*) for all types of cycles, and R/W* should be low when writing to the device.

In either case, the choice of bus interface is entirely up to the user. This feature is for users convenience, and to accommodate the address and bus-control logic being used. The CL-CD1864 has an 8-bit data bus, and it is a common practice (when connecting 8-bit peripherals to 16- or 32-bit systems) to connect them to only one lane, or one byte position. Thus, the CL-CD1864 Registers will appear in the host's address space only at every other byte address. The most common practice is to connect the CL-CD1864 to the portion of the data bus labelled D0-D7. For the little-endian processors, such as Intel, the CL-CD1864 will appear at even addresses (A0 = 0). For big-endian processors, such as Motorola, the CL-CD1864 will appear at odd addresses.

3.3.2 Un-Clocked Versus Clocked Bus Interface

Depending on the type and speed of the host processor, another important choice is determining the system bus interface to be clocked or un-clocked with the host CPU clock. Because there is a single clock for both the bus interface and bit-rate generation, the decision to use either Clocked or Un-clocked Bus Interface is affected by whether exact bit rates are required. Most applications do not require exact bit rates, and operate with rates varying by one percent or so. If exact bit rates are required, the clock speed must be a baud-rate multiple, such as 14.7456 MHz.

One method of bus interfacing may be preferable to another in certain applications. Although the easiest way to interface to the CL-CD1864 is by using the un-clocked handshake supplied by DTACK, but in some cases it may be better to design a clocked interface. The latter is true if the host system is running at the same clock speed (or a multiple) of the CL-CD1864 speed.

*Un-Clocked Bus Interface*

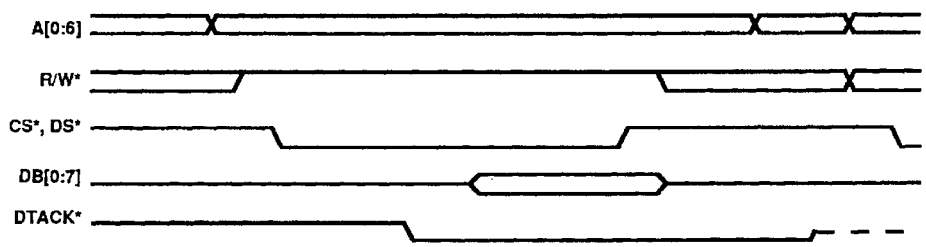

Figure 3-3. Typical Un-Clocked Bus Interface

An Un-clocked Bus Interface is the easiest interface to implement. Simply connect the address, data, and control lines in the customary manner, and use DTACK* to control the number of wait states either by connecting it to the processor's DTACK* (if it has one), or by feeding into a wait-state generator.

The maximum bus cycle time is two clock periods (1x) plus 10 nsec, typically less, as this specification is based on worst-case internal synchronization delays. Using DTACK* saves time; however, it is permissible to hard-wire the wait-state generator for the maximum time.

Clocked Bus Interface

The CL-CD1864 bus interface is controlled by a state machine that samples on the falling edge of the clock. External strobes (CS*, DS*, and R/W; or CS* and RD* or WR*) that meet the setup time requirement cause a bus cycle to begin. The external interface can be designed to meet these setup time requirements, and to have shorter CL-CD1864 access cycles.

A bus cycle consists of two half-clock periods. During the clock-low period, the transaction is set up internally, and the local bus arbitration occurs. During the clock-high period, the read or write transaction to RAM occurs. On write cycles, the data from the host is latched internally on the low-to-high clock transition. On read cycles, the data is available shortly after the end of the clock-high period.

Read and write cycles differ slightly in timing; during a write, it is permissible to remove the WR* or DS* relatively early during the high-clock period, however, this cannot be done during read cycles. The RD* or DS* Strobe is used as an output enable, and must remain low for the data to appear on the external data bus.

Service request acknowledgment cycles follow a different timing than ordinary read cycles. First, it is necessary to have the address stable before asserting ACKIN*. Second, the setup time from ACKIN* and DS* (or RD*) going low to the falling clock edge is longer, due to additional internal logic involved in service request acknowledge cycles.

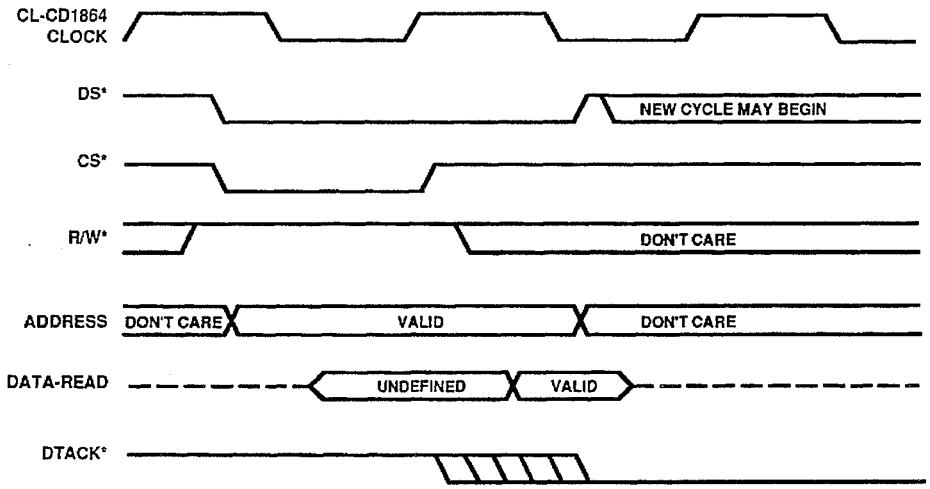

Figure 3–4. Typical Clocked Bus Interface

3.4 Interface Examples

There are some general design considerations when interfacing the CL-CD1864 to any host environment.

The three Service Request Pins (MREQ*, RREQ*, and TREQ*) may change at any time, and this can introduce metastability problems if the interrupt controller requires clocked signals. Care should be taken during the design to make sure that all signals are stable when needed.

The Service Request Pin of the type being acknowledged is negated at the end of the service acknowledgment bus cycle. Often, during the course of servicing one channel, another channel will reach a state where a request would assert, e.g., while servicing receive on channel one, channel two's FIFO fills. The Service Request Bits in the Service Request Status Register (SRSR) will not re-assert until approximately two clock periods after the host completes its write to the End-Of-Service Routine Register (EOSRR). In polled or mixed-mode systems, to determine whether another service request of the same level is pending, and to make sure that the host does not re-read the SRSR too quickly, insert a No-Operation (or similar) instruction.

Performing an 'invalid' service acknowledgment bus cycle on the CL-CD1864 is permissible, but can cause problems in certain circumstances. An Invalid Service Acknowledgment is an acknowledgment for which there is no request pending.

If a service request acknowledgment bus cycle is performed by the host when no service request is pending, either of two things can happen. If the value on the address bus matches one of the three values in the three Match Registers, and daisy chaining is enabled, the CL-CD1864 assumes that another device down the daisy chain should receive the request, and asserts its ACKOUT* Pin. This propagates down the CL-CD1864 chain until eventually the last CL-CD1864 asserts its ACKOUT*. At this point, the system waits endlessly unless the bus cycle terminates. The best method is to connect the ACKOUT* of the last CL-CD1864 in the chain to a bus-error input on the host. If there are multiple CL-CD1864s that are not cascaded, the ACKOUT* Signals should be OR'ed together through a gate or a PAL.

If an acknowledgment occurs and the value on the address bus does not match any of the Match Registers, the first CL-CD1864 in the chain does not pass it along or assert DTACK*, and the system waits endlessly unless there is a bus time-out or other mechanism to detect this condition. In either of these circumstances, the 'value' on the data bus is likely to be FFh because the bus is floating (this is system dependent). To make a robust design, do not use FFh as a valid Global Service Vector Register (GSVR) value. If daisy chaining is not enabled, then the CL-CD1864 will return a vector of '00' for invalid acknowledgments.

3.4.1 Interfacing to 80X86-Family Processors

The Intel 80X86 family processors often use the 8259A as the interrupt controller, that supplies its own vector during the INTA Cycle. The easiest way to interface the CL-CD1864 to an Intel processor is by Mixed Mode, as described in Section 2.5.

There is one 'bug' in the 8259A to be aware of. The 8259A can change the prioritizing of its eight inputs, which can result in one of its acknowledge outputs going low briefly (~30 nsec) if an input changes at a certain time. This typically happens if a higher-priority input to the 8259A asserts when the 8259A is about to issue an acknowledge to a lower-priority device. This brief pulse can cause the CL-CD1864 (and other devices) to malfunction, if this occurs at the beginning of a cycle. Care should be taken to make sure that this does not happen. See Intel 8259A Data Sheet for details.

3.4.2 Interfacing to 680X0-Family Processors

The 68000-family interface is quite straightforward. The three service request lines go through a priority encoder to the 680x0 IPL inputs. The CL-CD1864s ACKIN* Pin is driven by a decoder.

When the 680X0 performs an Interrupt Acknowledge Cycle, it drives its address lines A1, A2, and A3 with a three-bit value indicating the level being serviced. The other address lines are set to a 1. If the level being serviced corresponds to a level assigned to the CL-CD1864, external decoding logic should assert the CL-CD1864 ACKIN* Pin. The value on address lines A0 to A7 has been programmed into the Service Match Registers, so the CL-CD1864 recognizes the acknowledgment and proceeds as described in the Service Request Section 2.3.1.

All CL-CD1864 service requests can also be routed to a single interrupt level by using a Mixed-mode Interface, as described in Section 2.5.

3.4.3 Interfacing to the VME Bus

The CL-CD1864 can be directly interfaced to the VME Bus, and requires only a small amount of logic to complete the interface. This is necessary because service request acknowledgment works differently on the VME Bus than on the CL-CD1864.

VME defines seven levels of interrupts; each level can be shared among multiple VME cards. During an Interrupt Acknowledge Cycle, the VME Bus provides three bits on the address bus, indicating the level being acknowledged (A1-A3). Each VME card must pass along an interrupt on all levels it is not using so the CL-CD1864 does not automatically pass an interrupt acknowledgment.

To recognize how this difference can cause a problem, suppose that the three Service Request lines from the CL-CD1864 are connected to levels 7, 6, and 5 of the VME Bus (see Figure 3-5). Also, attach a 74XX244 so that during an Interrupt Acknowledgment Cycle provides an 8-bit code consisting of the three-address bits plus five more hard-wired bits to the CL-CD1864. Now, whenever an acknowledgment of a level 5, 6, or 7 interrupt occurs, the CL-CD1864 either responds or passes the acknowledgment properly. If an acknowledgment occurs on levels 1-4, the daisy chain 'breaks' because the CL-CD1864 does not recognize a match.

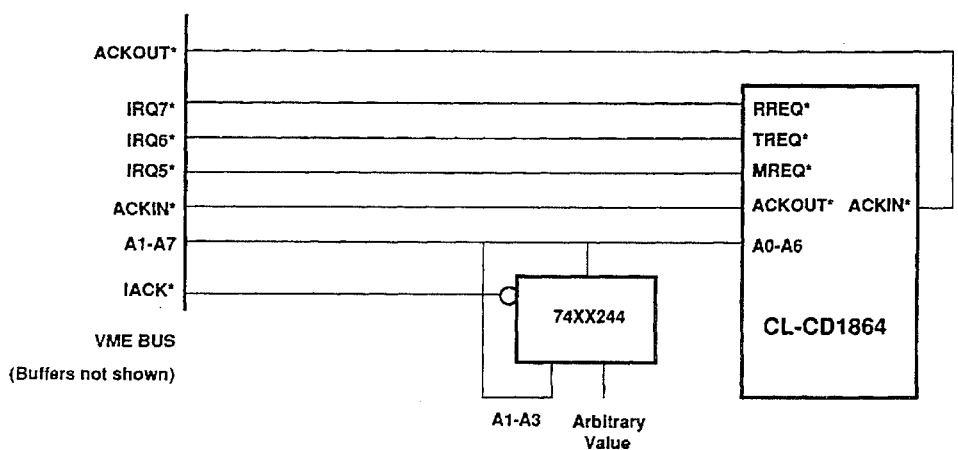

Figure 3-5. Incorrect VME Interface

This condition can be easily rectified, as shown in Figure 3–6. A PAL is used to assert ACKOUT*, whenever ACKIN* occurs on a level not being used by the CL-CD1864. The PAL is programmed for fixed levels. For instance, if the current VME Bus Interrupt level is 1-4, the PAL asserts ACKOUT* whenever ACKIN* is active. If the current level is 5-7, the PAL asserts ACKOUT* when ACKOUT* from the CL-CD1864 is active. If desired, the assignment of VME Interrupt levels to the CL-CD1864 can be field-programmable by supplying additional inputs to the PAL, indicating the levels being used by the CL-CD1864.

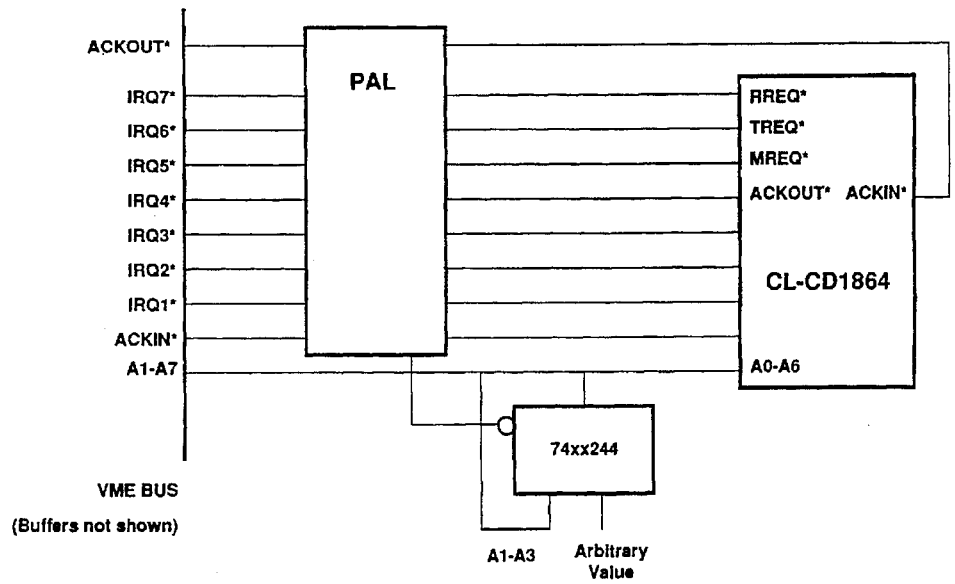

Figure 3–6. Correct VME Interface

4. SERIAL INTERFACES

4.1 Receiver Operation

4.1.1 Basic Operation

All receivers are disabled upon master reset. To prepare a receiver, first initialize and then enable it. Once initialized and enabled, the receiver monitors the RxD Line and waits for a high-to-low transition, which indicates a Start Bit. This sampling is performed at one-eighth of the System-clock Rate regardless of the Programmed Bit Rate, and provides accuracy of synchronization with the incoming data. See Figure 4–1 below for CL-CD1864 bit synchronization. Once a transition is detected, the receiver checks the RxD Input state again (a half-bit time later) to validate that it is a Start Bit. A valid Start Bit is defined to be a 'space' or a logic '0'. If the RxD Input is no longer a 'space' then a false Start Bit is assumed, and the receiver resumes the search for a high-to-low transition. If a valid Start Bit is detected, the RxD Input is sampled at one-bit time intervals in the middle of the bit to ensure stable data. Characters are assembled according to the programmed content of the Channel Option Register (COR1). Valid character framing (presence of a Stop Bit), and Optional Parity Bits are checked. After a character is assembled, it is placed in a temporary Holding Register. Then the CL-CD1864 processor checks for error conditions, FIFO overrun, and special character match before placing the character and its corresponding status into the Receive and Status FIFOs.

4.1.2 Receive FIFO Operation

Eight bytes of FIFO are assigned to each receiver for data storage, in addition to the Receive Holding Register and the Receive Shift Register. The CL-CD1864 can be programmed to generate a service request once the number of data bytes received and stored in the FIFO reaches a programmed threshold. See Figure 4–2 for Receive Operation. The Receive FIFO Service Request threshold can be selected by programming the RxTH Bits 3-0 in the Channel Option Register 3. A service request threshold of one-to-eight characters can be selected. Once this threshold is defined, a service request will be automatically triggered when the condition is met. It is possible that by the time the host responds to the service request, there will be more data in the FIFO than the threshold level.

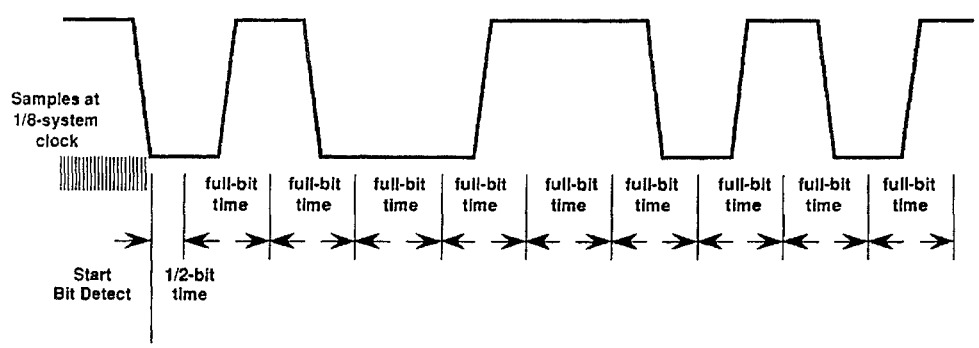

Figure 4–1. Bit Synchronization in CL-CD1864

An overrun condition occurs when the new data arrives, but the Receive FIFO and the Receive Holding Register are both full. The new data is lost and the overrun indication is flagged on the character in the Holding Register. That character and its status including the overrun indication will eventually be transferred to the host by a Receive Exception Service Request. Note that this character is good, and is the last character received before the overrun occurred.

Receiver Service Requests are enabled or disabled via the Receive Data Bit in the Service Request Enable Register. Receive Data Bit, when set to a '1', enables service requests to be asserted for the above causes.

The Prescaler Period Counter is a 16-bit counter clocked by the system clock. If the system clock is a 10-MHz clock, the maximum count will establish a clock tick every 6.5536 msec. The Prescaler Period should be set to generate a minimum tick period of 1.0 msec. The Receive Time-out Counter is an 8-bit counter decremental on every tick of the Prescaler Period Counter. At the maximum count per tick, the maximum time-out period is 1.671 sec.

The Receive Time-out is always enabled to transfer data when the Receive Data Service Request is enabled. From the system applications viewpoint, this time-out function is important for asynchronous data transmission. This is especially true when a FIFO is in use, and a service request threshold for the FIFO is set greater than one character. The Timer Service Request will eliminate long response times when excessive delay between characters occurs caused either by the remote operator or due to the line being disabled. The 'No New Data' Timer Service Request, which occurs after all data is transferred to the host, may be used to manage transfers from the host's receive data buffers.

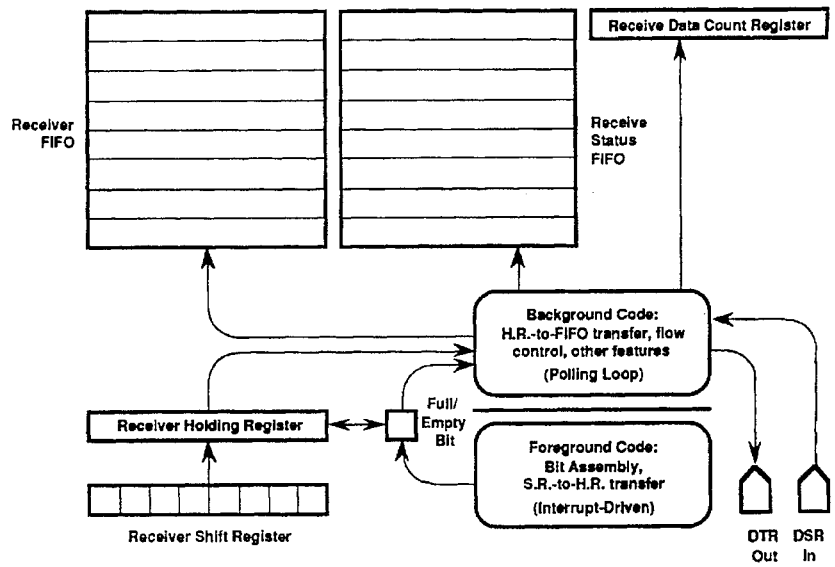

Figure 4–2. Receive Operation

4.1.3 FIFO Timer Operations

The CL-CD1864 uses the Receive FIFO Timer for two purposes. First is to avoid 'stuck' (or 'stale') data in the FIFO caused by not receiving enough characters to trip the threshold, which causes a service request to be issued. Second is to signal the host that there has been a relatively long pause in received data. It is useful for the host to know that 'no data has arrived lately', when managing relatively large I/O buffers. This event flushes the buffer up to the host for processing.

To avoid 'stuck' data, each time the CL-CD1864 moves a character into a channel's Receive FIFO, it sets the channel's Receive FIFO Timer to the value contained in the channel's Receive Time-out Period Register (RTPR). If the timer expires before new data arrives, a Receive Good Data sub-type will be asserted for the channel if the Receive Data Enable Bit in the Service Request Enable Register (SRER) is set.

The other receive timer option is to generate a service request for the first Receive Data Time-out following the transfer of all data from the channel to the host. This is called the No New Data Time-out (NNDT). This service request is a Receive Exception sub-type, with a status type of 'Time-out Exception'. There is no data character associated with the Time-out Exception status. This option can be enabled or disabled by controlling the NNDT Bit in the Service Request Enable Register.

If enough data arrives to fill the Receive FIFO to the level set by the RxTh Bits in COR3, or if a special character arrives in the Receive FIFO and the RxSC Bit of SRER is set, the channel will assert the Receive Data Service Request without waiting for the timer to expire.

If the timer times-out and the FIFO is not empty, the 'stale data' condition has occurred, and the device posts a Receive Good Data Interrupt. If the timer times-out and there is no data, two conditions are checked. First, a test is made to see if the feature is enabled, if it is true, then another flag is tested to make sure this is the first time the condition has occurred. If this is true, a Receive Exception Service Request is posted. (The NNDT internal flag is armed when the FIFO is emptied).

4.1.4 Receive Service Requests

The Receive Service Request is unique as it has two sub-types; i.e., it is capable of returning one of two different vectors during a service request acknowledge cycle. The two sub-types are Receive Good Data and Receive Exception. The reason there are two types within one category of service request is because while Good Data and Exceptions require different handling, they are both of equal priority and need to be serviced in the order they were received. Suppose, for example, two good characters are received, then an erroneous character, then another good character, then there must be a service request for the first two bytes of Good Data, then for the Exception, and then for more Good Data. If Exception Service Requests were at a different level, the erroneous character would be processed either before or after the Good Data, not in sequence as it should be. Receiver Service Requests will be invoked under several conditions.

Conditions that cause a Receive Good Data Service Request are:
- Receive FIFO threshold reached or exceeded
- Receive FIFO time-out — interval between character receptions exceeds time-out value

Conditions that cause a Receive Exception Service Request are:
- Receive erroneous data (parity error)
- Framing error (No Stop Bit)
- No data received time-out (optional)
- Special character detection
- Break detect

NOTE: Data cannot be read from the Receive FIFO or the Receive Status FIFO except when the CL-CD1864 is within the context of a Receive Data Service Request for a specific channel.

4.1.5 Receive Good Data™ Service Request

A Receive Good Data Service Request is asserted for any of the following conditions:

1. Receive FIFO threshold reached, and the FIFO contains Good Data.
2. Receive FIFO threshold not reached, but the FIFO contains Good Data and the Receive Data Timer times-out.
3. Receive FIFO threshold not reached, but the FIFO contains Good Data and the newly arrived data contains an exception condition.

When any of these conditions occur, the modified service request vector indicates to the host that the service request is for Good Data.

It is not necessary to take any or all of the available Good Data when a Good Data Service Request is received. If a host buffer is too full to accept eight bytes, a smaller number (even a '0') can be read. Service request context is then left, and the host buffer is dealt with first. The CL-CD1864 will generate another Good Data Service Request when any of the three conditions listed above are met.

The CL-CD1864 will immediately generate another service request if the condition that caused it in the first place remains true. If no data is read, this is always the case. If some, but not all of the available data is read, conditions 1 and 2 will not be true, but condition 3 may be if an exception condition caused the Good Data Service Request. If this is a problem, one solution is to temporarily disable Receive Service Requests on that channel. To avoid FIFO overflow, do not delay handling the channel for too long.

4.1.6 Receive Exception Service Request

Unusual or exception conditions are reported to the host one character at a time through the Receive Exception Service Request. As with normal receive processing, the host determines the requesting channel by reading the GSCR. It can then determine the specific exception(s) by reading the Receive Character Status Register, and take the appropriate action. Receive Exceptions are always one-byte-deep; multiple bytes of exception conditions will cause multiple Receive Exception Service Requests.

For many exceptions it will not be necessary to read the Receive Data Register once the Receive Status Register is read. For example, if special character detection is enabled, and the service request is for recognition of a special character, the character is known by definition because the exception code indicates which character or character sequence was detected.

However, for every exception a byte is placed in the Data FIFO even though the contents of that byte may be suspect data, and is discarded at the end of the exception service routine regardless of whether it was read by the host or not. This is done to keep the Status and Data FIFOs in lock-step with each other. This is different in the case of a Receive Good Data Service Request where the user is free to read as many or as few bytes as desired.

Regardless of the number or type of exceptions occurring, they will be reported to the host one character at a time; i.e., the number-of-bytes value in the Receive Data Count Register is not meaningful. Since every error is reported individually, there is no Receive Time-out Exception generated if the only characters in the FIFOs are error or exception characters.

4.1.7 Types of Errors

There are four types of errors recognized by the CL-CD1864: parity, framing, line break, and overrun. If parity checking is enabled, parity errors will be logged in the Status FIFO and the suspect data will be placed in the Receive Data FIFO. An error is also logged for framing, i.e., absence of a Stop Bit. In these cases, the suspect character is in the Receive Data FIFO and the appropriate status byte is placed in the Status FIFO.

When a line-break condition is recognized (zero data with zero parity, and zero or no Stop Bit), one NULL (00) character is loaded into the Receive FIFO, and a break status is recorded in the Status FIFO. Note that if odd parity is set and the bits received are all zeroes, it is marked as both a break character and a parity error. Generally when a break character is received, pre-set parity error may be ignored. No further FIFO entries will be made until normal-character reception is resumed, i.e., a Start Bit is found. The line must go high and then back to low for this to occur.

Multiple errors in one byte are possible because the CL-CD1864 evaluates the characters bit-by-bit as it receives them. For example, a parity error will be detected and flagged before the CL-CD1864 recognizes that a framing error has occurred. Parity plus framing or parity plus break error can occur, but framing plus a break error cannot occur because, if a character is received with every bit equal to a '0', it is marked as a break character. If some bits are a '1', but the Stop Bit is missing, i.e., a '0', it is marked as a framing error. Thus, any one character cannot have both framing and break errors.

The length of the Stop Bit is not checked by CL-CD1864. Any Stop Bit long enough to be sampled in mid-bit time as a '1' will be interpreted as a valid Stop Bit. In addition to all of the other errors, if an overrun occurs, the Overrun Error Bit will be set along with other error bits.

4.1.8 Types of Exceptions

4.1.8.1 Special Character Recognition

'Special Character Recognition' is a feature found only on the CL-CD1864 and other Cirrus Logic data communications controllers. The on-chip processor compares every good character received with user-defined special characters stored in registers on the chip. Both single-character and two-character sequence recognition is possible. This capability has several applications, including In-Band Flow Control. Special-character matches are reported to the host via a Receive Exception Service Request.

Four Special Character Registers are provided per channel, allowing received characters to be compared to as many as four special characters. However, these four registers are shared between Receive Special Character Detection and the Send Special Character Command, so some planning is required for using these characters.

The full set of features and options available as part of Special Character Recognition allows for Xon/Xoff flow-control to be implemented transparently to the host, and at the same time detect either of two other special characters in the data stream and alert the host of their arrival.

The user may individually enable any CL-CD1864 channel to recognize special characters. There are six bits used to control the various recognition and flow-control modes.

The following four registers are used to control character recognition:

| Bit Name | Register | Function |
|---|---|---|
| SCDE | COR3 | Enables detection of special characters. Must be set for In-Band Flow Control to work. |
| RxSC | SRER | Enables generation of service requests. Cannot be overridden by other bits. Does not need to be set for In-Band Flow Control to work. |
| XonCH | COR3 | Controls single- versus double-character matching. |
| XoffCH | COR3 | Controls single- versus double-character matching. |

The following table shows the effects of XonCH and XoffCH:

| XonCH | XoffCH | Characters matched |
|---|---|---|
| 0 | 0 | Match on: any of SCHR1, 2, 3, 4 |
| 0 | 1 | Match on: SCHR1 or SCHR3 or (SCHR2 and SCHR4) |
| 1 | 0 | Match on: (SCHR1 and SCHR3) or SCHR2 or SCHR4 |
| 1 | 1 | Match on: (SCHR1 and SCHR3) or (SCHR2 and SCHR4) |

NOTE: The two-character pairs may share a common first character; however, the same character must be programmed in both SCHR1 and SCHR2.

Single- versus double-character recognition is controlled by XonCH and XoffCH. If single-character compare is enabled, the CL-CD1864 will compare data in the data stream against the four special characters stored in the Special Character Registers (SCHR1-4). If fewer than four special characters are required, the unused Special Character Register(s) should be disabled by duplicating the pattern to be matched in the unneeded register. When reporting a special character, the CL-CD1864 always reports the lowest-number Special Character Register that matches.

To setup Special Character Recognition, first set the characters to be matched in Registers SCHR1-4, then set XonCH and XoffCH according to the length of match wanted. Set the SCDE Bit, and lastly enable service requests by setting RxSC.

Special characters are reported to the host by placing the appropriate status word in the Status FIFO, and the recognized special character in the Receive Data FIFO. In the case of a two-character sequence, only the second character will be stored in the Receive FIFO. This is because there is room only for one character, and preserving both is not needed as these characters are user-defined.

4.1.8.2 Flow-Control Characters

Automatic In-Band Flow Control of the CL-CD1864 transmitter is a subset of the Special Character Recognition capability, so to understand both these features is important. Refer to Section 4.2 for Transmitter Operation. Flow-control characters and operation are programmable on a per-channel basis. This is important to operating systems that allow users to configure their own terminal settings independently.

Because the CL-CD1864 performs flow-control functions before the data is passed to the host, the response time required of the host to avoid data overrun is greatly reduced. Additionally, the flow-control characters can be stripped from the data stream, relieving the host from processing them.

To use automatic flow-control, the Special Character Detection (SCDE) must be enabled via Bit 4 of Channel Option Register 3 (COR3). This causes all error-free received data to be compared for a match with the Special Character Registers (SCHR1-4). In addition, flow-control must be enabled via Transmit In-Band Enable (TxIBE, Bit 6) of COR2. This causes the special characters to be interpreted as flow-control characters. For single-character flow-control sequences, SCHR1 is used as Xon and SCHR2 as Xoff. SCHR3-4 are available for use as normal special-detect characters. If two-character sequences are enabled via XoffCH and XonCH (Bits 6 and 7) of COR3, SCHR1, and SCHR3 form the Xon sequence, and SCHR2 and SCHR4 form the Xoff sequence.

If flow-control characters are passed to the host where they are marked as special characters 1 or 2 in the Receive Channel Status Register (RCSR). If a two-character sequence is detected, it is compressed to the second character and a status indicating a match of the first character is set. A valid two-character sequence requires that both characters be received without error; if an error occurs on the second character the first character is treated as a normal character, and this does not affect non-flow control special character detection. Bits affecting flow control are summarized below.

| Bit Name | Register | Function | | | |
|---|---|---|---|---|---|
| SCDE | COR4 | Enables Special Character Recognition. | | | |
| TxIBE | COR2 | Enables Automatic Transmitter Flow-Control. | | | |
| FCT | COR3 | Sets Transparency Mode of flow-control. | | | |
| | | XonCH | XoffCH | Xon | Xoff |
| | | 0 | 0 | SCHR1 | SCHR2 |
| | | 0 | 1 | SCHR1 | (SCHR2 and SCHR4) |
| | | 1 | 0 | (SCHR1 and SCHR3) | SCHR2 |
| | | 1 | 1 | (SCHR1 and SCHR3) | (SCHR2 and SCHR4) |

The FCT Bit controls whether flow-control characters are passed on to the host. It has meaning only when In-Band Flow Control is enabled, i.e., TxIBE is set. When the CL-CD1864 receives a flow-control character or character sequence, and FCT is a '0', it will start or stop the transmitter, as required, and pass the character onto the host as a Receive Exception. Since there is a one-to-one correspondence between the Status and Receive FIFO, the flow-control character detected will be stored in the Receive FIFO, and a status byte indicating special-character detect will be stored in the Status FIFO. If FCT is a '0', RxSC must be set to enable service requests to be issued to the host. Otherwise, flow-control characters can not be passed as Receive Exceptions, and will instead be passed as Good Data.

If the FCT Bit is a '1', the CL-CD1864 will still start or stop the transmitter, as required, but the character will be discarded, and no exception will be posted. In either case, the flow-control status of the transmitter (on or off) is maintained by the CL-CD1864 in the Channel Control Status Register (CCSR).

The FCT Bit makes it possible to support 'escaping' of flow-control characters. Some systems follow a convention where two identical flow-control characters in a row indicates that flow control is not to be performed, but rather one flow-control character is to be kept in the normal received-data stream, and the other 'escape' character is to be discarded. If the CL-CD1864 is in such a system, set the FCT Bit to a '0', allowing flow-control characters to pass onto the host. When the host detects two flow-control characters in a row, it simply restores the proper flow-control state of the channel, and discards one of the characters. However, for most systems the FCT Bit can be set to a '1', reducing loading on the host.

4.1.8.3 No New Data Received Time-out

It is useful for the host to sense that 'no data has arrived lately', when managing relatively large I/O buffers. This event is used to flush the buffer up to the host for processing. One of the receive timer options, No New Data Time-out (NNDT), generates a service request for the first Receive Data Time-out following the transfer of all data from the channel to the host. This service request is a Receive Exception sub-type, and can be enabled or disabled by controlling the NNDT Bit in the Service Request Enable Register. Refer to Figure 4–3 for the timer logic.

The timer is started only on data arrival. If the CL-CD1864 processor determines that the Receive FIFO is empty, the timer has expired, and there has been a previous receipt of Good Data (and the timer feature is enabled), a Receive Exception will occur with a status indicating that a time-out has occurred.

If the last Receive Exception Service Request was triggered by a time-out (to avoid 'stale' data) the No New Data Time-out Service Request will occur immediately after the Data Transfer Service Request completes. If the last service request was triggered by reaching the threshold, the timer still has to expire so that some time will pass before the No New Data Service Request occurs. Likewise, if the last service request was triggered by some other error, such as parity, the timer still has to expire so that some time will pass before the No New Data Service Request occurs.

No New Data Function should not be confused with the time-out that occurs when there is Good Data in the FIFO, but the threshold has not been reached and the timer expires. This event is a Receive Good Data Service Request, and not a Receive Exception event. Timing-out to transfer Good Data before it becomes 'stale' is standard, and cannot be turned off by the user.

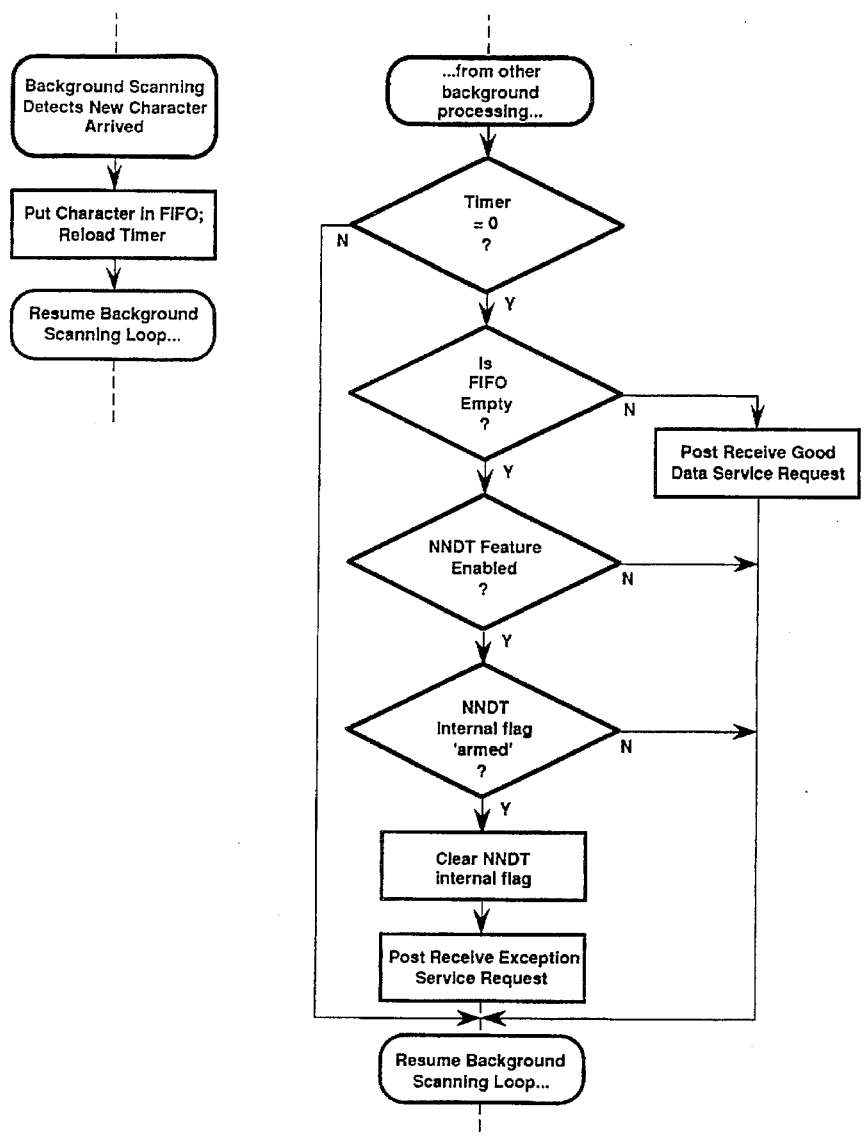
Figure 4-3. No New Data Timer Logic

4.1.9 Programming Notes

If a special condition (e.g., framing or a parity error) occurred on a special character, the CL-CD1864 will not interpret this character as matched. Flow-control characters that are processed and discarded because FCT is set, never cause an overrun.

Special Character Recognition only occurs on characters that have no other problems or errors. There is one case where the CL-CD1864 will not find a special character even though the character has been correctly received. If a good character arrives as the ninth character (e.g., the FIFO is full), it stays in a Holding Register. If another character arrives, the good character in the Holding Register will have its status marked as 'overflow', indicating that it is the last good character received; however, it will not be recognized as a special character.

There are two cases where the CL-CD1864 might not detect a two-character sequence. If the first character has been found, but no other character has been received for a long period of time and the Receive Time-out event occurs, no match will be found because the first character will have been flushed up to the host. If special-character detection is disabled by clearing SCDE just when the CL-CD1864 has received the first two-character special-character sequence, but has not received the second character yet, the first character will be lost.

4.2 Transmitter Operation

4.2.1 Basic Operation

Upon power-on reset, all transmitters are disabled with their Transmit Output held in the 'Mark' or a logic '1' condition. Other channel parameters are undefined. The minimum configuration of a channel for transmission consists of specifying the bit rate, parity, and number of Stop Bits. In-band and Out-of-Band Flow Control should also be set as desired. Next, set either (or both) of the service request enable bits. Then issue the Transmit Enable Command and either of two service request enable bits. For normal operation set the TxRDY Bit, which will cause a service request to be issued when the FIFO is empty. Since on power-up the FIFO is empty, a service request will be received (less than 1 millisecond), at that time data can be transferred to the FIFO. Data can not be transferred to the FIFO as part of channel initialization; instead one has to be in the service-request routine to do this. Refer to the Section 2.3 for details.

Once the channel is initialized and serviced, and a character is written into the Transmit FIFO, the transmitter starts to transmit by first sending the Start Bit (space or a logic '0') followed by the data character according to predefined character length, least significant bit first. An optional parity bit (none, odd, even, or forced) is appended followed by the final Stop Bit (a logic '1', or a 'Mark'). The length of the Stop Bit can be one, one-and-a-half, two, or two-and-a-half bit times long.

The transmitter will continue sending characters one after the other as long as the Transmit FIFO is not empty. When the Transmit FIFO becomes empty and the last character has been sent, the transmitter will stop transmission and will hold the TxD Output in the 'Mark' (1) condition. Transmission will resume as soon as there is another character in the FIFO.

In some cases it must be determined if the channel is completely done transmitting the last bit of the last character — for instance, before changing the bit rate. In such a case, the service request is to be issued only when the last character has been sent, rather than when the FIFO is empty. In this case, instead of setting the TxRDY Bit, set the TxMpty Bit. This will cause a service request to be issued only when the transmitter is completely empty.

For details on Transmitter Flow-control Operation, refer to the Section 4.3.

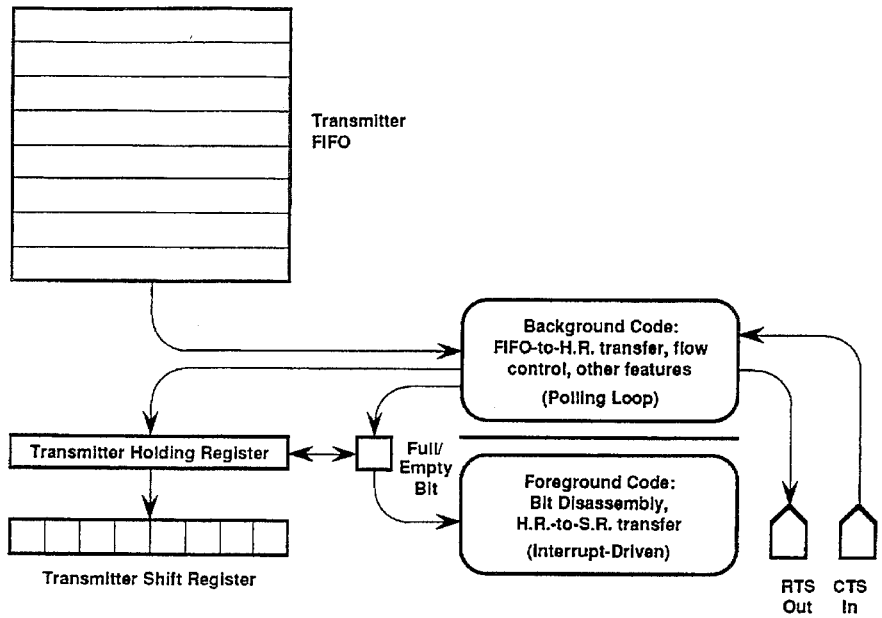

Figure 4-4. Transmitter Operation

4.2.2 FIFO Operation

An eight-byte FIFO is provided for each transmit channel. In addition to the eight-byte FIFO, the CL-CD1864 also contains a Transmit Holding Register and the Transmit Shift Register for each channel. However, when servicing a Transmit Service Request, up to eight characters can be written into the Transmit Data Register (TDR) consecutively.

4.2.3 Transmit Service Requests

Generating a Transmit Service Request depends on control bits in the Service Request Enable Register. Setting the TxRdy Bit of the SRER specifies that a Transmit Service Request be generated when the FIFO is empty. When this condition occurs, there is still one character in the Transmit Holding Register and another character in the Transmit Shift Register. The host CPU, therefore, has up to two-character times to respond before the transmitter output goes into the idle (Mark) condition.

Setting the TxMpty Bit instead of the TxRdy Bit of the SRER specifies that a Transmit Service Request be generated only when the FIFO, the Transmit Holding Register, and the Transmit Shift Register are empty. When this condition occurs, it means that all characters have been completely transmitted and the channel can now be re-configured. It is recommended that one of the two bits be set as needed, but do not set both bits at the same time.

End of a service request must be signalled to the CL-CD1864 by writing to the End-of-Service Request Register (EOSRR).

4.2.4 Special Transmitter Commands

The CL-CD1864 is capable of sending special characters pre-emptively (bypassing the FIFO); sending break characters, and inserting delays or pauses either between characters or to lengthen a break. There are two basic mechanisms the CL-CD1864 uses for these 'Send Special Character' and 'Embedded Transmit Command' functions.

4.2.5 Special Character Transmission Via Send Special Character Command

Selected special characters, or two-character sequences, may be transmitted pre-emptively by setting the appropriate bits in the Channel Command Register (CCR). The Send Special Character (SEND SP CH) Bit of the CCR, when set, initiates the Send Special Character Command. SSPC0-2 Bits of the CCR then specify which character or two-character sequence is to be used. The choice of a single- or two-character sequence is determined by the XonCH and XoffCH Bits of COR3.

When a Send Special Character Command is given, the CL-CD1864 will insert the special character(s) into the data stream immediately following the current character in the Transmit Holding Register. Thus, it is ensured that the special character will begin transmitting within two-character times after the command is issued. The Send Special Character Command overrides all other flow-control modes, including the state of TXEN and CTS*. Generally this is the preferred case. However, sample CTS* or CD* in some applications to determine if it is okay to send a character before invoking the Send Special Character Command.

The CCR is reset by the CL-CD1864 as an acknowledgment of the command. A new command must not be issued if the CCR contents are non-zero. A send special character command will be recognized and cleared within 125 $\mu$seconds (at 15 MHz, proportionally longer at lower clock speeds), unless a break is being sent. If a break is being sent, the special character will not be sent until after the break time is complete.

4.2.6 Embedded Transmit Commands

The CL-CD1864 may be enabled to recognize certain 'escape' sequences as commands embedded in the Transmit Data Stream. These commands are issued to introduce a time delay between characters, to insert an idle period during the transmission, or to send a break on the line.

These capabilities are enabled on a per-channel basis by setting the Embedded Transmit Command (ETC) Bit in the Channel Option Register 2 (COR2). The 'null' (00) character is used as the controlling character to initiate the special action. To preserve data transparency, two mechanisms are provided to allow the null character to be sent as data. If the host must transmit a null character as data, either the ETC Mode may be disabled, or the null character may be preceded by a null, i.e., '00 00' will cause one-null character to be sent. If the ETC Bit is not set, the '00' character has no effect, and may be sent as ordinary data. ETC Mode may be enabled or disabled 'on-the-fly'.

The CL-CD1864 uses the Transmit Timer to generate time delays between characters in the output data stream. It is also used to extend the duration of a line-break transmit condition when the delay is inserted between the 'Start Break' and 'Stop Break' embedded-transmit commands. All of the timers count ticks are determined by the Prescaler Counter. The two eight-bit Prescaler Period Registers (PPRH and PPRL) determine the real-time length of a tick. A tick is the period of the CL-CD1864 System Clock Input (CLK) multiplied by the Period Registers' contents.

4.2.7 Sending Breaks

Line breaks may be sent by embedding the following sequences in the data stream (all values are given in Hex):

00 81 Send Break: Enter line-break condition for at least one character time. The line will enter the break condition and stay there until one of the following conditions is met:

1. Another character needs to be sent.
2. If the Insert Delay Special Character Sequence immediately follows the Send Break Sequence, the duration of the break transmission is extended by the amount of the programmed delay. The Insert Delay Sequence is: 00 82 xx. This inserts a delay of 'xx' (interpreted as an unsigned binary number) times the programmed timer 'tick' set by the Prescaler Period Registers. Multiple insert delay commands can be executed consecutively by the CL-CD1864, to allow delays of arbitrarily long length. If 'xx' is a zero, no delay is inserted.
3. The Stop Break Sequence '00 83' is encountered next. This sequence is optional, and exists to provide a way to terminate a break without actually sending another character. If another character is being sent anyway, no Stop Break is required.

If there is no more data to be sent, the TxD Pin remains in the state it was left in by the last character. Since the Stop Bit is always a '1', the line will be left in the idle state after any character, except for break character. The break character leaves the line in the '0' state, until more data needs to be sent. Long breaks can be sent by simply sending one break and then waiting. To terminate the break, send the Stop Break Sequence or send another character.

Sending long breaks has precedence over the Send Special Character Command, i.e., the time delay duration must pass before the special character will be sent.

4.2.8 Sending Inter-Character Delays

In some applications it is desirable to pause between characters. For example, certain types of electro-mechanical teletype equipment cannot handle characters continuously at their specified bit rate. To accommodate this, the CL-CD1864 allows insertion of a delay between characters.

The user embeds an escape sequence into the Output Data Stream to generate delays between characters. When the CL-CD1864 encounters the Insert Delay Escape Sequence, it sets the Transmit Timer to the value contained in the Escape Sequence. When the timer expires, the CL-CD1864 loads the next character into the Transmit Shift Register and resumes output (unless the next character begins another Escape Sequence). The Escape Sequence for an inserted delay consists of three characters: '00', '82', and 'tt'. The time-out value 'tt' is expressed in timer ticks.

4.2.9 Summary of Special Transmitter Commands

The ETC Bit in COR2 must be set to enable the following functions:

| Char. Sequence | Effect |
| --- | --- |
| 00 00 | Send one-null character. |
| 00 81h | Send one-character time of line break. |
| 00 82h xxh | Delay for 'xx' prescaler time ticks (i.e., Transmit Timer Value is 'xx'). |
| 00 83h | Stop break. |

4.3 Flow Control

Variations in response times and system data transfer rates between systems communicating across asynchronous interfaces give rise to a need to control the flow of data between them. Systems typically are implemented with a receive buffer for temporary storage of data. When this buffer is nearly full, the receiving computer 'flow-controls' the remote transmitter. When, after processing the existing data, more buffer space is available for the receive process, the receiving computer signals the remote to resume transmission.

Flow control is implemented in one of two ways — 'out-of-band' or 'in-band' signaling. Out-of-band signaling is a hardware-based mechanism, performed via extra wires, such as the RTS/CTS and DSR/DTR pairs. It has the advantage of complete independence from the data stream. However, it is not always possible to provide all of the wires necessary to support Out-of-Band Flow Control. Also standards for implementing Out-of-Band Flow Control vary widely.

In-Band Flow Control works by inserting special flow-control characters into the stream of data being sent. It has the advantage that only the data circuit is required, thus only two wires are needed. The disadvantage of In-Band Flow Control is that the two communicating computers must perform additional functions, specifically, they must monitor the data stream for flow-control characters and take the appropriate action. This can be quite burdensome because the host computer that receives a flow-control command must recognize this event quickly and respond in a timely manner to avoid overrun at the remote receiver.

Although there are advantages and disadvantages to each system, in general the trend is toward In-Band Flow Control. This is because it is more useful than Out-of-Band Flow Control over a wider range of applications, such as communication via modems.

The CL-CD1864 provides significant performance advantages over conventional solutions during both the receive processing of and the transmission of flow-control characters. It does this by handling almost all flow control automatically, without host intervention. It also provides tools to make host intervention, when required, much easier. Because the CL-CD1864 performs flow-control functions automatically, before the data is passed to the host, the response time required of the host is substantially reduced. The possibility of data overrun is also reduced. Additionally, the flow-control characters themselves can be stripped from the data stream, relieving the host from processing them. The flow-control status of the transmitter is always available to the Host as a bit in the Channel Control Status Register (CCSR).

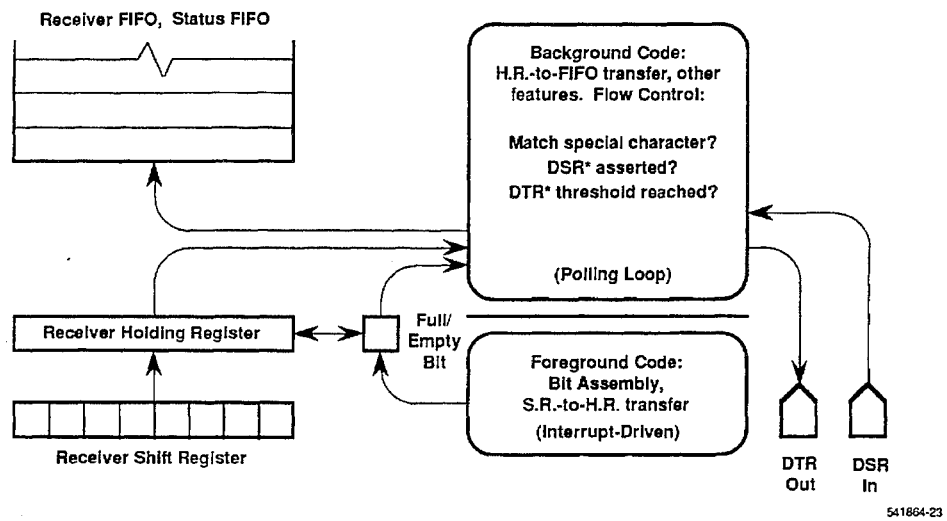
Figure 4-5. Receiver Flow-Control Logic
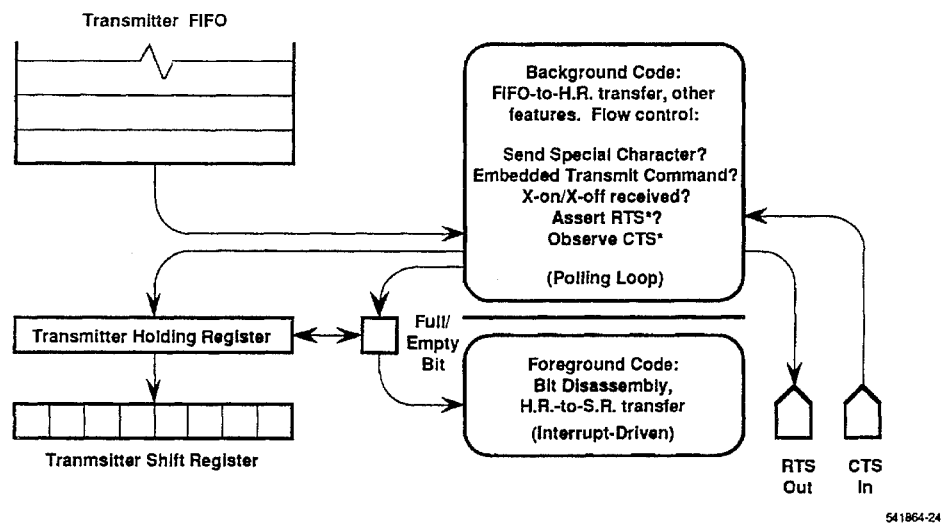
Figure 4-6. Transmitter Flow-Control Logic

4.3.1 Receiver Flow Control

The CL-CD1864 provides both In-Band (Xon/Xoff)) and Out-of-Band Flow Control functions for ensuring that the receiver does not overflow. In-Band Flow Control is semi-automatic, and helps the host manage its buffer size. Out-of-Band Flow Control is fully automatic, and can be used to prevent the CL-CD1864 Receive FIFO from overflowing.

When the CL-CD1864 receiver is too busy, the transmitter can be used to send Xoff/Xon to the remote device. This Receiver Software (In-Band) Flow Control is covered in Section 4.3.3.

The CL-CD1864 transmitter can be controlled by the remote device. This Transmitter Software (In-Band) Flow Control is covered in Section 4.3.6.

The current flow-control status is always available to the host. It is stored in the Channel Control Status Register (CCSR). Two bits, Receive Flow-on and Receive Flow-off, show whether the last flow-control command sent by the CL-CD1864 was on or off. As long as the receiver is enabled, the CL-CD1864 will continue to receive any data sent regardless of whether it has requested the remote to shut off.

4.3.2 Receiver Hardware (Out-of-Band) Flow Control

Out-of-Band Flow Control uses the Modem Handshake Signal (DTR*) to control the flow of data. Whenever the Receive FIFO reaches a user-defined threshold, DTR* will be negated, causing the remote to stop sending characters. The threshold is set by four bits in the Modem Control Option Register 1, and can be any level from one to eight or disabled. The DTR* Pin will also be negated whenever DTR* Mode is set and the channel is disabled or reset. If DTR* Mode is not set, the DTR* Pin is not changed by the CL-CD1864, and remains at whatever value the host sets it to.

While it is possible to set the DTR* threshold lower than the service request threshold, the part will operate as though the DTR* threshold was the same as the service request threshold. If the DTR* threshold is set lower, it will be ignored, and DTR* will negate when the service request threshold is reached. If desired, set the DTR* threshold to a 1, and then it will 'track' the other threshold automatically.

The receiver monitors the state of DSR* (if enabled) and ignores data on the Receive Data Pin if DSR* is negated. This feature is controlled by the DsrAE Bit, Bit 0, of Channel Option Register 2 (COR2).

4.3.3 Receiver Software (In-Band) Flow Control

Host receive buffers often cannot keep pace with data being received. The CL-CD1864 transmitter can be used to send flow-control characters to the remote device. This avoids over-flowing the receive buffers in the host. However, transmitting flow-control characters is an additional complication and source of delay when using conventional devices. As the host's receive buffer becomes full, the transmit process must be flagged to insert a flow-control character (or sequence) in the Transmit Data Stream. Any data already in the Transmit FIFO will be transmitted ahead of the flow-control character, increasing the response time at the remote end.

With the CL-CD1864, In-Band Flow Control of the remote system is semi-automatic; two commands (Send Xon, Send Xoff) can be issued by the host whenever the host wants to flow-control the remote. These special commands make host programming and buffer management easier because it allows the flow-control character(s) to be sent as the next character, regardless of the contents of the Transmit FIFO or host transmit buffers.

Flow-control characters are transmitted via the send special character command in the Channel Control Register (CCR). The lower-three bits in the command determine which of the four-special characters are to be sent. If two-character flow control sequences are enabled, requesting either SCHR1 or SCHR2 causes the appropriate two-character sequence to be transmitted. Refer to Section 4.2.5 for Special Character Definition details. Special characters are transmitted regardless of the state of transmit enable or transmit flow control. Transmitting flow-control characters can be handled independently of the current state of the transmit channel. In sending special characters, the CL-CD1864 bypasses any data already in the Transmit FIFO, thereby minimizing delay in transmitting flow-control characters. The maximum delay is two-character times. However, if a break is currently being transmitted, the CL-CD1864 will wait for the break transmission to terminate before the special character is transmitted, regardless of the length of the break.

The CL-CD1864 keeps a copy of the current state of the receive flow in the CCSR. Two bits are used to indicate the current state of the channel regarding flow control: RxFloff and RxFlon. RxFloff and RxFlon are meaningful only when the CL-CD1864 is flow-controlling the remote. Whenever an Xoff is transmitted, RxFlon is cleared and RxFloff is set. When a subsequent Xon is transmitted, RxFloff is cleared and RxFlon is set. When data is received from the remote, RxFlon is cleared.

The '0,0' state is provided as an aid to the programmer in determining whether there might be a problem in a communications link. If RxFlon remains set during normal operation, it could indicate that the remote did not correctly receive the last Xon.

If flow-control characters are sent by the host by embedding them in the Transmit FIFO rather than using the Send Special Character Function, the CL-CD1864 flow-control logic does not sense them, and the CCSR is not affected.

The table below summarizes the meaning of RxFloff and RxFlon.

| RxFloff | RxFlon | Meaning |
|---------|--------|---------|
| 1 | 1 | Illegal Mode. |
| 1 | 0 | Xoff is last flow-control character sent (flow off). |
| 0 | 1 | Xon is last flow-control character sent (flow on). |
| 0 | 0 | Flow is on, data has been received. |

4.3.4 Transmitter Flow Control

The CL-CD1864 provides both automatic In-Band (Xon/Xoff)) and Out-of-Band Flow Control functions. In-Band Flow Control recognizes special characters or character sequences for Xon and Xoff control embedded in the data stream. Out-of-Band Flow Control uses the modem handshake signals, RTS/CTS, to control the flow of data. Both types of flow control are implemented between the Transmit FIFO and the Transmit Holding Register, not between the Transmit Holding Register and the Transmit Shift Register.

All automatic flow-control functions are controlled by bits in Channel Option Register 2 (COR2), except DTR threshold, which is controlled by Modem Change Option Register 1 (MCOR1). Channel enable and flow-control status is stored in the Channel Control Status Register (CCSR). A TxEn Bit shows the enabled status of the channel's transmitter. Two bits, TxFloff and TxFlon, are used to indicate the current state of the channels' flow control.

Once the Automatic Flow-Control Modes are invoked by the host, all actions will be transparent to the host. If receipt of flow-control characters by the host is not desired, the Flow-Control Transparency Bit of COR3 may be set to not pass received flow-control characters onto the host. If TxIBE is set, the CL-CD1864 will implement the flow-control function on the transmitter regardless of the FCT Mode. The host can review the status of the channel by reading the Channel Control Status Register.

If flow-control status is needed by the host, the SCDE and RxSC Control Bits must be set and the FCT Bit must not be set. A special character detect status and the special character will be presented to the host by a Receive Exception Service Request. If the host wishes to manually flow-control the transmitter, it can do so by using the TxEn Bit, which will stop transmission after the current character completes.

4.3.5 Transmitter Hardware (Out-of-Band) Flow Control

Transmit out-of-band flow control is performed automatically by the CL-CD1864 via the CTS* Pin, if the CTS Auto Enable (CtsAE) Mode is enabled in Bit 1 of COR2. In this mode, before a character from the FIFO is transmitted, the CTS* Pin will be tested, and, if inactive, transmission will be delayed. Since flow control is implemented between the FIFO and the Transmit Holding Register, when CTS* is negated, it is possible to get both the current character being sent and the character in the Transmit Holding Register.

However, the Send Special Character Command (e.g., Xon and Xoff) will override CTS* inactive. This is generally preferred; however, in some applications sample CTS* or CD* before sending a special character.

To complete the handshake with a remote device, an RTS Automatic Output (RtsAO, Bit 2) Mode is also provided. This causes the RTS Pin to be asserted throughout any data transmission: normal, break, and special characters. The RTS Pin is activated before the Start Bit, and held active until after the last Stop Bit is transmitted. It will only be negated when the channel has been disabled via CCR or when the FIFO is empty.

4.3.6 Transmitter Software (In-Band) Flow Control

The CL-CD1864 transmitter can be programmed to respond automatically to flow-control characters received by the receiver. This feature requires no host assistance and substantially reduces host processing requirements. If this Automatic Mode is enabled when the remote unit transmits an Xoff character to the CL-CD1864 (to prompt the CL-CD1864 to suspend transmission), the CL-CD1864 upon detecting receipt of the Xoff character(s) will terminate the transmission. The CL-CD1864 may require approximately 500 microseconds (~2 character times at 38.4 kbps) after receipt of the Stop Bit to recognize that the character it has received is a flow-control character, and set its internal flag to stop transmission. Transmission actually stops as soon as the characters in the Transmit Shift Register and Transmit Holding Register are shifted out.

To enable In-Band Flow Control, two bits must be set. First, the Special Character Detection (SCDE) must be enabled via Bit 4 of Channel Option Register 3 (COR3). This causes all error-free received data to be compared for a match with the Special Character Registers (SCHR1-4). Second, flow control is enabled via Transmit In-Band Enable (TxIBE, Bit 6) of COR2, the special characters are interpreted as flow-control characters.

Different flow-control protocols use either single- or two-character sequences for the Xon and Xoff functions. For single-character flow-control sequences SCHR1 is used as Xon, SCHR2 as Xoff, and SCHR3-4 as normal special detect characters. If two-character sequences are enabled, via XoffCH and XonCH (Bits 6 and 7) of COR3, SCHR1 and SCHR3 form the Xon sequence, and SCHR2 and SCHR4 form the Xoff sequence.

Many operating systems allow users to define their own terminal's flow-control settings independently. The CL-CD1864 allows flow-control characters to be programmed on a per-channel basis.

The FCT Bit controls whether flow-control characters are passed on to the host. When the CL-CD1864 receives a flow-control character or character sequence and FCT is a '0', it will start or stop the transmitter as required, and pass the character on to the host as a Receive Exception Service Request. Since there is a one-to-one correspondence between the Status FIFO and the Receive Data FIFO, the flow-control character detected will be stored in the Receive Data FIFO, and a status byte, indicating special character detect, will be stored in the Status FIFO.

If the FCT Bit is a '1', the CL-CD1864 will still start or stop the transmitter as required, but the character will be discarded, and no exception will be posted. In either case, the flow-control status of the transmitter (on or off) is maintained by the CL-CD1864 in the Channel Control Status Register (CCSR).

If flow-control characters are passed to the host, they are marked as special characters 1 or 2 in the Receive Channel Status Register (RCSR). If a two-character sequence is detected, it is compressed to the second character and a status indicating a match of the first character is set. A valid two-character sequence requires that both characters be received without error. If an error occurs on the second character, the first character is treated as a normal character, and the second character is reported as an error via a Receive Exception Service Request.

Bits affecting flow control are summarized below:

| Bit Name | Register | Function |
|---|---|---|
| SCDE | COR4 | Enables Special Character Recognition. |
| TxIBE | COR2 | Enables Automatic-transmitter Flow Control. |
| FCT | COR3 | Sets Transparency Mode of flow control. |
| IXM | COR2 | Sets Implied Xon Mode<br>XonCH XoffCH Xon Xoff<br>0 0 SCHR1 SCHR2<br>0 1 SCHR1 (SCHR2 and SCHR4)<br>1 0 (SCHR1 and SCHR3) SCHR2<br>1 1 (SCHR1 and SCHR3) (SCHR2 and SCHR4) |

The remote device can signal the CL-CD1864 to resume transmission in one of two ways depending on the setting of the Implied Xon Mode (IXM) option Bit COR2. When the IXM Bit is set, the CL-CD1864 will resume transmission upon receipt of any character, i.e., each character is an implied Xon. In Implied Xon Mode it is assumed that if the remote is capable of transmitting data, it is in a fit state to receive as well. If a character is treated as an implied Xon, no special status is recorded in the RCSR, and the TxFlon Bit is not set in the CCSR. An implied Xon character will not be stripped if flow-control transparency is enabled.

When the IXM Bit is not set, the CL-CD1864 will only resume transmission upon receipt of an Xon character. In addition, the host may force a resumption of transmission by issuing a Transmit Enable Command, which will clear the TxFloff Bit.

The Xon and Xoff characters or character sequences are equal in a Toggle Mode. There is no special bit to enable this mode. The CL-CD1864 detects this mode whenever the Xon character equals the Xoff character, and implements Toggle Mode automatically.

In Toggle Mode, whenever the special character is received, the current state of flow control is toggled. If flow control transparency is set, the character is dropped. If not in flow-control transparency, the character is passed to the host. If it is a single character, the special character status is '1' and the character is put in the Receive Data FIFO. In two-character sequence, the second character is placed in the Receive Data FIFO along with special character '1' in the Status FIFO.

The TxFloff and TxFlon Bits indicate channel status when the remote device is flow-controlling the CL-CD1864 transmitter. When the remote requests the CL-CD1864 to stop transmission, the CL-CD1864 will set the TxFloff Status Bit in the CCSR. If TxFloff is set, the last flow-control character received was a flow-off. When the remote sends an explicit flow-on character, the CL-CD1864 will clear the TxFloff Bit, and set the TxFlon Bit. (If flow is resumed because of implied Xon, TxFloff will be cleared, but TxFlon will not be set). When the CL-CD1864 resumes transmission, the TxFlon Bit will be cleared. Transmit Flow Status Bits will also be cleared by enabling or disabling the transmitter or resetting the channel.

This is summarized as:

| TxFloff | TxFlon | Meaning |
|---|---|---|
| 1 | 1 | Illegal. |
| 1 | 0 | Transmitter is flow-controlled off. |
| 0 | 1 | Transmitter on, no data sent yet. |
| 0 | 0 | Transmitter on, CL-CD1864 has sent data, or implied Xon has occurred. This is also the 'normal' state of these bits when flow control is not being used. |

4.4 Modem Signals and General-Purpose I/O

Each channel of the CL-CD1864 has four pins that can be used either as modem-control or general-purpose I/O pins. The signal names are based on the conventional assumption that the CL-CD1864 is 'DTE' as defined by EIA specification RS-232D and V.24. As shown in Figure 4–7, the device can be wired to support either DTE or DCE.

Implementations of this specification vary widely so it is better to think of the pins in terms of their actual uses within the CL-CD1864, and connect them accordingly, without regard to their names. For example, the RTS* and CTS* Pins are associated with the CL-CD1864 transmitter; for instance, connect the modem's CD Output to the CL-CD1864 CTS* Input if the transmitter does not send because a modem's CD* Output is inactive. Similarly, the DSR* and DTR* Pins are associated with the CL-CD1864 receiver. Refer to Section 4.3 for details on operation of modem pins in flow-control applications.

| CL-CD1864 Signal | DTE Pin | DCE Pin | General-Purpose I/O |
|---|---|---|---|
| TxD → | 2 → | 3 → | N/A |
| RxD ← | 3 ← | 2 ← | N/A |
| RTS* → | 4 → | 5 → | Output |
| CTS* ← | 5 ← | 4 ← | Input |
| DTR* → | 20 → | 6 → | Output |
| DSR* ← | 6 ← | 20 ← | Input |
| CD* ← | 8 | N/C ← | Input |

Figure 4–7. Naming Conventions for Modem Interface Signals

| | |
|---|---|
| RTS*/GPO0* | Request to Send/General-Purpose Output '0'. |
| CTS*/GPI1* | Clear to Send/General-Purpose Input '1'. |
| DTR*/GPO2* | Data Terminal Ready/Carrier Detect/General-Purpose Input/Output '2'. |
| DSR*/GPI3* | Data Set Ready/General-Purpose Input '3'. |
| CD*/GPI4* | Carrier Detect/General-Purpose Input '4'. |

Modem pins are implemented as I/O ports accessible by either the CL-CD1864 processor or the host. The modem pins are not connected directly to the transmit or receive hardware. When a user programs out-of-band modem functions to be active, the CL-CD1864 processor will read from and write to these pins. Specifically, when RTS* and CTS* are being used for transmit flow control, the CL-CD1864 processor will assert RTS* and sense CTS*, as required. Likewise, when configured to do so, the Receive FIFO will negate DTR* when full. The host should not be allowed to re-assert it inadvertently. The host is not 'locked out' of accessing these bits, care should be taken so that these bits are not written to, causing the system to malfunction.

The user has direct control over the RTS* and DTR* Outputs and can sense the state of CTS*, CD*, and DSR* Inputs through the Modem Signal Value Register (MSVR). Since the host is accessing these pins directly, there is no delay in the host's ability to detect a level change.

When the CL-CD1864 is programmed to detect level changes and generate service requests when level changes occur, it does so in firmware by reading the pins and comparing to a previously stored value. This function is performed in the main timing loop of the firmware; the maximum time required to detect a level change under worst-case conditions is approximately 2 milliseconds. When the CL-CD1864 is performing this function, the modem pins are periodically sampled rather than continuously monitored; as such they have very little sensitivity to noise, which is desirable in data communication applications. However, in extremely noisy applications, re-read a modem line which has caused a Modem Signal Change Service Request to verify that it has indeed changed and is not merely malfunctioning. This will eliminate even the slight possibility of a noise pulse causing erratic operation.

When the CL-CD1864 is monitoring modem pins to control transmit or receive functions, it does not rely on the previously stored value, but checks the pins at the appropriate time. Thus, there is very little delay in this response. For example, before deciding to transmit another character, it will examine the CTS* Pin at that time. (The CL-CD1864 makes this decision when moving characters from the FIFO to the Holding Register, not from the Holding Register to the Shift Register. Refer to Section 4.3 for flow-control details.

Note that the logical sense of the modem bits is inverted; i.e., writing a '1' to the MSVR causes the output pin to go to nominal zero volts. Likewise, a low-voltage input will be sensed as a '1'.

4.4.1 Generating Service Requests with Modem Pins

The CL-CD1864 can generate service requests when any one of the input pins changes state. Either or both edges may be detected by setting bits in the two Modem Change Option Registers (MCOR1 and MCOR2). For each pin, the user can individually enable on-to-off or off-to-on transition detection of the inputs. When the CL-CD1864 detects such a transition, it sets the corresponding bit in the Modem Change Register. If the corresponding bit in the channel's Service Request Enable Register is set, the CL-CD1864 will assert its MREQ* Output. The user must clear the Modem Change Register during the service request service routine before writing to the EOSRR.

The CL-CD1864 performs this task by reading the modem input signals and comparing the current value with the value read in the last pass through the outer scanning loop. Because this is the lowest-priority event in the CL-CD1864 scanning loop, changes may not be detected unless they are several hundred microseconds long. Modem Input Pins can be used for purposes such as detecting the closing of a switch. However, the relatively slow speed of response should be taken into account when using Modem Input Pins for this purpose. The CL-CD1864 does not latch the Modem Input Signals.

4.4.2 Using Modem Pins as General-Purpose I/O

Since the modem pins can be directly accessed by the host, they can be used as general-purpose I/O pins if they are not needed for flow control or modem interfacing. Simply read from and write to them as any I/O port.

4.5 Testing the CL-CD1864 — Loopback Tests

The CL-CD1864 performs a basic internal self-test whenever it is reset. This test provides a reasonable degree of confidence that the CL-CD1864 is functioning satisfactorily. There are two additional tests that can be performed by the user to further ensure complete functionality. These two test modes are Local and Remote Loopback. Used together with diagnostic firmware in the host system, the Loopback Modes provide very thorough test coverage of all CL-CD1864 functional blocks: the CL-CD1864 processor, ROM, RAM, bus interface, and random logic.

Local Loopback Mode

Local Loopback Mode is a 'silent' loopback, i.e., data being sent by the transmitter is internally connected to the receiver without reaching the external TxD Pin. Generally, this is advantageous because it allows diagnostic software to operate without causing unwanted effects on any remote device that may be connected to the serial line. During local loopback, the TxD Pin is in the 'mark' (a logic '1') state. If non-silent loopback is also needed, it can be easily implemented externally with an AND'ed gate, or a jumper plug on the serial connector.

Local Loopback Mode is invoked by setting the LLM Bit in the Channel Option Register 2 (COR2), and then issuing a channel command to tell the CL-CD1864 that a COR has changed. When in this mode, the channels TxD Output is internally looped back to the channel's RxD Input. However, all other channel parameters including modem pins continue to work independently and normally. Receiver special character recognition, overflow handling, and other options may be tested by using the Local Loopback Mode and transmitting the appropriate character sequences. As shown in Figure 4–8, the loopback connection is directly from the TxD Signal to the RxD Signal, i.e., all transmit and receive logic is tested except the actual I/O buffers.

Remote Loopback Mode

Remote Loopback Mode is provided to support testing of devices connected to the serial lines. Remote Loopback is invoked by setting the RLM Bit in the Channel Option Register 2 (COR2). When in this mode, the CL-CD1864 will echo the received data to the transmitter for transmission back to the sender. The received data will not be passed on to the host.

When in Remote Loopback Mode, the transmitter continues to run as defined by its own Baud Rate Registers, not the values being used by the receiver. The CL-CD1864 receives a complete character, strips off Start, Stop, and Parity Bits then retransmits it with Parity, Length, and Stop Bit Output options as defined in COR1. Thus, it is possible to change baud rate. However, this can result in receiver overflow. In general, when programming for Remote Loopback Operation, the Transmit Bit Rate should be as fast or slightly faster than the expected receive rate to avoid possible overrun and loss of data. The number of Stop Bits should be set to a one, rather than one-and-a-half, or a two if the application permits it. This ensures that the effective transmit rate is faster than the receive rate.

As shown in Figure 4-8, Remote Loopback is done at the character level and not the bit level. The Receive and Transmit FIFOs are not used in Remote Loopback. Characters are transferred directly from the Receive Holding Register to the Transmit Holding Register. For a diagnostic mode that tests the FIFOs, other logic is needed to be implemented by programming the host system to transfer received characters from the Receive FIFO to the Transmit FIFO. This will permit full testing of FIFO thresholds, service request logic, special character operation, etc.

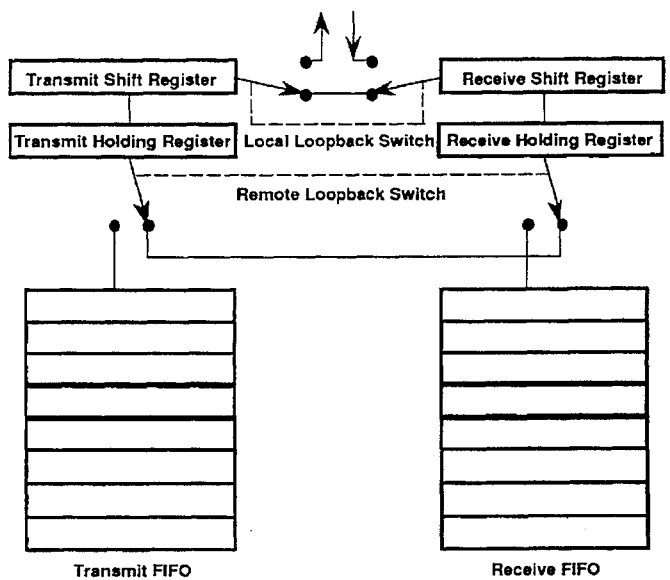

Figure 4-8. Local and Remote Loopback Logic

5. PROGRAMMING

5.1 Types of Registers

The CL-CD1864 contains three types of registers:

- Global Registers — registers not specific to a particular channel
- Indexed Indirect Registers — special registers that are mapped to unique functions
- Channel Registers — registers specific to each channel

*Global Registers*

Global Registers contain information common to all channels, and are used primarily for passing vectors and setting-up service request handling.

*Indexed Indirect Registers*

Indexed Indirect Registers are special registers that point to the FIFOs, or signal the end-of-service request processing. The Indexed Indirect Registers are used primarily to transfer data to and from the serial channel FIFOs. Such transfers can be done only during a service request. When service requests are being serviced by the host, a context-switching technique is used by the CL-CD1864 to reduce the number of cycles needed by the host to transfer data to and from the CL-CD1864. The CL-CD1864 makes available to the host all the registers pertaining to the channel requesting service by mapping them through to the Indexed Indirect Register addresses. This removes the burden on the host of keeping different addresses according to which channel is being accessed.

FIFO information is channeled through either the Receive Data Register, Receive Character Status Register, or through the Transmit Data Register of the Indexed Indirect Register set. Use of the Indexed Indirect Registers is valid only during appropriate service requests; the Transmit Data Register can be accessed during Transmit Service Requests, but not during Receive or Modem Service Requests. The Channel Access Register's (CAR) content is left unchanged from the value last set by the user, but it is not used in a service request context. The CAR can be modified during a service request, but will have no effect on the channel being serviced. During a service request, only access the channel that has caused the service request to be issued (as defined by the Global Service Channel Register).

*Channel Registers*

Channel Registers are used to store parameters specific to each channel, such as bit rates, special character processing, and modem options. When not actively involved in a service request, each channel can be accessed at any time, independently of the other channels. Channel Registers can be accessed by first writing the number of the channel to be accessed into the Channel Access Register. The channel number in the CAR is used by the CL-CD1864 as part of the Channel Register Address.

Individual CL-CD1864 Registers are addressed via a seven-bit address contained in Address Bus Bits A6-A0. Address Bit A6 set to a '1' selects the Global Registers, and when set to a '0' selects the Channel Registers. When the CL-CD1864 is not in a service request context, the active channel is defined in the CAR. The contents of the CAR then become part of the Address Field (along with A0-A5) needed to access the Channel Register file.

*Off-Limit Registers*

The CL-CD1864 communicates to the host via shared access to its on-chip RAM. Of the 128-byte locations in the CL-CD1864 address range, only 41 locations are defined as registers available to the host. The rest are used by the CL-CD1864 for internal variable storage. User should not access these registers as doing so may cause the CL-CD1864 to malfunction.

5.2 Access Duty Cycle

The host access to the CL-CD1864 appears to be a simple static read or write cycle, but the actual access occurs by arbitrating for the local (on-chip) bus and 'stealing' one-bus cycle. This is completely hidden from the user in normal circumstances, and successive accesses to the CL-CD1864 may be done 'back-to-back' with no delay. However, if the host were to repetitively read from (or write to) the CL-CD1864 as fast as possible over many cycles, enough CL-CD1864 internal bus cycles would be 'stolen' that the CL-CD1864 processor might not be able to keep pace with its processing. This situation could only occur if the host was continuously testing a bit while waiting for it to change state. If there is a requirement to do something similar, a delay should be inserted in the host code so that the net-duty cycle of accesses is less than ten percent. This limitation applies only when the CL-CD1864 is sending and receiving data on one or more channels. When initializing or re-configuring a channel, these registers can be written to at a fast pace.

5.3 Accessing FIFOs Versus Other Registers

The FIFO storage array is under the control of the CL-CD1864 at all times. This is necessary to ensure that the FIFO is available for the CL-CD1864 processor to access whenever needed. During normal operation, the CL-CD1864 processor sets the FIFO pointers to the value required to transfer data, regardless of the value placed in the Channel Access Register (CAR) by the user. Therefore, the user cannot access the FIFOs in this manner.

FIFOs may only be accessed in the context of an active Service Request. At this time only the CL-CD1864 processor causes the FIFO pointers to be set to the appropriate value for the channel being serviced. FIFOs are then accessed via the Indirect Indexed Registers.

5.4 Initialization

The CL-CD1864 initialization begins with a mandatory hardware reset applied through the active-low RESET* Input. The System Clock (CLK) Input must be active during the hardware reset, and the reset duration must be at least five clock periods. It is not necessary to synchronize RESET* Input with CLK.

Immediately following the hardware reset, the CL-CD1864 goes through a firmware initialization, reaching an Idle Mode within 500 µs. This may be verified by the host by reading the Global Service Vector Register, and find its contents to be FF Hex. Upon reset, the user may then configure the CL-CD1864 for the desired channel functions.

A software reset may be performed by setting certain bits in the Channel Command Register (CCR). Setting Bits 7 and 0 to a '1' will reset all channels. This is done by forcing the CL-CD1864 processor to jump to the same power-up sequence that it uses upon hardware reset. Whether the reset is caused by hardware or software, the CL-CD1864 does not initialize every register and RAM location to a defined value. The only sure state is that all channels will be inactive, no service requests will be pending, and the Global Service Vector Register will be FF Hex.

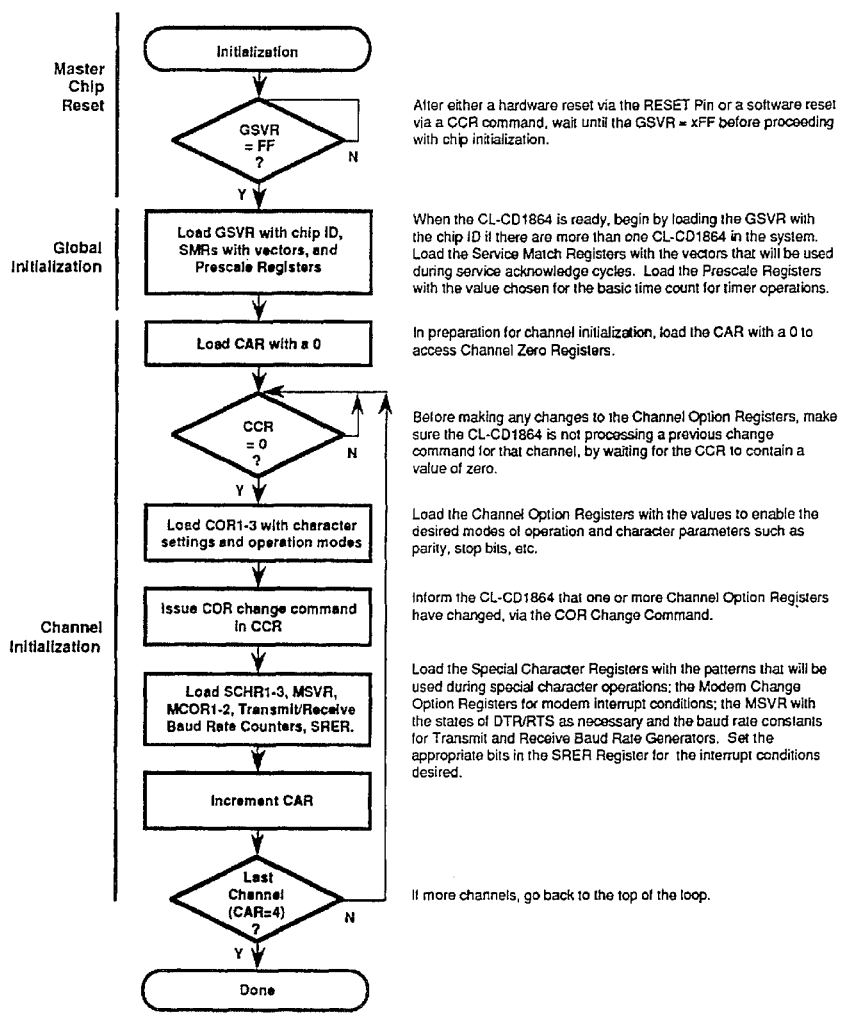
Figure 5-1. Initialization

5.5 Global Initialization

The user must initialize the CL-CD1864 by programming the following Global Registers before starting normal operations on the ports — Prescaler Period Registers, the Global Service Vector Register, and the three Service Match Registers.

5.6 Service Request Initialization

To prepare the CL-CD1864 for service requests the following registers must be initialized — the Global Service Vector Register (GSVR), the three Service Match Registers (MSMR, TSMR, RSMR), and the Global Service Channel Registers (GSCR).

The Global Service Vector Register consists of five bits of user-supplied information, and three bits of CL-CD1864-supplied service request group information. This concatenated vector supplied by the CL-CD1864 during a service-request-acknowledgment cycle will direct the host to the proper service request subroutine. The host writes the five MSBs into the GSVR during initialization. These five bits may be a chip ID number, or a code that is appropriate for service request handling. In multiple-cascaded-CL-CD1864 applications, these five bits must have a unique value for each CL-CD1864, to identify which CL-CD1864 is responding to a service request cycle.

Three registers in the Global Register set — Modem Service Match Register, Transmit Service Match Register, and Receive Service Match Register, store the service request values for the three types of service requests. These levels are used to match with the value that appears on the address bus during a service-request-acknowledgment cycle. Since these levels are system dependent, the user must initialize these registers with the proper values.

The following three registers are used to provide the channel number of the channel requesting service — GSCR1, GSCR2, and GSCR3. Reading any of these registers causes the CL-CD1864 to mask in three bits specifying the channel number of the currently active channel. Normally these registers are read by the host when it is handling a service request. In this case, the three bits will be the number of the channel requesting service. If any of the three GSCR Registers are read when the CL-CD1864 is not in a service request context, the three bits will be the current value in the CAR.

Bits 4:2 are masked into the contents of this register by the CL-CD1864 when it is read by the host. The actual contents of the register are not modified.

These three registers are provided as a convenience to the user. It most applications the user will only use one of these locations, and set the register to an arbitrary value. However, in some cases it may be useful to be able to record information about the state of the CL-CD1864 (or the software driving it) that is associated with each of the three service request types. In this case, the user may store desired information in the unused bits. When entering a service routine, the software can check these bits (a 'sub-vector') to read recorded states.

5.7 Prescaler

The Prescaler Period Register (PPR) determines the fundamental 'tick' rate for all CL-CD1864 on-chip timers, the Receiver Data Time-out and Transmitter Real-time Delay Timers. The PPR counts Clock (CLK) periods, and the minimum PPR value used must guarantee a 'tick' length of at least 1.0 milliseconds. This requires a minimum value of 2666h for 9.830-MHz CLK, or 2710h for 10-MHz CLK. When operating at lower clock speeds than this, a value of at least 2666h must be used. As shown in Figure 2–2, processing timer events is in the outer (lowest priority) loop of the CL-CD1864 firmware. A timer tick that is too short may result in two ticks occurring within one pass through the outer loop; this would result in missing one tick. This is not fatal, but would result in inaccurate timings.

5.8 Channel Initialization and Changes

Prior to enabling the individual channels, program the Channel Registers with desired channel options and parameters such as character lengths, parity type, Receive FIFO thresholds, modem signal detection levels, bit rates, etc. When ready to begin, enable service requests.

Channel initialization is accomplished by first writing to the CAR Register with the number of the channel to be programmed. This channel number will automatically become part of the address for subsequent channel register programming. The host can use the same set of register addresses for all channels, thus eliminating the need to calculate addresses.

Certain channel options are controlled by the three Channel Option Registers. All changes to the Channel Option Registers must be accompanied by setting the appropriate Channel Option Register 'changed' Bits in the Channel Command Register (CCR). The CL-CD1864 processor regularly samples the Channel Command Register for any value that is not a '0'. If the CCR is not a '0', the CL-CD1864 decodes the command or commands, acts on them and clears the CCR to signify acceptance of the commands. New commands must not be issued until any existing commands have been completed.

5.9 Transmitting Data

When transmitting data, a service request is received when the Transmit FIFO is empty. The number of the channel requesting service, (i.e., the one with the empty FIFO) is available from the GSCR. If there is more data to be sent, transfer up to eight bytes to the FIFO. If no data is available, disable the channel. The easiest way to accomplish this is by clearing the appropriate bit in the Service Request Enable Register (SRER). When new data is available, re-enable the channel via the SRER, and a new service request for transmit data is received. At that time, transfer the data to the FIFO. Channels can be enabled or disabled by giving enable and disable commands via the Channel Command Register (CCR), but it is a slower process.

In some cases, it is necessary to know when a channel has sent the last bit of the last character rather than an empty FIFO. One example would be when changing bit rates. Two bits in the Service Request Enable Register (SRER), TxMpty and TxRdy, control the exact conditions for generating a service request. TxRdy indicates when the FIFO is empty, and TxMpty indicates when the last bit has been sent. It is acceptable to have both bits set. If they are set, the FIFO Empty Service Request will always occur first. If there is no more data to be sent, the Transmitter Empty Service Request will be received later. At this time, a channel can be re-configured. Data can not be transferred to any other channel's FIFO than the one that requested it.

5.10 Receiving Data

When receiving data, a service request will be sent (for Good Data) when either the number of received bytes meets the threshold level, or the Receive Time-out expires, or there is Good Data followed by a Receive Exception Condition (the CL-CD1864 must transfer all the Good Data before giving the Exception). In either case, the service-request routine reads the channel number requesting service (from GSCR), and the number of bytes available (which can be more, the same, or less than the number set as the threshold) from the Receive Data Count Register (RDCR), and proceed to transfer that many bytes, if possible.

It is not necessary to transfer as many bytes as are available or any bytes at all. If the host's buffer is nearly or completely full, the host can accept only those bytes it has room for, disable Receive Service Requests, exit the Service Request Routine, process the buffer, enable Receive Service Requests, and wait for the next service request. If no bytes are transferred during a Receive Service Request, the CL-CD1864 will immediately re-request service because the internal conditions that caused the request to be issued are still true. The host may either disable service requests, or suspend host service request processing; however, both of these options should be implemented carefully as suspending service requests may result in an overflow condition if the suspension lasts too long.

6. DETAILED REGISTER DESCRIPTIONS

6.1 Register Map Quick Reference

| Name | Description | Access | Binary Address | Hex Address (8 bit)[1] | Hex Address (Intel)[2] | Hex Address (Motorola)[3] | Page |
|---|---|---|---|---|---|---|---|
| GLOBAL REGISTERS | | | | | | | |
| GFRCR | Global Firmware Revision Code Register | R/W | 110 1011 | $6B | $D6 | $D7 | 77 |
| SRCR | Service Request Configuration Register | R/W | 110 0110 | $66 | $CC | $CD | 77 |
| PPRH | Prescaler Period Register High | R/W | 111 0000 | $70 | $E0 | $E1 | 80 |
| PPRL | Prescaler Period Register Low | R/W | 111 0001 | $71 | $E2 | $E3 | 80 |
| MSMR | Modem Service Match Register | R/W | 110 0001 | $61 | $C2 | $C3 | 80 |
| TSMR | Transmit Service Match Register | R/W | 110 0010 | $62 | $C4 | $C5 | 80 |
| RSMR | Receive Service Match Register | R/W | 110 0011 | $63 | $C6 | $C7 | 81 |
| GSVR | Global Service Vector Register | R/W | 100 0000 | $40 | $80 | $81 | 82 |
| SRSR | Service Request Status Register | R | 110 0101 | $65 | $CA | $CB | 82 |
| MRAR | Modem Request Acknowledge Register | R | 111 0101 | $75 | $EA | $EB | 83 |
| TRAR | Transmit Request Acknowledge Register | R | 111 0110 | $76 | $EC | $ED | 83 |
| RRAR | Receive Request Acknowledge Register | R | 111 0111 | $77 | $EE | $EF | 83 |
| GSCR | Global Service Channel Register 1 | R/W | 100 0001 | $41 | $82 | $83 | 83 |
| GSCR | Global Service Channel Register 2 | R/W | 100 0010 | $42 | $84 | $85 | 83 |
| GSCR | Global Service Channel Register 3 | R/W | 100 0011 | $43 | $86 | $87 | 83 |
| CAR | Channel Access Register | R/W | 110 0100 | $64 | $C8 | $C9 | 84 |
| INDEXED INDIRECT REGISTERS | | | | | | | |
| RDCR | Receive Data Count Register | R | 000 0111 | $07 | $0E | $0F | 85 |
| RDR | Receiver Data Register | R | 111 1000 | $78 | $F0 | $F1 | 86 |
| RCSR | Receiver Character Status Register | R | 111 1010 | $7A | $F4 | $F5 | 86 |
| TDR | Transmit Data Register | W | 111 1011 | $7B | $F6 | $F7 | 87 |
| EOSRR | End of Service Request Register | W | 111 1111 | $7F | $FE | $FF | 87 |
| CHANNEL REGISTERS | | | | | | | |
| SRER | Service Request Enable Register | R/W | 000 0010 | $02 | $04 | $05 | 88 |
| CCR | Channel Command Register | R/W | 000 0001 | $01 | $02 | $03 | 89 |
| COR1 | Channel Option Register 1 | R/W | 000 0011 | $03 | $06 | $07 | 92 |
| COR2 | Channel Option Register 2 | R/W | 000 0100 | $04 | $08 | $09 | 93 |
| COR3 | Channel Option Register 3 | R/W | 000 0101 | $05 | $0A | $0B | 94 |
| CCSR | Channel Control Status Register | R | 000 0110 | $06 | $0C | $0D | 95 |
| RBR | Receiver Bit Register | R | 011 0011 | $33 | $66 | $67 | 96 |
| RTPR | Receive Time-out Period Register | R/W | 001 1000 | $18 | $30 | $31 | 96 |
| RBPRH | Receive Bit Rate Period Register High | R/W | 011 0001 | $31 | $62 | $63 | 96 |
| RBPRL | Receive Bit Rate Period Register Low | R/W | 011 0010 | $32 | $64 | $65 | 96 |
| TBPRH | Transmit Bit Rate Period Register High | R/W | 011 1001 | $39 | $72 | $73 | 97 |
| TBPRL | Transmit Bit Rate Period Register Low | R/W | 011 1010 | $3A | $74 | $75 | 97 |

6.1 Register Map Quick Reference (cont.)

| Name | Description | Access | Binary Address | Hex Address (8 bit)[1] | Hex Address (Intel)[2] | Hex Address (Motorola)[3] | Page |
|---|---|---|---|---|---|---|---|
| CHANNEL REGISTERS (cont.) | | | | | | | |
| SCHR1 | Special Character Register 1 | R/W | 000 1001 | $09 | $12 | $13 | 97 |
| SCHR2 | Special Character Register 2 | R/W | 000 1010 | $0A | $14 | $15 | 97 |
| SCHR3 | Special Character Register 3 | R/W | 000 1011 | $0B | $16 | $17 | 98 |
| SCHR4 | Special Character Register 4 | R/W | 000 1100 | $0C | $18 | $19 | 98 |
| MCR | Modem Change Register | R/W | 001 0010 | $12 | $24 | $25 | 99 |
| MCOR1 | Modem Change Option Register 1 | R/W | 001 0000 | $10 | $20 | $21 | 100 |
| MCOR2 | Modem Change Option Register 2 | R/W | 001 0001 | $11 | $22 | $23 | 101 |
| MSVR | Modem Signal Value Register | R/W | 010 1000 | $28 | $50 | $51 | 101 |
| MSVRTS | Modem Signal Value – Request To Send | W | 010 1001 | $29 | $52 | $53 | 102 |
| MSVDTR | Modem Signal Value – Data Terminal Ready | W | 010 1010 | $2A | $54 | $55 | 102 |

NOTES:

1) Hex Address for 8-bit processor.

2) Address for Intel-style processor, see below.

3) Address for Motorola-style processor, see below.

In the above register map, the binary addresses are shown relative to the CL-CD1864 address lines. In 16- and 32-bit systems, it is a common practice to connect 8-bit peripherals to only one byte lane. In 16-bit systems, the CL-CD1864 appears at every other address, i.e., A0 in the CL-CD1864 is connected to A1 in the host. In 32-bit systems, the CL-CD1864 appears at every fourth address, i.e., A0 in the CL-CD1864 is connected to A2 in the host. In both of these cases, the addresses used by a programmer will be different than what is shown.

For instance, in a 16-bit Motorola 68000-based system (or other 'big-endian' processors), the CL-CD1864 is placed on data lines D0-D7, which are at odd addresses in the Motorola manner of addressing. The A0 in the CL-CD1864 is connected to A1 of the 68000. Thus, CL-CD1864 address $40 becomes $81 to a programmer. It is 'left-shifted' one bit, and A0 must be '1' for low-byte (D0-D7) accesses.

In a 16-bit Intel system (or other 'little-endian' processors), the CL-CD1864 is again placed on data lines D0-D7, but these are at even addresses. The A0 in CL-CD1864 is connected to the A1 in the host, but the host's A0 must be a '0' to access data lines D0-D7.

Many 32-bit processors have internal logic to 'steer' the data to the correct pins regardless of address value. However, if the processor employed does not, a scheme similar to the one described for 16-bit machines can be used, except that the CL-CD1864 addresses are shifted two bits instead of one.

Even though not all of the CL-CD1864 registers are intended to be read/write, there is no hardware mechanism to prevent the user from writing to them. The registers should, in some cases, not be written to by the host. See the individual register descriptions for details.

6.2 Global Registers

Global Registers provide a function common to all channels. There are two groups of Global Registers: to control the configuration of the CL-CD1864, and to control service requests/interrupts.

6.2.1 Miscellaneous Registers

Global Firmware Revision Code Register (GFRCR) ($6B) — Read/Write

| Firmware Revision Code |
| --- |

This register is initialized by the firmware during the power-on reset initialization routine to contain the current firmware version code of the CL-CD1864. Revision 'A' CL-CD180s set this register to $80, and Revision 'B' CL-CD180s set it to $81. Revision 'A' CL-CD1864 devices set it to $82, and future revisions will increment this value.

This register is a RAM location and may be modified by the user. The CL-CD1864 sets it to the defined value only when a hardware or software reset is performed, and otherwise ignores the contents. This value can be modified to indicate the configuration status of the CL-CD1864, or indicate any other requirement.

6.2.2 Configuration Registers

Service Request Configuration Register (SRCR) ($66) — Read/Write

| PkgTyp | RegAckEn | DaisyEn | GlobPri | UnFair | Reserved | AutoPri | PriSel |
| --- | --- | --- | --- | --- | --- | --- | --- |

This register configures the CL-CD1864 depending on the method chosen for handling service requests. In addition to the 'traditional' interrupt-based host interface, writing the appropriate bits in this register provides for software- rather than hardware-based service request acknowledgments, fixes service request priorities in either of two ways, and controls Fair Share Interrupts operation. This register preserves compatibility with existing CL-CD180 software. For this reason, this register defaults to all zeroes and must be enabled for each new feature as desired.

RegAckEn and DaisyEn Bits are related to each other, and perform service-request acknowledgments by accessing registers within the CL-CD1864 instead of asserting hardware signals.

Service requests are prioritized by four other bits. AutoPri enables the priority scheme; PriSel, GlobPri, and UnFair determine the specific priority to be used.

| Bit | Description |
|---|---|
| PkgTyp | This read-only bit indicates the CL-CD1864 package type. This bit is a '1' for the 100-pin QFP. |
| RegAckEn | Enables register-based service-request acknowledgments. If this bit is a '0', register-based acknowledgments are not accepted. In this case, the results of a read of any of the service-acknowledgment registers are undefined. This is the default state of RegAckEn, and ensures compatibility with earlier versions of the CL-CD180.<br><br>When RegAckEn is enabled, register-based acknowledges allow the user's software to acknowledge a service request by reading from a register, rather than by driving the external ACKIN* Signal. This is convenient in applications where interrupts are not supported, or where polling is preferred. Setting this bit does not disable the function of the ACKIN* Signal. |
| DaisyEn | Enables daisy-chaining of register-based service acknowledgments. When DaisyEn is a '1', a CL-CD1864 being addressed with a register-based service acknowledgment (a read takes place from a register-acknowledgment address) for which it has a pending request, will place the contents of the Global Interrupt Vector Register modified by the service type on the data bus.<br><br>When DaisyEn is a '1', a CL-CD1864 being addressed with a register-based service acknowledgment for which it does not have a pending service request, asserts ACKOUT* to pass the acknowledgment down the daisy chain. The next CL-CD1864 in the chain will see the acknowledgment as an ACKIN* acknowledgment. The Service Request Acknowledge Register addresses must be placed in the corresponding Service Match Registers (RSMR, TSMR, and MSMR) as part of the user setup for daisy-chaining of register-based service acknowledgments.<br><br>If daisy-chaining of register-based service acknowledgments is not used, the Service Match Registers may be programmed with any address codes that the user finds convenient for use with the 'normal' ACKIN* service-acknowledge mechanism.<br><br>If DaisyEn is a '0' and a CL-CD1864 is addressed with a register-based service acknowledgment for which it does not have a pending service request, it will respond by providing an interrupt vector with a modification code of '000'. The addressed CL-CD1864 treats this as an interrupt acknowledge cycle, but with passing inhibited it must 'take' the acknowledge with an ACK level of '00' (none of the interrupt types).<br><br>RegAckEn must be a '1' to enable register-based service acknowledgments. DaisyEn has no effect on daisy-chain operation of the regular ACKIN-ACKOUT chain. |

| Bit | Description *(cont.)* |
|---|---|
| GlobPri | When AutoPri is used, GlobPri set to a '1' means that the CL-CD1864 will prioritize across multiple CL-CD1864s sharing IREQ lines. GlobPri is a '0' means to accept the acknowledge for the highest priority on-chip interrupt. In both cases, automatic prioritizing is only done on type 1 (normally the modem signal change type) interrupt acknowledgments through the ACKIN mechanism, or the register-based acknowledge mechanism.<br><br>It is possible to use the CL-CD1864 with the three IREQ lines wire-OR'ed together. In this configuration, with any interrupt request asserted, the global values of all requests will appear asserted. GlobPri should be a '0' to force prioritization among the interrupt sources on-chip. When no on-chip interrupts are pending, the acknowledgment will be subject to daisy-chaining. See DaisyEn description. |
| UnFair | Fairness Override Bit. If UnFair is a '0', normal Fair Share Interrupt control is performed. If UnFair is a '1', the fair bits are all forced to a '1', disabling the Fair Share mechanism. This is useful when the AutoPriority Option is used, and the different IREQ lines are wire-OR'ed together. |
| Reserved | Must be a '0'. |
| AutoPri | When set, indicates that the CL-CD1864 should prioritize service requests in the manner selected by the PriSel Bit. In conjunction with the GlobPri Bit, either local (within the chip) or global (across daisy-chained chips) prioritization is done. With AutoPri set, auto-prioritization is performed only when a type 1 (modem) interrupt acknowledgment is recognized. Acknowledgments of type 2 (transmit) and 3 (receive) interrupts continue to be unique and specific even with AutoPri set. This offers a form of local override to Auto-prioritization for Transmit or Receive Service Request when continuing a second-priority service routine. If not set, the user must indicate the service request being acknowledged by the choice of service request acknowledge register.<br><br>AutoPri x GlobPri => look at IREQin to prioritize globally.<br>AutoPri x GlobPri* => look at IREQ to prioritize locally. |
| PriSel | Prioritized interrupt order option. If AutoPri is set, PriSel selects the highest-priority service request. If PriSel is a '0', receive requests have the highest priority. If PriSel is a '1', transmit requests have the highest priority. Modem signal change request priority is fixed at the lowest priority. |

Prescaler Period Register – High (PPRH) ($70), Low (PPRL) ($71) — Read/Write

| Binary Value |
|---|

These two registers provide the initialization value for the Timer Prescaler that is clocked by the system clock. This establishes the clock for the various on-chip timers.

The value loaded into these registers must establish a clock period of at least 1.0 msec. For a clock speed of 10 MHz, the value must be 10,000 (decimal) or larger. The values in these registers will be programmed to be FF (Hex) automatically upon a hardware reset.

Modem Service Match Register (MSMR) ($61) — Read/Write

| 1 | Binary Value |
|---|---|

This register must contain the value for Modem Signal Change Service Requests that will be presented on the Address Bus A0-A6 by the host to indicate the type of service request being acknowledged when ACKIN* is asserted. This register along with the other two Match Registers, is compared to the value on the Address Bus during acknowledgment cycles so that the CL-CD1864 can determine the service request being acknowledged by the host.

Bit 7 must be programmed to a '1'. The CL-CD1864 compares all eight bits internally, but there are only seven address lines. Bits 6:0 of the register are compared to A6:A0 of the Address Bus. Bit 7 of the register is compared with a logic '1'.

Within any one CL-CD1864, the three Match Registers must have unique values. In multiple CL-CD1864 designs where service acknowledgments are cascaded, all Match Registers of the same type (e.g., Modem) must have the same value.

In designs using register-based service acknowledgments (RRAR, TRAR, and MRAR), the addresses of these registers must be placed in the equivalent Match Register, so that MSMR contains $75.

Transmit Service Match Register (TSMR) ($62) — Read/Write

| 1 | Binary Value |
|---|---|

This register must contain the value for Transmit Data Service Requests that will be presented on the Address Bus A0-A6 by the host to indicate the type of service request being acknowledged when ACKIN* is asserted. This register, along with the other two Match Registers, is compared to the value on the Address Bus during acknowledgment cycles so that the CL-CD1864 can determine the service request being acknowledged by the host.

Bit 7 must be programmed to a '1'. The CL-CD1864 compares all eight bits internally, but there are only seven address lines. Bits 6:0 of the register are compared to A6:A0 of the Address Bus. Bit 7 of the register is compared with a logic '1'.

Within any one CL-CD1864, the three Match Registers must have unique values. In multiple-CL-CD1864 designs where service acknowledgments are cascaded, all Match Registers of the same type (e.g., Transmit) must have the same value.

In designs using register-based service acknowledgments (RRAR, TRAR, and MRAR), the addresses of these registers must be placed in the equivalent Match Register, so that TSMR contains $76.

Receive Service Match Register (RSMR) ($63) — Read/Write

| 1 | Binary Value |
|---|---|

This register must contain the value for Receive Data Service Requests that will be presented on the Address Bus A0-A6 by the host to indicate the type of service request being acknowledged when ACKIN* is asserted. This register, along with the other two Match Registers, is compared to the value on the Address Bus during acknowledgment cycles so that the CL-CD1864 can determine the service request being acknowledged by the host.

Bit 7 must be programmed to a '1'. The CL-CD1864 compares all eight bits internally, but there are only seven address lines. Bits 6:0 of the register are compared to A6:A0 of the Address Bus. Bit 7 of the register is compared with a logic '1'.

Within any one CL-CD1864, the three Match Registers must have unique values. In multiple-CL-CD1864 designs where service acknowledgments are cascaded, all Match Registers of the same type (e.g., Receive) must have the same value.

In designs using register-based service acknowledgments (RRAR, TRAR, and MRAR), the addresses of these registers must be placed in the equivalent Match Register, so that RSMR contains $77.

Global Service Vector Register (GSVR) ($40) — Read/Write

| Binary Value | IT2 | IT1 | IT0 |
|---|---|---|---|

| Bit | Description |
|---|---|
| Bits 7:3 | These bits are user-defined. However, in a multiple-chip design, these five bits must have a unique value in each CL-CD1864, to identify which CL-CD1864 is returning a vector during service acknowledgments. When writing to this register, write eight bits at once; the CL-CD1864 will modify the low-three bits automatically. Note that if this register is read in a normal manner, the original eight bits will be read and the modified bits from the last acknowledgment cycle will not be preserved. |
| Bits 2:0 | These three bits indicate the group/type of service request occurring. These bit are supplied by the CL-CD1864 during an acknowledgment cycle.<br>IT2 IT1 IT0 Value Group/Type<br>0 0 0 0 No Request Pending *<br>0 0 1 1 Modem Signal Change Service Request<br>0 1 0 2 Transmit Data Service Request<br>0 1 1 3 Receive Good Data Service Request<br>1 0 0 4 Reserved<br>1 0 1 5 Reserved<br>1 1 0 6 Reserved<br>1 1 1 7 Receive Exception Service Request<br>* This code is returned by the CL-CD1864 only when RegAckEn is set, and DaisyEn is not set. In this condition, the CL-CD1864 must provide a vector when acknowledged. If the CL-CD1864 receives an acknowledgment for which it does not have a request pending, it will return '000'. |

6.2.3 Service Request/Interrupt Control Registers

Service Request Status Register (SRSR) ($65) — Read Only

| ilvl [1] | ilvl [0] | IREQ1ext | IREQ3int | IREQ2ext | IREQ2int | IREQ1ext | IREQ1int |
|---|---|---|---|---|---|---|---|

The i-level Bits, ilvl[1] and ilvl[0] are the current context code from the service request context stack, and are encoded as follows:

ilvl[1:0]   Context
00          Not in a service request context
11          CL-CD1864 is in a Receive Service Request context
10          CL-CD1864 is in a Transmit Service Request context
01          CL-CD1864 is in a Modem Service Request context An accepted interrupt acknowledge cycle pushes a new context onto the stack.

NOTE: The IREQ Status Bits are positive true, and the IREQ* Pins are negative true. The '...int' (internal) values are local to the chip being read, and the '...ext' (external) values are present externally on the pin, i.e., the result of the wire-OR'ed function.

Modem Request Acknowledge Register (MRAR) ($75) — Read Only

Transmit Request Acknowledge Register (TRAR) ($76) — Read Only

Receive Request Acknowledge Register (RRAR) ($77) — Read Only

| Modified Interrupt Vector provided on read |
|---|

The Service Request Acknowledge Registers are read-only registers that return an appropriate interrupt vector when read. Reading one of these registers has the effect of a service acknowledgment cycle in the CL-CD1864 (not necessarily the one addressed; it may be one further down the daisy chain). The vector supplied on the data bus during the cycle is described under the Global Service Vector Register description. RegAckEn must be set, for these registers to operate properly.

Global Service Channel Registers 1, 2, 3 (GSCR) ($41-$43) — Read/Write

| Binary Value | C2 | C1 | C0 | Binary Value |
|---|---|---|---|---|

There are three registers used to provide the channel number of the channel requesting service. Reading any of these registers will cause the CL-CD1864 to 'mask in' three bits, specifying the channel number of the currently active channel. Normally these registers are read by the host when it is handling a service request. In this case, the three bits will be the number of the channel requesting service. If any of the three GSCR Registers are read when the CL-CD1864 is not in a service request context, the three bits will be the current value in the CAR. Bits 4:2 are masked into the contents of this register by the CL-CD1864 when it is read by the host. The actual contents of the register are not modified.

These three registers are provided as a convenience to the user. In most applications, the user will only use one of these locations, and will set the register to an arbitrary value. All types of service routines would use this register. However, in some cases it may be useful to be able to record information about the state of the CL-CD1864 (or the software driving it), that is associated with each of the three service request types. In this case, the user may associate an individual register with each level of service request, and store whatever information is desired in the unused bits. When entering a service routine, the software can check these bits (a sub-vector) to read recorded states.

| Bit | Description |
|---|---|
| Bits 7:5 | User-defined. Set to a specific value by the user. |
| Bits 4:2 | Defines the service requesting channel number.<br>C2　C1　C0　Channel Number<br>0　　0　　0　　Channel 0<br>0　　0　　1　　Channel 1<br>0　　1　　0　　Channel 2<br>0　　1　　1　　Channel 3<br>1　　0　　0　　Channel 4<br>1　　0　　1　　Channel 5<br>1　　1　　0　　Channel 6<br>1　　1　　1　　Channel 7 |
| Bits 1:0 | User-defined. Set to a specific value by the user. |

Channel Access Register (CAR) ($64) — Read/Write

| Reserved | Reserved | Reserved | Reserved | A7 (0) | C2 | C1 | C0 |
|----------|----------|----------|----------|--------|----|----|----|

This register contains the channel number used for channel-oriented host read or write operations when the host is not in a service request service routine. When the CL-CD1864 and the host are in a service request routine, the CL-CD1864 supplies the service-requesting channel number via the Global Service Channel Register. The Channel Access Register contents are not used during service request. The host service request routine is restricted to accessing only the register set of the service-requesting channel, and the Global Registers.

The Channel Access Register is used by the host when the host is setting up or modifying the configuration of the channel, and to issue certain channel-specific commands such as sending a flow-control character.

| Bit | Description |
|-----|-------------|
| Bits 7:4 | Reserved, must be a '0'. |
| Bit 3 | Internally to the CL-CD1864, this is Address Bit 7. This bit completes the external to internal CL-CD1864 register address mapping, but is only to be used for test purposes. In normal operation, this bit should always be a '0'. |
| Bits 2:0 | Channel number<br>C2  C1  C0  Channel Number<br>0    0    0    Channel 0<br>0    0    1    Channel 1<br>0    1    0    Channel 2<br>0    1    1    Channel 3<br>1    0    0    Channel 4<br>1    0    1    Channel 5<br>1    1    0    Channel 6<br>1    1    1    Channel 7 |

6.3 Indexed Indirect Registers

Certain registers are specially designed to facilitate service-request handling. These registers do not exist as distinct registers, and can be thought of as pointers. These registers provide functions that are valid only during service-request service routines, and they must not be accessed at other times.

Three of the registers are actually pointers to the Transmit and Receive FIFOs, i.e., when referenced they cause the appropriate FIFO to be accessed. These registers are: Receive Data Register, Receive Character Status Register, and Transmit Data Register.

The CL-CD1864 maintains all channel-specific information. During data transfer between the host and the CL-CD1864, the CL-CD1864 uses a context-switching technique to switch the proper channel-specific information into the Global Registers for use by the host. This reduces the processing burden on the host by eliminating the need to calculate address offsets.

6.3.1 Receive Data Count Register (RDCR) ($07) — Read Only

| 0 | 0 | 0 | 0 | CT3 | CT2 | CT1 | CT0 |
|---|---|---|---|-----|-----|-----|-----|

| Bit | Description |
|---|---|
| Bits 7:4 | Reserved, must be a '0'. |
| Bits 3:0 | Specifies the number of Good Data bytes for transfer from the Receive FIFO at the time of service request. This may be larger or smaller than the threshold level set by the user. This register reflects the actual amount of data available, which can be greater than the threshold level if service-request response is slow, or less than the threshold if some other event (such as an error condition) has caused the Receive Good Data Interrupt. This register need only be read when receiving Good Data; by default all exceptions are one character, and the value in this register during a Receive Exception is not defined or meaningful.<br><br>CT3 CT2 CT1 CT0   Number of good bytes<br>0    0    0    0     will not occur<br>0    0    0    1     1<br>0    0    1    0     2<br>0    0    1    1     3<br>0    1    0    0     4<br>0    1    0    1     5<br>0    1    1    0     6<br>0    1    1    1     7<br>1    0    0    0     8<br><br>1001     to     1111     will not occur |

6.3.2 Receive Data Register (RDR) ($78) — Read Only

| D7 | D6 | D5 | D4 | D3 | D2 | D1 | D0 |
|----|----|----|----|----|----|----|----|

This register accesses the Receive Data FIFO for the channel, and is used by all channels to transfer Receive FIFO data to the host. Successive reads transfer bytes from the FIFO to the host. Reading this register increments an internal pointer to the Data and Status FIFOs. During service-request routines for Good Data, this is the only register that must be read. During service-request routines for Receive Exception, the Receive Status Register must be read first, then this register may be read. If both the RCSR and this register are to be read, the RCSR must be read first because reading this register causes the FIFOs to 'pop'.

Any attempt to write to this register will cause unpredictable results.

6.3.3 Receive Character Status Register (RCSR) ($7A) — Read Only

| Time-out | SC Det2 | SC Det1 | SC Det0 | Break | PE | FE | OE |
|----------|---------|---------|---------|-------|----|----|----|

This register accesses the status information for the current receive character.

| Bit | Description |
|-----|-------------|
| Bit 7 | Time-out: Indicates that the Receive FIFO is empty, and no data has been received within the receive time-out period. There is no data character associated with this status and no other status bits are valid if the Time-out Bit is set. |
| Bits 6:4 | Special Character Detect (SCD0-2):<br>SCD2 SCD1 SCD0 Status<br>0 0 0 None detected<br>0 0 1 Special Character 1 or Special Character 1 and 3 sequence matched (only if Special Character 1 and 3 sequence is enabled).<br>0 1 0 Special Character 2 or Special Character 2 and 4 sequence matched (only if Special Character 1 and 3 sequence is enabled).<br>0 1 1 Special Character 3 (only if Special Character 1 and 3 sequence is not enabled).<br>1 0 0 Special Character 4 (only if Special Character 2 and 4 sequence is not enabled).<br>NOTE: No special-character match is performed if any type of error occurs. The second character of a two-character sequence cannot cause a receiver overrun. |
| Bit 3 | Break: Indicates that a break has been detected. |
| Bit 2 | Parity Error: Indicates that a parity error has been detected. |
| Bit 1 | Framing Error: Indicates that a bad Stop Bit has been detected. |

| Bit | Description *(cont.)* |
|---|---|
| Bit 0 | Overrun Error: Indicates that new data has arrived, but the CL-CD1864 FIFO and Holding Registers are full. The new data is lost and the overrun indication is flagged on the last character received before the overrun occurred.<br><br>Multiple errors in one byte are possible because the CL-CD1864 evaluates the character bit-by-bit as it receives it. For example, a parity error will be detected and flagged before a framing error. If a character is received with every bit equal to a '0', it is marked as a linebreak. If some bits are a '1', but the Stop Bit is 'missing' a '0', it is marked as a framing error. If odd parity is set and the bits received are all zeroes, it is marked as both a break character and a parity error. In addition to any other bits, the Overrun Bit will be set if an overrun has occurred. |

Any attempt to write to this register will cause unpredictable results.

6.3.4 Transmit Data Register (TDR) ($7B) — Write Only

| D7 | D6 | D5 | D4 | D3 | D2 | D1 | D0 |
|---|---|---|---|---|---|---|---|

When servicing a Transmit Data Service Request, the Transmit Data Register accesses the Transmit FIFO of the service-requesting channel. Data is written to the Transmit Data Register by the host; the CL-CD1864 automatic FIFO pointer mechanism will place the data into the service-requesting channel's Transmit Character FIFO. Up to eight bytes of data may be written into the TDR during Transmit Data Service Request.

Any attempt to read from this register will cause unpredictable results.

6.3.5 End of Service Routine Register (EOSRR) ($7F) — Write Only

| Irrelevant Value |
|---|

This is a dummy register, and must be written to by the host's service request routine to signal to the CL-CD1864 that the current service-request service is concluded. This must be the last access to the CL-CD1864 during a service-request routine. Writing to this register will generate an internal End-of-Service Signal, which 'pops' the CL-CD1864's service-request-context stack, allowing the CL-CD1864 to resume normal processing and also service other channels. Service-request contexts may be nested, as explained in Section 2.4, i.e., one can respond to and service a higher-priority event while in the middle of a lower-priority service request routine (nesting subroutine calls within other subroutines).

Any attempt to read from this register will cause unpredictable results.

6.4 Channel Registers

There are eight sets of Channel Registers, but only one set is available at one given time. This offers the software-simplifying advantage that a given register is at the same address regardless of the channel number. To access a given channel's registers, first point to them by writing the channel number to the Channel Access Register.

6.4.1 Service Request Enable Register (SRER) ($02) — Read/Write

| DSR | CD | CTS | RxD | RxSC | TxRdy | TxMpty | NNDT |
|-----|----|----|-----|------|-------|--------|------|

A '1' in each bit position enables service request generation for the associated cause.

| Bit | Description |
|-----|-------------|
| Bit 7 | Data-Set-Ready (DSR) Service Request: When enabled, generates a Modem-Change Service Request on the selected level changes of the DSR input. |
| Bit 6 | Carrier Detect (CD) Service Request: When enabled, generates a Modem-Change Service Request on the selected level changes of the CD input. |
| Bit 5 | Clear-To-Send (CTS) Service Request: When enabled, generates a Modem-Change Service Request on the selected level changes of the CTS input. |
| Bit 4 | Receive Data Service Request: When enabled, the Receive Data Service Request is generated for receive data and Receive Exceptions. |
| Bit 3 | Receive Special Character (RxSC) Service Request: When enabled, the Receive Data Exception Service Request is generated when a received character matches one of the four user-defined special characters. When disabled, Receive Exceptions will be generated only for error conditions and time-outs. If flow-control transparency is set, flow-control characters will be stripped, and no Receive Special Character Exceptions will occur. |
| Bit 2 | Transmit Ready (TxRdy) Service Request: When enabled, the transmitter will generate a service request when the Transmit FIFO becomes empty. Set this bit when first beginning transmission on a channel, and before attempting to write data to the Transmit FIFO. Enabling the service request will cause an immediate Transmit Service Request, allowing it to write data into the Transmit FIFO in the usual manner. This bit may be set and cleared as needed to regulate the assertion of Transmit Data Service Requests on each channel. This technique is preferred over disabling the transmitter. |
| Bit 1 | Transmitter Empty (TxMpty) Service Request: When enabled, a service request is generated when the Transmit FIFO, the Transmit Holding Register, and the Transmit Shift Register are all empty. This mode is provided to allow the host to determine when all bits have been sent, and it is safe to alter a channel's configuration. |
| Bit 0 | No New Data Time-out (NNDT) Service Request: When enabled, a Receive Exception Service Request is generated after the completion of data transfer from the CL-CD1864 to the host. This feature is intended to assist in buffer management by providing a notice of a gap in the Receive Data Stream longer than the time-out period. |

6.4.2 Channel Command Register (CCR) ($01) — Read/Write

| RESET CHAN | COR CHNG | SEND SP CH | CHAN CTL | D3 | D2 | D1 | D0 |
|---|---|---|---|---|---|---|---|

The CCR is a special register used to prompt the CL-CD1864 processor to indicate if any channel parameters have changed. Bits are set in the CCR to indicate which of several commands to carry out. The CL-CD1864 processor notes changes in these bits and makes the required adjustments to the hardware; this process can take from microseconds to milliseconds. Therefore, it is important that the host CPU waits until the CL-CD1864 processor has finished the current command before issuing any more commands, or continuing with any operation that the command will affect. For example, after setting the Local Loopback Bit in COR2, the host must wait until the command is complete before resuming transmission. If the host does not wait, characters may not be properly looped back.

The CL-CD1864 processor indicates completion by clearing the CCR.

| Bit | Description |
|---|---|
| Bit 7 | Reset Channel Command. |
| Bit 6 | Channel Option Register Command. |
| Bit 5 | Send Special Character(s) Command. |
| Bit 4 | Channel Control Command. |
| Bits 3:0 | Defined by the type of command being issued; see the following descriptions. |

Reset Channel Command

| RESET CHAN | 0 | 0 | 0 | 0 | 0 | 0 | TYPE |
|---|---|---|---|---|---|---|---|

This is a software reset command. When this command is issued, the CL-CD1864 disables the transmitter and the receiver, and clears the Data and Status FIFOs of the channel. There are two types of reset — Channel Reset (type 0), resets only the current channel, and Global Reset (type 1), resets the entire part to its power-up condition. Channel parameters will not be affected by a Channel Reset.

| Bit | Description |
|---|---|
| Bit 7 | Reset Channel Command, must be a '1'. |
| Bits 6:1 | Not used. Must be a '0'. |
| Bit 0 | Reset Type: If the Reset Type Bit is a '0', a software reset of the channel is performed. The transmitter and receiver are disabled, and all FIFOs are cleared (flushed). If the Reset Type Bit is a '1', an on-chip firmware initialization of all channels is performed. All channel and global parameters are reset to their power-on reset condition. |

Channel Option Register Change Command

| 0 | COR CHG | 0 | 0 | COR3 | COR2 | COR1 | N/U |
|---|---------|---|---|------|------|------|-----|

Changes made to some Channel Option Register Bits must be signalled to the CL-CD1864 by this command. Any combination of COR changes may be indicated by one command. All of the bits in COR3 take effect immediately, and all of the bits in COR2 (except LLM) take effect immediately. In other words, when changing COR3 or any of COR2 (except LLM), do not issue a Channel Option Register Change Command. However, to preserve compatibility with older CL-CD180 designs, it is acceptable to set these bits.

| Bit | Description |
|-----|-------------|
| Bit 7 | Must be a '0'. |
| Bit 6 | Channel Option Register Change Command, must be a '1'. |
| Bits 5, 4 | Must be a '0'. |
| Bit 3 | Channel Option Register 3 changed (no longer required). |
| Bit 2 | Channel Option Register 2 changed (required only for Local Loopback Mode change). |
| Bit 1 | Channel Option Register 1 changed. |
| Bit 0 | Not used. |

Send Special Character(s) Command

| 0 | 0 | SEND SP CH | 0 | 0 | SSPC2 | SSPC1 | SSPC0 |
|---|---|------------|---|---|-------|-------|-------|

| Bit | Description |
|-----|-------------|
| Bits 7, 6 | Must be a '0'. |
| Bit 5 | Send Special Character(s) Command, must be a '1'. |
| Bits 4, 3 | Must be a '0'. |
| Bits 2:0 | Special Character Select |

| SSPC2 | SSPC1 | SSPC0 | Function |
|-------|-------|-------|----------|
| 0 | 0 | 0 | Do not use |
| 0 | 0 | 1 | Send Special Character 1, or characters 1 and 3 in sequence if COR3 [XonCH] defines a two-character sequence. |
| 0 | 1 | 0 | Send Special Character 2, or characters 2 and 4 in sequence if COR3 [XoffCH] defines a two-character sequence. |
| 0 | 1 | 1 | Send Special Character 3 |
| 1 | 0 | 0 | Send Special Character 4 |
| 1 | 0 | 1 | Do not use |
| 1 | 1 | 0 | Do not use |
| 1 | 1 | 1 | Do not use |

Channel Control Command

| 0 | 0 | 0 | CHAN CTL | XMTR EN | XMTR DIS | RCVR EN | RCVR DIS |
|---|---|---|----------|---------|----------|---------|----------|

| Bit | Description |
|---|---|
| Bits 7:5 | Must be a '0'. |
| Bit 4 | Channel Control Command, must be a '1'. |
| Bit 3 | Transmitter Enable |
| Bit 2 | Transmitter Disable |
| Bit 1 | Receiver Enable |
| Bit 0 | Receiver Disable |

When turning the receiver or transmitter on or off, it is faster to simply enable and disable service requests (SRER) rather than using the Channel Control Command.

Channel Option Register 1 (COR1) ($03) — Read/Write

| Parity | ParM1 | ParM0 | Ignore | Stop 1 | Stop 0 | CHL 1 | CHL 0 |

Changes to this register must be signalled via the Channel Command Register.

| Bit | Description |
|---|---|
| Bit 7 | Parity:<br>1 = odd parity.<br>0 = even parity. |
| Bits 6, 5 | Parity Mode 1 and 0: Defines Parity Mode for both the transmitter and the receiver.<br>ParM1 ParM0 Parity<br>  0      0     No parity<br>  0      1     Force parity (odd parity = force 1, even = force 0)<br>  1      0     Normal parity<br>  1      1     Not used |
| Bit 4 | Ignore: Ignore parity<br>0 = Evaluate parity on received characters.<br>1 = Do not evaluate parity on received characters. |
| Bits 3, 2 | Stop Bit Length: Specifies the length of the Stop Bit.<br>Stop1 Stop0 Stop Bit<br>  0      0     1 Stop Bit<br>  0      1     1 1/2 Stop Bits<br>  1      0     2 Stop Bits<br>  1      1     2 1/2 Stop Bits |
| Bits 1, 0 | Character Length:<br>CHL1 CHL0 Character Length<br>  0      0     5 bits<br>  0      1     6 bits<br>  1      0     7 bits<br>  1      1     8 bits |

Channel Option Register 2 (COR2) ($04) — Read/Write

| IXM | TxIBE | ETC | LLM | RLM | RtsAO | CtsAE | DsrAE |
|-----|-------|-----|-----|-----|-------|-------|-------|

Changes only to Bit 4 (LLM) of this register must be signalled via the Channel Command Register.

| Bit | Description |
|-----|-------------|
| Bit 7 | Implied Xon Mode (IXM): This bit has meaning only when in the automatic Transmit In-Band Flow-control Mode. During Transmit In-Band Flow-control Mode, the CL-CD1864 stops transmission upon detection of an Xoff character or character sequence. The IXM Bit determines whether the CL-CD1864 should restart transmission based on receipt of an Xon character or any character. When IXM Bit is set, the CL-CD1864 will restart transmission upon detection of any character. When IXM Bit is not set, the CL-CD1864 will wait for the Xon character or character sequence to restart the transmission. |
| Bit 6 | Transmit In-Band (Xon/Xoff) Flow Control Automatic Enable (TxIBE): The CL-CD1864 in the Transmitting Mode is flow-controlled by the remote. The CL-CD1864 upon receipt of the Xoff character, terminates transmission after the current character in the Transmit Shift Register, and the character in the Transmit Holding Register are sent. The CL-CD1864 will resume transmission upon receipt of the Xon character, or any character depending on the state of the IXM Bit. |
| Bit 5 | Embedded Transmitter Command Enable (ETC): If set, the embedded special transmitter command functions are enabled. |
| Bit 4 | Local Loopback Mode (LLM):<br>1 = Enables the Local Loopback Mode.<br>0 = Disables the Local Loopback Mode. |
| Bit 3 | Remote Loopback Mode (RLM):<br>1 = Enables the Remote Loopback Mode.<br>0 = Disables the Remote Loopback Mode. |
| Bit 2 | RTS Automatic Output Enable (RtsAO): When set, if the channel is enabled, the CL-CD1864 will automatically assert the RTS* Output when it has characters to send. If CtsAE is also set, it will wait for CTS* to respond prior to transmission. |
| Bit 1 | CTS Automatic Enable (CtsAE): Enables the CTS* Input to be used as automatic transmitter enable or disable. |
| Bit 0 | DSR Automatic Enable (DsrAE): Enables the DSR* Input as automatic receiver enable or disable. |

Channel Option Register 3 (COR3) ($05) — Read/Write

| Xon CH | Xoff CH | FCT | SCDE | RxTH3 | RxTH2 | RxTH1 | RxTH0 |
|--------|---------|-----|------|-------|-------|-------|-------|

Changes to this register do not have to be signalled via the CCR.

| Bit | Description |
|---|---|
| Bit 7 | Xon Character Definition:<br>0 = Xon Character is a single-character code, and is defined by Special Character.<br>1 = Xon Character is a double-character sequence, and is defined by Special Characters 1 and 3. |
| Bit 6 | Xoff Character Definition:<br>0 = Xoff Character is a single-character code, and is defined by Special Character 2.<br>1 = Xoff Character is a double-character sequence, and is defined by Special Characters 2 and 4. |
| Bit 5 | Flow-Control Transparency (FCT) Mode:<br>0 = Flow-control characters received will be given to the host by Receive Exception Service Requests.<br>1 = Flow-control characters received will not be given to the host by Receive Exception Service Requests. |
| Bit 4 | Special Character Detection Enable:<br>0 = Special-Character Status detection is disabled.<br>1 = Special-Character Status detection is enabled. |
| Bits 3:0 | RxFIFO Threshold: |

| RxTh3 | RxTh2 | RxTh1 | RxTH0 | Status |
|-------|-------|-------|-------|--------|
| 0 | 0 | 0 | 0 | Do not use |
| 0 | 0 | 0 | 1 | 1 character |
| 0 | 0 | 1 | 0 | 2 characters |
| 0 | 0 | 1 | 1 | 3 characters |
| 0 | 1 | 0 | 0 | 4 characters |
| 0 | 1 | 0 | 1 | 5 characters |
| 0 | 1 | 1 | 0 | 6 characters |
| 0 | 1 | 1 | 1 | 7 characters |
| 1 | 0 | 0 | 0 | 8 characters |
| 1001 | to | | 1111 | Reserved, do not use. |

6.4.3 Channel Control Status Register (CCSR) ($06) — Read Only

| RxEN | RxFloff | RxFlon | N/U | TxEN | TxFloff | TxFlon | N/U |
|------|---------|--------|-----|------|---------|--------|-----|

This Status Register stores the current state of the channel. It may be read by the host at any time. If the host determines that a flow-control state is inappropriate, it may be cleared by enabling or disabling the transmitter or receiver by CCR command.

| Bit | Description |
|-----|-------------|
| Bit 7 | RxEn Receiver Enable:<br>0 = Receiver is disabled.<br>1 = Receiver is enabled. |
| Bit 6 | RxFloff Receive Flow-off:<br>0 = Normal<br>1 = The CL-CD1864 has requested the remote to stop transmission (Send Xoff Command has been given to the channel). This bit will be reset when the CL-CD1864 has requested the remote to restart transmission, or when the receiver is enabled or disabled, or the channel is reset. |
| Bit 5 | RxFlon Receive Flow-on:<br>0 = Normal<br>1 = The CL-CD1864 has requested the remote to restart character transmission (Send Xon Command has been given to the channel). This bit is reset when the next (non-flow control) character is received, or when the receiver is enabled or disabled, or the channel is reset. |
| Bit 4 | Not used. |
| Bit 3 | TxEn Transmitter Enable:<br>0 = Transmitter is disabled.<br>1 = Transmitter is enabled. |
| Bit 2 | TxFloff Transmit Flow-off:<br>0 = Normal<br>1 = The CL-CD1864 has been requested by the remote to stop transmission. This bit is reset when the CL-CD1864 receives a request to resume transmission, or when the transmitter is enabled or disabled, or the channel is reset. |
| Bit 1 | TxFlon Transmit Flow-on:<br>0 = Normal<br>1 = The CL-CD1864 has been requested by the remote to resume transmission. This bit is reset once character transmission is resumed, or when the transmitter is enabled or disabled, or the channel is reset. |
| Bit 0 | Not used. |

6.4.4 Receiver Bit Register (RBR) ($33) — Read Only

| Reserved | RxD | Start Hunt | Reserved | Reserved | Reserved | Reserved | Reserved |

This register monitors certain functions of the actual receive hardware. It should never be written to as this will cause the part to fail. Only two of the bits are defined herein; however, the other bit positions can change value, so these bits should be 'masked-out' before testing.

Bit 6 is the sampled state of the RxD Pin, as sampled at the last bit-rate clock edge. This is not the actual RxD Input, as RxD cannot be sampled in real time. If no data has been received for a period of time, this bit will still reflect the last sampled state of the line at the end of the last character. This is because the line is not sampled when the CL-CD1864 is looking for the Start Bit of a new character.

Bit 5 indicates whether the CL-CD1864 is looking for a Start Bit. If Bit 5 is a '1', it is looking. If Bit 5 is a '0', it is receiving a character.

6.4.5 Receive Time-out Period Register (RTPR) ($18) — Read/Write

| Receiver Data Time-out Period |

This register defines the time period for two functions related to the Receive FIFO. As each character is moved to the Receive FIFO, the Receive Timer is reloaded with the Receive Data Time-out Period. The Receive Timer is then decremental on each tick of the Prescaler Counter. If the Receive Timer reaches a '0', it causes a Receive Good Data Service Request.

There is another optional feature called No New Data Time-out. When enabled, the Receive Timer will generate a Receive Exception if the timer expires after the last data is transferred from the FIFO to the host. This is intended to tell the host that no more data is arriving, and to go ahead and process the buffer.

The Receive Time-out Period Register defines the time-out period for both of these functions. It counts in time increments defined by the prescaler.

6.4.6 Receive Bit Rate Period Register – High Byte (RBPRH) ($31), and Low Byte (RBPRL) ($32) — Read/Write

| Receive Bit Rate Divisor Byte |

These two registers contain the 16-bit pre-load value for the Receive Bit Rate Counter. This count establishes the basic Receiver Clock Rate, which must be 16 times the desired Receiver Bit Rate. These registers are reset to a '0' by RESET*. The period established for the 16 times Receiver Clock Rate is equal to the RBPR 16-bit binary value times the System Clock (CLK) Period.

6.4.7 Transmit Bit Rate Period Register – High Byte (TBPRH) ($39), and Low Byte (TBPRL) ($3A) — Read/Write

| Transmit Bit Rate Divisor Byte |
|---|

These two registers contain the 16-bit pre-load value for the Transmit Bit Rate Counter. This count establishes the Transmitter Clock Rate, which must be 16 times the desired Transmitter Bit Rate. The precise period established for the 16 times Transmitter Clock is equal to the RBPR 16-bit binary value times the System Clock (CLK) Period. These registers are reset to a '0' by RESET*.

6.4.8 Special Character Register 1 (SCHR1) ($09) — Read/Write

| Special Character 1 |
|---|

This register stores the right-justified bit pattern for Special Character 1. Unused bits must be a '0'. During receive, this character is one of the four characters compared with the received data for special-character recognition. If a match occurs with one of these four characters, it is noted in the Receiver Status FIFO entry accompanying the received character unless a double-character compare is enabled. In this case, the Receive Status FIFO entry will not be made until both characters are compared and matched.

During transmit, this register contains the characters that are sent as a result of the Send Special Character 1 command. If two-character sequences are enabled, characters 1 and 3 will be sent.

Special Character 1 defines the Xon character or the first-half of the Xon-character sequence. The second half is Special Character Register 3.

6.4.9 Special Character Register 2 (SCHR2) ($0A) — Read/Write

| Special Character 2 |
|---|

This register stores the right-justified bit pattern for Special Character 2. Unused bits must be a '0'. During receive, this character is one of the four characters compared with the received data for special-character recognition. If a match occurs with one of these four characters, it is noted in the Receiver Status FIFO entry accompanying the received character unless a double-character compare is enabled. In this case, the Receive Status FIFO entry will not be made until both characters are compared.

During transmit, this register contains the characters that are sent as a result of the Send Special Character 2 command. If two-character sequences are enabled, characters 2 and 4 will be sent.

Special Character 2 defines the Xoff character or the first-half of the Xoff-character sequence.

6.4.10 Special Character Register 3 (SCHR3) ($0B) — Read/Write

| Special Character 3 |
|---|

This register stores the right-justified bit pattern for Special Character 3. Unused bits must be a '0'. During receive, this character is one of the four characters compared with the received data for special character recognition. If a match occurs with one of these four characters, it is noted in the Receiver Status FIFO entry accompanying the received character unless a double-character compare is enabled. In this case, the Receive Status FIFO entry will not be made until both characters are compared.

During transmit, this register contains the characters that are sent as a result of the Send Special Character 3 command.

Special Character 3 may be the second-half of the Xon-character sequence.

6.4.11 Special Character Register 4 (SCHR4) ($0C) — Read/Write

| Special Character 4 |
|---|

This register stores the right-justified bit pattern for Special Character 4. Unused bits must be a '0'. During receive, this character is one of the four characters compared with the received data for special character recognition. If a match occurs with one of these four characters, it is noted in the Receiver Status FIFO entry accompanying the received character unless a double-character compare is enabled. In this case, the Receive Status FIFO entry will not be made until both characters are compared.

During transmit, this register contains the characters that are sent as a result of the Send Special Character 4 command.

Special Character 4 may be the second-half of the Xoff-character sequence.

6.4.12 Modem Change Register (MCR) ($12) — Read/Write

| DSR chg | CDchg | CTSchg | 0 | 0 | 0 | 0 | 0 |
|---------|-------|--------|---|---|---|---|---|

The CL-CD1864 sets bits in this register when it recognizes a level change on a modem pin, as programmed by the Modem Change Option Registers. Changes detected will be a cause for asserting the Modem Service Request if corresponding Service Request Enable Bits are set. Once the service request is asserted, updates to this register are inhibited until End-of-Service Request Register (EOSRR) is written at the end of the Modem Service Request Routine. The host must clear these register bits during the service routine.

| Bit | Description |
|---|---|
| Bit 7 | DSR Changed: A logic '1' denotes that the Data-Set-Ready Input has changed state. |
| Bit 6 | CD Changed: A logic '1' denotes that the Carrier Detect Input has changed state. |
| Bit 5 | CTS Changed: A logic '1' denotes that the Clear-to-Send Input has changed state. |
| Bits 4:0 | Must be a '0'. |

Modem Change Option Register 1 (MCOR1) ($10) — Read/Write

| DSRzd | CDzd | CTSzd | 0 | DTRth3 | DTRth2 | DTRth1 | DTRth0 |
|---|---|---|---|---|---|---|---|

This register is used to define the current state change options to be monitored.

| Bit | Description |
|---|---|
| Bit 7 | DSRzd is a '1': Detect high-to-low voltage transition on DSR* input (zero-to-one transition of DSR (MSVR) Bit ). |
| Bit 6 | CDzd is a '1': Detect high-to-low voltage transition on CD* input (zero-to-one transition of CD (MSVR) Bit). |
| Bit 5 | CTSzd is a '1': Detect high-to-low voltage transition on CTS* input (zero-to-one transition of CTS (MSVR) Bit). |
| Bit 4 | Must be a '0'. |
| Bits 3:0 | Defines the threshold level that causes negation of DTR* when this flow-control option is specified. Normally, this level should be equal to or higher than the service-request level threshold as set in COR3. If it is set lower than the service-request threshold, it will default to the service-request threshold level.<br>DTRth3 DTRth2 DTRth1 DTRth0 Function<br>  0       0       0       0    Automatic DTR Mode disabled<br>  0       0       0       1    1 character<br>  0       0       1       0    2 character<br>  0       0       1       1    3 character<br>  0       1       0       0    4 character<br>  0       1       0       1    5 character<br>  0       1       1       0    6 character<br>  0       1       1       1    7 character<br>  1       0       0       0    8 character |

Modem Change Option Register 2 (MCOR2) ($11) — Read/Write

| DSRod | CDod | CTSod | 0 | 0 | 0 | 0 | 0 |
|-------|------|-------|---|---|---|---|---|

This register is used to define the current state change options to be monitored.

| Bit | Description |
|-----|-------------|
| Bit 7 | DSRod is a '1': Detect low-to-high transition on DSR* Input (one-to-zero transition DSR (MSVR) Bit). |
| Bit 6 | CDod is a '1': Detect low-to-high transition on CD* Input (one-to-zero transition of CD (MSVR) Bit). |
| Bit 5 | CTSod is a '1': Detect low-to-high transition on CTS* Input (one-to-zero transition of CTS (MSVR) Bit). |
| Bits 4:0 | Must be a '0'. |

6.4.13 Modem Signal Value Register (MSVR) ($28) — Read/Write

| DSR | CD | CTS | N/U | N/U | N/U | DTR | RTS |
|-----|----|----|-----|-----|-----|-----|-----|

This register is read to determine the current input levels on the Modem Input Pins. It is written to supply an output value for the RTS* and DTR* Pins. The register bits have the opposite polarities from the actual states on the individual pins. Writing a '1' causes the pin to go to nominal zero volts.

| Bit | Description |
|-----|-------------|
| Bit 7 | DSR: Current state of Data-Set-Ready Input. |
| Bit 6 | CD: Current state of Carrier Detect Input. |
| Bit 5 | CTS: Current state of Clear-to-Send Input. |
| Bits 4:2 | Not used. |
| Bit 1 | DTR: Current state of Data-Terminal-Ready Output. |
| Bit 0 | RTS: Current state of Request-to-Send Output. |

6.4.14 Modem Signal Value Request-To-Send (MSVRTS) ($29) — Write Only

| 0 | 0 | 0 | 0 | 0 | 0 | 0 | RTS |
|---|---|---|---|---|---|---|-----|

In the Modem Signal Value Register, a write to either RTS or DTR does not affect the state of the other one. This can be a problem when the CL-CD1864 is using one of these signals for flow control, and the other one needs to be used under host control. This register writes to RTS without affecting the state of any other bits. RTS is at Bit 0.

6.4.15 Modem Signal Value Data-Terminal-Ready (MSVDTR) ($2A) — Write Only

| 0 | 0 | 0 | 0 | 0 | 0 | DTR | 0 |
|---|---|---|---|---|---|-----|---|

In the Modem Signal Value Register, a write to either RTS or DTR does not affect the state of the other one. This can be a problem when the CL-CD1864 is using one of these signals for flow control, and the other one needs to be used under host control. This register writes to DTR without affecting the state of any other bits. DTR is at Bit 1.

7. ELECTRICAL SPECIFICATIONS

7.1 Absolute Maximum Ratings

Operating Ambient Temperature .................................................................... 0° C to 70° C
Storage Temperature ........................................................................ -65° C to 150° C
All voltages, with respect to ground ............................................... -0.5 to $V_{cc}$ + 0.5 Volts
Supply Voltage ($V_{cc}$) ................................................................................ + 7.0 Volts
Power Dissipation ................................................................................ 0.5 Watt NOTE: Stress above those listed under Absolute Maximum Ratings may cause permanent damage to the device. This is a stress rating only and functional operation of the device at these or any conditions above those indicated in the operational sections of this specification is not implied. Exposure to absolute maximum rating conditions for extended periods may affect device reliability.

7.2 Recommended Operating Conditions

Supply Voltage ($V_{cc}$) ................................................................................ 5V ± 5%
Operating free-air ambient temperature ..................................... 0° C < $T_A$ < 70° C
System Clock ........................................................................................... 15 MHz*

NOTE: * Internal Clock Frequency.

7.3 DC Electrical Characteristics (@ $V_{CC}$ = 5V ± 5%, $T_A$ = 0° C to 70° C)

NOTE: Before beginning any new design with this device, please contact Cirrus Logic, Inc. for the latest errata information. See the back cover of this document for sales office locations and phone numbers.

| Symbol | Parameter | MIN | MAX | Units | Conditions |
|---|---|---|---|---|---|
| $V_{IL}$ | Input Low Voltage | -0.5 | 0.8 | V | |
| $V_{IH}$ | Input High Voltage | 2.0 | $V_{cc}$ | V | (See note below) |
| $V_{OL}$ | Output Low Voltage | | 0.4 | V | $I_{OL}$ = 2.4 mA |
| $V_{OH}$ | Output High Voltage | 2.4 | $V_{cc}$ | V | $I_{OH}$ = -400 µA |
| $I_{IL}$ | Input Leakage Current | -10 | 10 | µA | 0 < $V_{in}$ < $V_{cc}$ |
| $I_{LL}$ | Data Bus three-state leakage current | -10 | 10 | µA | 0 < $V_{out}$ < $V_{cc}$ |
| $I_{OC}$ | Open Drain Output Leakage | -10 | 10 | µA | 0 < $V_{out}$ < $V_{cc}$ |
| $I_{CC}$ | Power Supply Current | | 75 | mA | CLK = 15 MHz |

7.3 DC Electrical Characteristics *(cont.)*

| Symbol | Parameter | MIN | MAX | Units | Conditions |
|---|---|---|---|---|---|
| $C_{in}$ | Input Capacitance | | 10 | pF | |
| $C_{out}$ | Output Capacitance | | 10 | pF | |

NOTE: Clock and RESET* $V_{IH}$ MIN = 2.7 Volts.

7.4 Index of Timing Information

| Figure | Title | Page |
|---|---|---|
| 7–1 | Clocked Bus Interface Reset | 108 |
| 7–2 | Clocked Bus Interface Clocks | 108 |
| 7–3 | Clocked Bus Interface Read Cycle, Motorola-Style Handshake | 109 |
| 7–4 | Clocked Bus Interface Service Acknowledgment Cycle, Motorola-Style Handshake | 110 |
| 7–5 | Clocked Bus Interface Write Cycle, Motorola-Style Handshake | 111 |
| 7–6 | Clocked Bus Interface Read Cycle, Intel-Style Handshake | 112 |
| 7–7 | Clocked Bus Interface Service Acknowledgment Cycle, Intel-Style Handshake | 113 |
| 7–8 | Clocked Bus Interface Write Cycle, Intel-Style Handshake | 114 |
| 7–9 | Un-Clocked Bus Interface Read Cycle, Motorola-Style Handshake | 117 |
| 7–10 | Un-Clocked Bus Interface Service Acknowledgment Cycle, Motorola-Style Handshake | 118 |
| 7–11 | Un-Clocked Bus Interface Write Cycle, Motorola-Style Handshake | 119 |
| 7–12 | Un-Clocked Bus Interface Read Cycle, Intel-Style Handshake | 120 |
| 7–13 | Un-Clocked Bus Interface Service Acknowledgment Cycle, Intel-Style Handshake | 121 |
| 7–14 | Un-Clocked Bus Interface Write Cycle, Intel-Style Handshake | 122 |

7.5 AC Electrical Characteristics

Internally, the CL-CD1864 is a fully clocked design; however, the hardware interface to the CL-CD1864 may be either un-clocked or clocked. An un-clocked interface is generally easier to implement, especially if the CL-CD1864 and its host are operating at different clock speeds. A clocked interface may be faster in some applications.

7.5.1 Clocked Bus Interface

Data transfers to or from the device take place in two steps. The first step occurs during the clock-low time. If the read/write state machine detects that it is time to do a cycle, it acquires the internal bus. The second step, that of actually transferring the data, occurs during the clock-high time. The cycle is complete at the end of the clock-high time.

The read/write state machine determines that it is time to do a cycle when there is a falling edge on the clock, and both CS* and DS* are low. There is a specified setup time which must be met to guarantee that the cycle will begin. If this setup is not met, the cycle will occur one clock later. If the cycle is recognized, arbitration for the internal bus is done during the clock-low time. Addresses (and data, if a write cycle) must meet another setup time specification to the rising edge of the clock, for the actual data transfer to occur properly during the clock-high time. In addition, the addresses must remain valid throughout the clock-high time, as specified. If the cycle is a write cycle, data must remain valid as specified. If the cycle is a read cycle, data is guaranteed valid for a specified time after the rising edge of the clock.

Service Acknowledge Cycles are a special case of read cycles. The service acknowledge 'read' (which returns the Global Service Request Vector value to the host) is started when the read/write state machine detects both DS* and another internal signal derived from both ACKIN* and DS*. There are two possible worst-case paths to consider in determining whether DS* and ACKIN* meet the necessary setup times to guarantee recognition on a particular clock edge. The longest path is DS*; it must propagate through a gate, an 8-bit comparator, a state machine, and another gate before arriving at the read/write state machine. The setup time for this is given in Table 7–1.

The other critical path is ACKIN*; it must pass through a state machine and a gate before arriving at the read/write state machine. The setup time to guarantee recognition on a particular clock edge is given in Table 7–1. Intel-style pin names are shown in {curly brackets}. All times are in nanoseconds.

Table 7-1. Clocked Timings

| Number | Description | MIN | TYP | MAX | Notes |
|---|---|---|---|---|---|
| 1 | Setup, DS*{RD*} and CS* low to CLK low, for read or write cycle to start ('ordinary' reads and all writes) | 15 | | | 1 |
| 2 | Setup, DS* {RD*} low to CLK low, for Service Acknowledge Cycle to start (ACKIN Cycles and read cycles from Acknowledge Registers) | 30 | | | 7 |
| 13 | Setup, ACKIN* low to CLK low for cycle to start | 15 | | | |
| 3b | Setup, Address Valid to CS* and DS* low | 5 | | | |
| 22 | Setup, Address Valid to DS* (service acknowledge cycles) | 7 | | | 3 |
| 5 | Setup, Write Data Valid to CLK high | -4 | | | |
| 6 | Setup, R/W* {RD*, WR*} stable to DS* and CS* low (read, write cycles) | -5 | | | 1, 6 |
| 23 | (DS* and CS*), or (RD* and CS*), or (WR* and CS*); high | 10 | | | 4 |
| 7 | Hold time, CS* low after CLK high (read, write cycles) | 5 | | | |
| 8 | Hold time, DS* {RD*} after valid data | 0 | | Infinity | 2 |
| 9 | Hold time, Address Valid after CLK high | 40 | | | |
| 10 | Hold time, Write Data Valid after CLK high | 25 | | | |
| 14 | Hold time, ACKIN* low after next CLK low | 5 | | | 5 |
| 26 | Clock Period (1x clock) | 66.67 | tbd | | 11 |
| 27 | Clock Low Time (1x clock) | 29 | | tbd | 11 |
| 28 | Clock High Time (1x clock) | 29 | | tbd | 11 |
| | Clock Duty Cycle (1x clock) | 45 | | 55 | Percent |
| 29 | Clock Rise/Fall time | | | 3 | 10 |
| 30 | RESET pulse width | 5 clock periods | | | |
| 11 | Data Bus out of Hi-Z after CLK low | 0 | | | 2 |
| 12 | Read Data Valid after CLK high | | | 66 | |
| 15 | ACKIN* to ACKOUT* propagation delay | | | 30 | |
| 16 | ACKOUT* high after ACKIN* high | | | 30 | |
| 17 | DS* {RD*} high to data bus tri-state | 0 | | 25 | |
| 18 | DTACK* assert after CLK high (DTACKDLY = 0) | | | 35 | |
| 19 | DTACK* assert after CLK low (DTACKDLY = 1) | | | 30 | |

Table 7-1. Clocked Timings *(cont.)*

| Number | Description | MIN | TYP | MAX | Notes |
|---|---|---|---|---|---|
| 25 | DTACK* negate after DS* {RD* or WR*} negation | | | 20 | |
| U1 | ACKOUT* assert after CS* and DS* active on register acknowledge cycle with no match | | | 40 | 8 |
| U2 | DTACK* active pull-up time | | | | 9 |
| U4 | ACKOUT high after end of cycle | | | 25 | |

NOTES:

1) The reference to DS* and CS* refers to whichever one goes active last, that is, both signals must meet the setup time requirement.
2) Greater than a '0' by design, but not tested.
3) Calculated value; see specification number 2 - 4.
4) A cycle must positively end before another begins; that is, control signals shall return to states such that no cycle is pending or active.
5) ACKIN* must be low for at least one clock period plus setup and hold times, if there is only one CL-CD1864 in the daisy chain. If there is more than one CL-CD1864 in a daisy chain, ACKIN* must be low until it has rippled all the way down the chain.
6) For Motorola-style interface, refers to R/W*. For Intel-style interface, refers to RD* or WR* (whichever is inactive for that cycle).
7) Enabling the Register Acknowledge ('regack') feature changes the timing somewhat, even on cycles where 'regack' is not being used.
8) This is the time for ACKOUT* to assert on register acknowledge cycles. ACKOUT* asserts if the part determines the acknowledgment is not intended for that part. If ACKOUT* asserts, the part does not drive the data bus or assert DTACK*. These functions are left to a device further down the daisy chain that accepts the acknowledge cycle.
9) DTACK* sources current until the voltage on the DTACK* line is approximately 1.5 volts. Then DTACK* goes to an 'open-drain' (high impedance) state.
10) For clock periods greater than 100 ns (10 MHz or less clock), rise and fall time may be 5-ns maximum.
11) When using the clock out (CKOUT) of one CL-CD1864 to drive subsequent CL-CD1864s (such as in daisy-chain environments), CKOUT is skewed (delayed) by 3 ns from the internal clock. Therefore, on subsequent CL-CD1864s, setup times are improved by 3 ns and hold times are derated by 3 ns.

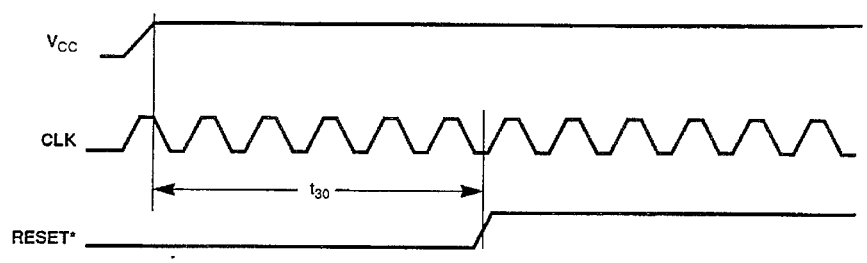
Figure 7-1. Clocked Bus Interface Reset
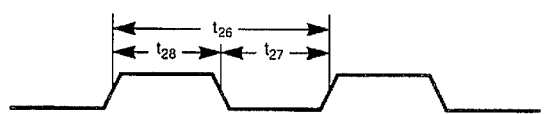
Figure 7-2. Clocked Bus Interface Clocks

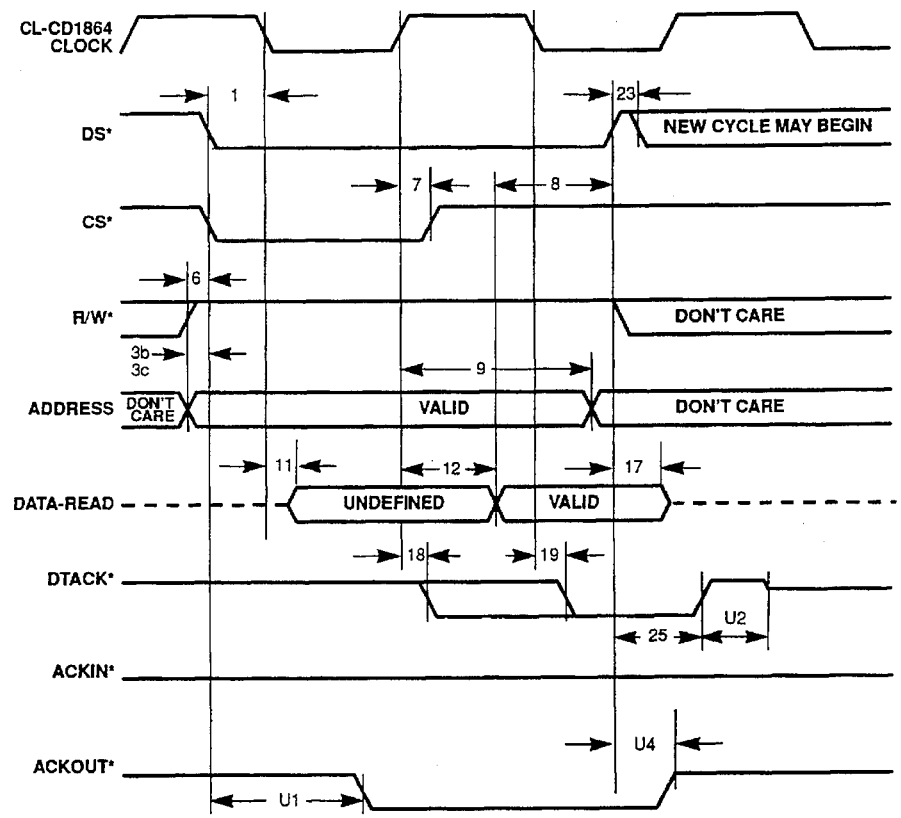
Figure 7-3. Clocked Bus Interface Read Cycle, Motorola-Style Handshake

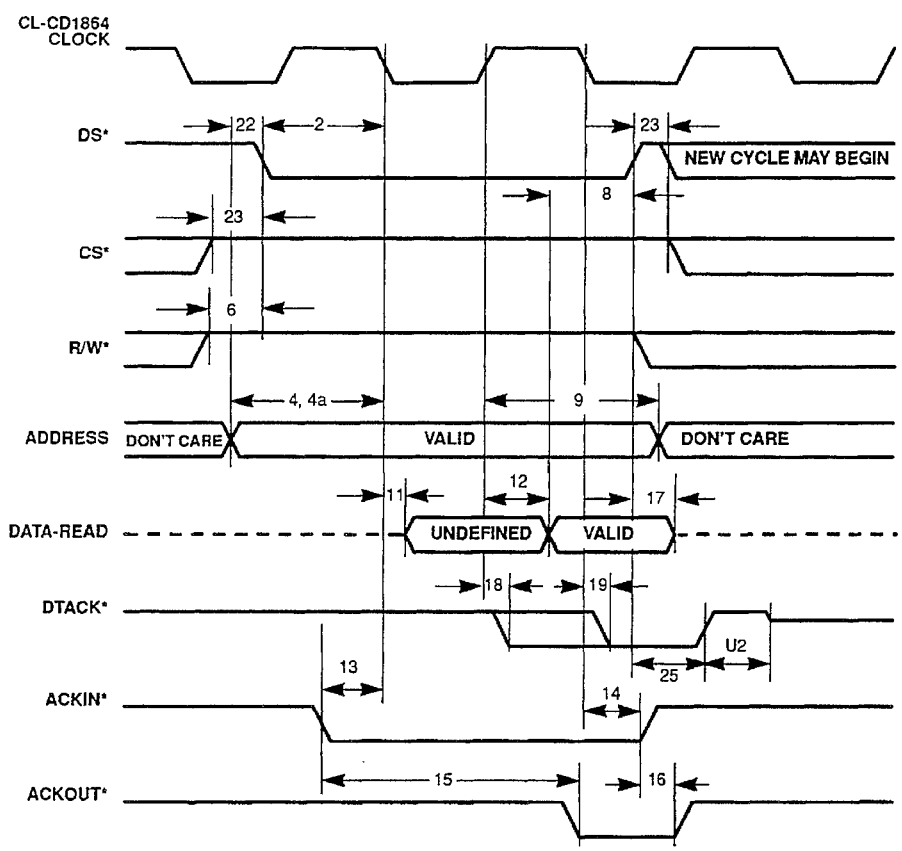
Figure 7–4. Clocked Bus Interface Service Acknowledgment Cycle, Motorola-Style Handshake

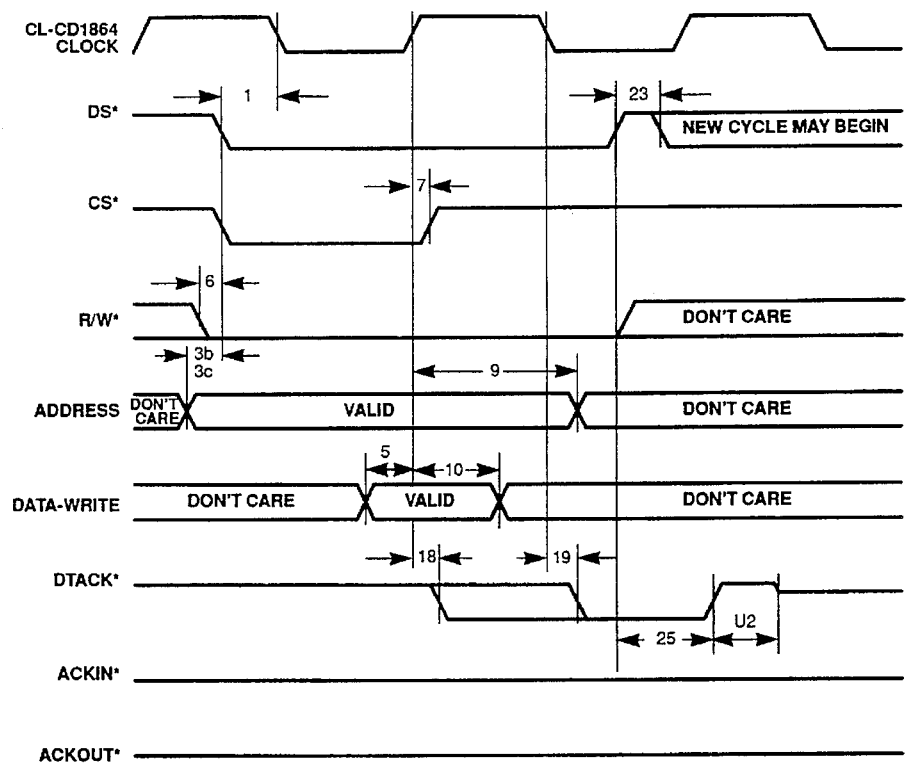
Figure 7–5. Clocked Bus Interface Write Cycle, Motorola-Style Handshake

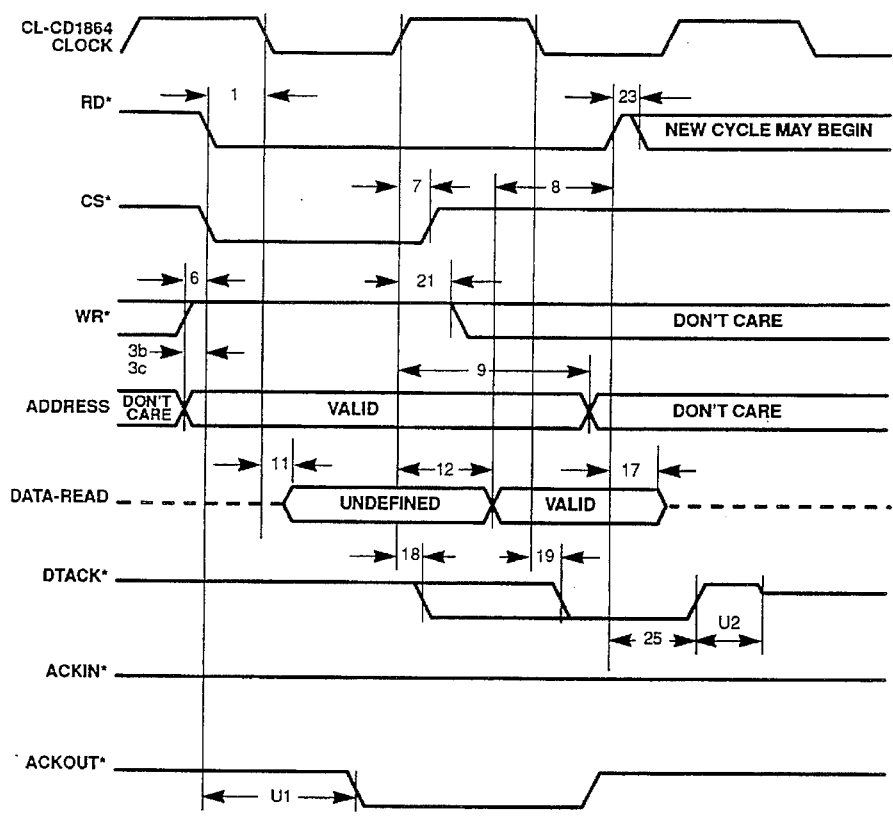
Figure 7-6. Clocked Bus Interface Read Cycle, Intel-Style Handshake

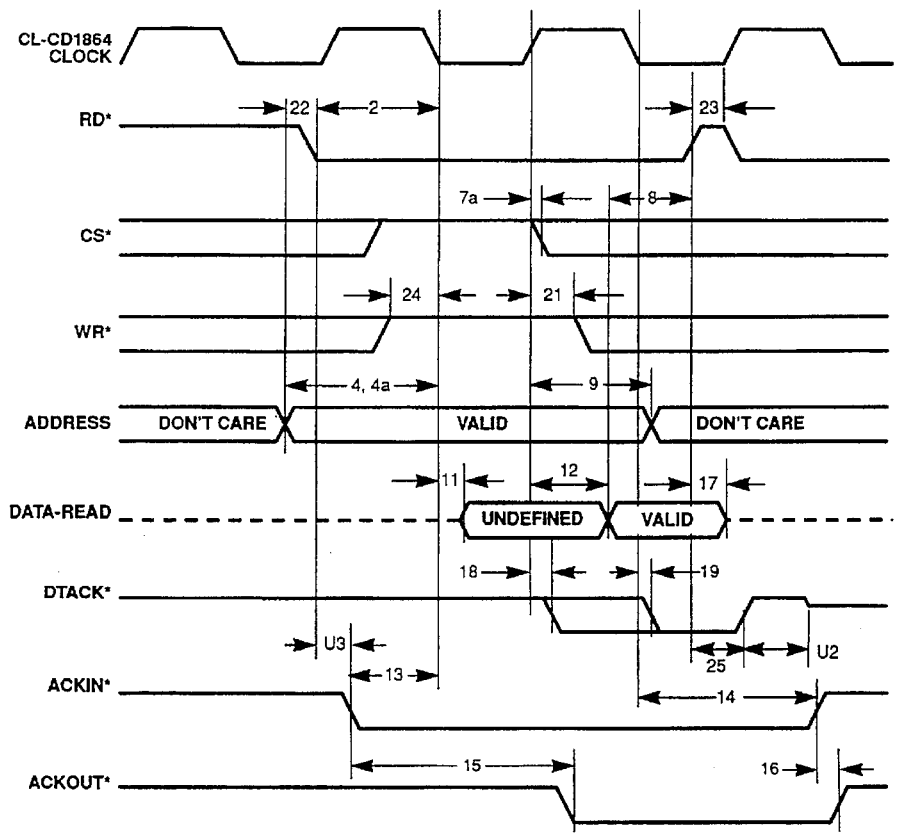
Figure 7-7. Clocked Bus Interface Service Acknowledgment Cycle, Intel-Style Handshake

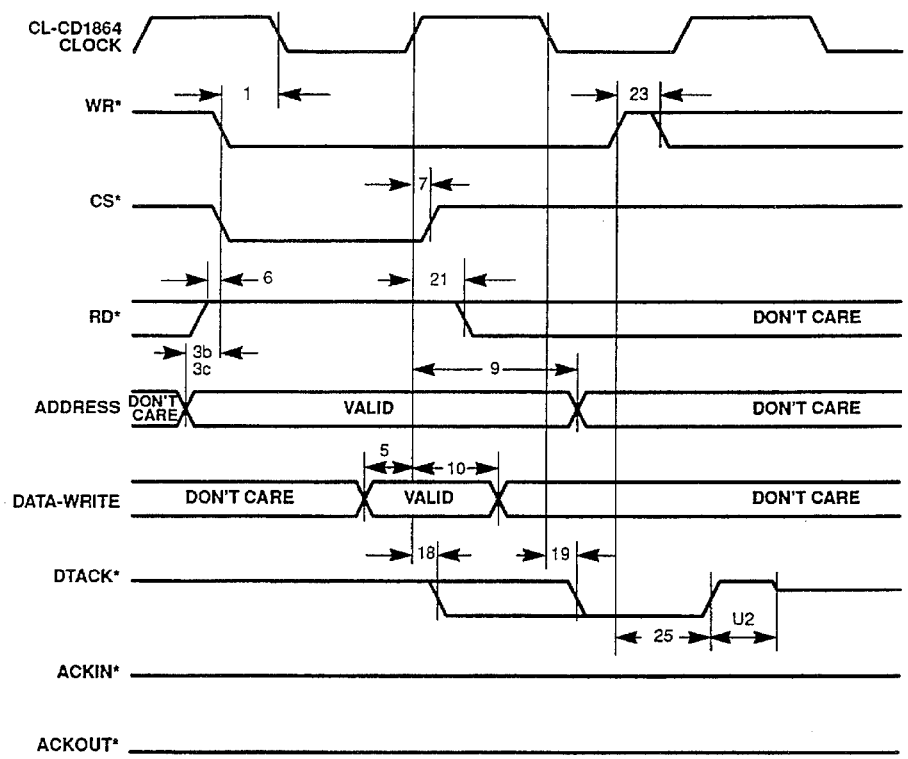
Figure 7–8. Clocked Bus Interface Write Cycle, Intel-Style Handshake

7.5.2 Un-Clocked Bus Interface

Un-clocked timing diagrams represent worst-case synchronization delays. That is, they reflect the maximum number of clock cycles required to complete the operation.

Internally, the CL-CD1864 fully synchronizes all signals, thus, the user need not be concerned with setup times or metastability. The vast majority of CL-CD1864s and CL-CD180s employ an Un-clocked Bus Interface.

All times are based on a master clock (CLK) of 15 MHz. All times are measured in nanoseconds. Intel-style handshake signals (where appropriate) are shown in {curly brackets}.

Table 7–2. Un-Clocked Timings

| Number | Description | MIN | MAX | Notes |
|---|---|---|---|---|
| 1 | Setup time, address to CS*, DS* {CS*, RD* or WR*} | | 5 | 1 |
| 2 | Setup time, R/W* to CS* or DS* | 0 | | 1 |
| 3 | Hold time, address after CS* or DS* {CS* or RD* or WR*} | 0 | | 3, 8 |
| 4 | R/W* hold time after CS* and DS* | 0 | | 3, 8 |
| 5 | Delay time, DTACK* assert to valid read data:<br>If DTACKDLY = 0<br>If DTACKDLY = 1 | | 31<br>-30 | |
| 6 | DTACK* assert after CS* or DS* {RD*}<br>If DTACKDLY = 0<br>If DTACKDLY = 1 | | 150<br>175 | 1, 2 |
| 7 | Hold time, read data after CS* and DS*{RD*} high | 1 | 30 | 3, 7, 17 |
| 8 | CS* or DS* {RD*} high from DTACK* low<br>If DTACKDLY = 0<br>If DTACKDLY = 1 | 31<br>3 | | 8, 9, 10, 17 |
| 9 | DTACK* inactive from (CS* or ACKIN*) or DS* high | | 30 | 3, 4, 8 |
| 10 | DS* {RD*} high pulse width | 10 | | 8 |
| 11 | Setup time, Address to ACKIN* | 23 | | 5, 6 |
| 12 | Setup time, write data to DS* {or WR*} low | | -10 | |
| 13 | Hold time, write data after DS* {or WR*} high | 0 | | |
| 14 | x_REQ* deassert after DTACK* asserted | | 2 Tclk + 50 | 14 |
| 15 | Setup time, R/W* {WR*} and CS* to ACKIN* low | 0 | | 11 |
| 16 | x_REQ* reassert delay after write to EOSRR | | 2 Tclk + 50 | 12, 14 |
| 17 | ACKIN* assert to ACKOUT* assert propagation delay | | 30 | |
| 18 | ACKIN* deassert to ACKOUT* deassert propagation delay | | 30 | |
| 19 | Data bus out of high-impedance after DS* {RD*} low | 5 | | 13 |

Table 7–2. Un-Clocked Timings (cont.)

| Number | Description | MIN | MAX | Notes |
|---|---|---|---|---|
| 20 | Setup time, address to DS* {RD*} during acknowledge cycles | 7 | | |
| U1 | ACKOUT* assert after CS* and DS* {RD*} active on register acknowledge cycles with no match | tbd | | 15 |
| U2 | DTACK* active pull-up time | | | 16 |

NOTES:
1) During read cycles, CS* and DS* {RD*} are gated together internally. This specification is with respect to whichever goes active (low) last.
2) The value given if for 15-MHz operation and DTACKDLY = 0. This time depends on system clock rate and the chosen DTACKDLY option. The actual time in any case can be determined by the formula:
   If DTACKDLY = 0   1.5(Tclk) + 43 ns
   If DTACKDLY = 1   2.0(Tclk) + 48 ns
3) During read cycles, CS* and DS* {RD*} are gated together internally. This specification is with respect to whichever goes inactive (high) last.
4) During Interrupt Acknowledge Cycles, ACKIN* is asserted instead of CS*; CS* should remain high. Note that ACKIN* timing is not always the same as CS*.
5) During acknowledge cycles, addresses must propagate through the Service Match Registers. If a service request is pending on this CL-CD1864, the match must finish before ACKIN* asserts. This is insured by the specifications.
6) This specification is with respect to ACKIN* only.
7) This specification is with respect to whichever of ACKIN* and DS* {RD*} goes active (low) last.
8) This specification is with respect to whichever goes inactive (high) last.
9) In multiple-CL-CD1864 designs, the Interrupt Acknowledge cycle must be long enough to accommodate the ACKIN* to ACKOUT* daisy-chain propagation delay from the first to the last CL-CD1864. ACKIN* must remain low until after DTACK* asserts.
10) For Acknowledge cycles, this specification refers to ACKIN* instead of CS*.
11) This specification is with respect to DS*. CS* and R/W* must be high before the assertion of DS* to avoid the possibility of the CL-CD1864 misinterpreting the cycle as a read or write.
12) This is the time required to reassert a service request if the internal conditions of the CL-CD1864 are such that the request should be asserted.
13) The data bus is guaranteed to become active after DS* {RD*} low and before data is valid.
14) This specification refers to one of Receive, Transfer, or Modem Service Request Outputs (RREQ*, TREQ*, MREQ*).
15) This is the time for ACKOUT* to assert on register acknowledge cycles. ACKOUT* asserts if the part determines the acknowledgment is not intended for that part. If ACKOUT* asserts, the part does not drive the data bus or assert DTACK*. These functions are left to a device further down the daisy chain that accepts the acknowledge cycle.
16) DTACK* sources current until the voltage on the DTACK* line is a valid logic '1'. At that time, DTACK* switches to an 'open-drain' (high impedance) state.
17) The data bus is tri-stated immediately after removal of DS* {RD*}. The device is guaranteed to be off the bus by the specified maximum time. The time can be as short as the minimum time. The hardware design should assure that the data has been read before DS* {RD*} is removed.

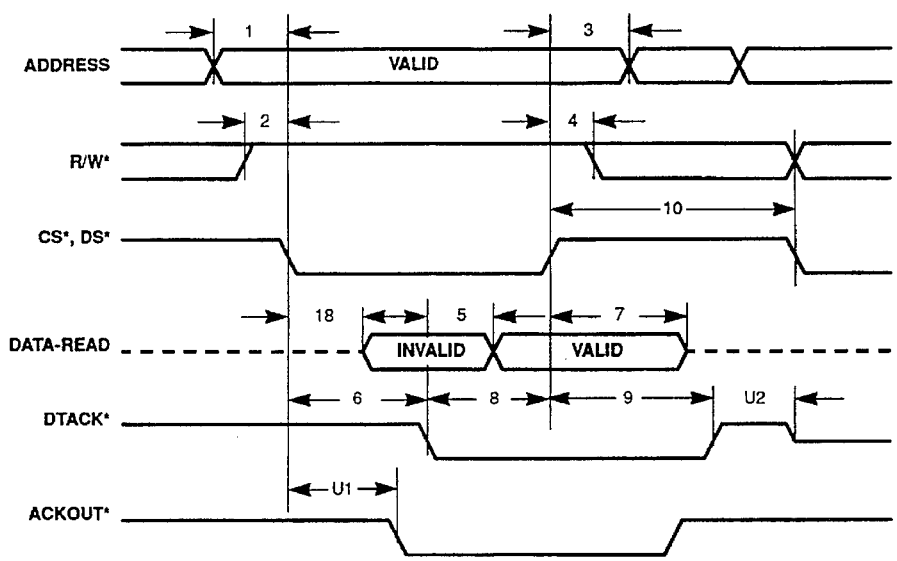
Figure 7-9. Un-Clocked Bus Interface Read Cycle, Motorola-Style Handshake

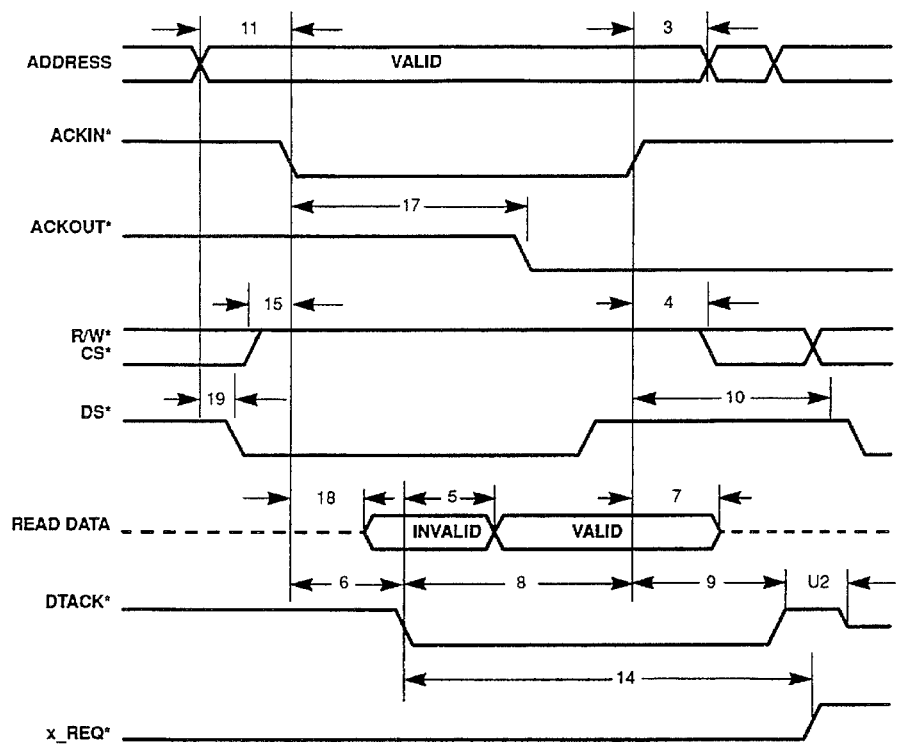
Figure 7-10. Un-Clocked Bus Interface Service Acknowledgment Cycle, Motorola-Style Handshake

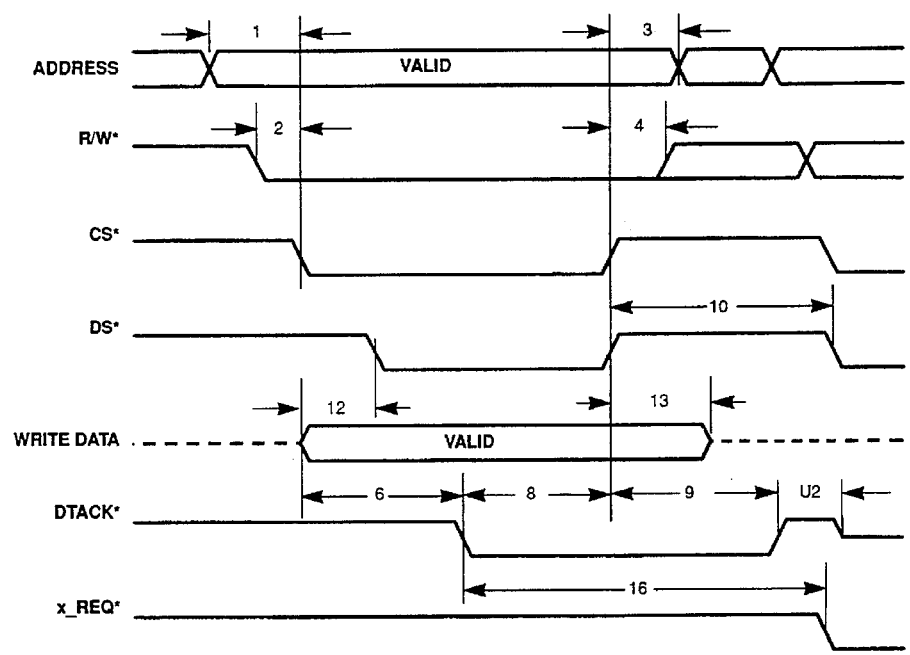
Figure 7-11. Un-Clocked Bus Interface Write Cycle, Motorola-Style Handshake

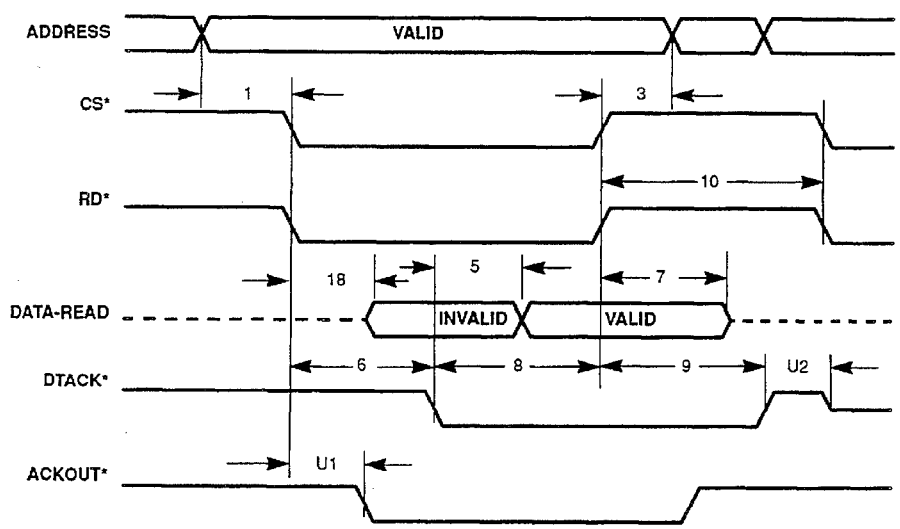
Figure 7–12. Un-Clocked Bus Interface Read Cycle, Intel-Style Handshake

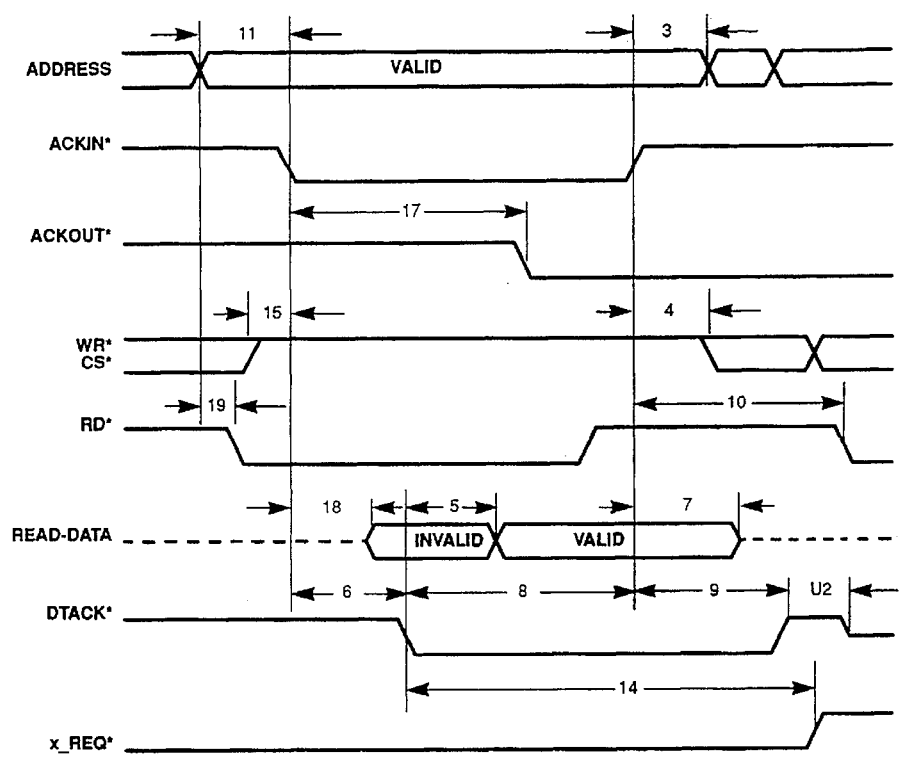
Figure 7–13. Un-Clocked Bus Interface Service Acknowledgment Cycle, Intel-Style Handshake

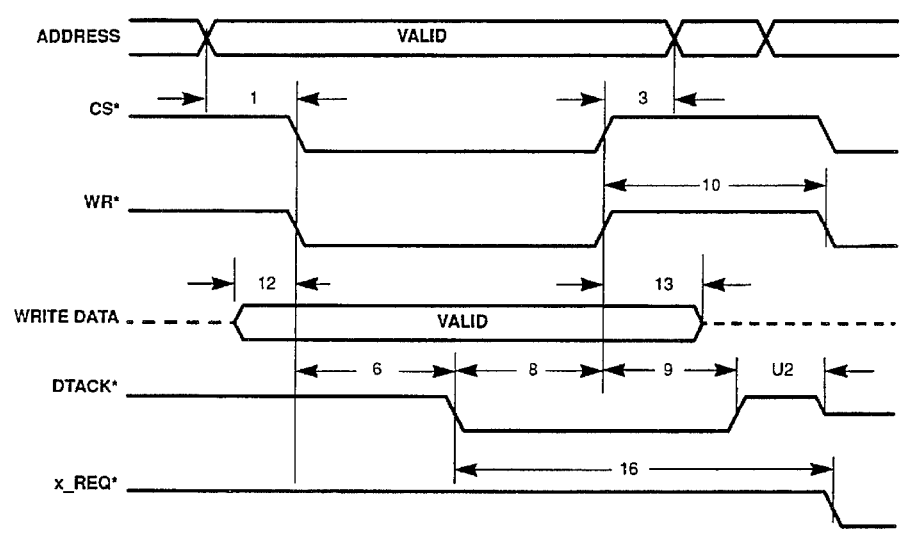
Figure 7–14. Un-Clocked Bus Interface Write Cycle, Intel-Style Handshake

8. PACKAGE DIMENSIONS
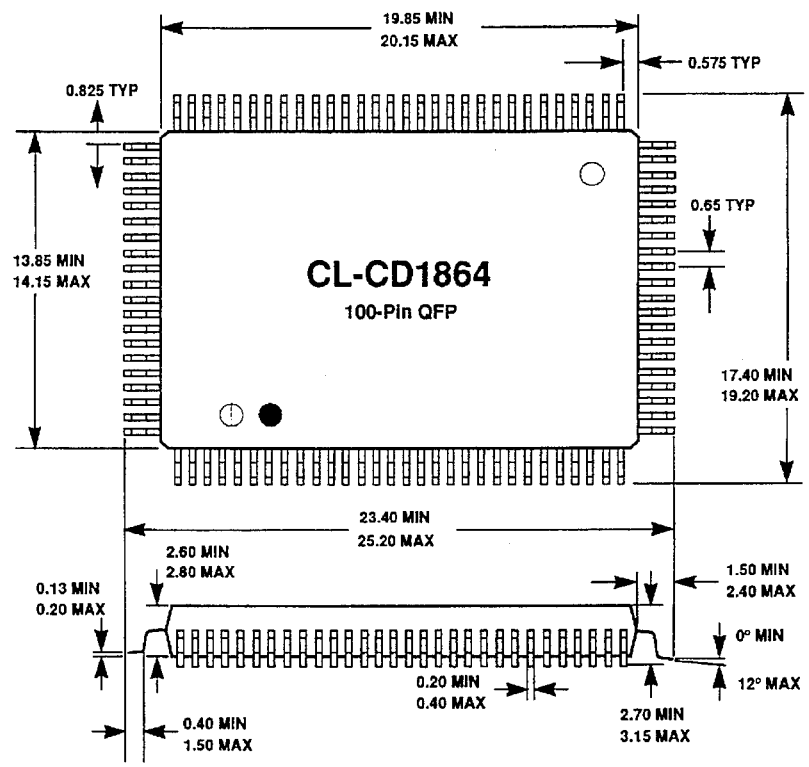
NOTE: Dimensions are in millimeters.

9. ORDERING INFORMATION
The order number for the 100-pin part is:
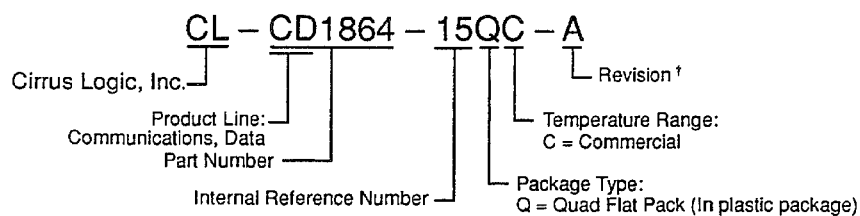
† Contact Cirrus Logic, Inc. for up-to-date information on revisions.

Direct Sales Offices

Domestic

N. CALIFORNIA
San Jose
TEL: 408/436-7110
FAX: 408/437-8960

S. CALIFORNIA
Tustin
TEL: 714/258-8303
FAX: 714/258-8307

Thousand Oaks
TEL: 805/371-5381
FAX: 805/371-5382

ROCKY MOUNTAIN AREA
Boulder, CO
TEL: 303/939-9739
FAX: 303/440-5712

SOUTH CENTRAL AREA
Austin, TX
TEL: 512/794-8490
FAX: 512/794-8069

Plano, TX
TEL: 214/985-2334
FAX: 214/964-3119

NORTHEASTERN AREA
Andover, MA
TEL: 508/474-9300
FAX: 508/474-9149

SOUTH EASTERN AREA
Boca Raton, FL
TEL: 407/362-5225
FAX: 407/994-9887

International

GERMANY
Herrsching
TEL: 49/08152-2030
FAX: 49/08152-6211

JAPAN
Tokyo
TEL: 81/3-5389-5300
FAX: 81/3-5389-5540

SINGAPORE
TEL: 65/3532122
FAX: 65/3532166

TAIWAN
Taipei
TEL: 886/2-718-4533
FAX: 886/2-718-4526

UNITED KINGDOM
Hertfordshire, England
TEL: 44/0727-872424
FAX: 44/0727-875919

The Company

Cirrus Logic, Inc., produces high-integration peripheral controller circuits for mass storage, graphics, and data communications. Our products are used in leading-edge personal computers, engineering workstations, and office automation equipment.

The Cirrus Logic formula combines proprietary S/LA™† IC design automation with system design expertise. The S/LA design system is a proven tool for developing high-performance logic circuits in half the time of most semiconductor companies. The results are better VLSI products, on-time, that help you win in the marketplace.

Cirrus Logic's fabless manufacturing strategy, unique in the semiconductor industry, employs a full manufacturing infrastructure to ensure maximum product quality, availability and value for our customers.

Talk to our systems and applications specialists; see how you can benefit from a new kind of semiconductor company.

† U.S. Patent No. 4,293,783

© Copyright, Cirrus Logic, Inc., 1992

*Preliminary* product information describes products which are in production, but for which full characterization data is not yet available. Cirrus Logic, Inc., believes the information contained in this document is accurate and reliable. However, it is marked *Preliminary* and is subject to change without notice. No responsibility is assumed by Cirrus Logic, Inc., for its use, nor for infringements of patents or other rights of third parties. This document implies no license under patents or copyrights. Trademarks in this document belong to their respective companies. Cirrus Logic, Inc., products are covered under one or more of the following U.S. patents: 4,293,783; Re. 31,287; 4,763,332; 4,777,635; 4,839,896; 4,931,946; 4,979,173; 5,032,981; 5,122,783.

CIRRUS LOGIC, Inc., 3100 West Warren Ave. Fremont, CA 94538
TEL: 510/623-8300   FAX: 510/226-2180

541864-001

Appendix_II

REGISTER ACKNOWLEDGE AND AUTO PRIORITY DESIGN NOTES

This document provides design details of the effects of implementing
the new register based acknowledgement functions in the design of the
CL-CD180/CL-CD1864. This deals only with areas of the Bus Interface
Logic and related state machines and controllers which are affected by
the introduction of these new features. Logic equations given here
correspond closely in name and function to gates and signals in the
actual design, though for clarity the equations here are shown in their
simplest, positive true form without regard to the actual nand gates,
nor gates and inverters used to implement these functions in the
design.

The block diagram, Figure 7, provides a useful overview of the logic
functions and machines presented here.

First, for reference, the definitions of the SRCR and SRSR bits:

(ch) SRCR          Service Request Control Register

```
   bit 7    bit 6    bit 5    bit 4    bit 3    bit 2    bit 1    bit 0
+--------+--------+--------+--------+--------+--------+--------+--------+
|100PQFP |RegAckEn|DaisyEn |GlobPri | UnFair |        |AutoPri | PriSel |
+--------+--------+--------+--------+--------+--------+--------+--------+
```

100PQFP    Read-only bit indicating the package type.

RegAckEn   Enable register based service request acknowledgments.

DaisyEn    Enable daisy chaining of register based service acknowledgments.

GlobPri    Use global prioritization of service requests.

UnFair     Fairness override bit.

AutoPri    Enable automatic prioritization for service acknowledgments.

PriSel     Select highest priority service type, Receive or Transmit.

SRSR          Service Request Status Register

```
   bit 7    bit 6    bit 5    bit 4    bit 3    bit 2    bit 1    bit 0
+--------+--------+--------+--------+--------+--------+--------+--------+
|ilvl[1] |ilvl[0] |  RREQ  |  rreq  |  TREQ  |  treq  |  MREQ  |  mreq  |
+--------+--------+--------+--------+--------+--------+--------+--------+
```

The i-level bits, ilvl[1], ilvl[0], are the current context code from
the interrupt context stack. They are encoded as follows:
```
         ilvl[1:0]   context
            00       Not in an interrupt context
            11       CD18xx is in a receive interrupt context
```

Appendix_II

10    CD18xx is in a transmit interrupt context
    01    CD18xx is in a modem interrupt context RREQ, TREQ, MREQ  positive true state of signal pins RREQ*, TREQ* and MREQ*
    reflecting global state of wired-or pin values.

rreq, treq, mreq  positive true state of the chip's local service requests

An accepted interrupt acknowledge cycle pushes a new context onto
  the stack.

Appendix_II

Address Decode Logic functions (not specifically shown in Fig 7):

```
    Ext. Addr.  |register | iop  |  adinc   |ctinc|indir| eos| ilvl  |
    G D RR rrr  |         | 1 0  |  1 0     |     |  ** | ** |       |
    ------------+---------+------+----------+-----+-----+----+-------+
    1 1 11 000  |*{RDR}   | 0 0  | 1 0 (+2) |(-)1 |  1  | 0  | 1 1   |
    1 1 11 010  | {RCSR}  | 0 0  | 0 0 (0)  |  0  |  1  | 0  | 1 1   |
                |         |      |          |     |     |    |       |
    1 1 11 011  | {TDR}   | 0 0  | 0 1 (+1) |(-)1 |  1  | 0  | 1 0   |
                |         |      |          |     |     |    |       |
    1 1 11 111  | {EOSRR} | 0 0  | 0 0 (0)  |  0  |  1  | 1  | x x   |
                |         |      |          |     |     |    |       |
    1 0 00 011  | {GSCR3} | 1 0  | 0 0 (0)  |  0  |  0  | 0  | 1 1   |
    1 0 00 010  | {GSCR2} | 1 0  | 0 0 (0)  |  0  |  0  | 0  | 1 0   |
    1 0 00 001  | {GSCR1} | 1 0  | 0 0 (0)  |  0  |  0  | 0  | 0 1   |
```

* The Receive Data Fifo is on odd addresses only so that
  the address lsb = ctinc for ilvl = 3 indirect operations.
  That is, ad[0] = ctinc for ilvl[0:1] = [1,1].

** indir and eos are anded with bilop to produce cycle oriented
   pulses that control internal decodes, muxing, etc.
   Bilop (Bus Interface Logic OPeration) is a signal that is true
   during the clock cycle in which the chip responds to a read or
   write operation by the exernal host system.

*** On an accepted ACK or regack cycle (not passed on the daisy
    chain), the address latch holding the address used on the
    internal bus, is forced by asynchronous set and reset inputs to
    the address [1000000] of the {GSVR}.

Context Stack Operation functions:

Because register based acknowledge functions may force the chip to
respond to a service acknowledge when it doesn't have a service
request pending, some changes are required from the cd180 version
of these functions. For this case, the acklvl[1:0] will = 00, but
ack-taken will be forced true. The acklvl[1:0] is the binary code
for the service context we are entering. However, 00 is a new
special case where the chip must respond to the acknowledge (not
pass it) but a new context is not being entered. The service
vector will reflect the 00 acklvl and the stack logic must be
careful not to push this value onto the stack.

```
    ack = ack-taken x bilop
    realack = acklvl[1] + acklvl[0]

push stack = ack x rd x realack     (ACK* reads {GSVR})
    pop stack  = eos x wr               (user MUST write to {EOSRR})

push+pop+devwr = wr x stksel  +  wr x eos  +  ack x rd x realack
    pushstk = ack-taken =  mine  +  regack x pass x daisyen*
```

Appendix_II

The value at bottom of context stack is ilvl[1:0], defining the current context.

if acklvl[0:1] is non-zero, it is pushed onto stack by ack x rd

Appendix_II

Service Request Que Controllers:

The bank select bit appears as a read-only bit in bit4 of both
service request controller register banks. The sreq# bits in the
cd18xx may be read in the Service Request Status Register.

Controller 3 (receive service requests):

```
      aa         Controller state bits are muxed by
      cc         Bank into ENsel, ACTsel, EOSsel
   f kk ii    e  E A E   E A E- B ||r E A E   C S C
   a ll ll a  o  N C O   N C O  A ||r N C O   H b b
   i vv vv c  s  3 T I   3 T I  N ||e 3 T I   G n n
   r ll ll k     0 3 3   1 3 3  K ||q   3 3   3 k k
   3 10 10       0 0     1 1    3 ||          3 3
   ----------------------------------+---------------------
A3 x xx xx x x  0 0 0   x x x  0 ||0 x x x   0 1 0   \_ Change Bank
A3 x xx xx x x  x x x   0 0 x  1 ||0 x x x   0 0 1   /  (bank will toggle
                                 | |                    while ENsel x ACTsel = 0)
                                 | |
C3 1 xx xx x x  1 0 0   x x x  0 ||0 1 1 0   1 0 0   \_ Assert Service Request
C3 1 xx xx x x  x x x   1 0 0  1 ||0 1 1 0   1 0 0   /
                                 | |
E3 x 11 xx 1 0  1 1 0   x x x  0 ||1 0 1 0   1 0 0   \_ Acknowledge Svc Req
E3 x 11 xx 1 0  x x x   1 1 0  1 ||1 0 1 0   1 0 0   /
                                 | |
G3 x xx 11 0 1  0 1 0   x x x  0 ||0 0 0 1   1 0 0   \_ EOS
G3 x xx 11 0 1  x x x   0 1 0  1 ||0 0 0 1   1 0 0   /
         sreq3 = EN3sel x ACT3sel
```

Controller 2 (transmit service requests):

```
      aa         Controller state bits are muxed by
      cc         Bank into ENsel, ACTsel, EOSsel
   f kk ii    e  E A E   E A E  B ||t E A E   C S C
   a ll ll a  o  N C O   N C O  A ||r N C O   H b b
   i vv vv c  s  2 T I   2 T I  N ||e 2 T I   G n n
   r ll ll k     0 2 2   1 2 2  K ||q   2 2   2 k k
   2 10 10       0 0     1 1    2 ||          2 2
   ----------------------------------+---------------------
A2 x xx xx x x  1 0 0   0 0 x  1 ||0 x x x   0 0 1   \_ Change Bank
A2 x xx xx x x  0 0 x   1 0 0  0 ||0 x x x   0 1 0   /  (bank will toggle
                                 | |                    while ENsel x ACTsel = 0)
                                 | |
C2 1 xx xx x x  1 0 0   x x x  0 ||0 1 1 0   1 0 0   \_ Assert Service Request
C2 1 xx xx x x  x x x   1 0 0  1 ||0 1 1 0   1 0 0   /
                                 | |
E2 x 10 xx 1 0  1 1 0   x x x  0 ||1 0 1 0   1 0 0   \_ Acknowledge Svc Req
E2 x 10 xx 1 0  x x x   1 1 0  1 ||1 0 1 0   1 0 0   /
                                 | |
G2 x xx 10 0 1  0 1 0   x x x  0 ||0 0 0 1   1 0 0   \_ EOS
G2 x xx 10 0 1  x x x   0 1 0  1 ||0 0 0 1   1 0 0   /
         sreq2 = EN1sel x ACT1sel
```

Appendix_II

```
Controller 1 (modem service requests):

aa         Controller state bits are muxed by
      cc         Bank into ENsel, ACTsel, EOSsel
   f kk ii    e  E A E   E A E   B ||m E A E   C S C
   a ll ll a  o  N C O   N C O   A ||r N C O   H b b
   i vv vv c  s  1 T I   1 T I   N ||e 1 T I   G n n
   r 11 11 k     0 1 1   1 1 1   K ||q   1 1   1 k k
   1 10 10       0 0     1 1 1   1 ||           1 1
   -------------------------------+-----------------------
   A1 x xx xx x x  0 0 x  x x x  0 ||0 x x x  0 1 0   \_ Change Bank
   A1 x xx xx x x  x x x  0 0 x  1 ||0 x x x  0 0 1   /  (bank will toggle
                                  ||                     while ENsel x ACTsel = 0)
                                  ||
   C1 1 xx xx x x  1 0 0  x x x  0 ||0 1 1 0  1 0 0   \_ Assert Service Request
   C1 1 xx xx x x  x x x  1 0 0  1 ||0 1 1 0  1 0 0   /
                                  ||
   E1 x 01 xx 1 0  1 1 0  x x x  0 ||1 0 1 0  1 0 0   \_ Acknowledge Svc Req
   E1 x 01 xx 1 0  x x x  1 1 0  1 ||1 0 1 0  1 0 0   /
                                  ||
   G1 x xx 01 0 1  0 1 0  x x x  0 ||0 0 0 1  1 0 0   \_ EOS
   G1 x xx 01 0 1  x x x  0 1 0  1 ||0 0 0 1  1 0 0   / sreq1 = EN1sel x ACT1sel

Dbank = A x Bank* + A* x Bank
      Dbank = Sbnk + BANK x Cbnk*    ;   Sbnk = A x Bank*, Cbnk = A x Bank
```

Data Translation Unit Logic (not specifically shown in Fig 7):

```
   Register read   Data Format                        iop    ack-taken
   ---------------+-----------------------------------+------+---------
                  |           data bus bit            |      |
                  | 7  6  5   4  3  2   1  0          |      |
   {GSCR1} or     |                                   |      |
   {GSCR2} or     | d  d  d   c2 c1 c0  d  d          | 1 0  | 0
   {GSCR3}        |                                   |      |
                  |                                   |      |
   svc. ack.      | d  d  d   d  d  i2  i1 i0         | 0 0  | 1
   ({GSVR})       |                                   |      |
                  |                                   |      |
   Any other      | d  d  d   d  d  d   d  d          | 0 0  | 0
```

'd'  = corresponding data bus bit read into rd_latch
   'c#' = current channel number bit
   's#' = corresponding mods[2:0] modified status bit
   'r'  = corresponding, bank selected, Rx Channel Status Copy bits.

Service acknowledgements force an internal read of the {GSVR} but modify
the 3 least significant bits to provide an acknowledge code to the host.

Appendix_II

```
'i#' = the modification code bits, determined by acklvl[1:0]
       and, if a receive vector, an additional bit denoting
       "good data" vs exception type.
       These are named IT2,IT1,IT0 in the cd1864 data sheet.
```

Appendix_II

BIL register address groupings in internal address format:

```
                   ad[10] - G D rrr RRR 000 - ad[0]  +
    {SCR1}                 1 1 001 000 000           |
    {SCR2}                 1 1 010 000 000           |
    {SCR3}                 1 1 011 000 000           |
    {CAR}                  1 1 100 000 000           |
    {SRSR}                 1 1 101 000 000           |
    {SRCR}                 1 1 110 000 000           |
    {STK}                  1 1 111 000 000           |
                           - -     --- ---           +- bilgr
                                                     |
                   ad[10] - G D ccc RRR rrr - ad[0]  +
    {RFPR0}                0 1 000 000 000           |
    {TFPR0}                0 1 000 000 001           |
    {RFCR0}                0 1 000 000 010           |
    {TFCR0}                0 1 000 000 011           |
    {RIR0}                 0 1 000 000 100           |
    {TIR0}                 0 1 000 000 101           |
    {MIR0}                 0 1 000 000 110           |
    {RCSC0}                0 1 000 000 111           |
                           - -  --  ---              +- aiuadr
                                                     |
                   ad[10] - G D ccc RRR rrr - ad[0]  |
    {RFPR1}                0 1 001 000 000           |
    {TFPR1}                0 1 001 000 001           |
    {RFCR1}                0 1 001 000 010           |
    {TFCR1}                0 1 001 000 011           |
    {RIR1}                 0 1 001 000 100           |
    {TIR1}                 0 1 001 000 101           |
    {MIR1}                 0 1 001 000 110           |
    {RCSC1}                0 1 001 000 111           +

Virtual Registers for indirect operations:
                           G D rrr RRR 000
    {RDR}                  1 1 000 011 000
    {RSR}                  1 1 001 011 000
    {RESR}                 1 1 010 011 000
    {TDR}                  1 1 011 011 000
    {EOSRR}                1 1 111 011 000

Service Request Acknowledge Registers:
    {MRAR}                 1 1 101 010 000           +- regackadr
    {TRAR}                 1 1 110 010 000           |
    {RRAR}                 1 1 111 010 000           +
```

Appendix_II

Bus Interface Logic:

The affect of register acknowledge functions on bus handshake machine:

The regack acknowledge registers, RRAR, TRAR and MRAR, effectively are
decoded outside the scope of normal addressing.  The decoding must be
logically quick and based on the raw addresses.  The bus handshake
signals CS* and DS* are delayed in their effect on the BIL bus
handshake state machine (bilop machine) so that the signal regack may
become true in time to keep the BIL from automatically responding to
the regack acknowledge registers.  This is because of the potential for
daisy chaining the acknowledgement to another chip which must be the
one to respond with a vector.  These registers must only stimulate a
bilop machine response through the ack-taken signal.

The bilop machine recognizes when the chip is selected by the host for
a read or write operation, synchronizes that selection to its clock,
Clkin, and generates a signal, bilop during the clock cycle that the
read or write operation uses the internal data bus.

Arrows between blocks in the karnaugh map representation show the
signals which cause state transitions.  Unlabeled arrows are forced,
unconditional transitions.  (Arriving in the state from which the arrow
exits is reason enough to move to the next state.)

```
     the bilop machine                     BilSt
                             /_____\
                      _____      BilB      _____
                     /                              \
          +--------------+-------------+-------------+-------------+
reset ->    select x CLKin   Clkin*       select*    |
          |      -->         -->          -->          -->
          |             |             |             |             |
          |   Idle      |   Sync      | Initbilop   |  InitAbrt   |
          |             |             |             |             |
          |    ^        |             |  |CLKin     |             |
       /  +--|----------+-------------+--|----------+-------------+
       |  |  |dtack*    |             |  v          |             |
       |  |             |             |             |             |
       |  |  EndSel     |  Bildone    |  Strobe1    |  Strobe2    |
 BilA  |  |    <--           <--           -->           -->
       |  |     select*       CLKin*        select*       CLKin*
       |  |             |             |             |             |
       \  +-------------+-------------+-------------+-------------+
```

The bus signals employed are:
    reset   -   initial Power On Reset
    intel   -   the bus mode is Intel, interpret DS* as RD* and
                R/W* as WR* instead of the "Motorola" signal sense
    cs      -   chip select
    ds      -   data strobe
    r/w*    -   read operation if true, write operation if false
    dtack*  -   data transfer acknowledge signal generated by the chip
                to the host Appendix_II ack-taken   -   internal signal from daisy-chain controllers
                indicating the chip is responding to a service
                acknowledge cycle The select signal is the combined stimulus to the bilop machine,
causing it to perform clock synchronization, and reserve a clock
cycle for the response to the host read or write operation in progress.

```
select  =  intel* x ds x (cs + ack-taken)  +
           intel  x (ds + (r/w*)*) x (cs + ack-taken)
        =  (cs + ack-taken) x (intel* x ds + intel x ds +
                                         intel x (r/w*)*)
  let chds  =  (ds + intel x (r/w*)*)

=  (cs + ack-taken) x chds
```

However, with the introduction of the register based service
acknowledge functions, a modification is required.  The register
based acknowledge functions are in the "normal" address space of
the cd1800, but they cannot be allowed to trigger a bilop cycle in
the "normal" way.  This is because the chip must respond to the
regack operation as an ack-cycle, not a cs* enabled register
read.  This is particularly true when the chip decides to pass the
regack down the service acknowledge chain by asserting ACKOUT*.
(It wouldn't do to have the regack'ed chip drive the bus AND pass
the acknowledge.)

So, we must qualify the cs and the ds in the above equation with
the term regack*, but to give regack* time to get to the select
logic, we must also delay cs and ds, so the equation becomes:

```
select  =  ((csslow x regack*) + ack-taken) x chdsslow
``` csslow is cs delayed through 2 slow inverters
chdsslow is chds delayed through 2 slow inverters

```
regack    = regackadr x (Adr[1] + Adr[0]) x (regacken x cs x ds)
regackadr = Adr[6] x Adr[5] x Adr[4] x Adr[3]* x Adr[2]

dtacken = Strobe1 + Strobe2  =  BilSt x BilA bilop  =  BilSt

Sbila   =  BilSt x BilB x CLKin
Rbila   =  BilSt* x BilB* x dtack*  +  reset

Sbilb   =  BilA* x BilSt* x select x CLKin
Rbilb   =  BilSt x select*  +  BilSt* x BilA x select*  +  reset Sbilst  =  BilA* x BilB x CLKin*
Rbilst  =  BilA x CLKin*  +  BilA* x BilB*  +  reset
```

Appendix_II

Daisy-Chain Controllers:

Logic required to support Cirrus's Fair Share Daisy Chain (tm) for multiple service types:

accept-or-pass machine: (3 required, 1 for each service level)

An indexed notation is used here for brevity.  Instead of refering
   to the service request and acknowledge types as receive, transmit,
   and modem we use indexes 3, 2, and 1.  The corresponding binary
   codes 11, 10, and 01 are the binary context values representing
   these types in the design.  So sreq3 corresponds to rreq (receive
   request), and so forth.  The lower case n at the end of state and
   signal names is a place holder for an index number.  That is, the
   description is a generic one for the "n'th" set of logic out of "n"
   types of service.

(Pass indicates the decision for a given service type to pass
   the acknowledgment.  Reaching the state "MINEn" indicates
   recognition of the type of service request, the device will "accept".)

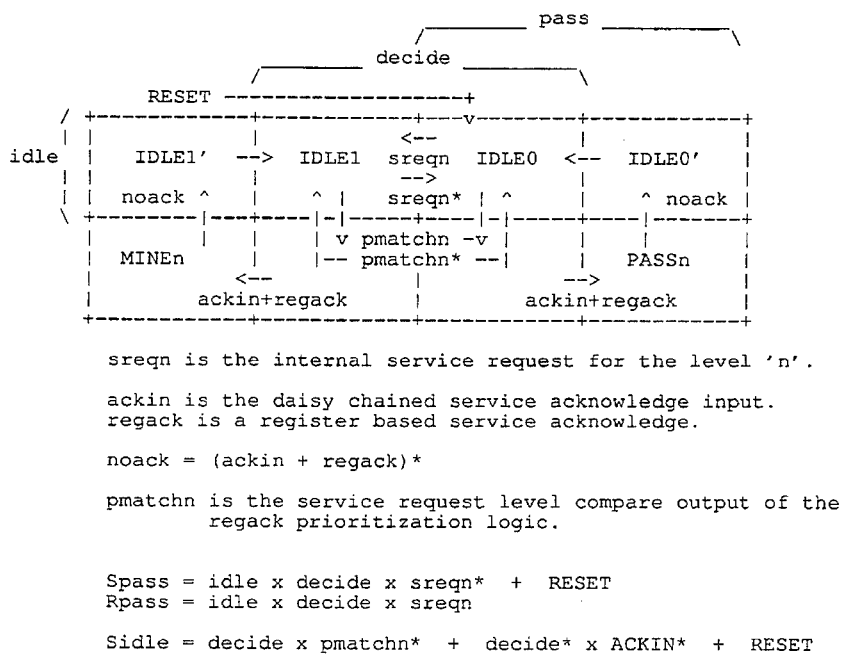

sreqn is the internal service request for the level 'n'.

ackin is the daisy chained service acknowledge input.
   regack is a register based service acknowledge.

noack = (ackin + regack)* pmatchn is the service request level compare output of the
         regack prioritization logic.

Spass = idle x decide x sreqn*  +  RESET
   Rpass = idle x decide x sreqn

Sidle = decide x pmatchn*  +  decide* x ACKIN*  +  RESET

Appendix_II

```
Ridle = decide x pmatchn

Sdecide = idle  +   RESET
Rdecide = idle* x ACKIN

MINEn = pass* x idle* x decide*
      ===>  ackn (needs to be qualified with bilop to
      function as sequence control for service request
      controller 'n' and "push" for context stack PASSn = pass x idle* x decide*
      ===> accept-or-pass machine "n" has recognized the
      acknowledge is for its type of service request and it does not
      have one pending, so pass the acknowledge to the next
      chip

PASS = PASS1 + PASS2 + PASS3

ACKOUT  =   PASS x (DaisyEn + regack*)

MINE = mine1 + mine2 + mine3
```

Appendix_II

Regack Prioritization Logic:

The original design produced "match" outputs from a Content
Addressible Memory (Service Acknowledge Recognition CAM), activated
during service acknowledgments to recognize the type of
acknowledgment being given. The CAM logic is still present, but in
addition there is the Register Acknowledgment mechanism represented
by the 3 regack registers, Receive Service Acknowledge Register,
Transmit Service Acknowledge Register and Modem Service Acknowledge
Register. This is embodied in the Register Acknowledge Recognition
block attached to the Bus Interface Logic block of Figure 7. With
service acknowledgments enabled, reading these registers asserts one
of the signals rxregack, txregack or mdregack. These new signals are
combined with the original match signals to form "newmatch" signals
which are processed through the prioritization logic before being
presented to the daisy chain controllers as "pmatch" signals
(prioritized match).

It's best to decode the newmatch1 condition (modem acknowledge) as
the qualifier for generating a prioritized match based on examining
the priority options and the current state of sreq's and SREQ's.
This is not only simpler, but allows specific acknowledgments of the
higher priority Transmit and Receive types to be unaffected by
prioritization if the user should want to override prioritization for
one or a few acknowledgments. The latches on the sreq/SREQ input mux
lines are used for the Service Request Status Register. Since the
match signals as well as reads of SRSR are intiated by DS* the
latches are clocked with DS* to freeze them whenever DS* is asserted.
This should eliminate glitches whenever the prioritization logic is
active. Though not indicated in the following equations, the actual
request states evaluated are the outputs of the SRSR latches.

The tidiest implementation of the prioritizing logic pre-qualifies the
active sreqs on and off chip based on the priority option bits. This
is built with pass gates to pre and post shuffle PriSel'ected levels
to simple prioritizing logic. At the end, we AND with newmatch1.

Appendix_II

Diagram of prioritization logic

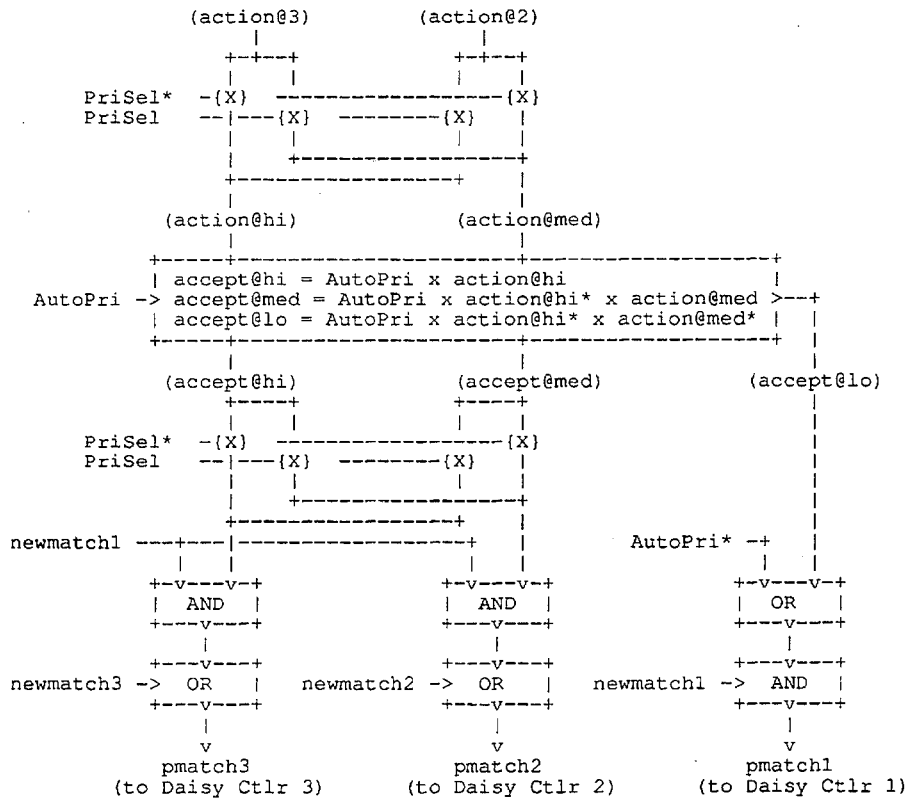

"accept@" results are prioritized, mutually exclusive and only
generated for AutoPri = 1. For AutoPri, newmatch1 activates
prioritization and will be the only match type used. The other matches
are still active for "normal" operation and come in through the final
OR gates before sending signals pmatch3, pmatch2, and pmatch1
(prioritized match) to trigger the respective Daisy Chain Controllers.

The "action" signals are assessments of the internal (rreq, treq, mreq)
and external (RREQ, TREQ, MREQ) request state and the global priority
option.

Appendix_II

```
action@3  =  rreq + (RREQ x globpri)
action@2  =  treq + (TREQ x globpri)

acklvl1 = mine2 + mine3
acklvl0 = mine3 + mine1 mine    = mine3 + mine2 + mine1 ack-taken =   mine  +  pass x DaisyEn* x regack
ACKOUT    =  pass x (DaisyEn + regack*)

Note: mine and pass are triggered by (regack + ackin).

regack   = regackadr x (regacken x cs x ds) x (Adr[1] + Adr[0])
regackadr = Adr[6] x Adr[5] x Adr[4] x Adr[3]* x Adr[2]

mdmregack = (regacken x ds x cs) x regackadr x Adr[1]* x Adr[0]
txregack  = (regacken x ds x cs) x regackadr x Adr[1] x Adr[0]*
rxregack  = (regacken x ds x cs) x regackadr x Adr[1] x Adr[0]

newmatch1 = match1 + mdmregack
newmatch2 = match2 + txregack
newmatch3 = match3 + rxregack
```

I claim:

1. A computer system, comprising:
   (a) a peripheral device operable to initiate a service request of one of a plurality of types of service requests by generating a service request signal;
   (b) a service request controller, coupled to said peripheral device, having a register corresponding to a register address, and operable to receive said service request signal and to generate an interrupt request signal in response thereto; and
   (c) a processor, coupled to said service request controller, operable, in response to said interrupt request signal, to interrupt its normal execution and to issue an interrupt acknowledgment, and having a read command operable to specify said register address thereby acknowledging a pending service request;
   said service request controller being operable, in response to either said service request acknowledgment or said interrupt acknowledgment, to select which of the service requests currently pending is to be acknowledged based on which service request type has the highest priority, and to provide said processor with a vector corresponding to the service request being acknowledged.

2. A computer system according to claim 1 wherein said service request controller is operable to provide said processor with a predetermined vector in response to said read command specifying said register address when there is no service request pending.

3. A computer system according to claim 1, wherein
   said service request controller has a plurality of registers corresponding to a plurality of register address and to said plurality of types of service requests; and
   said read command acknowledges service requests of a particular type by specifying said corresponding register address.

4. A computer system according to claim 1, wherein said types of service requests comprise transmit data service requests, receive data service requests, and modem signal change service requests.

5. A computer system according to claim 1, wherein
   said service request controller has a control register operable to hold a current priority order among said types of service requests;
   said service request controller performs said selection of which service request currently pending has the highest priority based on said current priority order; and
   said processor can alter the value of said current priority order within said control register.

6. A computer system according to claim 1, wherein
   said processor is operable in a normal mode to process information and in a service request mode to handle service requests; and
   after said processor completes handling a first service request and before said processor returns to said normal mode, said read command specifies said register address thereby acknowledging a second service request if one is pending.

7. A computer system, comprising:
   (a) a plurality of peripheral devices, each operable to initiate a service request of one of a plurality of types of service requests by generating a corresponding service request signal;
   (b) a plurality of service request controllers, each coupled to at least one of said peripheral devices, each having a register corresponding to a register address, and each operable to receive the service request signal corresponding to said coupled peripheral device and to generate an interrupt request signal in response thereto, said plurality of service request controllers being coupled together as a daisy chain with one of said service request controllers at the head of said daisy chain;
   (c) a processor, coupled to said head service request controller, operable, in response to said interrupt request signal, to interrupt its normal execution and to issue an interrupt acknowledgment, and having a read command operable to specify said register address thereby providing a service request acknowledgment to said head service request controller;
   each said service request controller being operable, in response to receipt of either said service request acknowledgment or said interrupt acknowledgment, to select one of the service requests pending from any of said peripheral devices connected thereto or, if there are no such pending service requests, to pass said service request acknowledgment on to the next service request controller in said daisy chain, said selecting or said passing being based on which service request type has the highest priority; and
   each said service request controller being operable, in response to either said service request acknowledgment or said interrupt acknowledgment, to provide said processor with a vector that corresponds to the type of service request being acknowledged and that corresponds to which of said service controllers has said service request being acknowledged.

8. A computer system according to claim 7, wherein said service request controllers are operable to provide said processor with a predetermined vector in response to said read command specifying said register address when there is no service request pending.

9. A computer system according to claim 7, wherein
   each said service request controller has a plurality of registers corresponding to a plurality of register address and to said plurality of types of service requests; and
   said read command acknowledges service requests of a particular type by specifying said corresponding register address.

10. A computer system according to claim 7, wherein said types of service requests comprise transmit data service requests, receive data service requests, and modem signal change service requests.

11. A computer system according to claim 7, wherein
    said service request controller has a control register operable to hold a current priority order among said types of service requests;
    said service request controller performs said selection of which service request currently pending has the highest priority based on said current priority order; and
    said processor can alter the value of said current priority order within said control register.

12. A computer system according to claim 7, wherein said service request controllers are operable:
    to select which of its currently pending service requests is to be acknowledged based on which has the highest priority when said read command acknowledges a predetermined type of service request and no other of said service request controllers has a higher priority service request pending; and
    to pass the service request acknowledgment on to the next service request controller in said daisy chain when said read command acknowledges a predetermined type of service request and another of said service request controllers has a higher priority service request pending.

13. A computer system according to claim 7, wherein each said service request controller has a control register operable to hold a current priority order among said basic types of service requests;

each said service request controller is operable to select said highest priority service request based on said current priority order; and said processor can alter the value of said current priority order within each said control register.

14. A computer system according to claim 7, wherein said processor is operable in a normal mode to process information and in a service request mode to handle service requests; and after said processor completes handling a first service request and before said processor returns to said normal mode, said read command acknowledges a second service request if one is pending.

15. A computer system, comprising:

(a) a first peripheral device operable to initiate a service request of one of a plurality of types of service requests by generating a service request signal;

(b) a service request controller, coupled to said first peripheral device, having a register corresponding to a register address, and operable to receive said service request signal and to generate a first interrupt request line signal in response thereto;

(c) a second peripheral device operable to initiate an interrupt by generating a second interrupt request line signal;

(d) an interrupt controller, coupled to said service request controller and to said second peripheral device, operable to generate a master interrupt request signal responsive to either said first or said second interrupt request line signals;

(e) a main memory to hold data corresponding to memory addresses; and (f) a processor, coupled to said main memory, to said service request controller and to said interrupt controller, operable, in response to said interrupt request signal, to interrupt its normal execution and to issue an interrupt acknowledgment, and having a read command operable to specify a memory address thereby reading the data corresponding thereto from said main memory, said read command being further operable to specify said register address thereby acknowledging said service request;

said service request controller being operable, in response to either said service request acknowledgment or said interrupt acknowledgment, to select which of the service requests currently pending is to be acknowledged based on which service request type has the highest priority, and to provide said processor with a vector corresponding to the service request being acknowledged.

16. A computer system according to claim 15, wherein said service request controller is operable to provide said processor with a predetermined vector in response to said read command specifying said register address when there is no service request pending.

17. A computer system according to claim 15, wherein said service request controller has a plurality of registers corresponding to a plurality of register address and to said plurality of types of service requests; and said read command acknowledges service requests of a particular type by specifying said corresponding register address.

18. A computer system according to claim 15, wherein said types of service requests comprise transmit data service requests, receive data service requests, and modem signal change service requests.

19. A computer system according to claim 15, wherein said service request controller has a control register operable to hold a current priority order among said types of service requests;

said service request controller performs said selection of which service request currently pending has the highest priority based on said current priority order; and said processor can alter the value of said current priority order within said control register.

20. A computer system according to claim 15, wherein said processor is operable in a normal mode to process information and in a service request mode to handle service requests; and after said processor completes handling a first service request and before said processor returns to said normal mode, said read command specifies said register address thereby acknowledging a second service request if one is pending.

21. A service request controller operable in conjunction with a processor, comprising:

a register acknowledge recognition element, coupled to said processor, operable to recognize a register read acknowledgment from said processor;

an interrupt acknowledge recognition element, coupled to said processor, operable to recognize an interrupt acknowledgment from said processor;

a service acknowledgment prioritization element, coupled to said register acknowledge recognition element and to said interrupt acknowledge recognition element, operable, in response to recognition of either said register read acknowledgment or of said interrupt acknowledgment, to select which of any pending service requests is to be acknowledged, and operable, when said read command specifies a predetermined register address, to select which of the service requests currently pending is to be acknowledged based on which has the highest priority; and a modified service vector element, coupled to said service acknowledgment prioritization element, operable to receive therefrom an indication of said acknowledged service request and to provide said processor with a modified service vector corresponding thereto.

22. A computer system according to claim 21, wherein said modified service vector element is operable to provide said processor with a predetermined vector in response to said processor issuing a register read acknowledgment when there is no service request pending.

23. A computer system according to claim 21, wherein said register acknowledge recognition element has a plurality of registers corresponding to a plurality of register address and to a plurality of types of service requests; and said processor acknowledges service requests of a particular basic type by specifying said corresponding register address.

24. A computer system according to claim 21, wherein said basic types of service requests comprise transmit data service requests, receive data service requests, and modem signal change service requests.

25. A computer system according to claim 21, wherein said service request controller further comprises:

a control register operable to hold a current priority order among said types of service requests; and said service acknowledgment prioritization element is operable, when said processor specifies a predetermined register address, to select which of the service requests currently pending is to be acknowledged based on which has the highest priority based on said current priority order, said processor being able to alter the value of said current priority order within said control register.

* * * * *